US011927457B2

United States Patent
Van Der Merwe et al.

(10) Patent No.: US 11,927,457 B2
(45) Date of Patent: Mar. 12, 2024

(54) SYSTEM AND METHOD FOR REAL TIME CONTROL OF AN AUTONOMOUS DEVICE

(71) Applicant: DEKA Products Limited Partnership, Manchester, NH (US)

(72) Inventors: Dirk A. Van Der Merwe, Canterbury, NH (US); Arunabh Mishra, Manchester, NH (US); Christopher C. Langenfeld, Nashua, NH (US); Michael J. Slate, Merrimack, NH (US); Christopher J. Principe, Nahant, NH (US); Gregory J. Buitkus, Dracut, MA (US); Justin M. Whitney, Goffstown, NH (US); Raajitha Gummadi, Manchester, NH (US); Derek G. Kane, Manchester, NH (US); Emily A. Carrigg, Weare, NH (US); Patrick Steele, Bedford, NH (US); Benjamin V. Hersh, Raymond, NH (US); Fnu G Siva Perumal, Manchester, NH (US); David Carrigg, Manchester, NH (US); Daniel F. Pawlowski, Raymond, NH (US); Yashovardhan Chaturvedi, Manchester, NH (US); Kartik Khanna, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 16/926,522

(22) Filed: Jul. 10, 2020

(65) Prior Publication Data
US 2021/0278851 A1    Sep. 9, 2021

Related U.S. Application Data

(63) Continuation-in-part of application No. 16/800,497, filed on Feb. 25, 2020.
(Continued)

(51) Int. Cl.
G05D 1/02    (2020.01)
G01C 21/00    (2006.01)
(Continued)

(52) U.S. Cl.
CPC ....... G01C 21/3811 (2020.08); G05D 1/0044 (2013.01); G05D 1/0088 (2013.01);
(Continued)

(58) Field of Classification Search
CPC .. G05D 1/0214; G05D 1/0044; G05D 1/0088; G05D 1/0242; G05D 1/0246; G05D 1/0276; G05D 2201/0216
See application file for complete search history.

(56) References Cited

U.S. PATENT DOCUMENTS 8,392,117 B2    3/2013  Dolgov et al.
9,285,230 B1    3/2016  Silver et al.
(Continued)

FOREIGN PATENT DOCUMENTS

CN    107416443 A  * 12/2017 ............. B65G 35/00
JP    2016522508        5/2019
(Continued)

OTHER PUBLICATIONS

English translation of WO-2007057274-A1 (Year: 2007).*
(Continued)

Primary Examiner — Anshul Sood
Assistant Examiner — Matthew Ho
(74) Attorney, Agent, or Firm — William A. Bonk, III

(57) ABSTRACT

An autonomous vehicle having sensors advantageously varied in capabilities, advantageously positioned, and advantageously impervious to environmental conditions. A system executing on the autonomous vehicle that can receive a map including, for example, substantially discontinuous surface features along with data from the sensors, create an occu-
(Continued)

pancy grid based upon the map and the data, and change the configuration of the autonomous vehicle based upon the type of surface on which the autonomous vehicle navigates. The device can safely navigate surfaces and surface features, including traversing discontinuous surfaces and other obstacles.

2 Claims, 72 Drawing Sheets

Related U.S. Application Data

(60) Provisional application No. 62/990,485, filed on Mar. 17, 2020, provisional application No. 62/872,320, filed on Jul. 10, 2019, provisional application No. 62/872,396, filed on Jul. 10, 2019.

(51) Int. Cl.
*G05D 1/00* (2006.01)
*G06V 10/764* (2022.01)
*G06V 20/56* (2022.01)
*G06V 10/44* (2022.01)

(52) U.S. Cl.
CPC ......... *G05D 1/0214* (2013.01); *G05D 1/0242* (2013.01); *G05D 1/0246* (2013.01); *G05D 1/0276* (2013.01); *G06V 10/764* (2022.01); *G06V 20/56* (2022.01); *G05D 2201/0216* (2013.01); *G06V 10/44* (2022.01)

(56) References Cited

U.S. PATENT DOCUMENTS

| | | | |
|---|---|---|---|
| 9,443,163 B2 | 9/2016 | Springer | |
| 9,823,661 B2 | 11/2017 | Pink et al. | |
| 9,997,075 B2 | 6/2018 | Ono et al. | |
| 10,108,866 B2 | 10/2018 | Prinet et al. | |
| 10,365,649 B2 | 7/2019 | Zhu et al. | |
| 10,921,817 B1* | 2/2021 | Kangaspunta | G01S 7/4802 |
| 11,043,026 B1* | 6/2021 | Fathi | G06N 20/00 |
| 2009/0105939 A1 | 4/2009 | Dolgov et al. | |
| 2010/0274430 A1* | 10/2010 | Dolgov | G01C 21/20 701/25 |
| 2016/0021178 A1* | 1/2016 | Liu | H04L 41/06 370/216 |
| 2016/0026184 A1 | 1/2016 | Olshansky et al. | |
| 2018/0045520 A1* | 2/2018 | Haberl | G01C 21/32 |
| 2018/0306587 A1 | 10/2018 | Holz | |
| 2019/0163175 A1* | 5/2019 | Ko | G05D 1/0022 |
| 2019/0287063 A1* | 9/2019 | Skaaksrud | B60Q 5/005 |
| 2019/0340447 A1 | 11/2019 | Wei et al. | |
| 2020/0142417 A1* | 5/2020 | Hudecek | B60W 30/0953 |

FOREIGN PATENT DOCUMENTS

| | | | | |
|---|---|---|---|---|
| KR | 101209573 | | 12/2012 | |
| WO | WO-2007057274 A1 * | | 5/2007 | ........... B60Q 1/0023 |

OTHER PUBLICATIONS

English translation of CN-107416443-A.*
English translation of WO-2007057274-A1.*
International Search Report, Intl. App. # PCT/US2020/041711, dated Oct. 12, 2020.
B-H Schafer et al., The Application of Design Schemata in Off-Road Robotics, IEEE Intelligent Transportation Systems Magazine, vol. 5:1, Jan. 1, 2013.
International Search Report and Written Opinion, App # PCT/US2020/019670, dated Jul. 6, 2020, 24 pages.
Burger, Occupancy Grid Mapping using Stereo Vision, Thesis, Master of Engineering, Stellenbosch University, Mar. 2015.
Chen et al., Velodyne-based Curb Detection Up to 50 Meters Away, National University of Defense Technology, DOI:10.13140/RG.2.1.4714.7680, Jun. 2015.
El-Halawany et al., Detection of Road Curb from Mobile Terrestrial Laser Scanner Point Cloud, International Archives of the Photogrammetry, Remote Sensing and Spatial Information Sciences, vol. XXXVIII-5/W12, 2011 ISPRS Calgary 2011 Workshop, Calgary, Canada, Aug. 29-31, 2011.
Grabowski et al., Autonomous Exploration via Regions of Interest, Carnegie Mellow University, Proceedings, 2003 IEEE/RSJ International Conference on Intelligent Robots and systems, vol. 2, DOI:10.1109/IROS.2003.1248887, 2003.
Guo et al., On Calibration of Modern Neural Networks, arXiv:1706.04599v2 [cs.LG] Aug. 3, 2017.
Hinton et al., Distilling Knowledge in a Neural Network, arXiv:1503.02531v1 [stat.ML] Mar. 9, 2015.
Hu et al., Real-time extraction method of road boundary based on three-dimensional lidar, IOP Conference Series: Journal of Physics: Conference Series 1074 (2018) 012080, DOI:10/1088/1742-6596/1074/1/012080, 2018.
Huang et al., A Practical Point Cloud Based Road Curb Detection Method for Autonomous Vehicle, MDPI, Information (Switzerland) 8(3):93, DOI: 10.3390/info8030093, Jul. 30, 2017.
Mangalam et al., U-Net Compression Using Knowledge Distillation, Master's Semester Project, EPFL, Switzerland, https://karttikeya.github.io/, Sep. 2017-Feb. 2018.
Morisset et al., Leaving Flatland: Toward Real-Time 3D Navigation, 2009 IEEE International Conference on Robotics and Automation, Kobe Japan, May 12, 2009.
Norouzi et al., Planning High-Visibility Stable Paths for Reconfigurable Robots On Uneven Terrain, 2012 IEEE/RSJ International Conference on Intelligent Robots and Systems, Oct. 7, 2012.
Rhee et al., Low-Cost Curb Detection and Localization System Using Multiple Ultrasonic Sensors, Sensors 2019, 19(6), 1389, https://doi.org/10.3390/s19061389, Mar. 21, 2019.
Rodríguez-Cuenca et al., Morphological Operations to Extract Urban Curbs in 3D MLS Point Clouds, ISPRS Int. J. Geo-Inf. 2016, 5(6), 93; https://doi.org/10.3390/ijgi5060093, Jun. 14, 2016.
Rusu et al., Leaving Flatland: Efficient Real-Time Three-Dimensional Perception and Motion Planning, Journal of Field Robotics, vol. 26:10, Oct. 1, 2009.
Sless et al., Self-Supervised Occupancy Grid Learning From Sparse Radar For Autonomous Driving, General Motors, Advanced Technical Center, Israel, arXiv:1904.00415v1 [cs.CV] Mar. 31, 2019.
Thrun et al., Probabilistic Robotics, Early draft—not for distribution, https://docs.ufpr.br/~danielsantos/ProbabilisticRobotics.pdf, 1999-2000.
Zhang et al., A Real-time Curb Detection and Tracking Method for UGVs by Using a 3D-LIDAR Sensor, 2015 IEEE Conference on Control Applications (CCA), Sep. 21-23, 2015, DOI: 10.1109/CCA.2015.7320746, Sep. 2015.
Zhang et al., Road-Segmentation based Curb Detection Method for Self-driving via a 3D-LiDAR Sensor, IEEE Transactions on Intelligent Transportation Systems, vol. 19:12, Dec. 2018).
Communication issued in European Patent Application No. 10750954.8, dated Feb. 17, 2022, 3 pages.
International Preliminary Report on Patentability issued in PCT Patent Application No. PCT/US2020/041711, dated Jan. 11, 2022, 15 pages.
Naresh, et al., A Residual Encoder-Decoder Network for Semantic Segmentation in Autonomous Driving Scenarios, 2018 26th European Signal Processing Conference (EUSIPCO), 2018, pp. 1052-1056.
Anagnostopolous et al., Detection of Walls, Floors, and Ceilings in Point Cloud Data, ResearchGate, Conference Paper, May 2016, 11 pages.
He, et al., Deep Residual Learning for Image Recognition, Semantic Scholar, 2016 IEEE Conference on Computer Vision and Pattern Recognition, Dec. 10, 2015, 12 pages.
Holz, et al., Real-Time Plane Segmentation using RGB-D Cameras, ResearchGate, In Proceedings of 15th RoboCup International Symposium, Istanbul, 2011, 13 pages.

(56) References Cited

OTHER PUBLICATIONS

Cui, et al., Line-Based Registration of Panoramic Images and LiDAR Point Clouds for Mobile Mapping, Sensors, MDPI, 2019, 17, 70, 20 pages.

Ramey, et al., Real-time 3D Surface Tracking and Its Applications, ResearchGate, IEEE Computer Society Conference on Computer Vision and Pattern Recognition, Jul. 2004, 9 pages.

Jiang, et al., RedNet: Residual Encoder-Decoder Network for indoor RGB-D Semantic Segmentation, Cornell University, Aug. 6, 2018, arXiv:1806.01054 [cs.CV], 14 pages.

ArcMap Clipping a polygon feature http://desktop.arcgis.com/en/arcmap/10.3/manage-data/editing-existing-features/clipping-a-polygon-feature.htm Downloaded Feb. 8, 2023.

Angus Johnson, Clipper2—Polygon Clipping and Offsetting Library, Copyright 2010-2022. http://www.angusj.com/delphi/clipper.php Downloaded Feb. 8, 2023.

http://pointclouds.org/documentation/tutorials/region_growing_segmentation.php. Link to non-patent literature was available at time of disclosure in application on filing; however, the link is no longer valid.

http://pointclouds.org/documentation/tutorials/cluster_extraction.php#cluster-extraction Link to non-patent literature was available at time of disclosure in application on filing; however, the link is no longer valid.

http://pointclouds.org/documentation/tutorials/voxel_grid.php Link to non-patent literature was available at time of disclosure in application on filing; however, the link is no longer valid.

https://github.com/mapbox/earcut.hpp github.com/mapbox/earcut.hpp Link to non-patent literature was available at time of disclosure in application on filing; however, the link is no longer valid.

\* cited by examiner

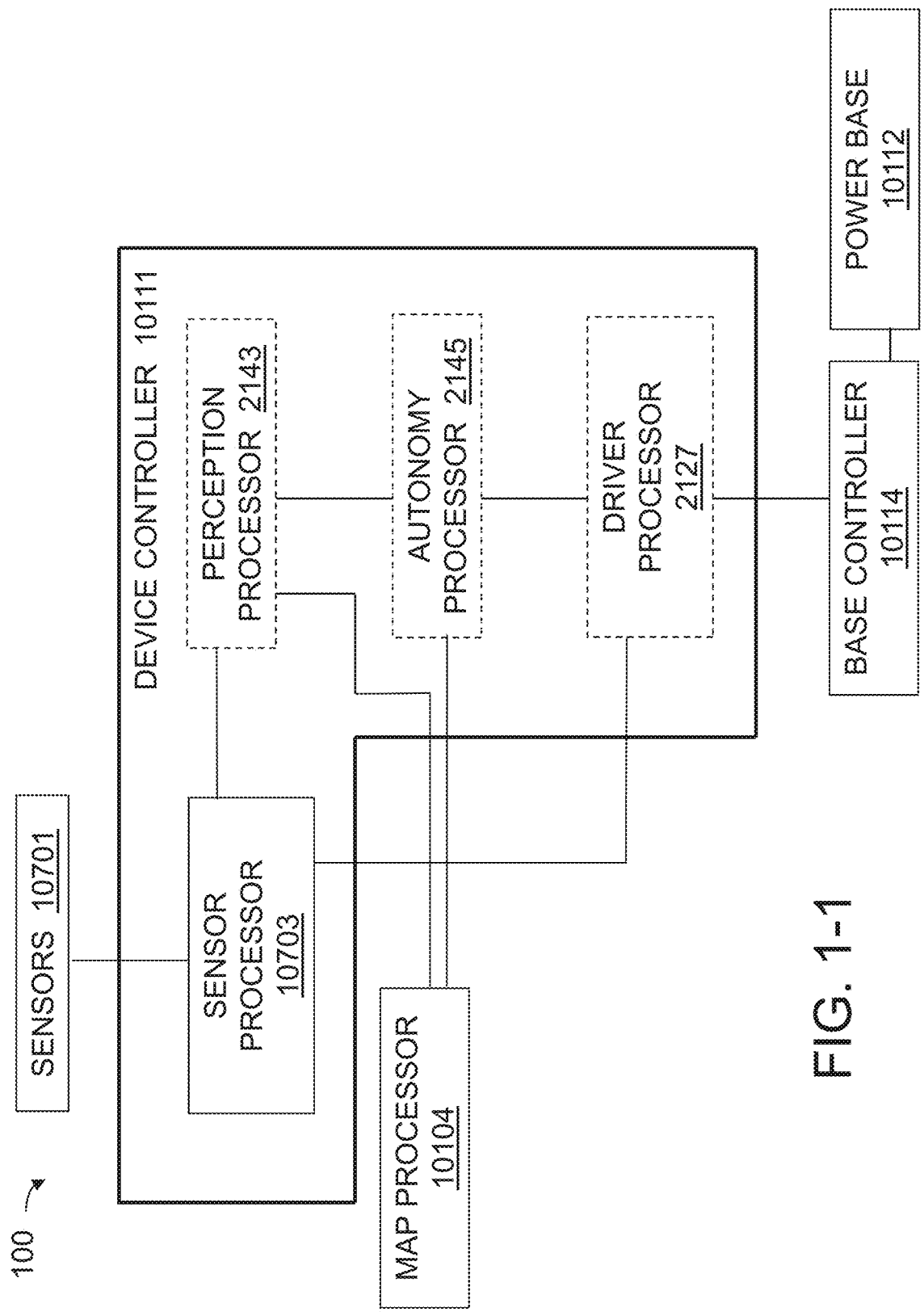

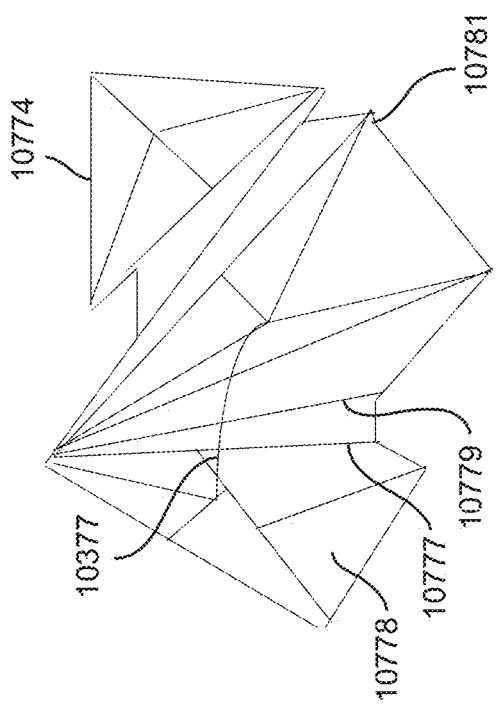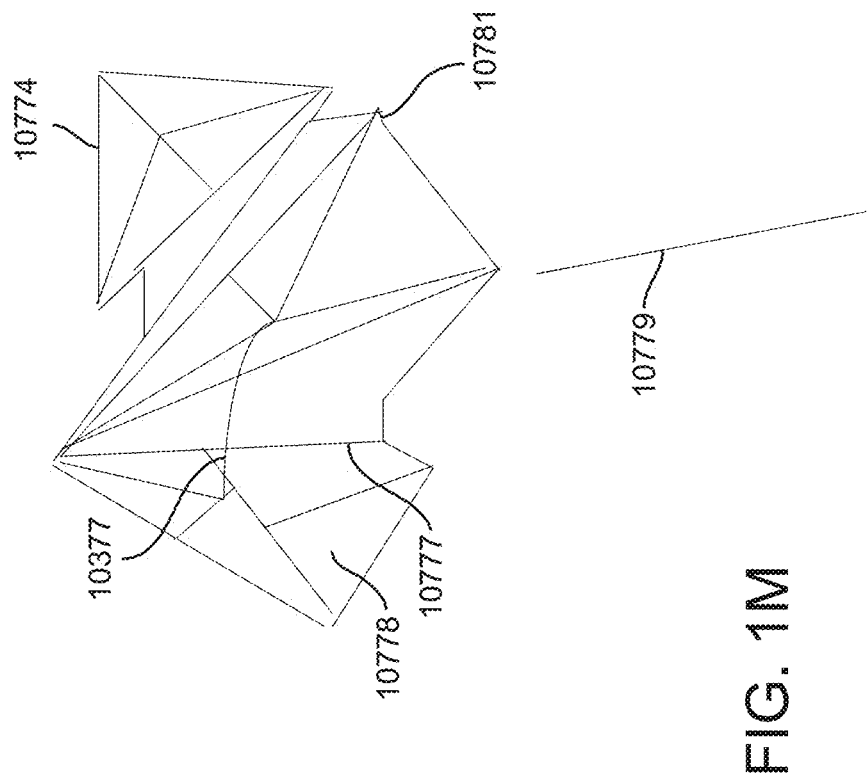
FIG. 1M

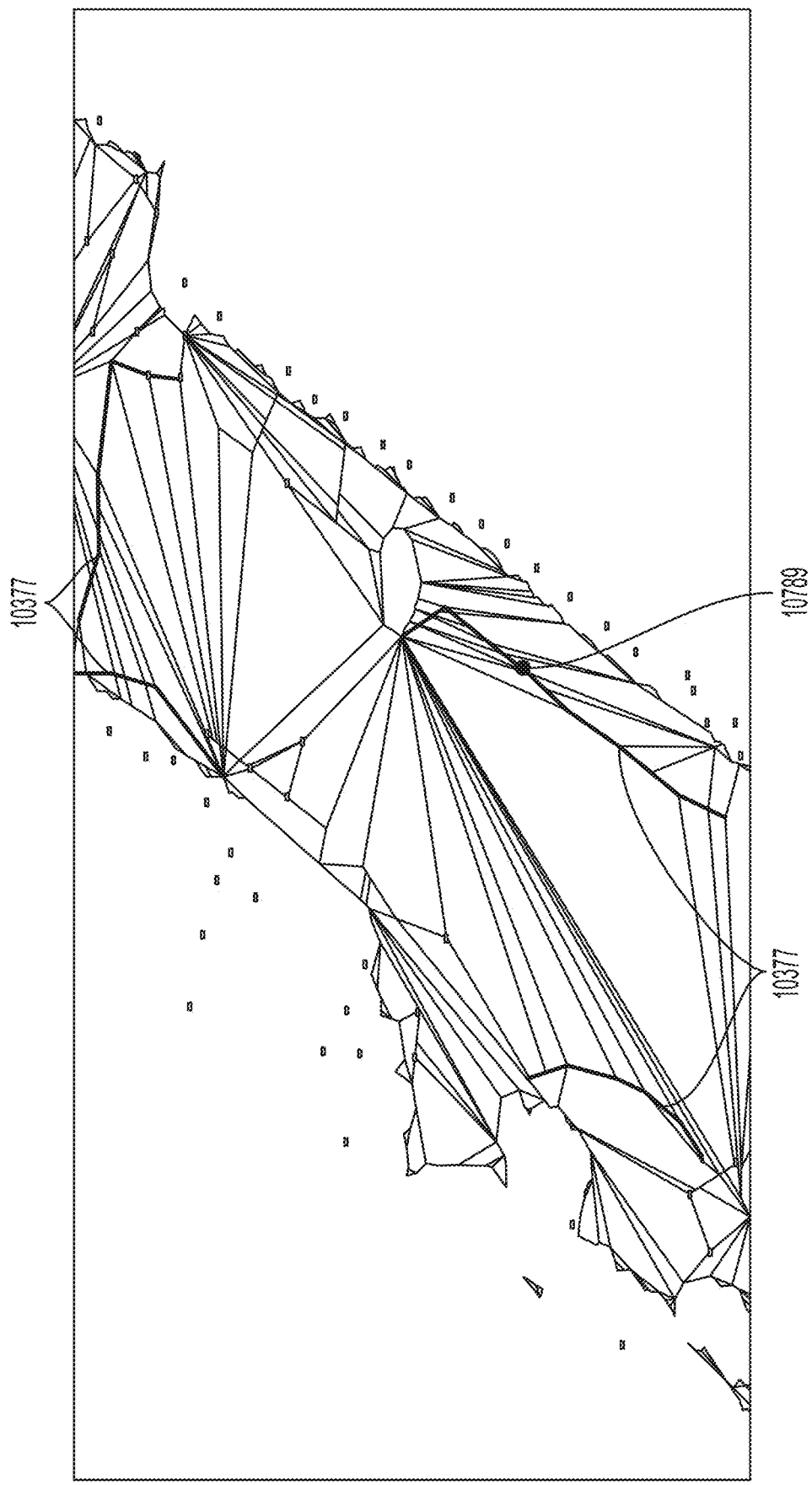

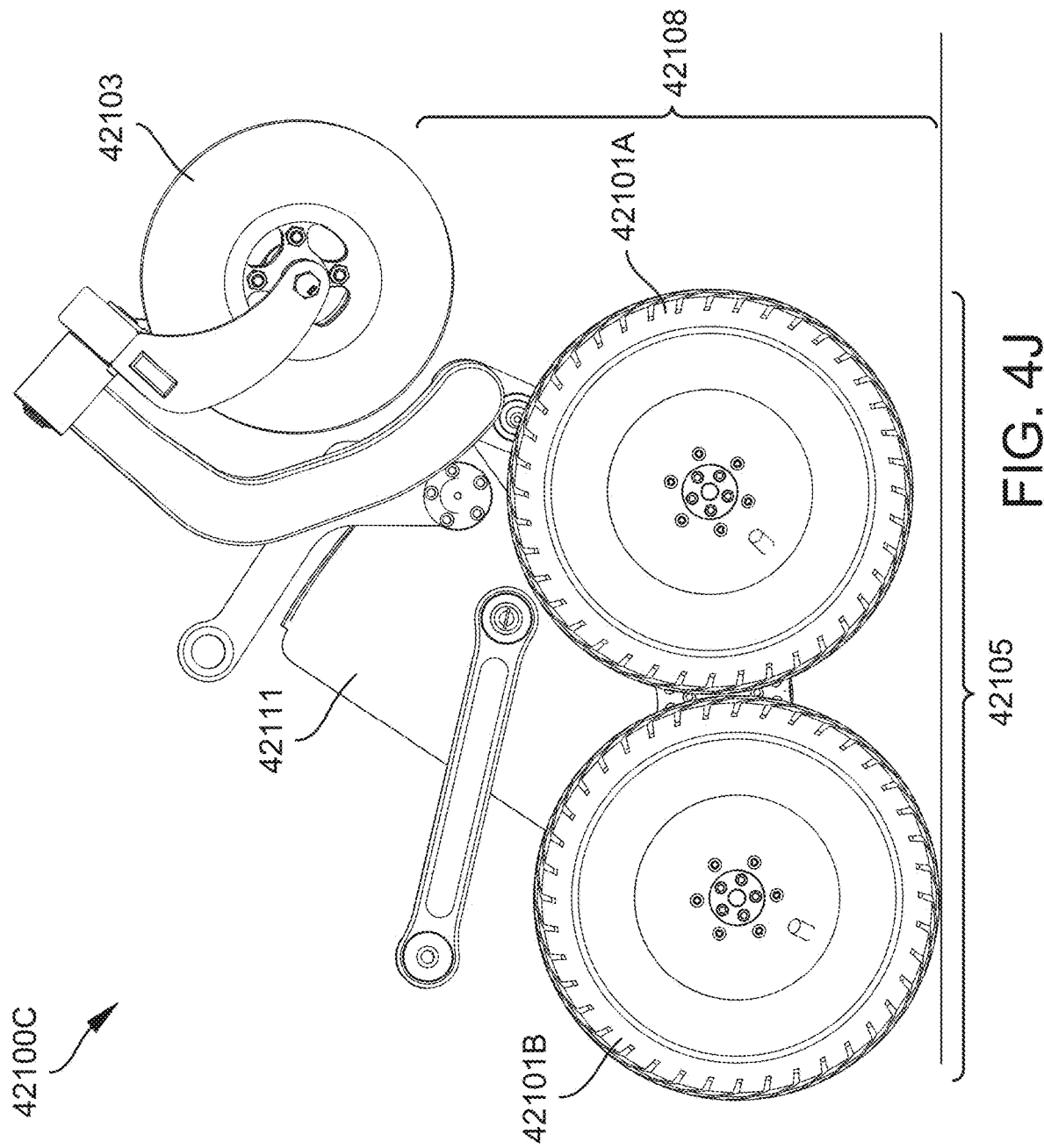

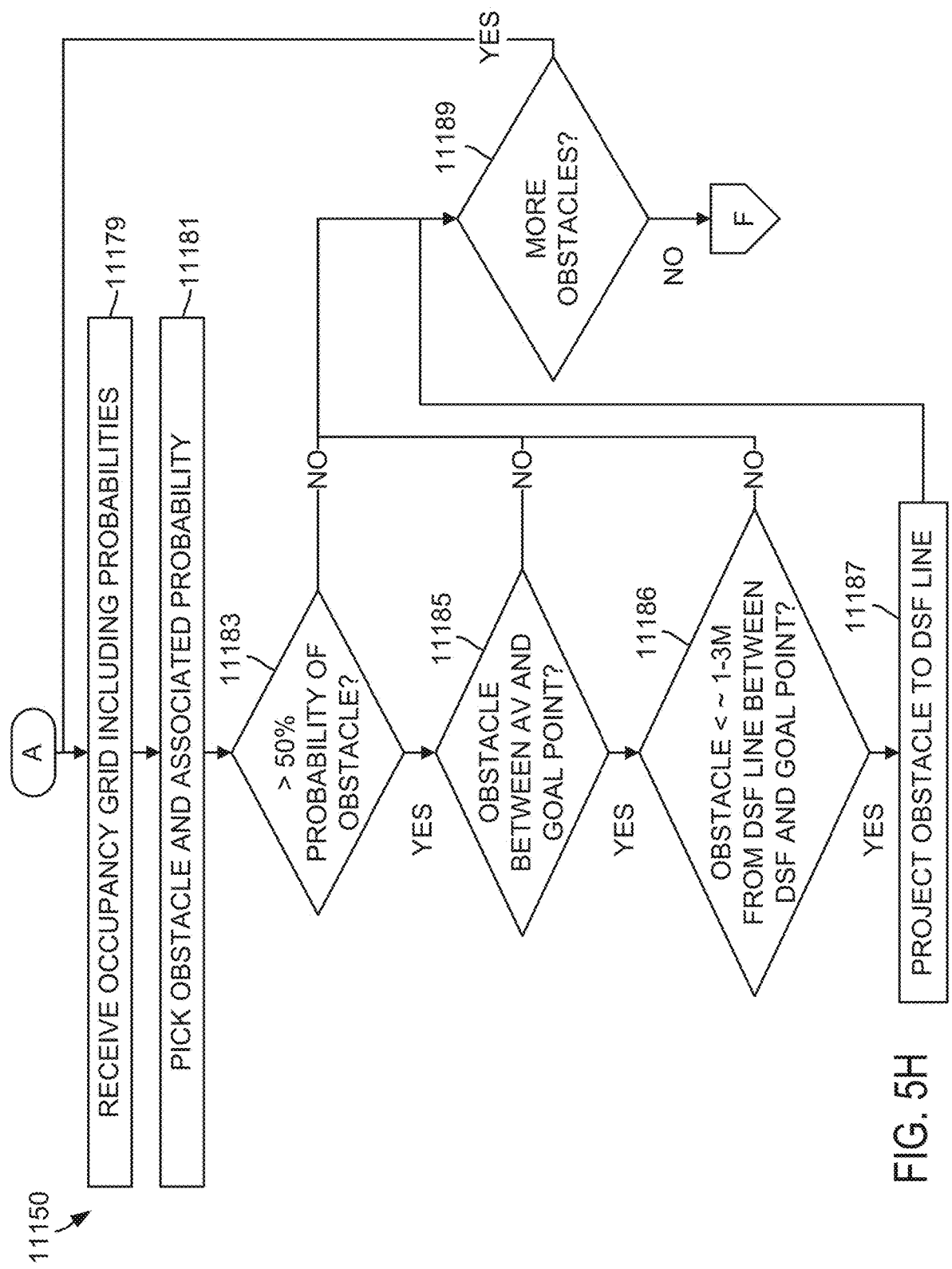

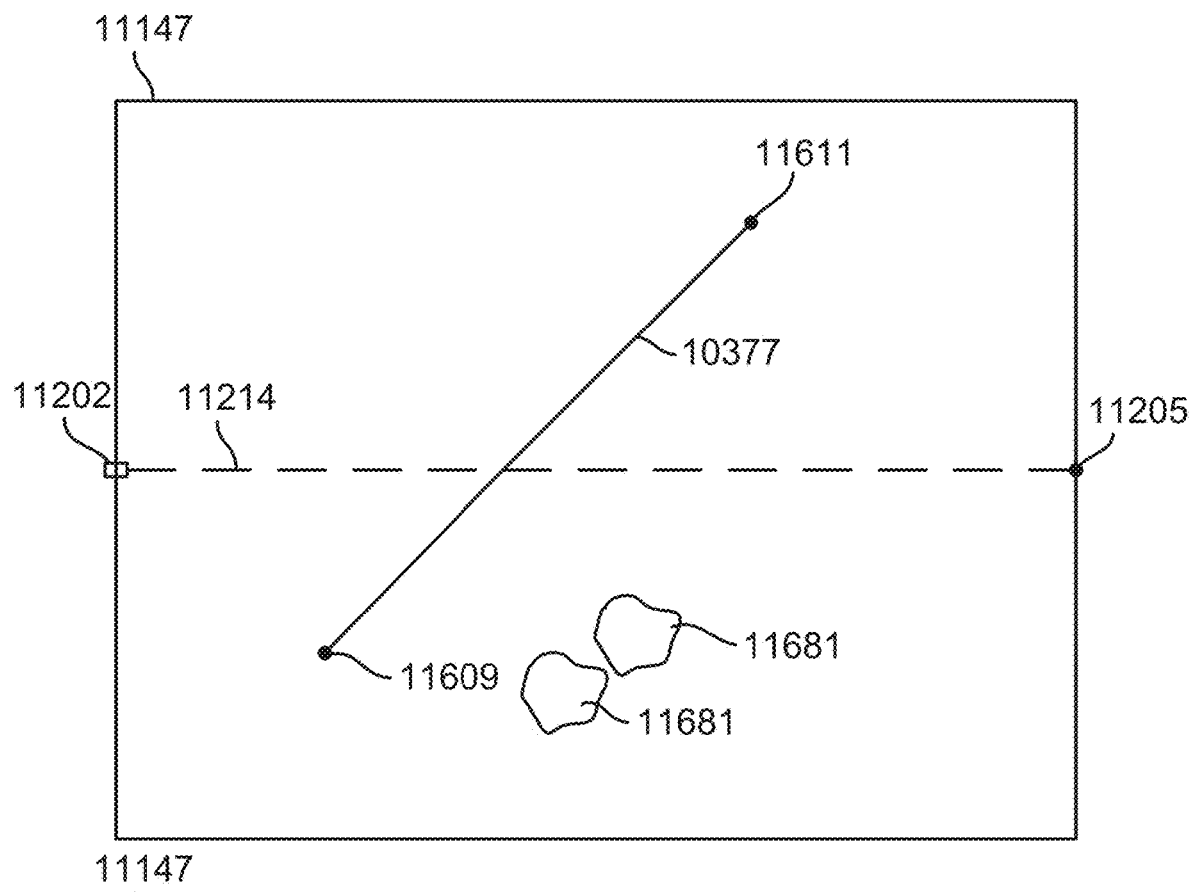
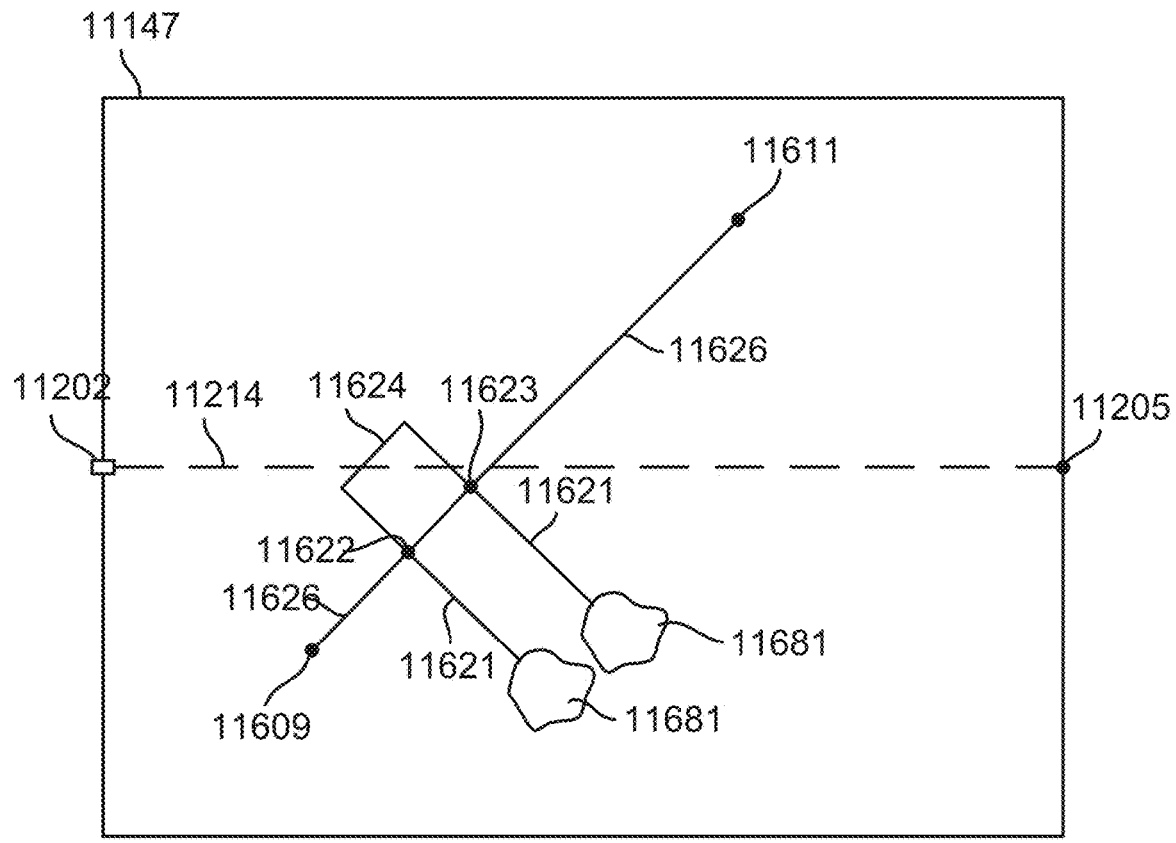
FIG. 5M

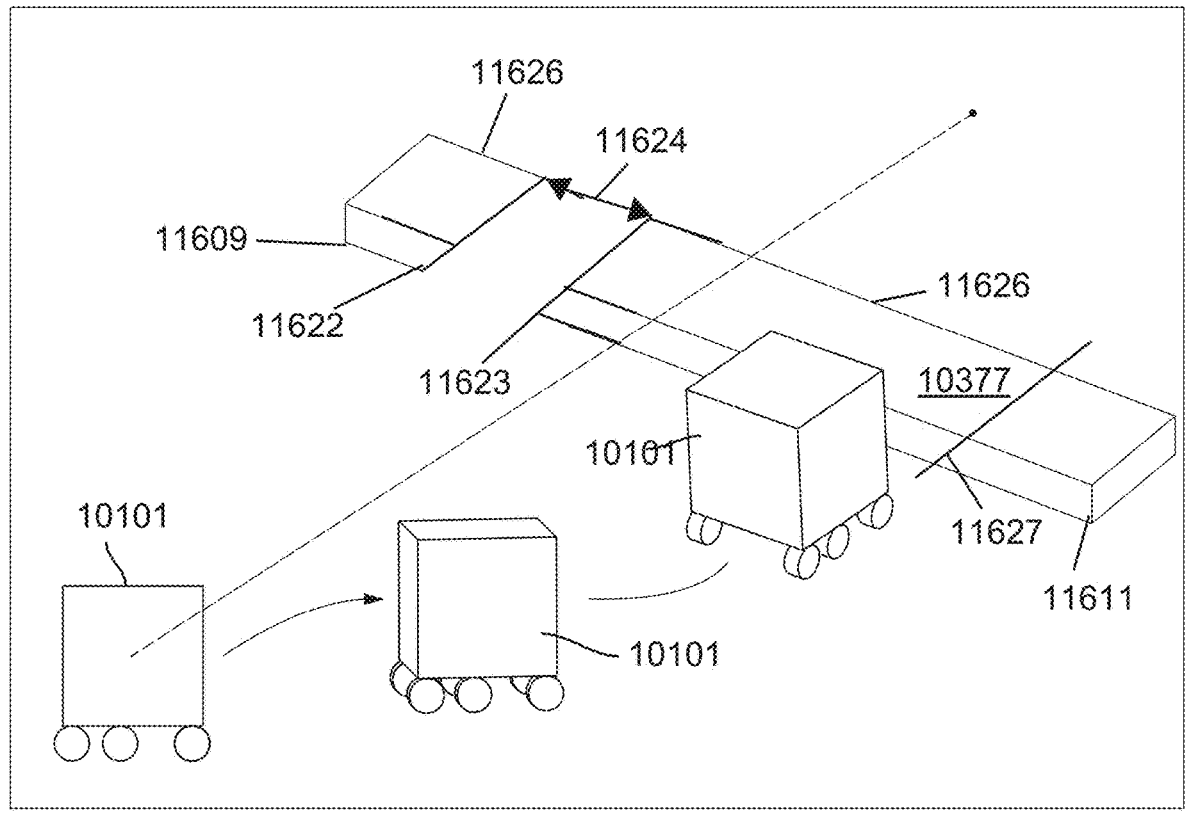
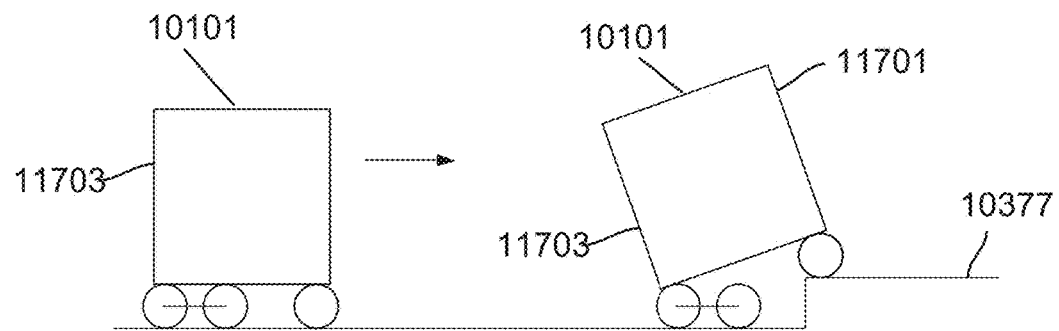
FIG. 5N

SYSTEM AND METHOD FOR REAL TIME CONTROL OF AN AUTONOMOUS DEVICE

CROSS REFERENCE TO RELATED APPLICATIONS

This utility patent application is a continuation-in-part of U.S. patent application Ser. No. 16/800,497 filed Feb. 25, 2020, entitled System and Method for Surface Feature Detection and Traversal which is incorporated herein by reference in its entirety. This patent application claims the benefit of U.S. Provisional Patent Application Ser. No. 62/872,396 filed Jul. 10, 2019, entitled Apparatus for Long and Short Range Sensors on an Autonomous Delivery Device, U.S. Provisional Patent Application Ser. No. 62/990,485 filed Mar. 17, 2020, entitled System and Method for Managing an Occupancy Grid, and U.S. Provisional Patent Application Ser. No. 62/872,320 filed Jul. 10, 2019, entitled System and Method for Real-Time Control of the Configuration of an Autonomous Device.

This application is related to U.S. patent application Ser. No. 16/035,205, filed on Jul. 13, 2018 entitled MOBILITY DEVICE, U.S. patent application Ser. No. 15/787,613, filed on Oct. 18, 2017 entitled MOBILITY DEVICE, U.S. patent application Ser. No. 15/600,703, filed on May 20, 2017 entitled MOBILITY DEVICE, U.S. patent application Ser. No. 15/982,737, entitled SYSTEM AND METHOD FOR SECURE REMOTE CONTROL OF A MEDICAL DEVICE, filed on May 17, 2018, U.S. Provisional Application Ser. No. 62/532,993, filed Jul. 15, 2017, entitled MOBILITY DEVICE IMPROVEMENTS, U.S. Provisional Application Ser. No. 62/559,263, filed Sep. 15, 2017, entitled MOBILITY DEVICE SEAT, and U.S. Provisional Application Ser. No. 62/581,670, filed Nov. 4, 2017, entitled MOBILITY DEVICE SEAT, which are incorporated herein by reference in their entirety.

BACKGROUND

The present teachings relate generally to AVs, and more specifically to autonomous route planning, global occupancy grid management, on-vehicle sensors, surface feature detection and traversal, and real-time vehicle configuration changes.

Navigation of AVs and semi-autonomous vehicles (AVs) typically relies on long range sensors including, for example, but not limited to, LIDAR, cameras, stereo cameras, and radar. Long range sensors can sense between 4 and 100 meters from the AV. In contrast, object avoidance and/or surface detection typically relies on short range sensors including, for example, but not limited to, stereo-cameras, short-range radar, and ultra-sonic sensors. These short range sensors typically observe the area or volume around the AV out to about 5 meters. Sensors can enable, for example, orienting the AV within its environment and navigating streets, sidewalks, obstacles, and open spaces to reach a desired destination. Sensors can also enable visioning humans, signage, traffic lights, obstacles, and surface features.

Surface feature traversal can be challenging because surface features, for example, but not limited to, substantially discontinuous surface features (SDSFs), can be found amidst heterogeneous topology, and that topology can be unique to a specific geography. SDSFs, such as, for example, but not limited to, inclines, edges, curbs, steps, and curb-like geometries (referred to herein, in a non-limiting way, as SDSFs or simply surface features), however, can include some typical characteristics that can assist in their identification. Surface/road conditions and surface types can be recognized and classified by, for example, fusing multisensory data, which can be complex and costly. Surface features and condition can be used to control, in real-time, the physical reconfiguration of an AV.

Sensors can be used to enable the creation of an occupancy grid that can represent the world for path planning purposes for the AV. Path planning requires a grid that identifies a space as free, occupied, or unknown. However, a probability that the space is occupied can improve decision-making with respect to the space. Logodds representation of the probabilities can be used to increase the accuracy at the numerical boundaries of the probability of 0 and 1. The probability that the cell is occupied can depend at least upon new sensor information, previous sensor information, and prior occupancy information.

What is needed is a system that combines gathered sensor data and real-time sensor data with the change of physical configuration of a vehicle to accomplish variable terrain traversal. What is needed is advantageous sensor placement to achieve physical configuration change, variable terrain traversal, and object avoidance. What is needed is the ability to locate SDSFs based on a multi-part model that is associated with several criteria for SDSF identification. What is needed is determining candidate surface feature traversals based upon criteria such as candidate traversal approach angle, candidate traversal driving surface on both sides of the candidate surface feature, and real-time determination of candidate traversal path obstructions. What is needed is a system and method for incorporating drivable surface and device mode information into occupancy grid determination.

SUMMARY

The AV of the present teachings can autonomously navigate to a desired location. In some configurations, the AV can include sensors, a device controller including a perception subsystem, an autonomy subsystem, and a driver subsystem, a power base, four powered wheels, two caster wheels, and a cargo container. In some configurations, the perception and autonomy subsystems can receive and process sensor information (perception) and map information (perception and autonomy), and can provide direction to the driver subsystem. The map information can include surface classifications and associated device mode. Movement of the AV, controlled by the driver subsystem, and enabled by the power base, can be sensed by the sensor subsystem, providing a feedback loop. In some configurations, SDSFs can be accurately identified from point cloud data and memorialized in a map, for example, according to the process described herein. The portions of the map associated with the location of the AV can be provided to the AV during navigation. The perception subsystem can maintain an occupancy grid that can inform the AV about the probability that a to-be-traversed path is currently occupied. In some configurations, the AV can operate in multiple distinct modes. The modes can enable complex terrain traversal, among other benefits. A combination of the map (surface classification, for example), the sensor data (sensing features surrounding the AV), the occupancy grid (probability that the upcoming path point is occupied), the mode (ready to traverse difficult terrain or not), and can be used to identify the direction, configuration, and speed of the AV.

With respect to preparing the map, in some configurations, the method of the present teachings for creating a map to navigate at least one SDSF encountered by an AV, where the AV travels a path over a surface, where the surface includes the at least one SDSF, and where the path includes a starting point and an ending point, the method can include, but is not limited to including, accessing point cloud data representing the surface, filtering the point cloud data, forming the filtered point cloud data into processable parts, and merging the processable parts into at least one concave polygon. The method can include locating and labeling the at least one SDSF in the at least one concave polygon. The locating and labeling can form labeled point cloud data. The method can include creating graphing polygons based at least on the at least one concave polygon, and choosing the path from the starting point to the ending point based at least on the graphing polygons. When navigating, the AV can traverse the at least one SDSF along the path.

Filtering the point cloud data can optionally include conditionally removing points representing transient objects and points representing outliers from the point cloud data, and replacing the removed points having a pre-selected height. Forming processing parts can optionally include segmenting the point cloud data into the processable parts, and removing points of a pre-selected height from the processable parts. Merging the processable parts can optionally include reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. Locating and labeling the at least one SDSF feature can optionally include sorting the point cloud data of the drivable surfaces according to a SDSF filter, the SDSF filter including at least three categories of points, and locating the at least one SDSF point based at least on whether the categories of points, in combination, meet at least one first pre-selected criterion. The method can optionally include creating at least one SDSF trajectory based at least on whether a plurality of the at least one SDSF points, in combination, meet at least one second pre-selected criterion. Creating graphing polygons further can optionally include creating at least one polygon from the at least one drivable surface. The at least one polygon can include edges. Creating graphing polygons can include smoothing the edges, forming a driving margin based on the smoothed edges, adding the at least one SDSF trajectory to the at least one drivable surface, and removing edges from the at least one drivable surface according to at least one third pre-selected criterion. Smoothing of the edges can optionally include trimming the edges outward. Forming a driving margin of the smoothed edges can optionally include trimming the outward edges inward.

In some configurations, the system of the present teachings for creating a map for navigating at least one SDSF encountered by a AV, where the AV travels a path over a surface, where the surface includes the at least one SDSF, where the path includes a starting point and an ending point, the system can include, but is not limited to including, a first processor accessing point cloud data representing the surface, a first filter filtering the point cloud data, a second processor forming processable parts from the filtered point cloud data, a third processor merging the processable parts into at least one concave polygon, a fourth processor locating and labeling the at least one SDSF in the at least one concave polygon, the locating and labeling forming labeled point cloud data, a fifth processor creating graphing polygons, and a path selector choosing the path from the starting point to the ending point based at least on the graphing polygons. The AV can traverse the at least one SDSF along the path.

The first filter can optionally include executable code that can include, but is not limited to including, conditionally removing points representing transient objects and points representing outliers from the point cloud data, and replacing the removed points having a pre-selected height. The segmenter can optionally include executable code that can include, but is not limited to including, segmenting the point cloud data into the processable parts, and removing points of a pre-selected height from the processable parts. The third processor can optionally include executable code that can include, but is not limited to including, reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. The fourth processor can optionally include executable code that can include, but is not limited to including, sorting the point cloud data of the drivable surfaces according to a SDSF filter, the SDSF filter including at least three categories of points, and locating the at least one SDSF point based at least on whether the categories of points, in combination, meet at least one first pre-selected criterion. The system can optionally include executable code that can include, but is not limited to including, creating at least one SDSF trajectory based at least on whether a plurality of the at least one SDSF points, in combination, meet at least one second pre-selected criterion.

Creating graphing polygons can optionally include executable code that can include, but is not limited to including, creating at least one polygon from the at least one drivable surface, the at least one polygon including edges, smoothing the edges, forming a driving margin based on the smoothed edges, adding the at least one SDSF trajectory to the at least one drivable surface, and removing edges from the at least one drivable surface according to at least one third pre-selected criterion. Smoothing the edges can optionally include executable code that can include, but is not limited to including, trimming the edges outward. Forming a driving margin of the smoothed edges can optionally include executable code that can include, but is not limited to including, trimming the outward edges inward.

In some configurations, the method of the present teachings for creating a map for navigating at least one SDSF encountered by a AV, where the AV travels a path over a surface, where the surface includes the at least one SDSF, where the path includes a starting point and an ending point, the method can include, but is not limited to including, accessing a route topology. The route topology can include at least one graphing polygon that can include filtered point cloud data. The point cloud data can include labeled features and a drivable margin. The method can include transforming the point cloud data into a global coordinate system, determining boundaries of the at least one SDSF, creating SDSF buffers of a pre-selected size around the boundaries, determining which of the at least one SDSFs can be traversed based at least on at least one SDSF traversal criterion, creating an edge/weight graph based at least on the at least one SDSF traversal criterion, the transformed point cloud data, and the route topology, and choosing a path from the starting point to the destination point based at least on the edge/weight graph.

The at least one SDSF traversal criterion can optionally include a pre-selected width of the at least one SDSF and a pre-selected smoothness of the at least one SDSF, a minimum ingress distance and a minimum egress distance between the at least one SDSF and the AV including a drivable surface, and a minimum ingress distance between the at least one SDSF and the AV that can accommodate approximately a 90° approach by the AV to the at least one SDSF.

In some configurations, the system of the present teachings for creating a map for navigating at least one SDSF encountered by a AV, where the AV travels a path over a surface, where the surface includes the at least one SDSF, and where the path includes a starting point and an ending point, the system can include, but is not limited to including, a sixth processor accessing a route topology. The route topology can include at least one graphing polygon that can include filtered point cloud data. The point cloud data can include labeled features and a drivable margin. The system can include a seventh processor transforming the point cloud data into a global coordinate system, and an eighth processor determining boundaries of the at least one SDSF. The eighth processor can create SDSF buffers of a pre-selected size around the boundaries. The system can include a ninth processor determining which of the at least one SDSFs can be traversed based at least on at least one SDSF traversal criterion, a tenth processor creating an edge/weight graph based at least on the at least one SDSF traversal criterion, the transformed point cloud data, and the route topology, and a base controller choosing a path from the starting point to the destination point based at least on the edge/weight graph.

In some configurations, the method of the present teachings for creating a map for navigating at least one SDSF encountered by a AV, where the AV travels a path over a surface, where the surface includes the at least one SDSF, and where the path includes a starting point and an ending point, the method can include, but is not limited to including, accessing point cloud data representing the surface. The method can include filtering the point cloud data, forming the filtered point cloud data into processable parts, and merging the processable parts into at least one concave polygon. The method can include locating and labeling the at least one SDSF in the at least one concave polygon. The locating and labeling can form labeled point cloud data. The method can include creating graphing polygons based at least on the at least one concave polygon. The graphing polygons can form a route topology, and the point cloud data can include labeled features and a drivable margin. The method can include transforming the point cloud data into a global coordinate system, determining boundaries of the at least one SDSF, creating SDSF buffers of a pre-selected size around the boundaries, determining which of the at least one SDSFs can be traversed based at least on at least one SDSF traversal criterion, creating an edge/weight graph based at least on the at least one SDSF traversal criterion, the transformed point cloud data, and the route topology, and choosing a path from the starting point to the destination point based at least on the edge/weight graph.

Filtering the point cloud data can optionally include conditionally removing points representing transient objects and points representing outliers from the point cloud data, and replacing the removed points having a pre-selected height. Forming processing parts can optionally include segmenting the point cloud data into the processable parts, and removing points of a pre-selected height from the processable parts. Merging the processable parts can optionally include reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. Locating and labeling the at least one SDSF feature can optionally include sorting the point cloud data of the drivable surfaces according to a SDSF filter, the SDSF filter including at least three categories of points, and locating the at least one SDSF point based at least on whether the categories of points, in combination, meet at least one first pre-selected criterion. The method can optionally include creating at least one SDSF trajectory based at least on whether a plurality of the at least one SDSF points, in combination, meet at least one second pre-selected criterion. Creating graphing polygons further can optionally include creating at least one polygon from the at least one drivable surface. The at least one polygon can include edges. Creating graphing polygons can include smoothing the edges, forming a driving margin based on the smoothed edges, adding the at least one SDSF trajectory to the at least one drivable surface, and removing edges from the at least one drivable surface according to at least one third pre-selected criterion. Smoothing of the edges can optionally include trimming the edges outward. Forming a driving margin of the smoothed edges can optionally include trimming the outward edges inward. The at least one SDSF traversal criterion can optionally include a pre-selected width of the at least one and a pre-selected smoothness of the at least one SDSF, a minimum ingress distance and a minimum egress distance between the at least one SDSF and the AV including a drivable surface, and a minimum ingress distance between the at least one SDSF and the AV that can accommodate approximately a 90° approach by the AV to the at least one SDSF.

In some configurations, the system of the present teachings for creating a map for navigating at least one SDSF encountered by a AV, where the AV travels a path over a surface, where the surface includes the at least one SDSF, where the path includes a starting point and an ending point, the system can include, but is not limited to including, a point cloud accessor accessing point cloud data representing the surface, a first filter filtering the point cloud data, a segmenter forming processable parts from the filtered point cloud data, a third processor merging the processable parts into at least one concave polygon, a fourth processor locating and labeling the at least one SDSF in the at least one concave polygon, the locating and labeling forming labeled point cloud data, a fifth processor creating graphing polygons. The route topology can include at least one graphing polygon that can include filtered point cloud data. The point cloud data can include labeled features and a drivable margin. The system can include a seventh processor transforming the point cloud data into a global coordinate system, and a eighth processor determining boundaries of the at least one SDSF. The eighth processor can create SDSF buffers of a pre-selected size around the boundaries. The system can include a ninth processor determining which of the at least one SDSFs can be traversed based at least on at least one SDSF traversal criterion, a tenth processor creating an edge/weight graph based at least on the at least one SDSF traversal criterion, the transformed point cloud data, and the route topology, and a base controller choosing a path from the starting point to the destination point based at least on the edge/weight graph.

The first filter can optionally include executable code that can include, but is not limited to including, conditionally removing points representing transient objects and points representing outliers from the point cloud data, and replacing the removed points having a pre-selected height. The segmenter can optionally include executable code that can include, but is not limited to including, segmenting the point cloud data into the processable parts, and removing points of a pre-selected height from the processable parts. The third processor can optionally include executable code that can include, but is not limited to including, reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. The fourth processor can optionally include executable code that can include, but is not limited to including, sorting the point cloud data of the drivable surfaces according to a SDSF filter, the SDSF filter including at least three categories of points, and locating the at least one SDSF point based at least on whether the categories of points, in combination, meet at least one first pre-selected criterion. The system can optionally include executable code that can include, but is not limited to including, creating at least one SDSF trajectory based at least on whether a plurality of the at least one SDSF points, in combination, meet at least one second pre-selected criterion.

Creating graphing polygons can optionally include executable code that can include, but is not limited to including, creating at least one polygon from the at least one drivable surface, the at least one polygon including edges, smoothing the edges, forming a driving margin based on the smoothed edges, adding the at least one SDSF trajectory to the at least one drivable surface, and removing edges from the at least one drivable surface according to at least one third pre-selected criterion. Smoothing the edges can optionally include executable code that can include, but is not limited to including, trimming the edges outward. Forming a driving margin of the smoothed edges can optionally include executable code that can include, but is not limited to including, trimming the outward edges inward.

In some configurations, a SDSF can be identified by its dimensions. For example, a curb can include, but is not limited to including, a width of about 0.6-0.7 m. In some configurations, point cloud data can be processed to locate SDSFs, and those data can be used to prepare a path for the AV from a beginning point to a destination. In some configurations, the path can be included in the map and provided to the perception subsystem. As the AV is traveling the path, in some configurations, SDSF traversal can be accommodated through sensor-based positioning of the AV enabled in part by the perception subsystem. The perception subsystem can execute on at least one processor within the AV.

The AV can include, but is not limited to including, a power base including two powered front-wheels, two powered back-wheels, energy storage, and at least one processor. The power base can be configured to move at a commanded velocity. The AV can include a cargo platform, mechanically attached to the power base, including a plurality of short-range sensors. The AV can include a cargo container, mounted atop the cargo platform in some configurations, having a volume for receiving a one or more objects to deliver. The AV can include a long-range sensor suite, mounted atop the cargo container in some configurations, that can include, but is not limited to including, LIDAR and one or more cameras. The AV can include a controller that can receive data from the long-range sensor suite and the short-range sensor suite.

The short-range sensor suite can optionally detect at least one characteristic of the drivable surface, and can optionally include stereo cameras, an IR projector, two image sensors, an RGB sensor, and radar sensors. The short-range sensor suite can optionally supply RGB-D data to the controller. The controller can optionally determine the geometry of the road surface based on RGB-D data received from the short-range sensor suite. The short-range sensor suite can optionally detect objects within 4 meters of the AV, and the long-range sensor suite can optionally detect objects more than 4 meters from the AV.

The perception subsystem can use the data collected by the sensors to populate the occupancy grid. The occupancy grid of the present teachings can be configured as a 3D grid of points surrounding the AV, with the AV occupying the center point. In some configurations, the occupancy grid can stretch 10 m to the left, right, back, and front of the AV. The grid can include, approximately, the height of the AV, and can virtually travel with the AV as it moves, representing obstacles surrounding the AV. The grid can be converted to two dimensions by reducing its vertical axis, and can be divided into polygons, for example, but not limited to, approximately 5 cm×5 cm in size. Obstacles appearing in the 3D space around the AV can be reduced into a 2D shape. If the 2D shape overlaps any segment of one of the polygons, the polygon can be given the value of 100, indicating that the space is occupied. Any polygons left unfilled-in can be given the value of 0, and can be referred to as free space, where the AV can move.

As the AV navigates, it can encounter situations in which a change of configuration of the AV could be required. A method of the present teachings for real-time control of a configuration of an AV includes a chassis, at least four wheels, a first side of the chassis operably coupled with at least one of the at least four wheels, and an opposing second side of the chassis operably coupled with at least one of the at least four wheels, the method can include, but is not limited to including, receiving environmental data, determining a surface type based at least on the environmental data, determining a mode based at least on the surface type and a first configuration, determining a second configuration based at least on the mode and the surface type, determining movement commands based at least on the second configuration, and controlling the configuration of the device by using the movement commands to change the device from the first configuration to the second configuration.

The method can optionally include populating the occupancy grid based at least on the surface type and the mode. The environmental data can optionally include RGB-D image data and a topology of a road surface. The configuration can optionally include two pairs of clustered of the at least four wheels. A first pair of the two pairs can be positioned on the first side, and a second pair of the two pairs being can be positioned on the second side. The first pair can include a first front wheel and a first rear wheel, and the second pair can include a second front wheel and a second rear wheel. The controlling of the configuration can optionally include coordinated powering of the first pair and the second pair based at least on the environmental data. The controlling of the configuration can optionally include transitioning from driving the at least four wheels and a pair of casters retracted to driving two wheels with the clustered first pair and the clustered second pair rotated to lift the first front wheel and the second front wheel. The pair of casters can be operably coupled with the chassis. The device can rest on the first rear wheel, the second rear wheel, and the pair of casters. The controlling of the configuration can optionally include rotating a pair of clusters operably coupled with two powered wheels on the first side and two powered wheels on the second side based at least on the environmental data.

The system of the present teachings for real-time control of a configuration of an AV, can include, but is not limited to including, a device processor and a powerbase processor. The AV can include a chassis, at least four wheels, a first side of the chassis, and an opposing second side of the chassis. The device processor can receive real-time environmental data surrounding the AV, determine a surface type based at least on the environmental data, determine a mode based at least on the surface type and a first configuration, and determine a second configuration based at least on the mode and the surface type. The power base processor can enable the AV to move based at least on the second configuration, and can enable the AV to change from the first configuration to the second configuration. The device processor can optionally include populating the occupancy grid based at least on the surface type and the mode.

During navigation, the AV can encounter SDSFs that can require maneuvering the AV for successful traverse. In some configurations, the method of the present teachings for navigating the AV along a path line in a travel area towards a goal point across at least one SDSF, the AV including a leading edge and a trailing edge, can include, but is not limited to including, receiving SDSF information and obstacle information for the travel area, detecting at least one candidate SDSF from the SDSF information, and selecting a SDSF line from the at least one candidate SDSF line based on at least one selection criterion. The method can include determining at least one traversable part of the selected SDSF line based on at least one location of at least one obstacle found in the obstacle information in the vicinity of the selected SDSF line, heading the AV, operating at a first speed towards the at least one traversable part, by turning the AV to travel along a line perpendicular to the traversable part, and constantly correcting a heading of the AV based on a relationship between the heading and the perpendicular line. The method can include driving the AV at a second speed by adjusting the first speed of the AV based at least on the heading and a distance between the AV and the traversable part. If a SDSF associated with the at least one traversable part is elevated relative to a surface of the travel route, the method can include traversing the SDSF by elevating the leading edge relative to the trailing edge and driving the AV at a third increased speed per degree of elevation, and driving the AV at a fourth speed until the AV has cleared the SDSF.

Detecting at least one candidate SDSF from the SDSF information can optionally include (a) drawing a closed polygon encompassing a location of the AV, and a location of a goal point, (b) drawing a path line between the goal point and the location of the AV, (c) selecting two SDSF points from the SDSF information, the SDSF points being located within the polygon, and (d) drawing a SDSF line between the two points. Detecting at least one candidate SDSF can include (e) repeating steps (c)-(e) if there are fewer than a first pre-selected number of points within a first pre-selected distance of the SDSF line, and if there have been less than a second pre-selected number of attempts at choosing the SDSF points, drawing a line between them, and having fewer than the first pre-selected number of points around the SDSF line. Detecting at least one candidate SDSF can include (f) fitting a curve to the SDSF points that fall within the first pre-selected distance of the SDSF line if there are the first pre-selected number of points or more, (g) identifying the curve as the SDSF line if a first number of the SDSF points that are within the first pre-selected distance of the curve exceeds a second number of the SDSF points within the first pre-selected distance of the SDSF line, and if the curve intersects the path line, and if there are no gaps between the SDSF points on the curve that exceed a second pre-selected distance. Detecting at least one candidate SDSF can include (h) repeating steps (f)-(h) if the number of points that are within the first pre-selected distance of the curve does not exceed the number of points within the first pre-selected distance of the SDSF line, or if the curve does not intersect the path line, or if there are gaps between the SDSF points on the curve that exceed the second pre-selected distance, and if the SDSF line is not remaining stable, and if steps (f)-(h) have not been attempted more than the second pre-selected number of attempts.

The closed polygon can optionally include a pre-selected width, and the pre-selected width can optionally include a width dimension of the AV. Selecting the SDSF points can optionally include random selection. The at least one selection criterion can optionally include a first number of the SDSF points within the first pre-selected distance of the curve exceeds a second number of SDSF points within the first pre-selected distance of the SDSF line, the curve intersects the path line, and there are no gaps between the SDSF points on the curve that exceed a second pre-selected distance.

Determining at least one traversable part of the selected SDSF can optionally include selecting a plurality of obstacle points from the obstacle information. Each of the plurality of obstacle points can include a probability that the obstacle point is associated with the at least one obstacle. Determining at least one traversable part can include projecting the plurality of obstacle points to the SDSF line if the probability is higher than a pre-selected percent, and any of the plurality of obstacle points lies between the SDSF line and the goal point, and if any of the plurality of obstacle points is less than a third pre-selected distance from the SDSF line, forming at least one projection. Determining at least one traversable part can optionally include connecting at least two of the at least one projection to each other, locating end points of the connected at least two projections along the SDSF line, marking as a non-traversable SDSF section the connected at least two projections, and marking as at least one traversable section the SDSF line outside of the non-traversable section.

Traversing the at least one traversable part of the SDSF can optionally include heading the AV, operating at a first speed, towards the traversable part, turning the AV to travel along a line perpendicular to the traversable part, constantly correcting a heading of the AV based on the relationship between the heading and the perpendicular line, and driving the AV at a second speed by adjusting the first speed of the AV based at least on the heading and a distance between the AV and the traversable part. Traversing the at least one traversable part of the SDSF can optionally include if the SDSF is elevated relative to a surface of the travel route, traversing the SDSF by elevating the leading edge relative to the trailing edge and driving the AV at a third increased speed per degree of elevation, and driving the AV at a fourth speed until the AV has cleared the SDSF.

Traversing the at least one traversable part of the SDSF can alternatively optionally include (a) ignoring updated of the SDSF information and driving the AV at a pre-selected speed if a heading error is less than a third pre-selected amount with respect to a line perpendicular to the SDSF line, (b) driving the AV forward and increasing the speed of the AV to an eighth pre-selected speed per degree of elevation if an elevation of a front part of the AV relative to a rear part of the AV is between a sixth pre-selected amount and a fifth pre-selected amount, (c) driving the AV forward at a seventh pre-selected speed if the front part is elevated less than a sixth pre-selected amount relative to the rear part, and (d) repeating steps (a)-(d) if the rear part is less than or equal to a fifth pre-selected distance from the SDSF line.

In some configurations, the SDSF and the wheels of the AV can be automatically aligned to avoid system instability. Automatic alignment can be implemented by, for example, but not limited to, continually testing for and correcting the heading of the AV as the AV approaches the SDSF. Another aspect of the SDSF traversal feature of the present teachings is that the SDSF traversal feature automatically confirms that sufficient free space exists around the SDSF before attempting traversal. Yet another aspect of the SDSF traversal feature of the present teachings is that traversing SDSFs of varying geometries is possible. Geometries can include, for example, but not limited to, squared and contoured SDSFs. The orientation of the AV with respect to the SDSF can determine in what speed and direction the AV proceeds. The SDSF traversal feature can adjust the speed of the AV in the vicinity of SDSFs. When the AV ascends the SDSF, the speed can be increased to assist the AV in traversing the SDSF.

1. An autonomous delivery vehicle comprising: a power base including two powered front wheels, two powered back wheels and energy storage, the power base configured to move at a commanded velocity and in a commanded direction to perform a transport of at least one object; a cargo platform including a plurality of short-range sensors, the cargo platform mechanically attached to the power base; a cargo container with a volume for receiving the at least one object, the cargo container mounted on top of the cargo platform; a long-range sensor suite comprising LIDAR and one or more cameras, the long-range sensor suite mounted on top of the cargo container; and a controller to receive data from the long-range sensor suite and the plurality of short-range sensors, the controller determining the commanded velocity and the commanded direction based at least on the data, the controller providing the commanded velocity and the commanded direction to the power base to complete the transport. 2. The autonomous delivery vehicle of claim 1 wherein the data from the plurality of short-range sensors comprise at least one characteristic of a surface upon which the power base travels. 3. The autonomous delivery vehicle of claim 1 wherein the plurality of short-range sensors comprises at least one stereo camera. 4. The autonomous delivery vehicle of claim 1 wherein the plurality of short-range sensors comprise at least one IR projector, at least one image sensor, and at least one RGB sensor. 5. The autonomous delivery vehicle of claim 1 wherein the plurality of short-range sensors comprises at least one radar sensor. 6. The autonomous delivery vehicle of claim 1 wherein the data from the plurality of short-range sensors comprise RGB-D data. 7. The autonomous delivery vehicle of claim 1 wherein the controller determines a geometry of a road surface based on RGB-D data received from the plurality of short-range sensors. 8. The autonomous delivery vehicle of claim 1 wherein the plurality of short-range sensors detect objects within 4 meters of the AV and the long-range sensor suite detects objects more than 4 meters from the autonomous delivery vehicle. 9. The autonomous delivery vehicle of claim 1 wherein the plurality of short-range sensors comprise a cooling circuit. 10. The autonomous delivery vehicle of claim 1 wherein the plurality of short-range sensors comprise an ultrasonic sensor. 11. The autonomous delivery vehicle of claim 2 wherein the controller comprises: executable code, the executable code including: accessing a map, the map formed by a map processor, the map processor comprising: first processor accessing point cloud data from the long-range sensor suite, the point cloud data representing the surface; a filter filtering the point cloud data; a second processor forming processable parts from the filtered point cloud data; a third processor merging the processable parts into at least one polygon; a fourth processor locating and labeling the at least one substantially discontinuous surface feature (SDSF) in the at least one polygon, if present, the locating and labeling forming labeled point cloud data; a fifth processor creating graphing polygons from the labeled point cloud data; and a sixth processor choosing a path from a starting point to an ending point based at least on the graphing polygons, the AV traversing the at least one SDSF along the path. 12. The autonomous delivery vehicle as in claim 11 wherein the filter comprises: a seventh processor executing code including: conditionally removing points representing transient objects and points representing outliers from the point cloud data; and replacing the removed points having a pre-selected height. 13. The autonomous delivery vehicle as in claim 11 wherein the second processor includes the executable code comprising: segmenting the point cloud data into the processable parts; and removing points of a pre-selected height from the processable parts. 14. The autonomous delivery vehicle as in claim 11 wherein the third processor includes the executable code comprising: reducing a size of the processable parts by analyzing outliers, voxels, and normals; growing regions from the reduced-size processable parts; determining initial drivable surfaces from the grown regions; segmenting and meshing the initial drivable surfaces; locating polygons within the segmented and meshed initial drivable surfaces; and setting at least one drivable surface based at least on the polygons. 15. The autonomous delivery vehicle as in claim 14 wherein the fourth processor includes the executable code comprising: sorting the point cloud data of the initial drivable surfaces according to a SDSF filter, the SDSF filter including at least three categories of points; and locating at least one SDSF point based at least on whether the at least three categories of points, in combination, meet at least one first pre-selected criterion. 16. The autonomous delivery vehicle as in claim 15 wherein the fourth processor includes the executable code comprising: creating at least one SDSF trajectory based at least on whether a plurality of the at least one SDSF point, in combination, meet at least one second pre-selected criterion. 17. The autonomous delivery vehicle as in claim 14 wherein creating graphing polygons includes an eighth processor including the executable code comprising: creating at least one polygon from the at least one drivable surface, the at least one polygon including exterior edges; smoothing the exterior edges; forming a driving margin based on the smoothed exterior edges; adding the at least one SDSF trajectory to the at least one drivable surface; and removing interior edges from the at least one drivable surface according to at least one third pre-selected criterion. 18. The autonomous delivery vehicle as in claim 17 wherein the smoothing the exterior edges includes a ninth processor including the executable code comprising: trimming the exterior edges outward forming outward edges. 19. The autonomous delivery vehicle as in claim 18 wherein forming the driving margin of the smoothed exterior edges includes a tenth processor including the executable code comprising: trimming the outward edges inward. 20. The autonomous delivery vehicle as in claim 1 wherein the controller comprises: a subsystem for navigating at least one substantially discontinuous surface feature (SDSF) encountered by the autonomous delivery vehicle (AV), the AV traveling a path over a surface, the surface including the at least one SDSF, the path including a starting point and an ending point, the subsystem comprising: a first processor accessing a route topology, the route topology including at least one graphing polygon including filtered point cloud data, the filtered point cloud data including labeled features, the point cloud data including a drivable margin; a second processor transforming the point cloud data into a global coordinate system; a third processor determining boundaries of the at least one SDSF, the third processor creating SDSF buffers of a pre-selected size around the boundaries; a fourth processor determining which of the at least one SDSFs can be traversed based at least on at least one SDSF traversal criterion; a fifth processor creating an edge/weight graph based at least on the at least one SDSF traversal criterion, the transformed point cloud data, and the route topology; and a base controller choosing the path from the starting point to the ending point based at least on the edge/weight graph. 21. The autonomous delivery vehicle as in claim 20 wherein the at least one SDSF traversal criterion comprises: a pre-selected width of the at least one and a pre-selected smoothness of the at least one SDSF; a minimum ingress distance and a minimum egress distance between the at least one SDSF and the AV including a drivable surface; and the minimum ingress distance between the at least one SDSF and the AV accommodating approximately a 90° approach by the AV to the at least one SDSF.

22. A method for managing a global occupancy grid for an autonomous device, the global occupancy grid including global occupancy grid cells, the global occupancy grid cells being associated with occupied probability, the method comprising: receiving sensor data from sensors associated with the autonomous device; creating a local occupancy grid based at least on the sensor data, the local occupancy grid having local occupancy grid cells; if the autonomous device has moved from a first area to a second area, accessing historical data associated with the second area; creating a static grid based at least on the historical data; moving the global occupancy grid to maintain the autonomous device in a central position of the global occupancy grid; updating the moved global occupancy grid based on the static grid; marking at least one of the global occupancy grid cells as unoccupied, if the at least one of the global occupancy grid cells coincides with a location of the autonomous device; for each of the local occupancy grid cells, calculating a position of the local occupancy grid cell on the global occupancy grid; accessing a first occupied probability from the global occupancy grid cell at the position; accessing a second occupied probability from the local occupancy grid cell at the position; and computing a new occupied probability at the position on the global occupancy grid based at least on the first occupied probability and the second occupied probability. 23. The method as in claim 22 further comprising: range-checking the new occupied probability. 24. The method as in claim 23 wherein the range-checking comprises: setting the new occupied probability to 0 if the new occupied probability <0; and setting the new occupied probability to 1 if the new occupied probability >1. 25. The method as in claim 22 further comprising: setting the global occupancy grid cell to the new occupied probability. 26. The method as in claim 23 further comprising: setting the global occupancy grid cell to the range-checked new occupied probability.

27. A method for creating and managing occupancy grids comprising: transforming, by a local occupancy grid creation node, sensor measurements to a frame of reference associated with a device; creating a time-stamped measurement occupancy grid; publishing the time-stamped measurement occupancy grid as a local occupancy grid; creating a plurality of local occupancy grids; creating a static occupancy grid based on surface characteristics in a repository, the surface characteristics associated with a position of the device; moving a global occupancy grid associated with the position of the device to maintain the device and the local occupancy grid approximately centered with respect to the global occupancy grid; adding information from the static occupancy grid to the global occupancy grid; marking an area in the global occupancy grid currently occupied by the device as unoccupied; for each of at least one cell in each local occupancy grid, determining a location of the at least one cell in the global occupancy grid; accessing a first value at the location; determining a second value at the location based on a relationship between the first value and a cell value at the at least one cell in the local occupancy grid; comparing the second value against a pre-selected probability range; and setting the global occupancy grid with the new value if a probability value is within the pre-selected probability range. 28. The method as in claim 27 further comprising:

publishing the global occupancy grid. 29. The method as in claim 27 wherein the surface characteristics comprise surface type and surface discontinuities. 30. The method as in claim 27 wherein the relationship comprises summing. 31. A system for creating and managing occupancy grids comprising: a plurality of local grid creation nodes creating at least one local occupancy grid, the at least one local occupancy grid associated with a position of a device, the at least one local occupancy grid including at least one cell; a global occupancy grid manager accessing the at least one local occupancy grid, the global occupancy grid manager creating a static occupancy grid based on surface characteristics in a repository, the surface characteristics associated with the position of the device, moving a global occupancy grid associated with the position of the device to maintain the device and at least one the local occupancy grid approximately centered with respect to the global occupancy grid; adding information from the static occupancy grid to at least one global occupancy grid; marking an area in the global occupancy grid currently occupied by the device as unoccupied; for each of the at least one cell in each local occupancy grid, determining a location of the at least one cell in the global occupancy grid; accessing a first value at the location; determining a second value at the location based on a relationship between the first value and a cell value at the at least one cell in the local occupancy grid; comparing the second value against a pre-selected probability range; and setting the global occupancy grid with the new value if a probability value is within the pre-selected probability range.

32. A method for updating a global occupancy grid comprising: if an autonomous device has moved to a new position, updating the global occupancy grid with information from a static grid associated with the new position; analyzing surfaces at the new position; if the surfaces are drivable, updating the surfaces and updating the global occupancy grid with the updated surfaces; and updating the global occupancy grid with values from a repository of static values, the static values being associated with the new position. 33. The method as in claim 32 wherein updating the surfaces comprises: accessing a local occupancy grid associated with the new position; for each cell in the local occupancy grid, accessing a local occupancy grid surface classification confidence value and a local occupancy grid surface classification; if the local occupancy grid surface classification is the same as a global surface classification in the global occupancy grid in the cell, adding a global surface classification confidence value in the global occupancy grid to the local occupancy grid surface classification confidence value to form a sum, and updating the global occupancy grid at the cell with the sum; if the local occupancy grid surface classification is not the same as the global surface classification in the global occupancy grid in the cell, subtracting the local occupancy grid surface classification confidence value from the global surface classification confidence value in the global occupancy grid to form a difference, and updating the global occupancy grid with the difference; if the difference is less than zero, updating the global occupancy grid with the local occupancy grid surface classification. 34. The method as in claim 32 wherein updating the global occupancy grid with the values from the repository of static values comprises: for each cell in a local occupancy grid, accessing a local occupancy grid probability that the cell is occupied value, a logodds value, from the local occupancy grid; updating the logodds value in the global occupancy grid with the local occupancy grid logodds value at the cell; if a pre-selected certainty that the cell is not occupied is met, and if the autonomous device is traveling within lane barriers, and if a local occupancy grid surface classification indicates a drivable surface, decreasing the logodds that the cell is occupied in the local occupancy grid; if the autonomous device expects to encounter relatively uniform surfaces, and if the local occupancy grid surface classification indicates a relatively non-uniform surface, increasing the logodds in the local occupancy grid; and if the autonomous device expects to encounter relatively uniform surfaces, and if the local occupancy grid surface classification indicates a relatively uniform surface, decreasing the logodds in the local occupancy grid.

35. A method for real-time control of a configuration of a device, the device including a chassis, at least four wheels, a first side of the chassis operably coupled with at least one of the at least four wheels, and an opposing second side of the chassis operably coupled with at least one of the at least four wheels, the method comprising: creating a map based at least on prior surface features and an occupancy grid, the map being created in non-real time, the map including at least one location, the at least one location associated with at least one surface feature, the at least one surface feature being associated with at least one surface classification and at least one mode;
  determining current surface features as the device travels;
    updating the occupancy grid in real-time with the current surface features; determining, from the occupancy grid and the map, a path the device can travel to traverse the at least one surface feature.

36. A method for real-time control of a configuration of a device, the device including a chassis, at least four wheels, a first side of the chassis operably coupled with at least one of the at least four wheels, and an opposing second side of the chassis operably coupled with at least one of the at least four wheels, the method comprising: receiving environmental data; determining a surface type based at least on the environmental data; determining a mode based at least on the surface type and a first configuration; determining a second configuration based at least on the mode and the surface type; determining movement commands based at least on the second configuration; and controlling the configuration of the device by using the movement commands to change the device from the first configuration to the second configuration. 37. The method as in claim 36 wherein the environmental data comprises RGB-D image data. 38. The method as in claim 36 further comprising: populating an occupancy grid based at least on the surface type and the mode; and determining the movement commands based at least on the occupancy grid. 39. The method as in claim 38 wherein the occupancy grid comprises information based at least on data from at least one image sensor. 40. The method as in claim 36 wherein the environmental data comprises a topology of a road surface. 41. The method as in claim 36 wherein the configuration comprises two pairs of clustered of the at least four wheels, a first pair of the two pairs being positioned on the first side, a second pair of the two pairs being positioned on the second side, the first pair including a first front wheel and a first rear wheel, and the second pair including a second front wheel and a second rear wheel. 42. The method as in claim 41 wherein the controlling of the configuration comprises: coordinated powering of the first pair and the second pair based at least on the environmental data. 43. The method as in claim 41 wherein the controlling of the configuration comprises: transitioning from driving the at least four wheels and a pair of casters retracted, the pair of casters operably coupled to the chassis, to driving two wheels with the clustered first pair and the clustered second pair rotated to lift the first front wheel and the second front wheel, the device resting on the first rear wheel, the second rear wheel, and the pair of casters. 44. The method as in claim 41 wherein the controlling of the configuration comprises: rotating a pair of clusters operably coupled with a first two powered wheels on the first side and a second two powered wheels on the second side based at least on the environmental data. 45. The method as in claim 36 wherein the device further comprises a cargo container, the cargo container mounted on the chassis, the chassis controlling a height of the cargo container. 46. The method as in claim 45 wherein the height of the cargo container being based at least on the environmental data.

47. A system for real-time control of a configuration of a device, the device including a chassis, at least four wheels, a first side of the chassis, and an opposing second side of the chassis, the system comprising: a device processor receiving real-time environmental data surrounding the device, the device processor determining a surface type based at least on the environmental data, the device processor determining a mode based at least on the surface type and a first configuration, the device processor determining a second configuration based at least on the mode and the surface type; and a powerbase processor determining movement commands based at least on the second configuration, the powerbase processor controlling the configuration of the device by using the movement commands to change the device from the first configuration to the second configuration. 48. The system as in claim 47 wherein the environmental data comprises RGB-D image data. 49. The system as in claim 47 wherein the device processor comprises populating an occupancy grid based at least on the surface type and the mode. 50. The system as in claim 49 wherein the powerbase processor comprises determining the movement commands based at least on the occupancy grid. 51. The system as in claim 49 wherein the occupancy grid comprises information based at least on data from at least one image sensor. 52. The system as in claim 47 wherein the environmental data comprises a topology of a road surface. 53. The system as in claim 47 wherein the configuration comprises two pairs of clustered of the at least four wheels, a first pair of the two pairs being positioned on the first side, a second pair of the two pairs being positioned on the second side, the first pair having a first front wheel and a first rear wheel, and the second pair having a second front wheel and a second rear wheel. 54. The system as in claim 53 wherein the controlling of the configuration comprises: coordinated powering of the first pair and the second pair based at least on the environmental data. 55. The system as in claim 53 wherein the controlling of the configuration comprises: transitioning from driving the at least four wheels and a pair of casters retracted, the pair of casters operably coupled to the chassis, to driving two wheels with the clustered first pair and the clustered second pair rotated to lift the first front wheel and the second front wheel, the device resting on the first rear wheel, the second rear wheel, and the pair of casters.

56. A method for maintaining a global occupancy grid comprising: locating a first position of an autonomous device; when the autonomous device moves to a second position, the second position being associated with the global occupancy grid and a local occupancy grid, updating the global occupancy grid with at least one occupied probability value associated with the first position; updating the global occupancy grid with at least one drivable surface associated with the local occupancy grid; updating the global occupancy grid with surface confidences associated with the at least one drivable surface; updating the global occupancy grid with logodds of the at least one occupied probability value using a first Bayesian function; and adjusting the logodds based at least on characteristics associated with the second position; and when the autonomous device remains in the first position and the global occupancy grid and the local occupancy grid are co-located, updating the global occupancy grid with the at least one drivable surface associated with the local occupancy grid; updating the global occupancy grid with the surface confidences associated with the at least one drivable surface; updating the global occupancy grid with the logodds of the at least one occupied probability value using a second Bayesian function; and adjusting the logodds based at least on characteristics associated with the second position. 57. The method as in claim 35 wherein creating the map comprises: accessing point cloud data representing the surface; filtering the point cloud data; forming the filtered point cloud data into processable parts; merging the processable parts into at least one concave polygon; locating and labeling the at least one SDSF in the at least one concave polygon, the locating and labeling forming labeled point cloud data; creating graphing polygons based at least on the at least one concave polygon; and choosing the path from a starting point to an ending point based at least on the graphing polygons, the AV traversing the at least one SDSF along the path. 58. The method as in claim 57 wherein the filtering the point cloud data comprises: conditionally removing points representing transient objects and points representing outliers from the point cloud data; and replacing the removed points having a pre-selected height. 59. The method as in claim 57 wherein forming processing parts comprises: segmenting the point cloud data into the processable parts; and removing points of a pre-selected height from the processable parts. 60. The method as in claim 57 wherein the merging the processable parts comprises: reducing a size of the processable parts by analyzing outliers, voxels, and normals; growing regions from the reduced-size processable parts; determining initial drivable surfaces from the grown regions; segmenting and meshing the initial drivable surfaces; locating polygons within the segmented and meshed initial drivable surfaces; and setting at least one drivable surface based at least on the polygons. 61. The method as in claim 60 wherein the locating and labeling the at least one SDSF comprises: sorting the point cloud data of the initial drivable surfaces according to a SDSF filter, the SDSF filter including at least three categories of points; and locating at least one SDSF point based at least on whether the at least three categories of points, in combination, meet at least one first pre-selected criterion. 62. The method as in claim 61 further comprising: creating at least one SDSF trajectory based at least on whether a plurality of the at least one SDSF point, in combination, meet at least one second pre-selected criterion. 63. The method as in claim 62 wherein the creating graphing polygons further comprises: creating at least one polygon from the at least one drivable surface, the at least one polygon including exterior edges; smoothing the exterior edges; forming a driving margin based on the smoothed exterior edges; adding the at least one SDSF trajectory to the at least one drivable surface; and removing interior edges from the at least one drivable surface according to at least one third pre-selected criterion. 64. The method as in claim 63 wherein the smoothing of the exterior edges comprises: trimming the exterior edges outward forming outward edges. 65. The method as in claim 63 wherein forming the driving margin of the smoothed exterior edges comprises: trimming the outward edges inward.

66. An autonomous delivery vehicle comprising: a power base including two powered front wheels, two powered back wheels and energy storage, the power base configured to move at a commanded velocity; a cargo platform including a plurality of short-range sensors, the cargo platform mechanically attached to the power base; a cargo container with a volume for receiving a one or more objects to deliver, the cargo container mounted on top of the cargo platform; a long-range sensor suite comprising LIDAR and one or more cameras, the long-range sensor suite mounted on top of the cargo container; and a controller to receive data from the long-range sensor suite and the plurality of short-range sensors. 67. The autonomous delivery vehicle of claim 66 wherein the plurality of short-range sensors detect at least one characteristic of a drivable surface. 68. An autonomous delivery vehicle of claim 66 wherein the plurality of short-range sensors are stereo cameras. 69. The autonomous delivery vehicle of claim 66 wherein the plurality of short-range sensors comprise an IR projector, two image sensors and an RGB sensor. 70. The autonomous delivery vehicle of claim 66 wherein the plurality of short-range sensors are radar sensors. 71. The autonomous delivery vehicle of claim 66 wherein the short-range sensors supply RGB-D data to the controller. 72. The autonomous delivery vehicle of claim 66 wherein the controller determines a geometry of a road surface based on RGB-D data received from the plurality of short-range sensors. 73. The autonomous delivery vehicle of claim 66 wherein the plurality of short-range sensors detect objects within 4 meters of the autonomous delivery vehicle and the long-range sensor suite detects objects more than 4 meters from the autonomous delivery vehicle.

74. An autonomous delivery vehicle comprising: a power base including at least two powered back wheels, caster front wheels and energy storage, the power base configured to move at a commanded velocity; a cargo platform including a plurality of short-range sensors, the cargo platform mechanically attached to the power base; a cargo container with a volume for receiving a one or more objects to deliver, the cargo container mounted on top of the cargo platform; a long-range sensor suite comprising LIDAR and one or more cameras, the long-range sensor suite mounted on top of the cargo container; and a controller to receive data from the long-range sensor suite and the plurality of short-range sensors. 75. The autonomous delivery vehicle of claim 74 wherein the plurality of short-range sensors detect at least one characteristic of a drivable surface. 76. The autonomous delivery vehicle of claim 74 wherein the plurality of short-range sensors are stereo cameras. 77. The autonomous delivery vehicle of claim 74 wherein the plurality of short-range sensors comprise an IR projector, two image sensors and an RGB sensor. 78. The autonomous delivery vehicle of claim 74 wherein the plurality of short-range sensors are radar sensors. 79. The autonomous delivery vehicle of claim 74 wherein the short-range sensors supply RGB-D data to the controller. 80. The autonomous delivery vehicle of claim 74 wherein the controller determines a geometry of a road surface based on RGB-D data received from the plurality of short-range sensors. 81. The autonomous delivery vehicle of claim 74 wherein the plurality of short-range sensors detect objects within 4 meters of the autonomous delivery vehicle and the long-range sensor suite detects objects more than 4 meters from the autonomous delivery vehicle. 82. The autonomous delivery vehicle of claim 74, further comprising a second set of powered wheels that may engage the ground, while the caster wheels are lifted off the ground.

83. An autonomous delivery vehicle comprising: a power base including at least two powered back wheels, caster front wheels and energy storage, the power base configured to move at a commanded velocity; a cargo platform the cargo platform mechanically attached to the power base; and a short-range camera assembly mounted to the cargo platform that detects at least one characteristic of a drivable surface, the short-range camera assembly comprising: a camera; a first light; and a first liquid-cooled heat sink, wherein the first liquid-cooled heat sink cools the first light and the camera. 84. The autonomous delivery vehicle according to claim 83, wherein the short-range camera assembly further comprises a thermal electric cooler between the camera and the liquid cooled heat sink. 85. The autonomous delivery vehicle according to claim 83, wherein the first light and the camera are recessed in a cover with openings that deflect illumination from the first light away from the camera. 86. The autonomous delivery vehicle according to claim 83, wherein the lights are angled downward by at least 15° and recessed at least 4 mm in a cover to minimize illumination distracting a pedestrian. 87. The autonomous delivery vehicle according to claim 83, wherein the camera has a field of view and the first light comprises two LEDs with lenses to produce two beams of light that spread to illuminate the field of view of the camera. 88. The autonomous delivery vehicle according to claim 87, wherein the lights are angled approximately 50° apart and the lenses produce a 60° beam. 89. The autonomous delivery vehicle according to claim 83, wherein the short-range camera assembly includes an ultrasonic sensor mounted above the camera. 90. The autonomous delivery vehicle according to claim 83, where the short-range camera assembly is mounted in a center position on a front face of the cargo platform. 91. The autonomous delivery vehicle according to claim 83, further comprising at least one corner camera assembly mounted on at least one corner of a front face of the cargo platform, the at least one corner camera assembly comprising: an ultra-sonic sensor a corner camera; a second light; and a second liquid-cooled heat sink, wherein the second liquid-cooled heat sink cools the second light and the corner camera. 92. The method as in claim 22 wherein the historical data comprises surface data. 93. The method as in claim 22 wherein the historical data comprises discontinuity data.

BRIEF DESCRIPTION OF THE DRAWINGS

The present teachings will be more readily understood by reference to the following description, taken with the accompanying drawings, in which:

FIG. 1-1 is a schematic block diagram of the major components of the system of the present teachings;

FIG. 1-2 is a schematic block diagram of the major components of the map processor of the present teachings;

FIG. 1-3 is a schematic block diagram of the major components of the perception processor of the present teachings;

FIG. 1-4 is a schematic block diagram of the major components of the autonomy processor of the present teachings;

FIGS. 1L and 1M are pictorial diagrams of the polygon processing of the present teachings;

FIG. 1N is an image of the polygons and SDSFs identified by the system of the present teachings;

FIG. 2AA-2BB are views of the center short range camera assembly;

FIGS. 4I and 4J are perspective and side view diagrams, respectively, of a configuration of the device of the present teachings in raised 4-Wheel mode;

FIGS. 5F-5J are flowcharts of the method of the present teachings for traversing SDSFs;

FIGS. 5L-5N are pictorial representations of the method of FIGS. 5F-5H; and

FIG. 5O is a pictorial representation of converting an image to a polygon.

DETAILED DESCRIPTION

The system and method of the present teachings can use on-board sensors and previously-developed maps to develop an occupancy grid and use these aids to navigate an AV across surface features, including reconfiguring the AV based at least on the surface type.

Figures 1, 2:
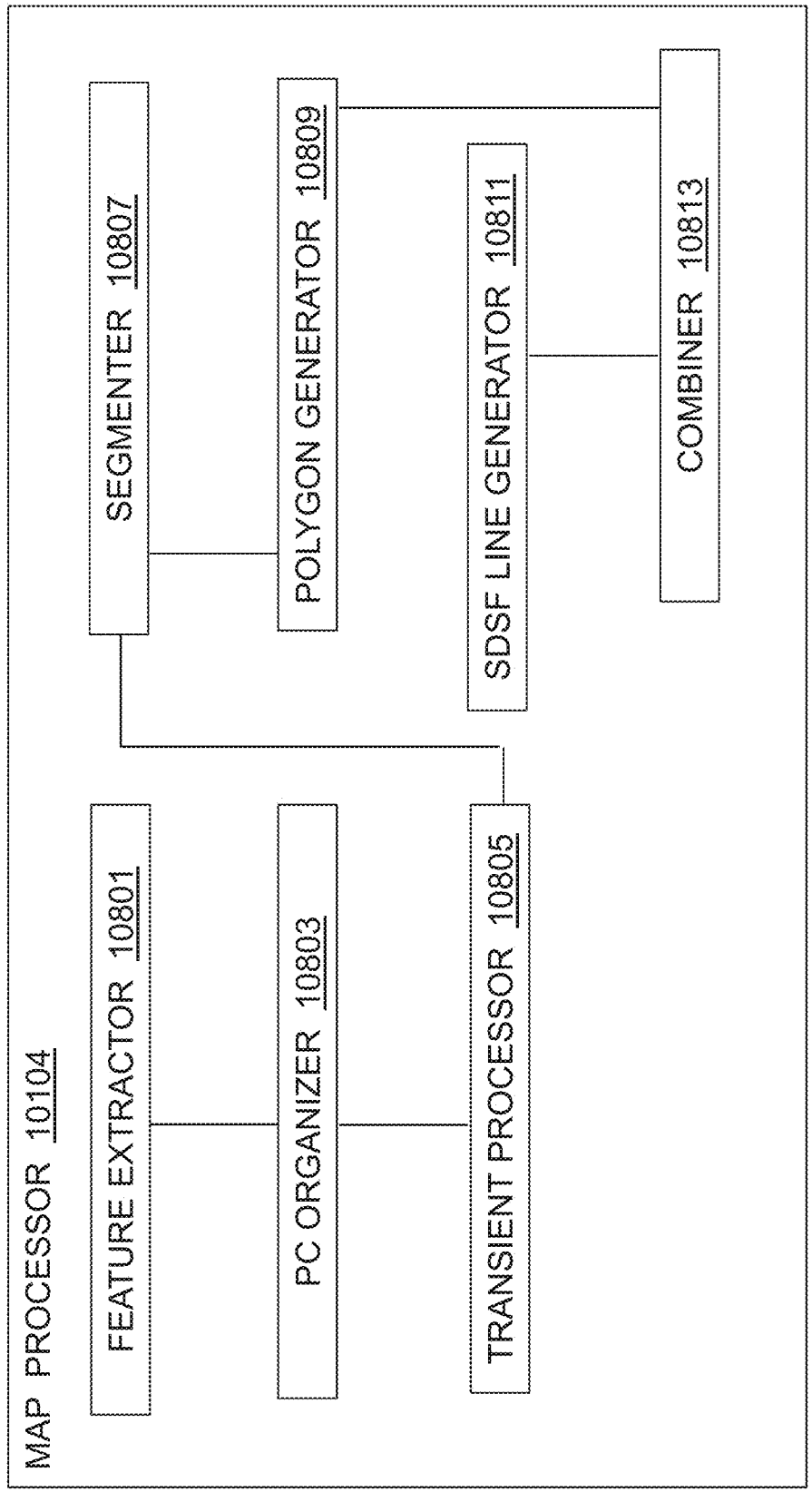

Referring now to FIG. 1-1, AV system 100 can include a structure upon which sensors 10701 can be mounted, and within which device controller 10111 can execute. The structure can include power base 10112 that can direct movement of wheels that are part of the structure and that can enable movement of the AV. Device controller 10111 can execute on at least one processor located on the AV, and can receive data from sensors 10701 that can be, but are not limited to being, located on the AV. Device controller 10111 can provide speed, direction, and configuration information to base controller 10114 that can provide movement commands to power base 10112. Device controller 10111 can receive map information from map processor 10104, which can prepare a map of the area surrounding the AV. Device controller 10111 can include, but is not limited to including, sensor processor 10703 that can receive and process input from sensors 10701, including on-AV sensors. In some configurations, device controller 10111 can include perception processor 2143, autonomy processor 2145, and driver processor 2127. Perception processor 2143 can, for example, but not limited to, locate static and dynamic obstacles, determine traffic light state, create an occupancy grid, and classify surfaces. Autonomy processor 2145 can, for example, but not limited to, determine the maximum speed of the AV and determine the type of situation the AV is navigating in, for example, on a road, on a sidewalk, at an intersection, and/or under remote control. Driver processor 2127 can, for example, but not limited to, create commands according to the direction of autonomy processor 2145 and send them on to base controller 10114.

Referring now to FIG. 1-2, map processor 10104 can create a map of surface features and can provide the map, through device controller 10111, to perception processor 2143, which can update an occupancy grid. Map processor 10104 can include, among many other aspects, feature extractor 10801, point cloud organizer 10803, transient processor 10805, segmenter 10807, polygon generator 10809, SDSF line generator 10811, and combiner 10813. Feature extractor 10801 can include a first processor accessing point cloud data representing the surface. Point cloud organizer 10803 can include a second processor forming processable parts from the filtered point cloud data. Transient processor 10805 can include a first filter filtering the point cloud data. Segmenter 10807 can include executable code that can include, but is not limited to including, segmenting the point cloud data into the processable parts, and removing points of a pre-selected height from the processable parts. The first filter can optionally include executable code that can include, but is not limited to including, conditionally removing points representing transient objects and points representing outliers from the point cloud data, and replacing the removed points having a pre-selected height. Polygon generator 10809 can include a third processor merging the processable parts into at least one concave polygon. The third processor can optionally include executable code that can include, but is not limited to including, reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable sur faces based at least on the polygons. SDSF line generator 10811 can include a fourth processor locating and labeling the at least one SDSF in the at least one concave polygon, the locating and labeling forming labeled point cloud data. The fourth processor can optionally include executable code that can include, but is not limited to including, sorting the point cloud data of the drivable surfaces according to a SDSF filter, the SDSF filter including at least three categories of points, and locating the at least one SDSF point based at least on whether the categories of points, in combination, meet at least one first pre-selected criterion. Combiner 10813 can include a fifth processor creating graphing polygons. Creating graphing polygons can optionally include executable code that can include, but is not limited to including, creating at least one polygon from the at least one drivable surface, the at least one polygon including edges, smoothing the edges, forming a driving margin based on the smoothed edges, adding the at least one SDSF trajectory to the at least one drivable surface, and removing edges from the at least one drivable surface according to at least one third pre-selected criterion. Smoothing the edges can optionally include executable code that can include, but is not limited to including, trimming the edges outward. Forming a driving margin of the smoothed edges can optionally include executable code that can include, but is not limited to including, trimming the outward edges inward.

Figures 1, 2, 3:
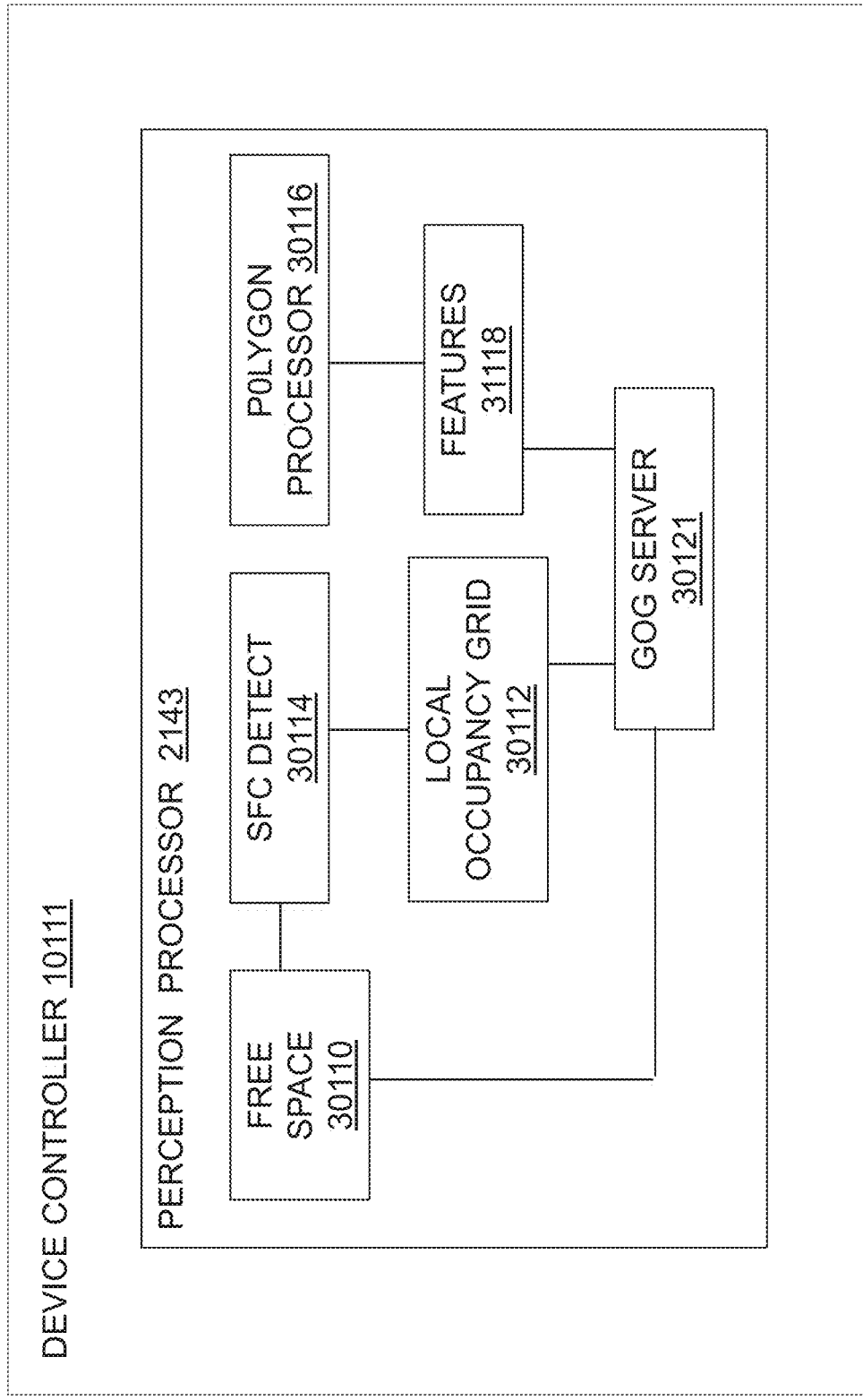
Figures 1, 2, 3, 4:
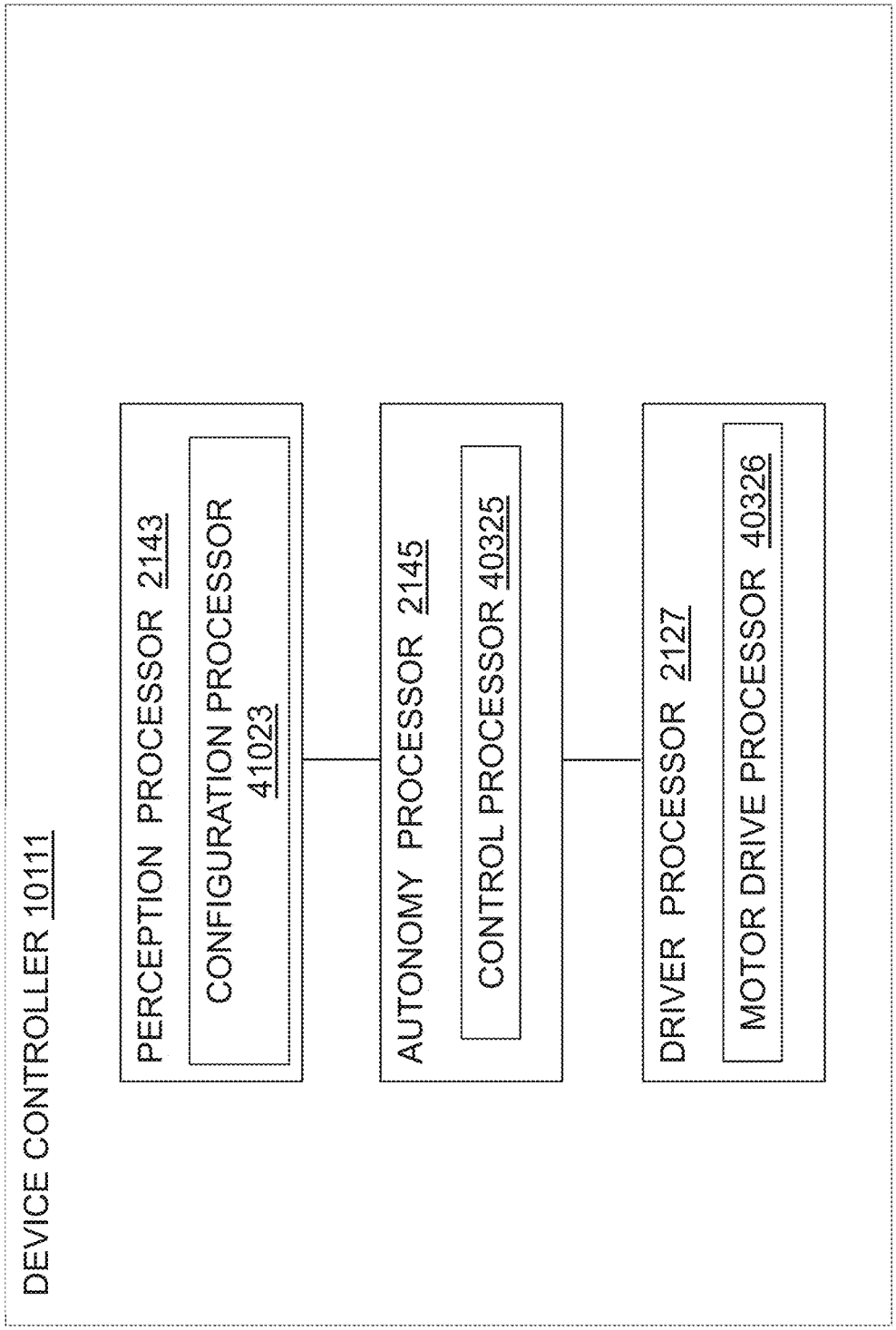

Referring now to FIG. 1-3, maps can be provided to an AV that can include on-board sensors, powered wheels, processors to receive the sensor and map data and use those data to power configure the AV to traverse various kinds of surfaces, among other things, as the AV, for example, delivers goods. The on-board sensors can provide data that can populate an occupancy grid and can be used to detect dynamic obstacles. The occupancy grid can also be populated by the map. Device controller 10111 can include perception processor 2143 that can receive and process sensor data and map data, and can update the occupancy grid with those data.

Referring now to FIG. 1-4, device controller 10111 can include configuration processor 41023 that can automatically determine the configuration of the AV based at least upon the mode of the AV and encountered surface features. Autonomy processor 2145 can include control processor 40325 that can determine, based at least on the map (the planned route to be followed), the information from configuration processor 41023, and the mode of the AV, what kind of surface needs to be traversed and what configuration the AV needs to assume to traverse the surface. Autonomy processor 2145 can supply commands to motor drive processor 40326 to implement the commands.

Figure 1A:
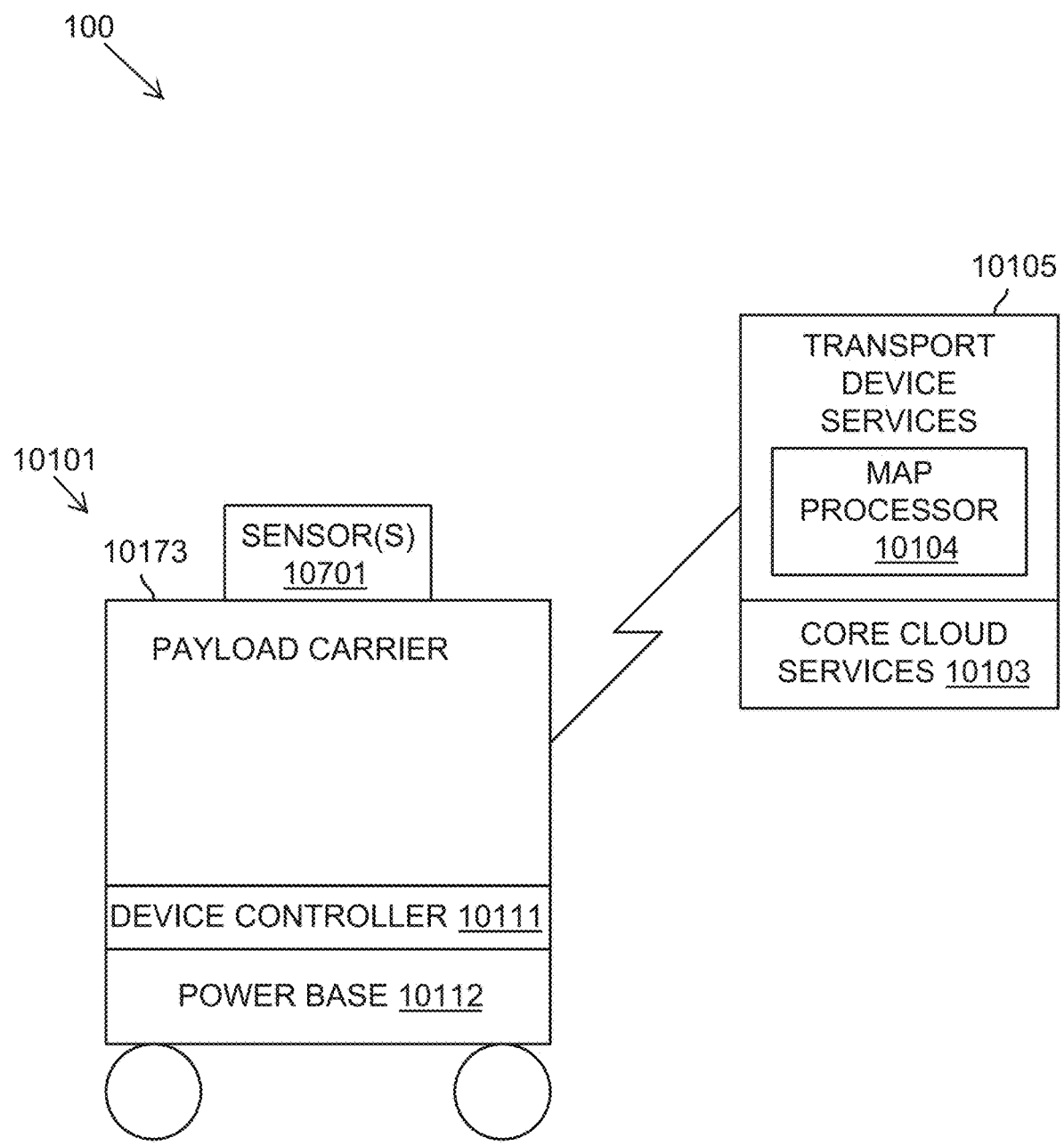
FIG. 1A is a schematic block diagram of the system of the present teachings for preparing a travel path for the AV.

Referring now to FIG. 1A, map processor 10104 can enable a device, for example, but not limited to, an AV or a semi-autonomous device, to navigate in environments that can include features such as SDSFs. The features in the map can enable, along with on-board sensors, the AV to travel on a variety of surfaces. In particular, SDSFs can be accurately identified and labeled so that the AV can automatically maintain the performance of the AV during ingress and egress of the SDSF, and the AV speed, configuration, and direction can be controlled for safe SDSF traversal.

Continuing to refer to FIG. 1A, in some configurations, system 100 for managing the traversal of SDSFs can include AV 10101, core cloud infrastructure 10103, AV services 10105, device controller 10111, sensor(s) 10701, and power base 10112. AV 10101 can provide, for example, but not limited to, transport and escort services from an origin to a destination, following a dynamically-determined path, as modified by incoming sensor information. AV 10101 can include, but is not limited to including, devices that have autonomous modes, devices that can operate entirely autonomously, devices that can be operated at least partially remotely, and devices that can include a combination of those features. Transport device services 10105 can provide drivable surface information including features to device controller 10111. Device controller 10111 can modify the drivable surface information at least according to, for example, but not limited to, incoming sensor information and feature traversal requirements, and can choose a path for AV 10101 based on the modified drivable surface information. Device controller 10111 can present commands to power base 10112 that can direct power base 10112 to provide speed, direction, and configuration commands to wheel motors and cluster motors, the commands causing AV 10101 to follow the chosen path, and to raise and lower its cargo accordingly. Transport device services 10105 can access route-related information from core cloud infrastructure 10103, which can include, but is not limited to including, storage and content distribution facilities. In some configurations, core cloud infrastructure 10103 can include commercial products such as, for example, but not limited to, AMAZON WEB SERVICES®, GOOGLE CLOUD™, and ORACLE CLOUD®.

Figure 1B:
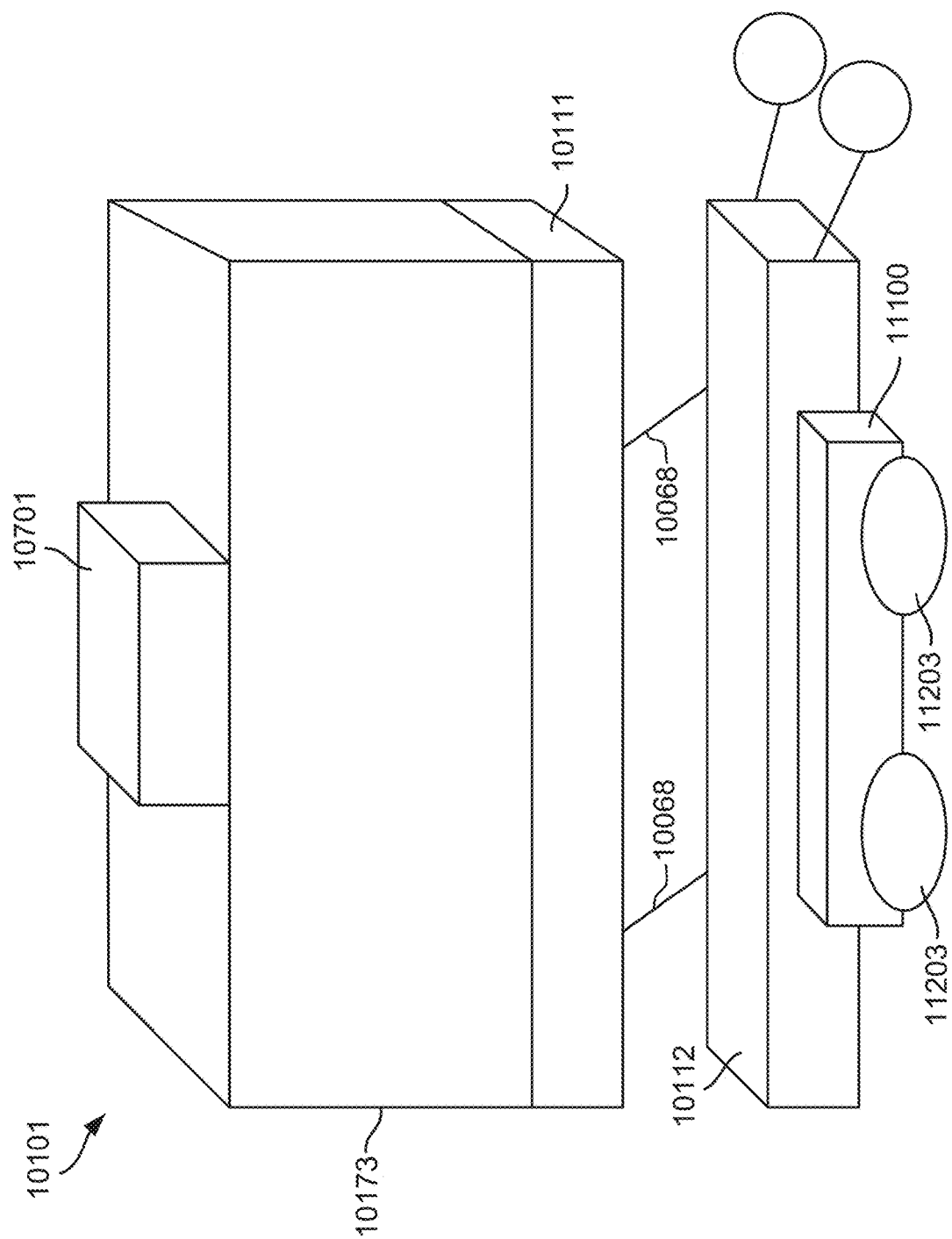
FIG. 1B is a pictorial diagram of an exemplary configuration of a device incorporating the system of the present teachings.

Referring now to FIG. 1B, an exemplary AV that can include device controller 10111 (FIG. 1A) that can receive information from map processor 10104 (FIG. 1A) of the present teachings can include a power base assembly such as, for example, but not limited to, the power base that is described fully in, for example, but not limited to, U.S. patent application Ser. No. 16/035,205, filed on Jul. 13, 2018, entitled Mobility Device, or U.S. Pat. No. 6,571,892, filed on Aug. 15, 2001, entitled Control System and Method, both of which are incorporated herein by reference in their entirety. An exemplary power base assembly is described herein not to limit the present teachings but instead to clarify features of any power base assembly that could be useful in implementing the technology of the present teachings. An exemplary power base assembly can optionally include power base 10112, wheel cluster assembly 11100, and payload carrier height assembly 10068. An exemplary power base assembly can optionally provide the electrical and mechanical power to drive wheels 11203 and clusters 11100 that can raise and lower wheels 11203. Power base 10112 can control the rotation of cluster assembly 11100 and the lift of payload carrier height assembly 10068 to support the substantially discontinuous surface traversal of the present teachings. Other such devices can be used to accommodate the SDSF detection and traversal of the present teachings.

Referring again to FIG. 1A, in some configurations, sensors internal to an exemplary power base can detect the orientation and rate of change in orientation of AV 10101, motors can enable servo operation, and controllers can assimilate information from the internal sensors and motors. Appropriate motor commands can be computed to achieve transporter performance and to implement the path following commands. Left and right wheel motors can drive wheels on the either side of AV 10101. In some configurations, front and back wheels can be coupled to drive together, so that two left wheels can drive together and two right wheels can drive together. In some configurations, turning can be accomplished by driving left and right motors at different rates, and a cluster motor can rotate the wheelbase in the fore/aft direction. This can allow AV 10101 to remain level while front wheels become higher or lower than rear wheels. This feature can be useful when, for example, but not limited to, climbing up and down SDSFs. Payload carrier 10173 can be automatically raised and lowered based at least on the underlying terrain.

Continuing to refer to FIG. 1A, in some configurations, point cloud data can include route information for the area in which AV 10101 is to travel. Point cloud data, possibly collected by a mapping device similar or identical to AV 10101, can be time-tagged. The path along which the mapping device travels can be referred to as a mapped trajectory. Point cloud data processing that is described herein can happen as a mapping device traverses the mapped trajectory, or later after point cloud data collection is complete. After the point cloud data are collected, they can be subjected to point cloud data processing that can include initial filtering and point reduction, point cloud segmentation, and feature detection as described herein. In some configurations, core cloud infrastructure 10103 can provide long- or short-term storage for the collected point cloud data, and can provide the data to AV services 10105. AV services 10105 can select among possible point cloud datasets to find the dataset that covers the territory surrounding a desired starting point for AV 10101 and a desired destination for AV 10101. AV services 10105 can include, but are not limited to including, map processor 10104 that can reduce the size of point cloud data and determine the features represented in the point cloud data. In some configurations, map processor 10104 can determine the location of SDSFs from point cloud data. In some configurations, polygons can be created from the point cloud data as a technique to segment the point cloud data and to ultimately set a drivable surface. In some configurations, SDSF finding and drivable surface determination can proceed in parallel. In some configurations, SDSF finding and drivable surface determination can proceed sequentially.

Figure 1C:
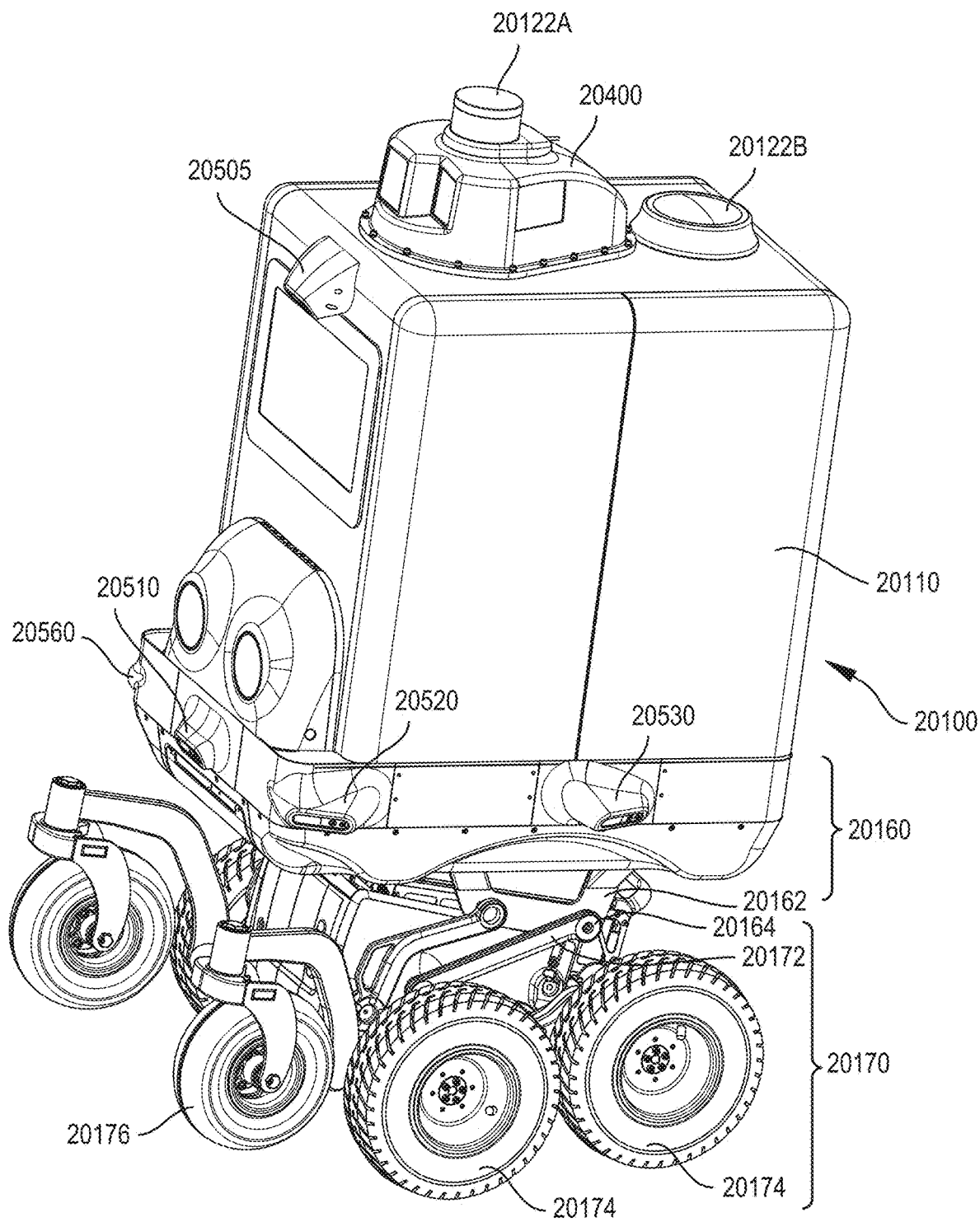
FIG. 1C is a side view of Automatic Delivery Vehicle showing field of views of some long and short range sensors.

Referring now to FIG. 1C, in some configurations, the AV may be configured to deliver cargo and/or perform other functions involving autonomously navigating to a desired location. In some applications, the AV may be remotely guided. In some configurations, AV 20100 comprises a cargo container that can be opened remotely, in response to user inputs, automatically or manually to allow users to place or remove packages and other items. The cargo container 20110 is mounted on the cargo platform 20160, which is mechanically connected to the power base 20170. The power base 20170 includes the four powered wheels 20174 and two caster wheels 20176. The power base provides speed and directional control to move the cargo container 20110 along the ground and over obstacles including curbs and other discontinuous surface features.

Continuing to refer to FIG. 1C, cargo platform 20160 is connected to the power base 20170 through two U-frames 20162. Each U-frame 20162 is rigidly attached to the structure of the cargo platform 20160 and includes two holes that allow a rotatable joint 20164 to be formed with the end of each arm 20172 on the power base 20170. The power base controls the rotational position of the arms and thus controls the height and attitude of the cargo container 20110.

Continuing to refer to FIG. 1C, in some configurations, AV 20100 includes one or more processors to receive data, navigate a path and select the direction and speed of the power base 20170.

Figure 1D:
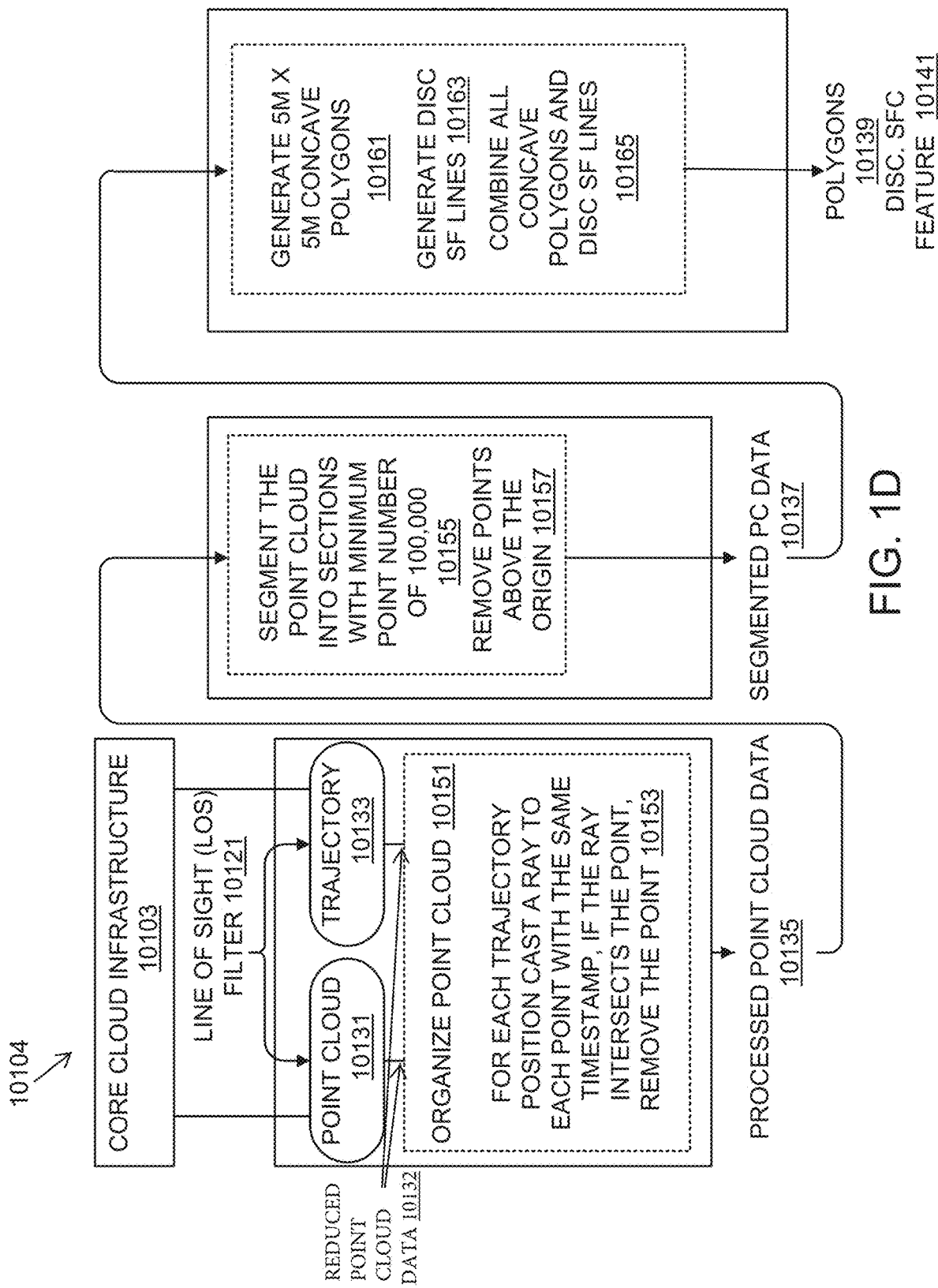
FIG. 1D is a schematic block diagram of the map processor of the present teachings.

Referring now to FIG. 1D, in some configurations, map processor 10104 of the present teachings can position SDSFs on a map. Map processor 10104 can include, but is not limited to including, feature extractor 10801, point cloud organizer 10803, transient processor 10805, segmenter 10807, polygon generator 10809, SDSF line generator 10811, and data combiner 10813.

Continuing to refer to FIG. 1D, feature extractor 10801 (FIG. 1-2) can include, but is not limited to including, line of sight filtering 10121 of point cloud data 10131 and mapped trajectory 10133. Line of sight filtering can remove points that are hidden from the direct line of sight of the sensors collecting the point cloud data and forming the mapped trajectory. Point cloud organizer 10803 (FIG. 1-2) can organize 10151 reduced point cloud data 10132 according to pre-selected criteria possibly associated with a specific feature. In some configurations, transient processor 10805 (FIG. 1-2) can remove 10153 transient points from organized point cloud data and mapped trajectory 10133 by any number of methods, including the method described herein. Transient points can complicate processing, in particular if the specific feature is stationary. Segmented 10807 (FIG. 1-2) can split processed point cloud data 10135 into processable chunks. In some configurations, processed point cloud data 10135 can be segmented 10155 into sections having a pre-selected minimum number of points for example, but not limited to, about 100,000 points. In some configurations, further point reduction can be based on pre-selected criteria that could be related to the features to be extracted. For example, if points above a certain height are unimportant to a locating a feature, those points could be deleted from the point cloud data. In some configurations, the height of at least one of the sensors collecting point cloud data could be considered an origin, and points above the origin could be removed from the point cloud data when, for example, the only points of interest are associated with surface features. After filtered point cloud data 10135 have been segmented, forming segments 10137, the remaining points can be divided into drivable surface sections and surface features can be located. In some configurations, polygon generator 10809 (FIG. 1-2) can locate drivable surfaces by generating 10161 polygons 10139, for example, but not limited to, as described herein. In some configurations, SDSF line generator 10811 (FIG. 1-2) can locate surface features by generating 10163 SDSF lines 10141, for example, but not limited to, as described herein. In some configurations, combiner 10813 (FIG. 1-2) can create a dataset that can be further processed to generate the actual path that AV 10101 (FIG. 1A) can travel by combining 10165 polygons 10139 and SDSFs 10141.

Figure 1E:
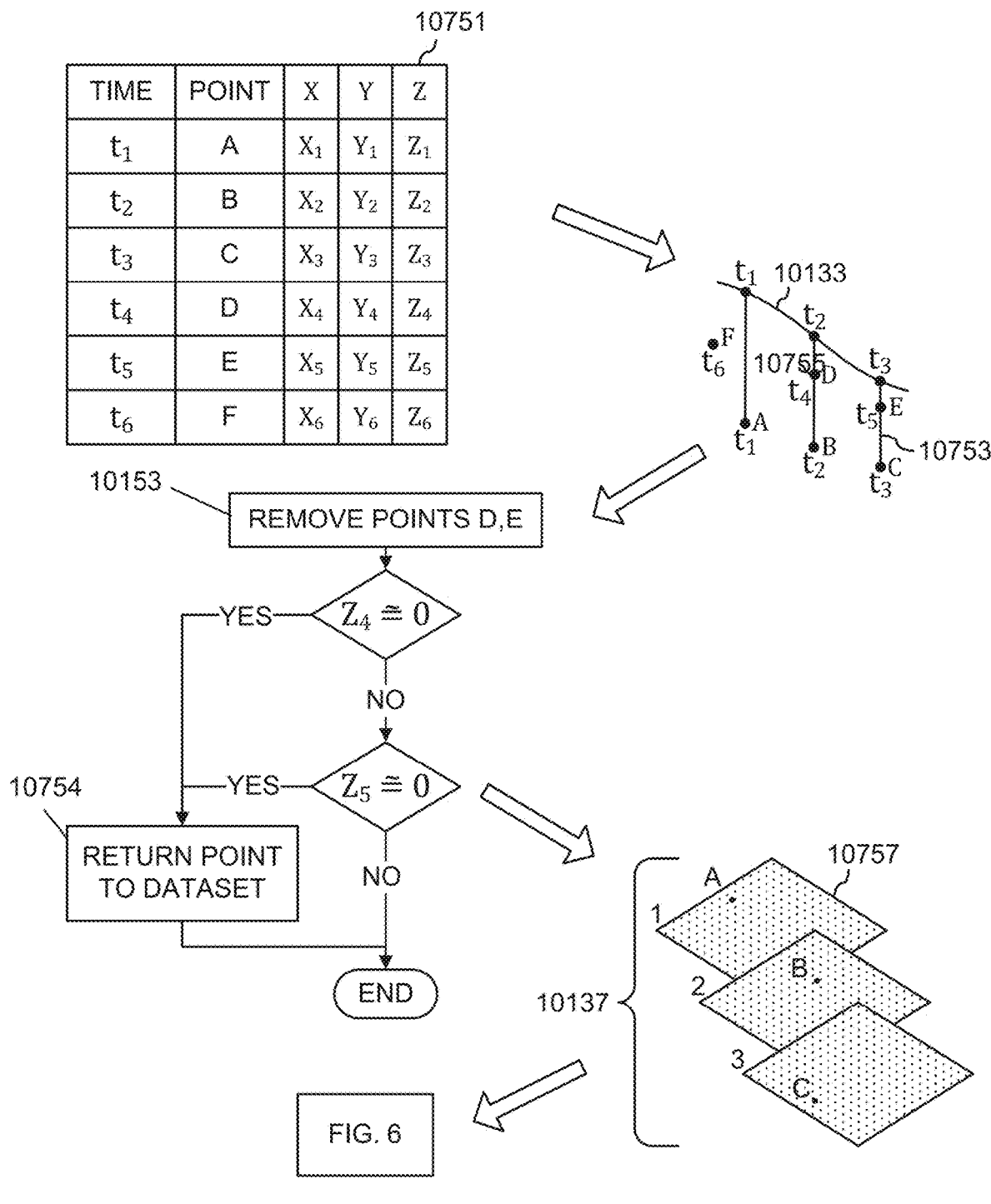
FIG. 1E is a pictorial diagram of the first part of the flow of the map processor of the present teachings.

Referring now primarily to FIG. 1E, eliminating 10153 (FIG. 1D), from point cloud data 10131 (FIG. 1D), objects that are transient with respect to mapped trajectory 10133, such as exemplary time-stamped points 10751, can include casting ray 10753 from time-stamped points on mapped trajectory 10133 to each time-stamped point within point cloud data 10131 (FIG. 1D) that has substantially the same time stamp. If ray 10753 intersects a point, for example, point D 10755, between the time-stamped point on mapped trajectory 10133 and the end point of ray 10753, intersecting point D 10755 can be assumed to have entered the point cloud data during a different sweep of the camera. The intersecting point, for example, intersecting point D 10755, can be assumed to be a part of a transient object and can be removed from reduced point cloud data 10132 (FIG. 1D) as not representing a fixed feature such as a SDSF. The result is processed point cloud data 10135 (FIG. 1D), free of, for example, but not limited to, transient objects. Points that had been removed as parts of transient objects but also are substantially at ground level can be returned 10754 to the processed point cloud data 10135 (FIG. 1D). Transient objects cannot include certain features such as, for example, but not limited to, SDSFs 10141 (FIG. 1D), and can therefore be removed without interfering with the integrity of point cloud data 10131 (FIG. 1D) when SDSFs 10141 (FIG. 1D) are the features being detected.

Figure 1F:
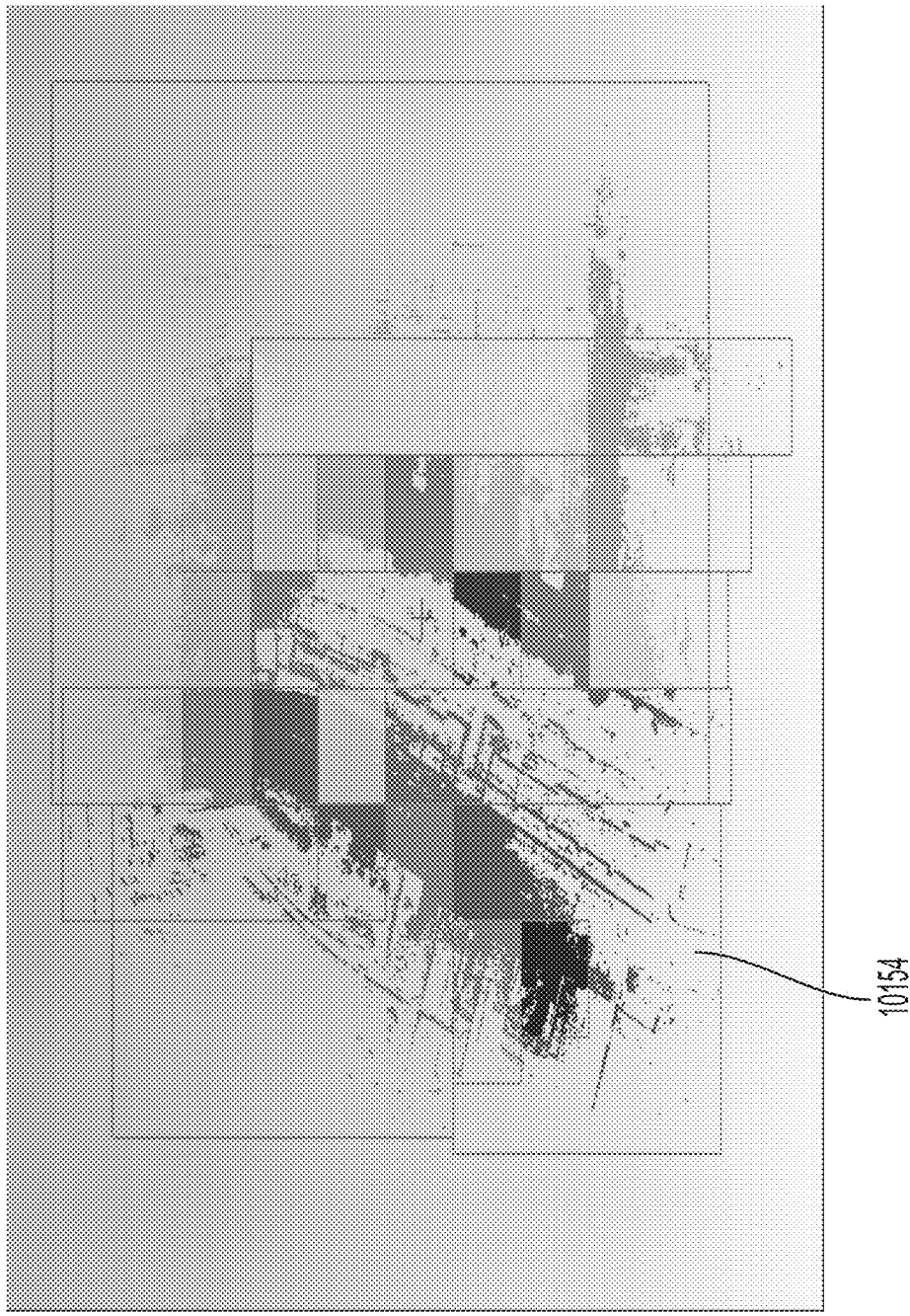
FIG. 1F is an image of the segmented point cloud of the present teachings.

Continuing to refer to FIG. 1E, segmenting 10155 (FIG. 1D) processed point cloud data 10135 (FIG. 1D) can produce sections 10757 having a pre-selected size and shape, for example, but not limited to, rectangles 10154 (FIG. 1F) having a minimum pre-selected side length and including about 100,000 points. From each section 10757, points that are not necessary for the specific task, for example, but not limited to, points that lie above a pre-selected level, can be removed 10157 (FIG. 1D) to reduce the dataset size. In some configurations, the pre-selected level can be the height of AV 10101 (FIG. 1A). Removing these points can lead to more efficient processing of the dataset.

Referring again primarily to FIG. 1D, map processor 10104 can supply to device controller 10111 at least one dataset that can be used to produce direction, speed, and configuration commands to control AV 10101 (FIG. 1A). The at least one dataset can include points that can be connected to other points in the dataset, where each of the lines that connects points in the dataset traverses a drivable surface. To determine such route points, segmented point cloud data 10137 can be divided into polygons 10139, and the vertices of polygons 10139 can possibly become the route points. Polygons 10139 can include the features such as, for example, SDSFs 10141.

Continuing to refer to FIG. 1D, in some configurations, creating processed point cloud data 10135 can include filtering voxels. To reduce the number of points that will be subject to future processing, in some configurations, the centroid of each voxel in the dataset can be used to approximate the points in the voxel, and all points except the centroid can be eliminated from the point cloud data. In some configurations, the center of the voxel can be used to approximate the points in the voxel. Other methods to reduce the size of filtered segments 10251 (FIG. 1G) can be used such as, for example, but not limited to, taking random point subsamples so that a fixed number of points, selected uniformly at random, can be eliminated from filtered segments 10251 (FIG. 1G).

Continuing to still further refer to FIG. 1D, in some configurations, creating processed point cloud data 10135 can include computing the normals from the dataset from which outliers have been removed and which has been downsized through voxel filtering. Normals to each point in the filtered dataset can be used for various processing possibilities, including curve reconstruction algorithms. In some configurations, estimating and filtering normals in the dataset can include obtaining the underlying surface from the dataset using surface meshing techniques, and computing the normals from the surface mesh. In some configurations, estimating normals can include using approximations to infer the surface normals from the dataset directly, such as, for example, but not limited to, determining the normal to a fitting plane obtained by applying a total least squares method to the k nearest neighbors to the point. In some configurations, the value of k can be chosen based at least on empirical data. Filtering normals can include removing any normals that are more than about 45° from perpendicular to the x-y plane. In some configurations, a filter can be used to align normals in the same direction. If part of the dataset represents a planar surface, redundant information contained in adjacent normals can be filtered out by performing either random sub-sampling, or by filtering out one point out of a related set of points. In some configurations, choosing the point can include recursively decomposing the dataset into boxes until each box contains at most k points. A single normal can be computed from the k points in each box.

Continuing to refer to FIG. 1D, in some configurations, creating processed point cloud data 10135 can include growing regions within the dataset by clustering points that are geometrically compatible with the surface represented the dataset, and refining the surface as the region grows to obtain the best approximation of the largest number of points. Region growing can merge the points in terms of a smoothness constraint. In some configurations, the smoothness constraint can be determined empirically, for example, or can be based on a desired surface smoothness. In some configurations, the smoothness constraint can include a range of about $10\pi/180$ to about $20\pi/180$. The output of region growing is a set of point clusters, each point cluster being a set of points, each of which is considered to be a part of the same smooth surface. In some configurations, region growing can be based on the comparison of the angles between normals. Region growing can be accomplished by algorithms such as, for example, but not limited to, region growing segmentation.

Figure 1G:
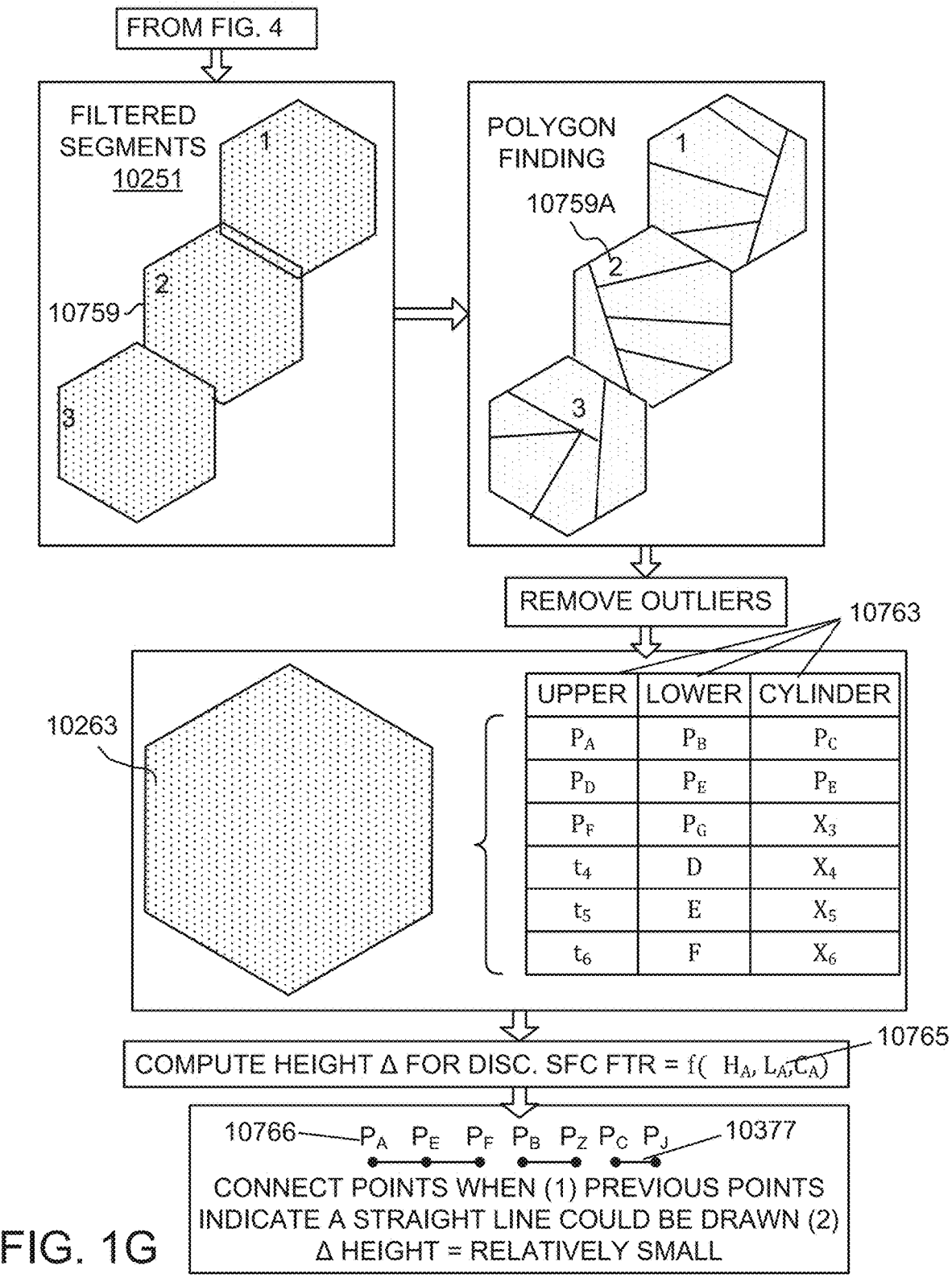
FIG. 1G is a pictorial diagram of the second part of the map processor of the present teachings.

Referring now to FIG. 1G, segmented point cloud data 10137 (FIG. 1D) can be used to generate 10161 (FIG. 1D) polygons 10759, for example, 5 m×5 m polygons. Point sub-clusters can be converted into polygons 10759 using meshing, for example. Meshing can be accomplished by, for example, but not limited to, standard methods such as marching cubes, marching tetrahedrons, surface nets, greedy meshing, and dual contouring. In some configurations, polygons 10759 can be generated by projecting the local neighborhood of a point along the point's normal, and connecting unconnected points. Resulting polygons 10759 can be based at least on the size of the neighborhood, the maximum acceptable distance for a point to be considered, the maximum edge length for the polygon, the minimum and maximum angles of the polygons, and the maximum deviation that normals can take from each other. In some configurations, polygons 10759 can be filtered according to whether or not polygons 10759 would be too small for AV 10101 (FIG. 1A) to transit. In some configurations, a circle the size of AV 10101 (FIG. 1A) can be dragged around each of polygons 10759 by known means. If the circle falls substantially within polygon 10759, then polygon 10759, and thus the resulting drivable surface, can accommodate AV 10101 (FIG. 1A). In some configurations, the area of polygon 10759 can be compared to the footprint of AV 10101 (FIG. 1A). Polygons can be assumed to be irregular so that a first step for determining the area of polygons 10759 is to separate polygon 10759 into regular polygons 10759A by known methods. For each regular polygon 10759A, standard area equations can be used to determine its size. The areas of each regular polygon 10759A can be added together to find the area of polygon 10759, and that area can be compared to the footprint of AV 10101 (FIG. 1A). Filtered polygons can include the subset of polygons that satisfy the size criteria. The filtered polygons can be used to set a final drivable surface.

Continuing to refer to FIG. 1G, in some configurations, polygons 10759 can be processed by removing outliers by conventional means such as, for example, but not limited to, statistical analysis techniques such as those available in the Point Cloud Library. Filtering can include downsizing segments 10137 (FIG. 1D) by conventional means including, but not limited to, a voxelized grid approach such as is available in the Point Cloud Library. Concave polygons 10263 can be created, for example, but not limited to, by the process set out in the process set out in *A New Concave Hull*

*Algorithm and Concaveness Measure for n-dimensional Datasets*, Park et al., Journal of Information Science and Engineering 28, pp. 587-600, 2012.

Figure 1H:
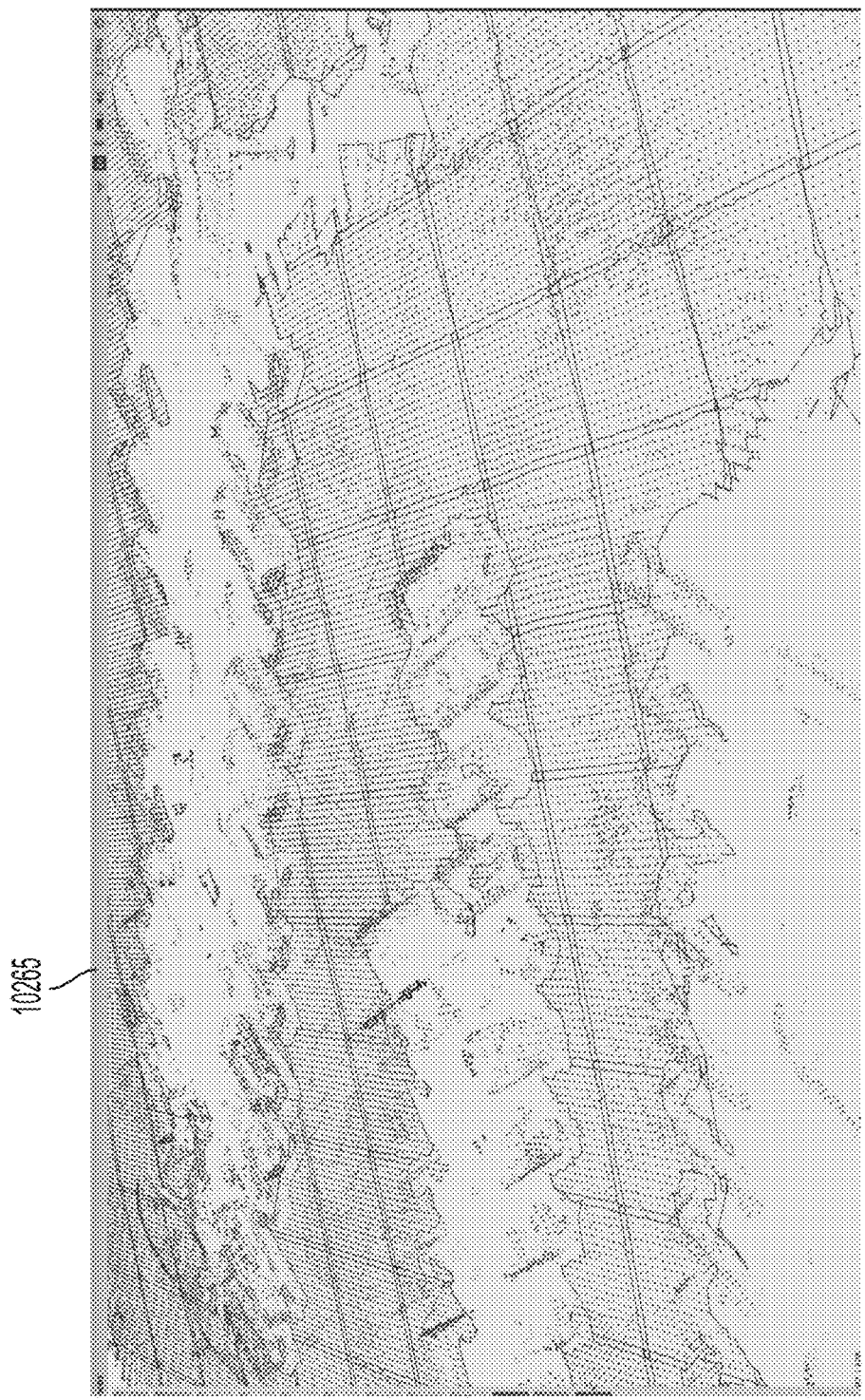
FIG. 1H is an image of the drivable surface detection result of the present teachings.

Referring now primarily to FIG. 1H, in some configurations, processed point cloud data 10135 (FIG. 1D) can be used to determine initial drivable surface 10265. Region growing can produce point clusters that can include points that are part of a drivable surface. In some configurations, to determine an initial drivable surface, a reference plane can be fit to each of the point clusters. In some configurations, the point clusters can be filtered according to a relationship between the orientation of the point clusters and the reference plane. For example, if the angle between the point cluster plane and the reference plane is less than, for example, but not limited to, about 30°, the point cluster can be deemed, preliminarily, to be part of an initial drivable surface. In some configurations, point clusters can be filtered based on, for example, but not limited to, a size constraint. In some configurations, point clusters that are greater in point size than about 20% of the total points in point cloud data 10131 (FIG. 1D) can be deemed too large, and point clusters that are smaller in size than about 0.1% of the total points in point cloud data 10131 (FIG. 1D) can be deemed too small. The initial drivable surface can include the filtered of the point clusters. In some configurations, point clusters can be split apart to continue further processing by any of several known methods. In some configurations, density based spatial clustering of applications with noise (DBSCAN) can be used to split the point clusters, while in some configurations, k-means clustering can be used to split the point clusters. DBSCAN can group together points that are closely packed together, and mark as outliers the points that are substantially isolated or in low-density regions. To be considered closely packed, the point must lie within a pre-selected distance from a candidate point. In some configurations, a scaling factor for the pre-selected distance can be empirically or dynamically determined. In some configurations, the scaling factor can be in the range of about 0.1 to 1.0.

Figure 1I:
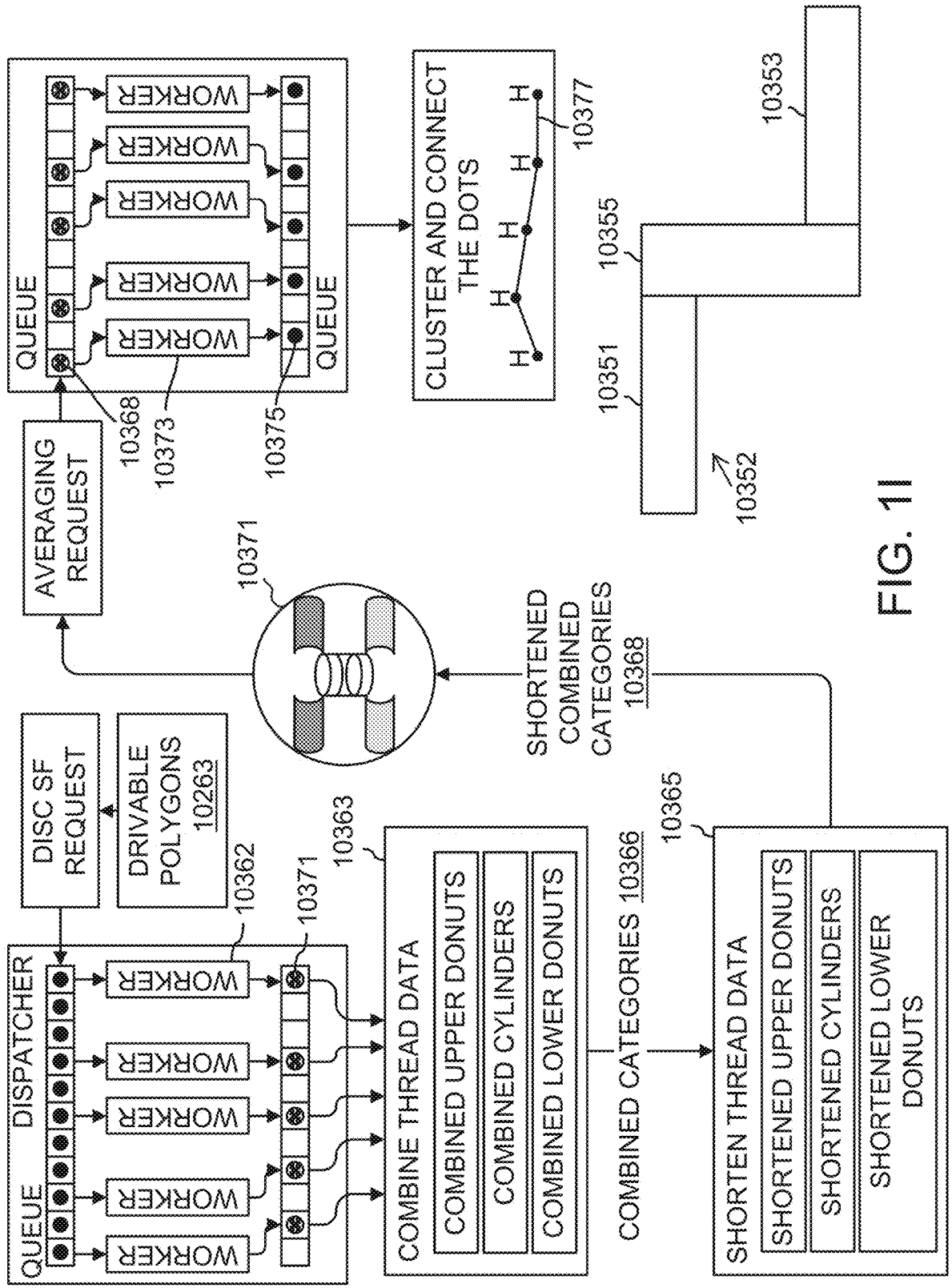
FIG. 1I is a pictorial diagram of the flow of the SDSF finder of the present teachings.
Figure 1J:
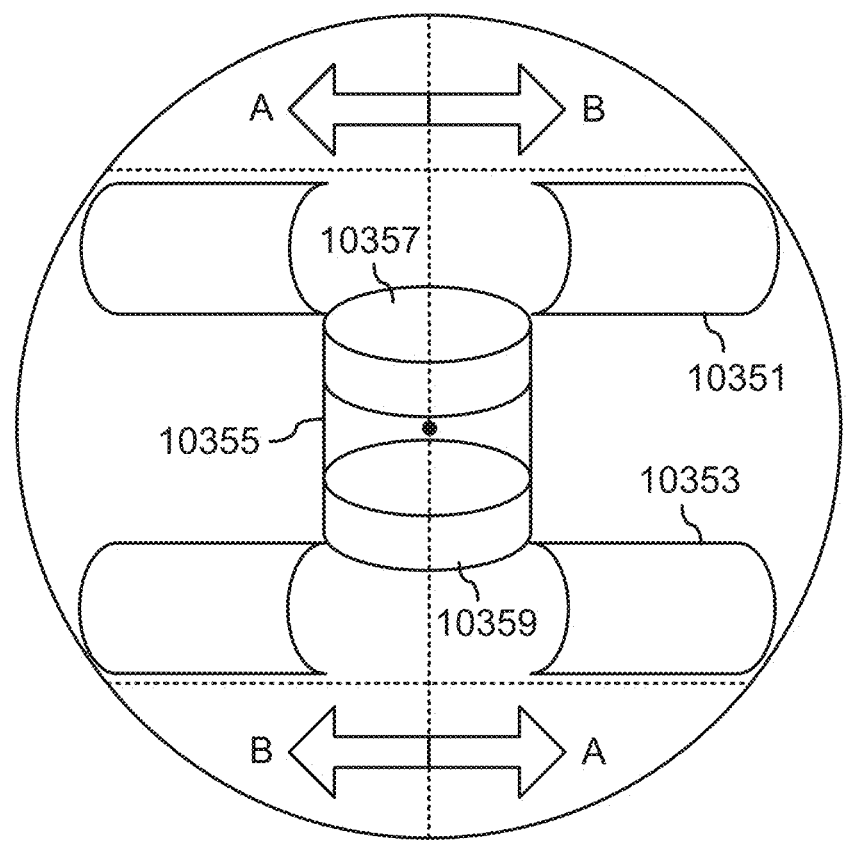
FIG. 1J is a pictorial diagram of the SDSF categories of the present teachings.

Referring primarily to FIG. 1I, generating 10163 (FIG. 1D) SDSF lines can include locating SDSFs by further filtering of concave polygons 10263 on drivable surface 10265 (FIG. 1H). In some configurations, points from the point cloud data that make up the polygons can be categorized as either upper donut point 10351 (FIG. 1J), lower donut point 10353 (FIG. 1J), or cylinder point 10355 (FIG. 1J). Upper donut points 10351 (FIG. 1J) can fall into the shape of SDSF model 10352 that is farthest from the ground. Lower donut points 10353 (FIG. 1J) fall into the shape of SDSF model 10352 that is closest to the ground, or at ground level. Cylinder points 10355 (FIG. 1J) can fall into the shape between upper donut points 10351 (FIG. 1J) and lower donut points 10353 (FIG. 1J). The combination of categories can form donut 10371. To determine if donuts 10371 form a SDSF, certain criteria are tested. For example, in each donut 10371 there must be a minimum number of points that are upper donut points 10351 (FIG. 1J) and a minimum number that are lower donut points 10353 (FIG. 1J). In some configurations, the minima can be selected empirically and can fall into the range of about 5-20. Each donut 10371 can be divided into multiple parts, for example, two hemispheres. Another criterion for determining if the points in donut 10371 represent a SDSF is whether the majority of the points lie in opposing hemispheres of the parts of donut 10371. Cylinder points 10355 (FIG. 1J) can occur in either first cylinder region 10357 (FIG. 1J) or second cylinder region 10359 (FIG. 1J). Another criterion for SDSF selection is that there must be a minimum number of points in both cylinder regions 10357/10359 (FIG. 1J). In some configurations, the minimum number of points can be selected empirically and can fall into the range of 3-20. Another criterion for SDSF selection is that donut 10371 must include at least two of the three categories of points, i.e. upper donut point 10351 (FIG. 1J), lower donut point 10353 (FIG. 1J), and cylinder point 10355 (FIG. 1J).

Figure 1K:
FIG. 1K is an image of the SDSFs identified by the system of the present teachings.

Continuing to refer primarily to FIG. 1I, in some configurations, polygons can be processed in parallel. Each category worker 10362 can search its assigned polygon for SDSF points 10789 (FIG. 1N) and can assign SDSF points 10789 (FIG. 1N) to categories 10763 (FIG. 1G). As the polygons are processed, the resulting point categories 10763 (FIG. 1G) can be combined 10363 forming combined categories 10366, and the categories can be shortened 10365 forming shortened combined categories 10368. Shortening SDSF points 10789 (FIG. 1N) can include filtering SDSF points 10789 (FIG. 1N) with respect to their distances from the ground. Shortened combined categories 10368 can be averaged, possibly processed in parallel by average workers 10373, by searching an area around each SDSF point 10766 (FIG. 1G) and generating average points 10765 (FIG. 1G), the category's points forming a set of averaged donuts 10375. In some configurations, the radius around each SDSF point 10766 (FIG. 1G) can be determined empirically. In some configurations, the radius around each SDSF point 10766 (FIG. 1G) can include a range of between 0.1 m to 1.0 m. The height change between one point and another on SDSF trajectory 10377 (FIG. 1G) for the SDSF at average point 10765 (FIG. 1G) can be calculated. Connecting averaged donuts 10375 together can generate SDSF trajectory 10377 (FIGS. 1G and 1K). In creating SDSF trajectory 10377 (FIGS. 1G and 1K), if there are two next candidate points within a search radius of the starting point, the next point can be chosen based at least on forming a straight-as-possible line among previous line segments, the starting point and the candidate destination point, and upon which the candidate next point represents the smallest change in SDSF height between previous points and the candidate next point. In some configurations, SDSF height can be defined as the difference between the height of upper donut 10351 (FIG. 1J) and lower donut 10353 (FIG. 1J).

Figure 1L:
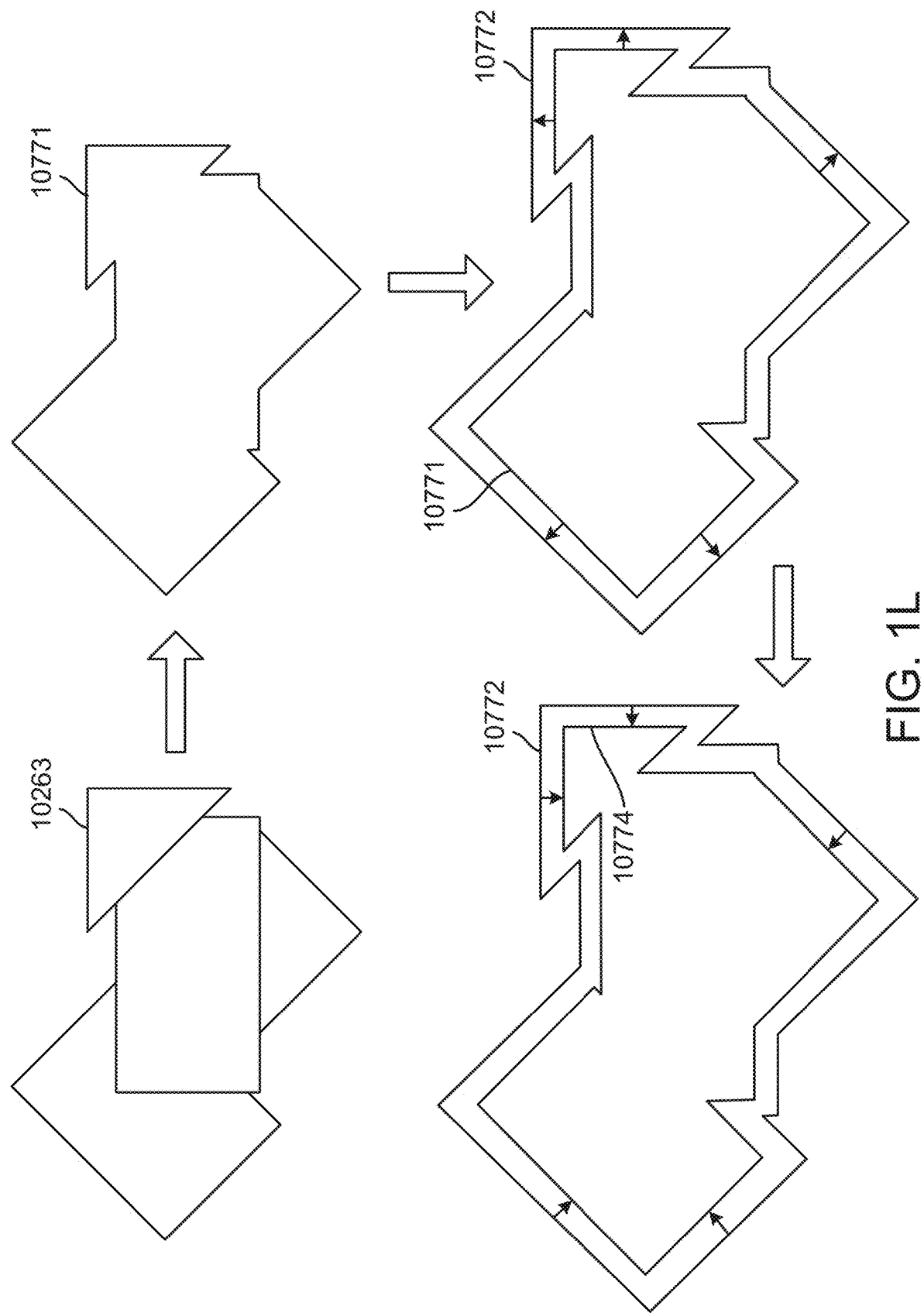

Referring now primarily to FIG. 1L, combining 10165 (FIG. 1D) convex polygons and SDSF lines can produce a dataset including polygons 10139 (FIG. 1D) and SDSFs 10141 (FIG. 1D), and the dataset can be manipulated to produce graphing polygons with SDSF data. Manipulating convex polygons 10263 can include, but is not limited to including, merging convex polygons 10263 to form merged concave polygon 10771. Merging convex polygons 10263 can be accomplished using known methods. Merged concave polygon 10771 can be expanded to smooth the edges and form expanded polygon 10772. Expanded polygon 10772 can be contracted to provide a driving margin, forming contracted polygon 10774, to which SDSF trajectories 10377 (FIG. 1M) can be added. Inward trimming (contraction) can insure that there is room near the edges for AV 10101 (FIG. 1A) to travel by reducing the size of the drivable surface by a pre-selected amount based at least on the size of AV 10101 (FIG. 1A). Polygon expansion and contraction can be accomplished by commercially available technology such as, for example, but not limited to, the ARCGIS® clip command.

Referring now primarily to FIG. 1M, contracted polygon 10774 can be partitioned into polygons 10778, each of which can be traversed without encountering non-drivable surfaces. Contracted polygon 10774 can be partitioned by conventional means such as, for example, but not limited to, ear slicing, optimized by z-order curve hashing and extended to handle holes, twisted polygons, degeneracies, and self-intersections. SDSF trajectory 10377 can include SDSF points 10789 (FIG. 1N) that can be connected to polygon vertices 10781. Vertices 10781 can be considered to be possible path points that can be connected to each other to form possible travel paths for AV 10101 (FIG. 1A). In the dataset, SDSF points 10789 (FIG. 1N) can be labeled as such. As partitioning progresses, it is possible that redundant edges are introduced such as, for example, but not limited to, edges 10777 and 10779. Removing one of edges 10777 or 10779 can reduce the complexity of further analyses and can retain the polygon mesh. In some configurations, a Hertel-Mehlhorn polygon partitioning algorithm can be used to remove edges, skipping edges that have been labeled as features. The set of polygons 10778, including the labeled features, can be subjected to further simplification to reduce the number of possible path points, and the possible path points can be provided to device controller 10111 (FIG. 1A) in the form of annotated point data 10379 (FIG. 5B) which can be used to populate the occupancy grid.

Figure 2A:
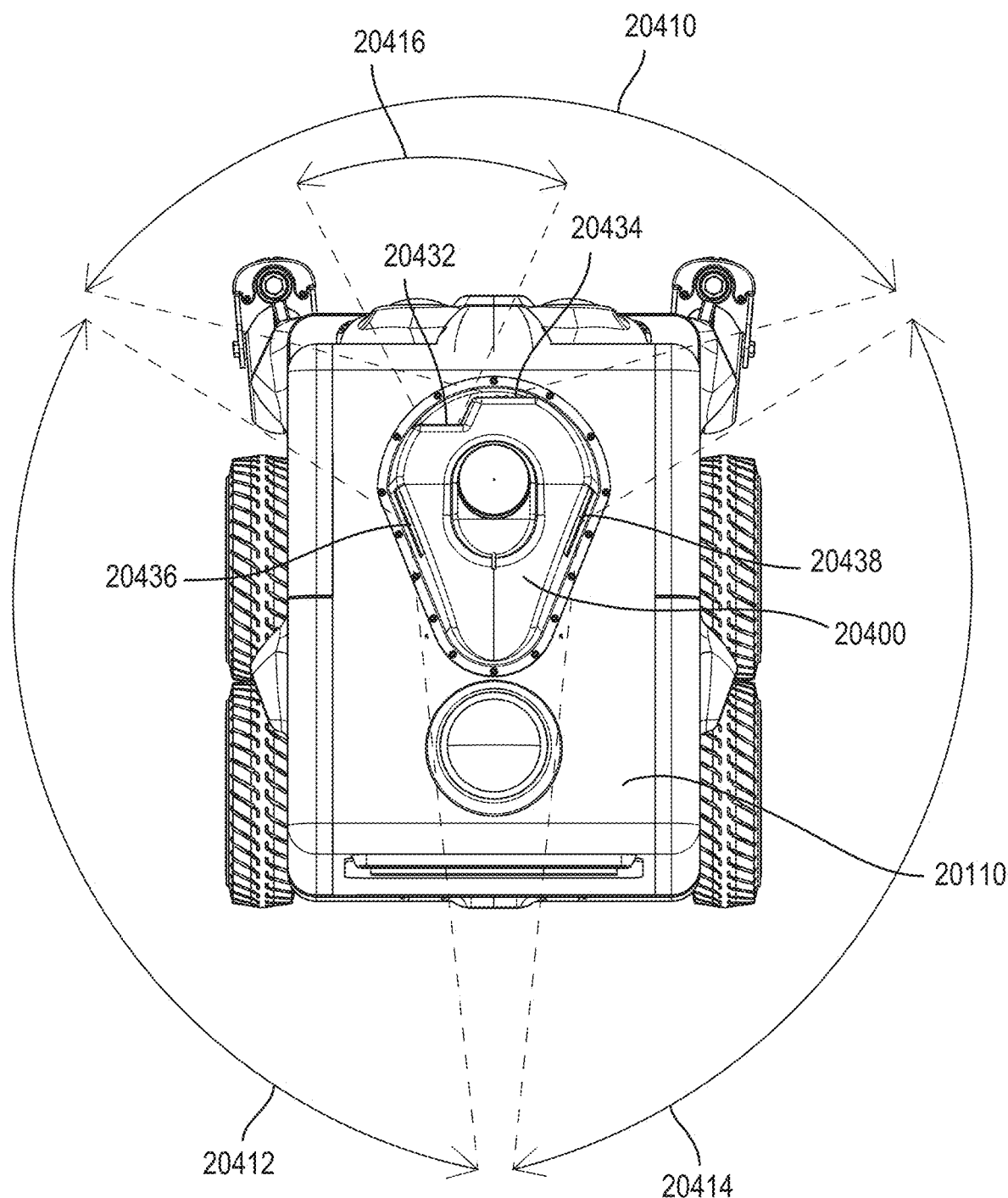
FIG. 2A is an isometric view of the autonomous vehicle of the present teachings.
Figure 2B:
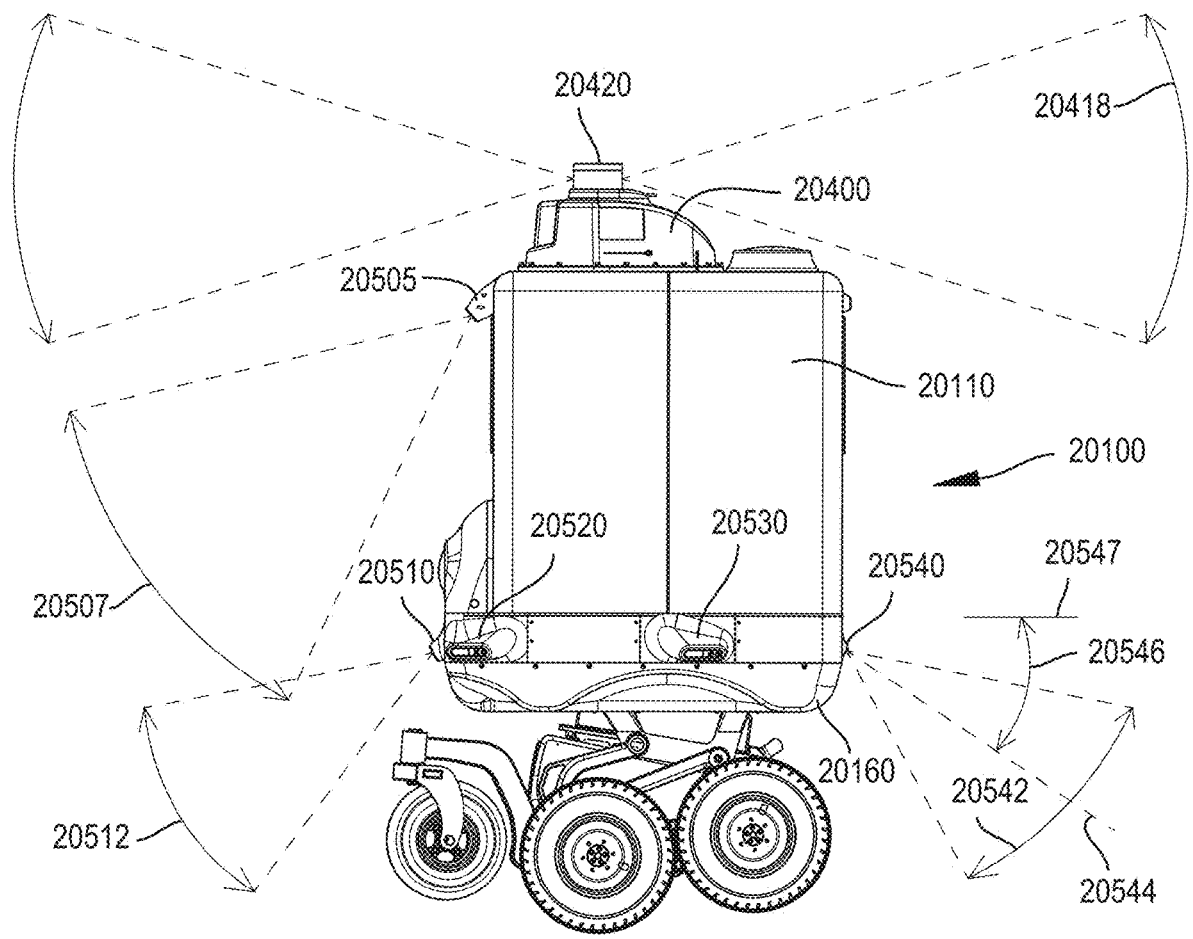
FIG. 2B is a top view the cargo container showing fields of view of selected of the long-range sensors.

Referring now to FIGS. 2A-2B, sensor data gathered by an AV can also be used to populate the occupancy grid. The processors in the AV can receive data from the sensors in long-range sensor assembly 20400 mounted on top of cargo container 20110 and from short-range sensors 20510, 20520, 20530, 20540 and others sensors located in cargo platform 20160. In addition, the processors may receive data from optional short-range sensor 20505 mounted near the top of the front of cargo-container 20110. The processors may also receive data from one or more antennas 20122A, 20122B (FIG. 1C) including cellular, WiFi and/or GPS. In one example, AV 20100 has an GPS antenna 20122A (FIG. 1C) located on top of long-range sensor assembly 20400 and/or antenna 20122B (FIG. 1C) located atop cargo-container 20110. The processors may be located anywhere in AV 20100. In some examples, one or more processors are located in long-range sensor assembly 20400. Additional processors may be located in cargo platform 20160. In other examples, the processors may be located in cargo container 20110 and/or as part of power base 20170.

Continuing to refer to FIGS. 2A-2B, long-range sensor assembly 20400 is mounted on top of the cargo-container to provide improved view of the environment surrounding the AV. In one example, long-range sensor assembly 20400 is more than 1.2 m above the travel surface or ground. In other examples, where the cargo container is taller or the power base configuration raises cargo platform 20160, long-range sensor assembly 20400 may be 1.8 m above the ground that the AV is moving over. Long-range sensor assembly 20400 provides information about environment around the AV from a minimum distance out to a maximum range. The minimum distance may be defined by the relative position of long-range sensors 20400 and cargo-container 20110. The minimum distance may be further defined by the field of view (FOV) of the sensors. The maximum distance may be defined by the range of the long-range sensors in long-range sensor assembly 20400 and/or by the processors. In one example, the range of the long-range sensors is limited to 20 meters. In one example, a Velodyne Puck LIDAR has a range to 100 m. Long-range sensor assembly 20400 may provide data on objects in all directions. The sensor assembly may provide information on structures, surfaces, and obstacles over a 360° angle around the AV 20100.

Continuing to refer to FIG. 2A, three long-range cameras observing through windows 20434, 20436 and 20438 can provide horizontal FOVs 20410, 20412, 20414 that together provide 360° FOV. The horizontal FOV may be defined by the selected camera and the location of cameras within the long-range camera assembly 20400. In describing fields of view, the zero angle is a ray located in a vertical plain through the center of the AV 20100 and perpendicular to the front of the AV. The zero angle ray passes through the front of the AV. Front long-range camera viewing through window 20434 has a 96° FOV 20410 from 311° to 47°. Left side long-range camera viewing through window 20436 has a FOV 20412 from 47° to 180°. Right side long-range camera viewing through window 20438 has a FOV 20414 from 180° to 311°. Long-range sensor assembly 20400 may include an industrial camera located to observe through window 20432 that provides more detailed information on objects and surfaces in front of AV 20100 than the long-range cameras. The industrial camera located behind window 20432 may have FOV 20416 defined by selected camera and the location of cameras within long-range camera assembly 20400. In one example, the industrial camera behind window 20432 has a FOV from 23° to 337°.

Referring now to FIG. 2B, LIDAR 20420 provides a 360 horizontal FOV around AV 20100. The vertical FOV may be limited by the LIDAR instrument. In one example, the vertical FOV 20418 of 40° and mounted at 1.2 m to 1.8 m above the ground sets the minimum distance of the sensor at 3.3 m to 5 m from the AV 20100.

Figure 2C:
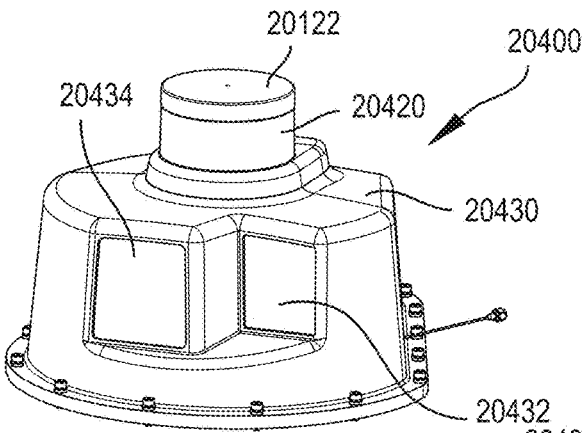
FIG. 2C-2F are views of the long range sensor assembly.
Figure 2D:
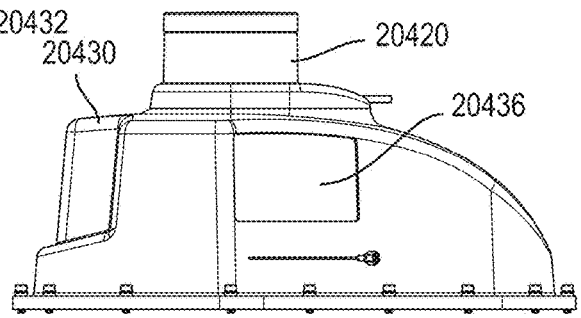

Referring now to FIGS. 2C and 2D, long-range sensor assembly 20400 is shown with cover 20430. Cover 20430 includes windows 20434, 20432, 20436 through which the long-range cameras and industrial camera observe the environment around AV 20100. Cover 20430 for long-range sensor assembly 20400 is sealed from the weather by an O-ring between cover 20430 and the top of cargo container 20110.

Figure 2E:
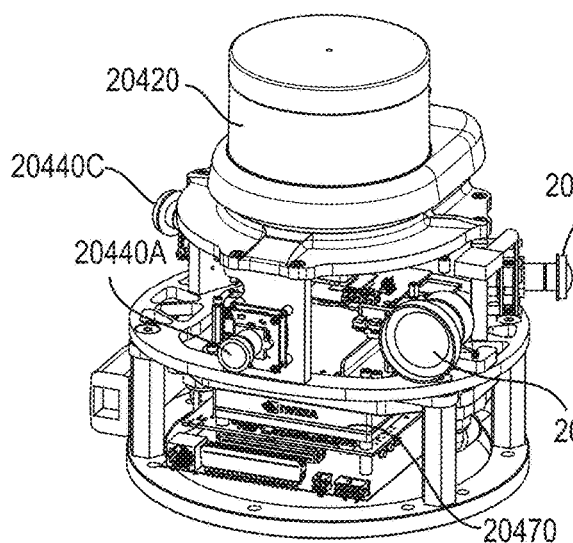
Figure 2F:
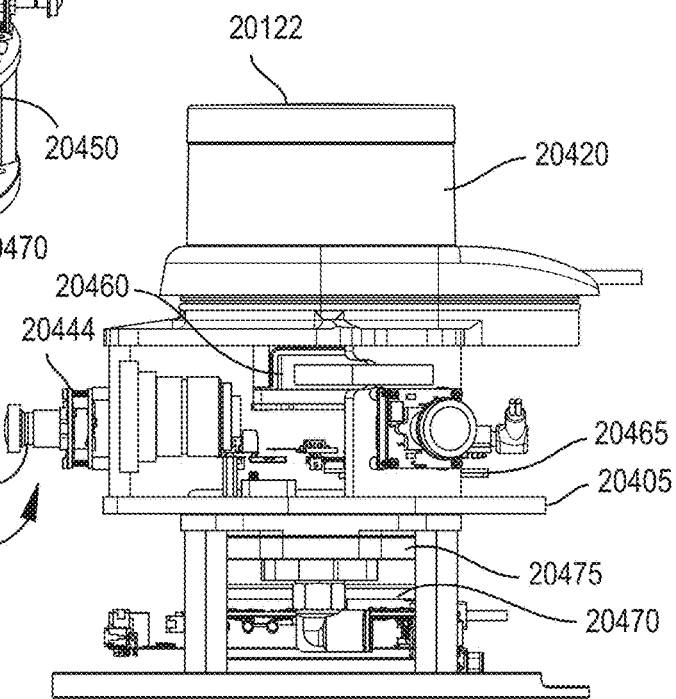

Referring now to FIGS. 2E and 2F, cover 20430 has been removed to reveal examples of cameras and processors. LIDAR sensor 20420 provides data with regard to the range or distance to surfaces around the AV. These data may be provided to processor 20470 located in long-range sensor assembly 20400. The LIDAR is mounted on the structure 20405 above the long-range cameras 20440A-C and cover 20430. LIDAR sensor 20420 is one example of a ranging sensor based on reflected laser pulsed light. Other ranging sensors such as radar that use reflected radio waves can also be used. In one example, LIDAR sensor 20420 is the Puck sensor by VELODYNE LIDAR® of San Jose, CA. Three long-range cameras 20440A, 20440B, 20440C provide digital images of the objects, surfaces and structures around AV 20100. Three long-range cameras 20440A, 20440B, 20440C are arranged around structure 20405 with respect to cover 20430 to provide three horizontal FOVs that cover the entire 360 around the AV. Long-range cameras 20440A, 20440B, 20440C are on elevated ring structure 20405 that is mounted to cargo container 20110. Long-range cameras 20440A, 20440B, 20440C receive images through windows 20434, 20436, 20438 that are mounted in cover 20430. The long-range cameras may comprise a camera on a printed circuit board (PCB) and a lens.

Referring now to FIG. 2F, one example of long-range camera 20440A may comprise digital camera 20444 with fisheye lens 20442 mounted in front of digital camera 20444. Fisheye lens 20442 may expand the FOV of the camera to a much wider angle. In one example, the fisheye lens expands the field of view to 180. In one example, digital camera 20444 is similar to e-cam52A_56540_MOD by E-con Systems of San Jose, CA. In one example, fisheye lens 20442 is similar to model DSL227 by Sunex of Carlsbad, CA.

Continuing to refer to FIG. 2F, long-range sensor assembly 20400 may also include industrial camera 20450 that receives visual data through window 20432 in cover 20430. Industrial camera 20450 provides additional data on objects, surfaces and structures in front of the AV to processor 20470. The camera may be similar to a Kowa industrial camera part number LM6HC. Industrial camera 20450 and long-range cameras 20440A-C are located 1.2 m to 1.8 m above the surface that AV 20100 is moving over.

Continuing to refer to FIG. 2F, mounting long-range sensor assembly 20400 on top of the cargo-container provides at least two advantages. The field of views for the long-range sensors including long-range cameras 20440A-C, industrial camera 20450 and LIDAR 20420 are less often blocked by nearby objects such as people, cars, low walls etc., when the sensors are mounted further above the ground. Additionally, pedestrian ways are architected to provide visual cues including signage, fence heights etc. for people to perceive, and a typical eye level is in the range of 1.2 m to 1.8 m. Mounting long-range sensor assembly 20400 to the top of the cargo-container puts the long-range cameras 20440A-C, 20450 on the same level as signage and over visual clues directed at pedestrians. The long-range sensors are mounted on the structure 20405 that provides a substantial and rigid mount that resists deflections caused by movement of AV 20100.

Referring again to FIGS. 2E and 2F, the long-range sensor assembly may include an inertial measurement unit (IMU) and one or more processors that receive data from the long-range sensors and output processed data to other processors for navigation. IMU 20460 with a vertical reference (VRU) is mounted to structure 20405. IMU/VRU 20460 may be located directly under LIDAR 20420 to as to provide positional data on LIDAR 20420. The position and orientation from IMU/VRU 20460 may be combined with data from the other long-range sensors. In one example, IMU/VRU 20460 is model MTi 20 supplied by Xsens Technologies of The Netherlands. The one or more processors may include processor 20465 that receives data from at least industrial camera 20450. In addition, processor 20470 may receive data from the at least one of the following, LIDAR 20420, long-range cameras 20440A-C, industrial camera 20450, and IMU/VRU 20460. Processor 20470 may be cooled by liquid-cooled heat exchanger 20475 that is connected to a circulating coolant system.

Figure 2G:
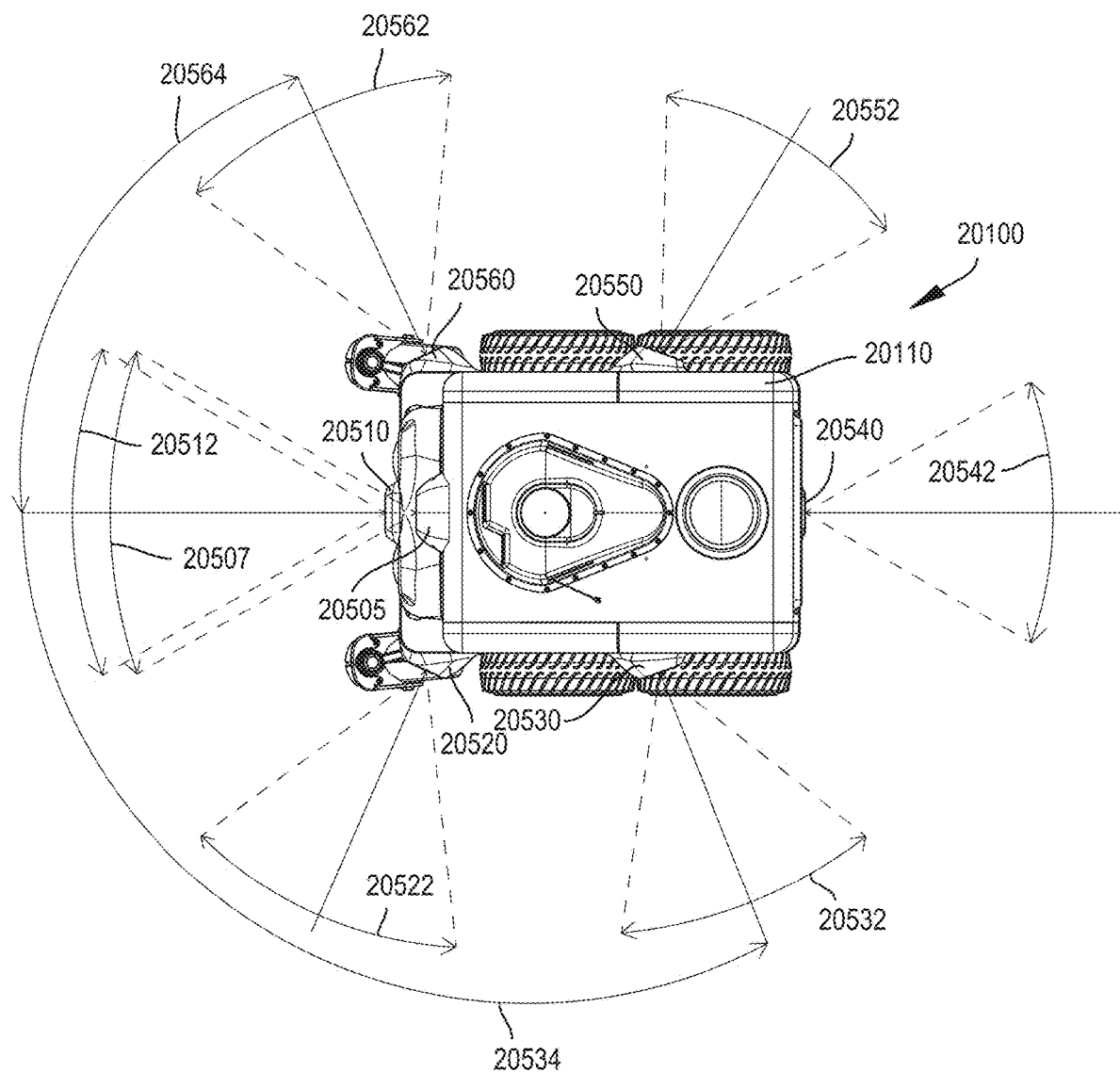
FIG. 2G is a top view of the cargo container showing fields of view of selected of the short-range sensors.

Referring now to FIG. 2G, AV 20100 may include a number of short-range sensors that detect driving surfaces and obstacles within a predetermined distance from the AV. Short-range sensors 20510, 20520, 20530, 20540, 20550, and 20560 are located on the periphery of the container platform 20160. These sensors are located below cargo-container 20110 (FIG. 2B) and are closer to the ground than long-range sensor assembly 20400 (FIG. 2C). Short-range sensors 20510, 20520, 20530, 20540, 20550, and 20560 are angled downward to provide FOVs that capture surfaces and objects that cannot be seen by the sensors in long-range sensor assembly 20400 (FIG. 2C). The field of view of a sensor located closer to the ground and angled downward is less likely to be obstructed by the nearby objects and pedestrians than sensors mounted further from the ground. In one example, the short range sensors provide information about the ground surfaces and objects up to 4 m from AV 20100.

Referring again to FIG. 2B, the vertical FOVs for two of short-range sensors are shown in a side view of the AV 20100. The vertical FOV 20542 of the aft-facing sensor 20540 is centered about the center line 20544. The center line 20544 is angled below the top surface of the cargo platform 20160. In one example, sensor 20540 has a vertical FOV 42° and a center line angled 22° to 28° 20546 below the plane 20547 defined by the top plate of the cargo platform 20160. In an example, the short range sensors 20510 and 20540 are approximately 0.55 m to 0.71 m above the ground. The resulting vertical FOVs 20512, 20542 cover the ground from 0.4 m to 4.2 m from the AV. Short range sensors 20510, 20520, 20530, 20550 (FIG. 2G), 20560 (FIG. 2G) mounted on the cargo base 20160 have similar vertical fields of view and a center-line angle relative to the top of the cargo-platform. The short-range sensors mounted on the cargo platform 20160 can view the ground from 0.4 to 4.7 meters out from the outer edge of the AV 20100.

Continuing to refer to FIG. 2B, short-range sensor 20505 may be mounted on the front surface near to the top of cargo-container 20110. In one example, sensor 20505 may provide additional views of the ground in front of the AV to the view of provided by short-range sensor 20510. In another example, sensor 20505 may provide a view of the ground in front of the AV in place of the view provided by short-range sensor 20510. In one example, short-range sensor 20505 may be have a vertical FOV 20507 of 42° and the angle of the centerline to the top of the cargo-platform 20160 is 39°. The resulting view of the ground extends from 0.7 m to 3.75 m from the AV.

Referring again to the FIG. 2G, the horizontal FOVs of short range sensor 20510, 20520, 20530, 20540, 20550, 20560 cover all the directions around the AV 20100. The horizontal FOVs 20522 and 20532 of adjacent sensors such as 20520 and 20530 overlap at a distance out from the AV 20100. In one example, the horizontal FOVs 20522, 20532 and 20562, 20552 of adjacent sensors, 20520, 20530 and 20560, 20550 overlap at 0.5 to 2 meters from the AV. The short-range sensors are distributed around the periphery of cargo-base 20160, have horizontal fields of view, and are placed at specific angles to provide nearly complete visual coverage of the ground surrounding the AV. In one example, the short-range sensors have horizontal FOV of 69°. Front sensor 20510 faces forward at zero angle relative to the AV and has FOV 20512. In one example, two front corner sensors 20520, 20560 are angled so that the center lines are at angle 20564 of 65°. In an example, rear side sensors 20530, 20550 are angled so that the center lines of 20530 and 20560 at angle 20534 of 110. In some configurations, other numbers of sensors with other horizontal FOV that are mounted around the periphery of cargo base 20160 to provide nearly complete view of the ground around AV 20100 are possible.

Figure 2H:
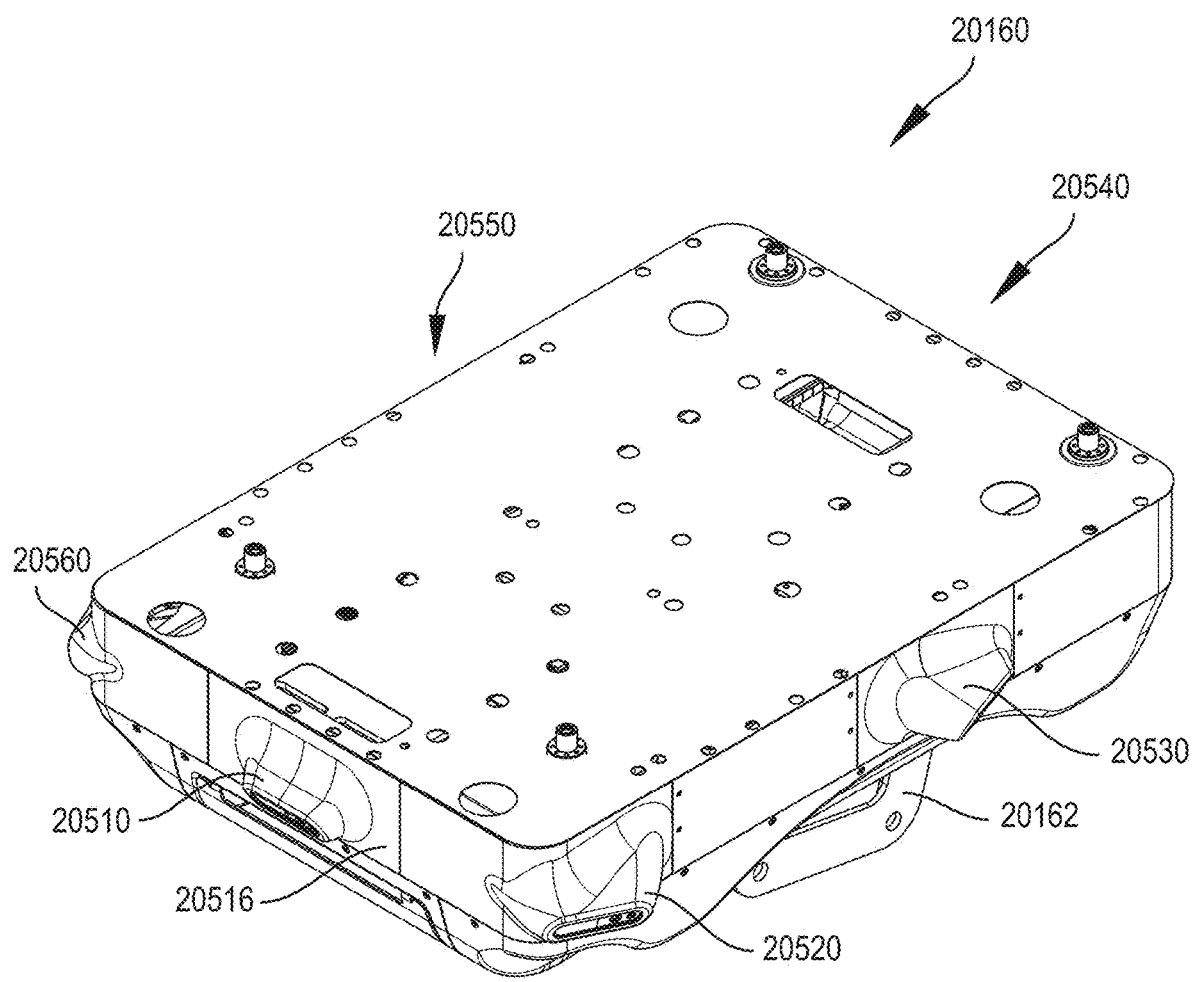
FIG. 2H is an isometric view of the cargo platform of the present teachings.

Referring now to FIG. 2H, short-range sensors 20510, 20520, 20530, 20540, 20550, 20560 are located on the periphery of cargo base 20160. The short-range cameras are mounted in the protuberances that set the angle and location of the short-range sensors. In another configuration, the sensors are located mounted on the interior of the cargo base and receive visual data through windows aligned with the outer skin of cargo base 20160.

Figure 2I:
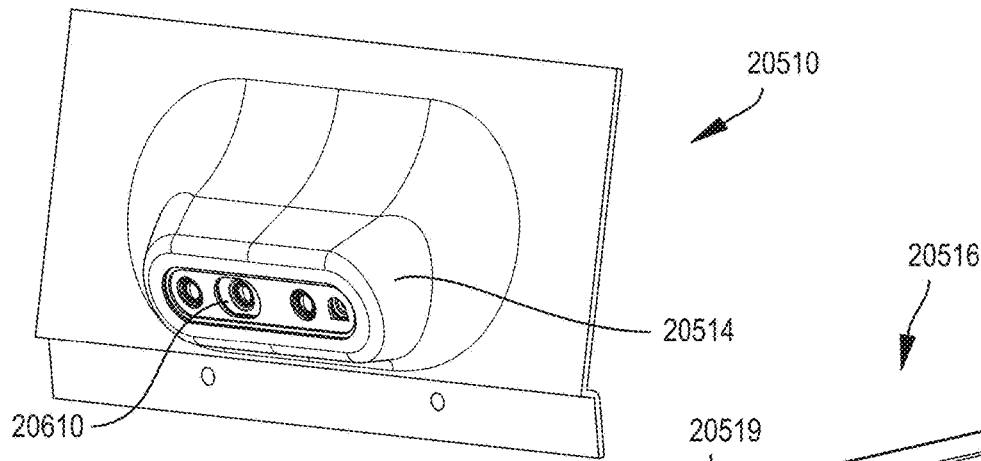
FIG. 2I-2L are isometric views of a short-range sensor.
Figure 2J:
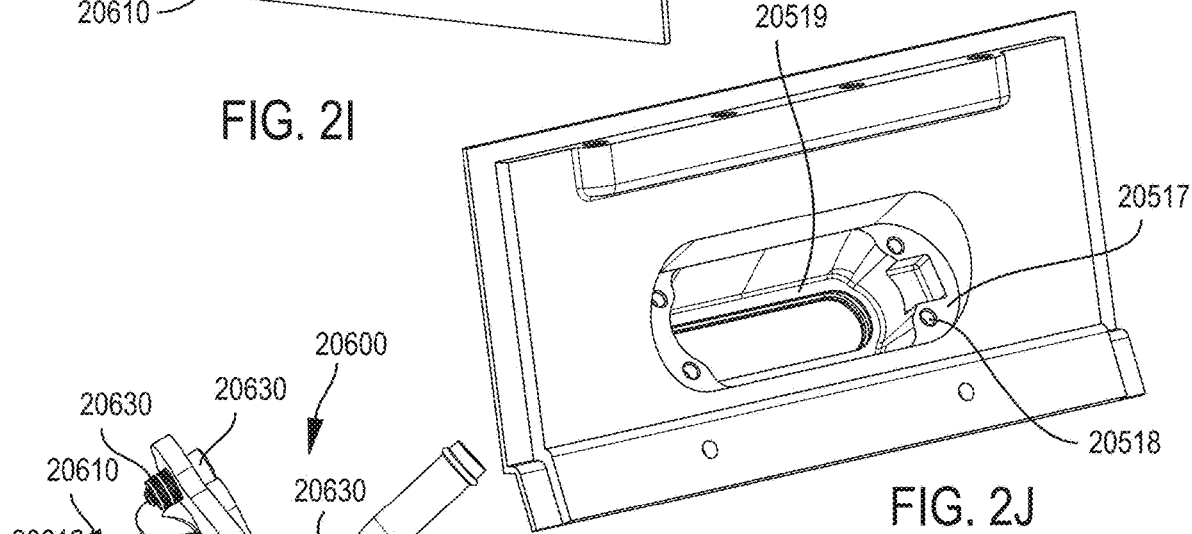

Referring now to FIGS. 2I and 2J, short-range sensors 20600 mount in skin element 20516 of cargo base 20160 and may include a liquid cooling system. Skin element 20516 includes formed protrusion 20514 that holds short-range sensor assembly 20600 at the predetermined location and vertical angle relative to the top of cargo-base 20160 and at an angle relative to front of cargo base 20160. In some configurations, short-range sensor 20510 is angled downward with respect to cargo platform 20160 by 28°, short-range sensors 20520 and 20560 are angled downward 18° and forward 25°, short-range sensors 20530 and 20550 are angled downward 34° and rearward 20°, and short range sensor 20540 is angled downward with respect to cargo platform 20160 by 28°. Skin element 20516 includes a cavity 20517 for receiving camera assembly 20600. Skin element 20516 may also include a plurality of elements 20518 to receive mechanical fasteners including but not limited to rivets, screws and buttons. Alternatively, the camera assembly may be mounted with an adhesive or held in place with a clip that fastens to skin element 20516. Gasket 20519 can provide a seal against the front of camera 20610.

Figure 2K:
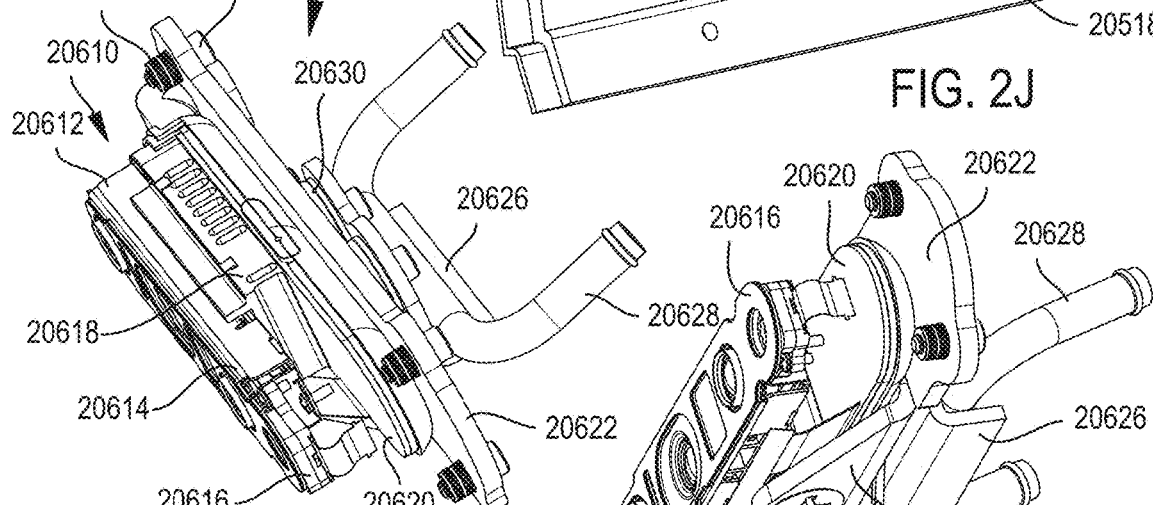
Figure 2L:
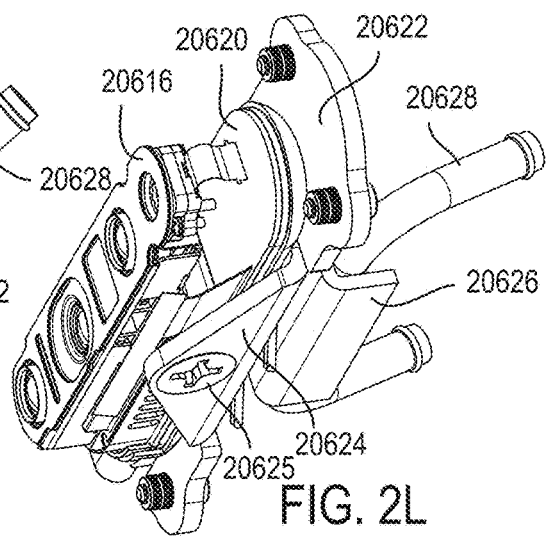

Referring now to FIGS. 2K and 2L, short-range sensor assembly 20600 comprises short-range sensor 20610 mounted on bracket 20622 that is attached to water-cooled plate 20626. Outer case 20612, transparent cover 20614 and heat sink 20618 have been partially removed in FIGS. 2K and 2L to better visualize heat dissipating elements sensor block 20616 and electronic block 20620 of the short-range sensor 20610. Short-range sensor assembly 20600 may include one or more thermal-electric coolers (TEC) 20630 between bracket 20622 and liquid-cooled plate 20626. Liquid-cooled plate 20626 is cooled by coolant pumped through 20628 that is thermally connected to plate 20626. The TECs are electrically powered elements with a first and a second side. An electrically powered TEC cools the first side, while rejecting the thermal energy removed from the first side plus the electrical power at the second side. In short-range sensor assembly 20600, TECs 20630 cool bracket 20622 and transfer the thermal cooling energy plus the electrical energy to water cooled plate 20626. Alternatively, TEC 20630 can be used to actively control the temperature of camera 20600 by varying the magnitude and polarity of the voltage supplied to TEC 20630.

Operating TEC 20630 in a cooling mode allows short-range sensor 20610 to operate at temperatures below the coolant temperature. Bracket 20622 is thermally connected to short-range sensor 20610 in two places to maximize cooling of sensor block 20616 and electronic block 20620. Bracket 20622 includes tab 20624 that is thermally attached to heat sink 20618 via screw 20625. Heat sink 20618 is thermally connected to sensor block 20616. The bracket is thus thermally connected to sensor block 20616 via heat sink 20618, screw 20625 and tab 20624. Bracket 20622 is also mechanically attached to electronic block 20620 to provide direct cooling of electronics block 20620. Bracket 20622 may include a plurality of mechanical attachments including but not limited to screws and rivets that engage with elements 20518 in FIG. 2J. Short-range sensor 20610 may incorporate one or more sensors including but not limited to a camera, a stereo camera, an ultrasonic sensor, a short-range radar, and an infrared projector and CMOS sensor. One example short-range sensor is similar to the real-sense depth camera D435 by Intel of Santa Clara, California, that comprises an IR projector, two imager chips and a RGB camera.

Figure 2M:
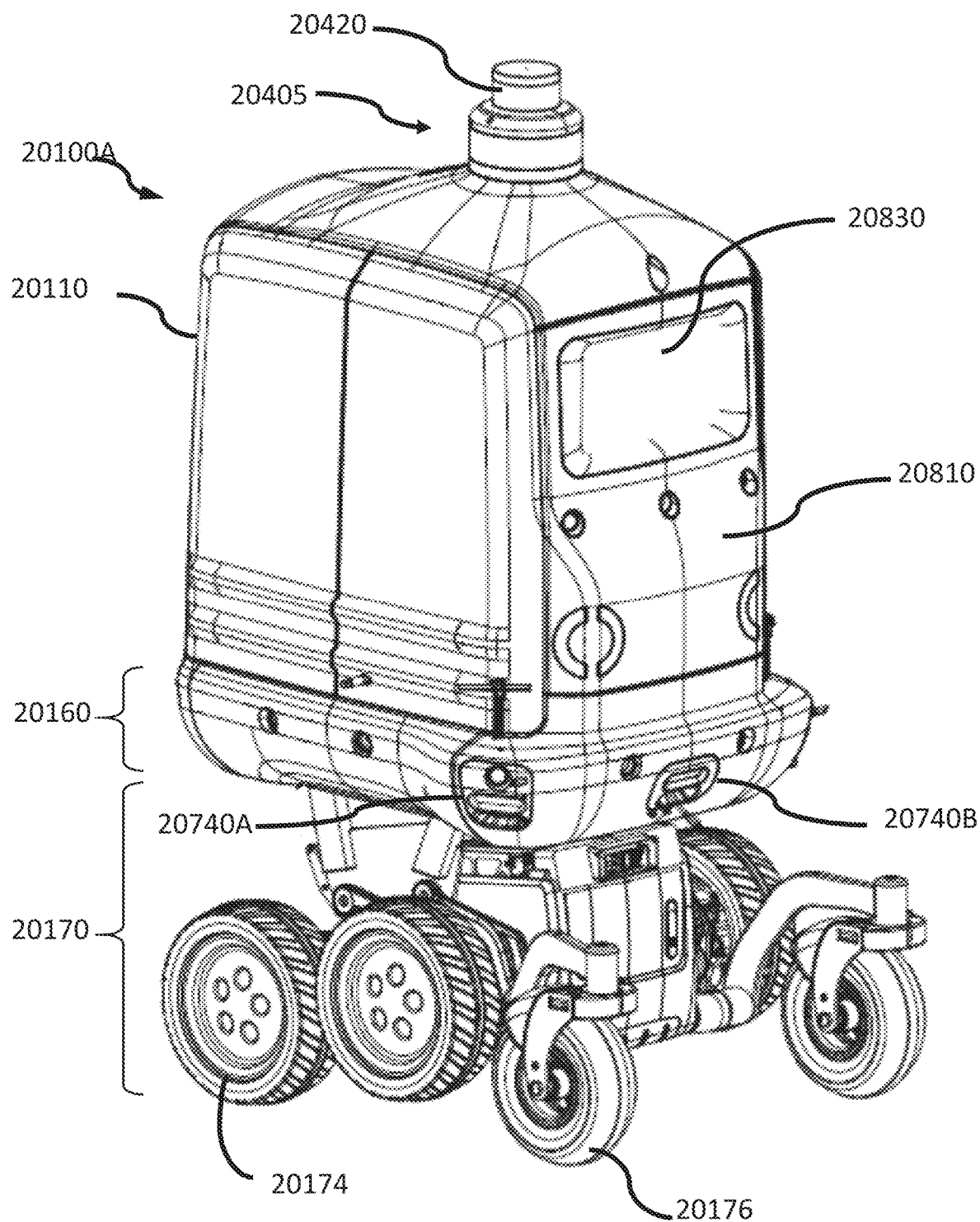
FIG. 2M-2N are isometric views of the autonomous vehicle of the present teachings.
Figure 2N:
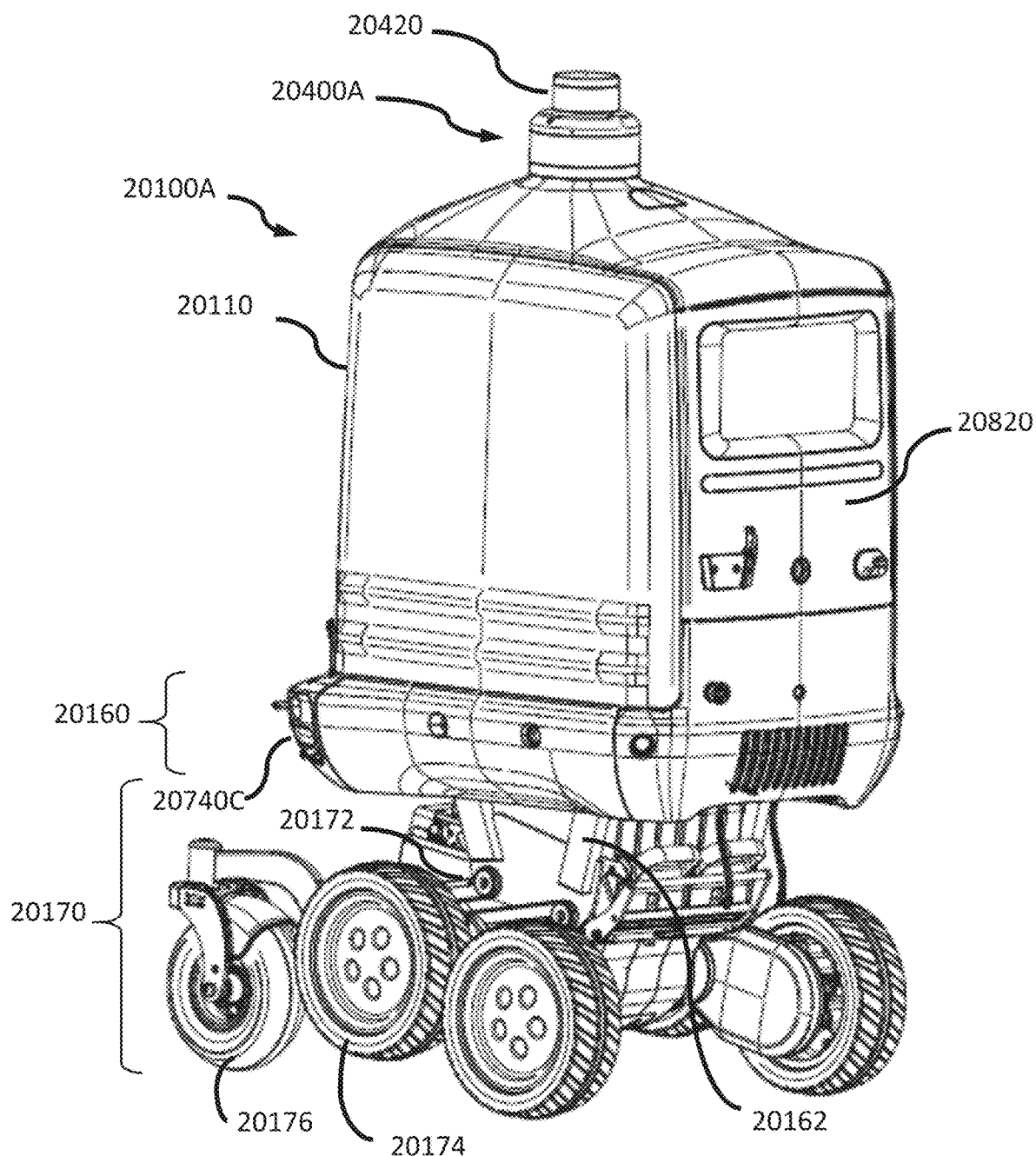
Figure 2O:
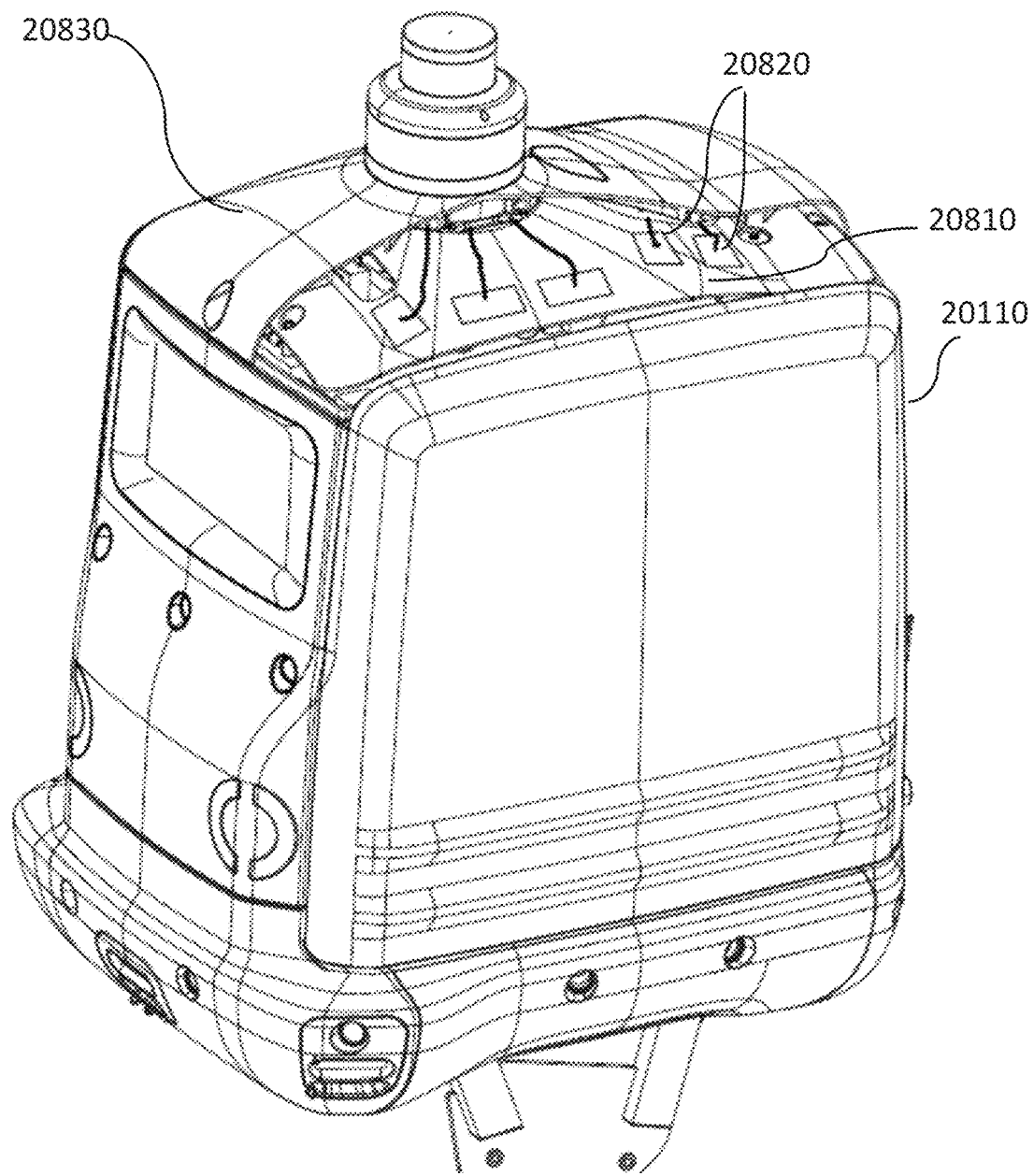
FIG. 2O-2P are isometric views of the autonomous vehicle of the present teachings with skin panels removed.

Referring now to FIGS. 2M-2O, another embodiment of AV 20100 is shown. AV 20100A includes a cargo container 20110 mounted on a cargo platform 20160 and power base 20170. AV 20100A includes a plurality of long-range and short range sensors. The primary long-range sensors are mounted in sensor pylon 20400A on top of the cargo container 20110. The sensor pylon may include a LIDAR 20420 and a plurality of long-range cameras (not shown) aimed in divergent directions to provide a wide field of view. In some configurations, LIDAR 20420 can be used as described elsewhere herein, for example, but not limited to, providing point cloud data that can enable population of an occupancy grid, and to provide information to identify landmarks, locate the AV 20100 within its environment and/or determine the navigable space. In some configurations, a long-range camera from Leopard Imaging Inc. can be used to identify landmarks, locate the AV 20100 within its environment and/or determine the navigable space.

Continuing to refer to FIGS. 2M-20, the short range sensors are primarily mounted in the cargo platform 20160 and provide information about obstacles near AV 20100A. In some embodiments, the short-range sensors supply data on obstacles and surfaces within 4 m of AV 20100A. In some configurations, the short-range sensors provide information up to 10 m from the AV 20100A. A plurality of cameras that are at least partially forward facing, are mounted in the cargo platform 20160. In some configurations, the plurality of cameras can include three cameras.

Referring now to FIG. 2O, the top cover 20830 has been partially cut-away to reveal a sub-roof 20810. The sub-roof 20810 provides a single piece upon which a plurality of antennas 20820 can be mounted. In an example, ten antennas 20820 are mounted to sub-roof 20810. Further, for example, four cellular communications channels each have two antennas, and there are two WiFi antennas. The antennas are wired as a main antenna and an auxiliary antenna for cellular transmissions and reception. The auxiliary antenna may improve cellular functionality by several methods including but not limited to reducing interference, and achieving 4G LTE connectivity. The sub-roof 20810 as well as the top cover 20830 are a non-metallic. The sub-roof 20810 is a plastic surface within 10 mm-20 mm of the top cover 20830, that is not structural and allows the antennas to be connected to the processors before the top cover 20830 is attached. Antenna connects are often high impedance and sensitive to dirt, grease and mishandling. Mounting and connecting the antennas to the sub-roof 20810 allows the top cover to be installed and removed without touching the antenna connections. Maintenance and repair operations may include removing the top cover without removing the sub-roof or disconnecting the antennas. Assembly of the antennas apart from installing the top-cover 20830 facilitates testing/repair. The top cover 20830 is weatherproof and prevents water and grit from entering the cargo container 20110. Mounting the antennas on the sub-roof minimizes the number of openings on the top-cover 20830.

Figure 2P:
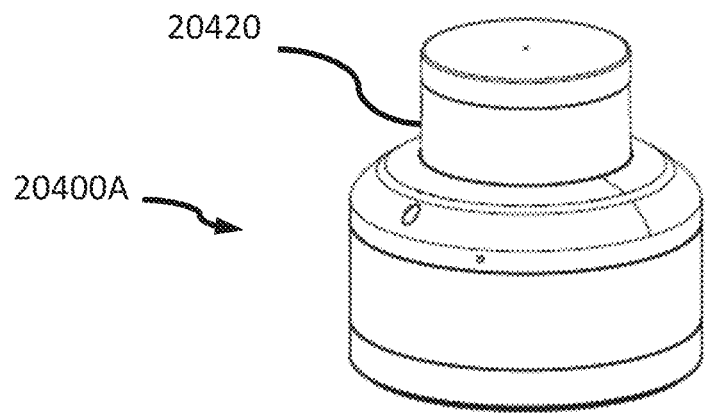
Figure 2Q:
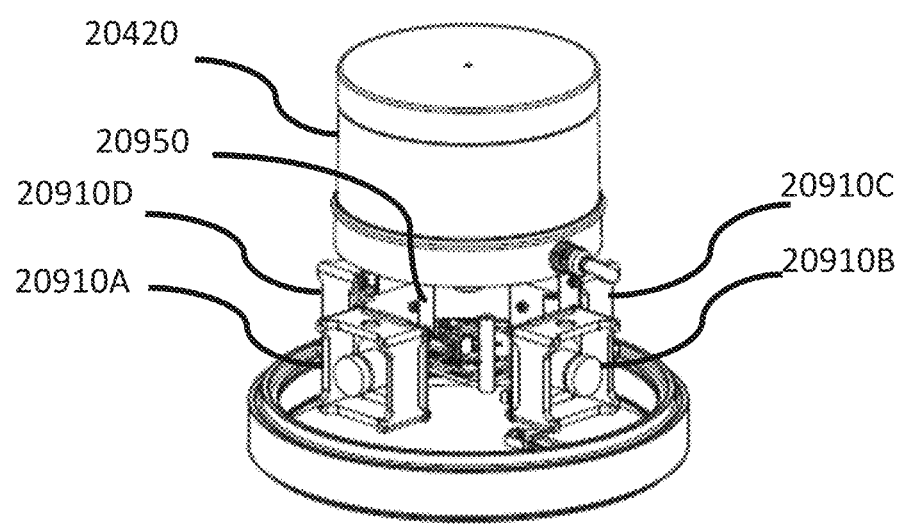
FIG. 2Q is an isometric view of the autonomous vehicle of the present teachings with part of the top panel removed.
Figure 2R:
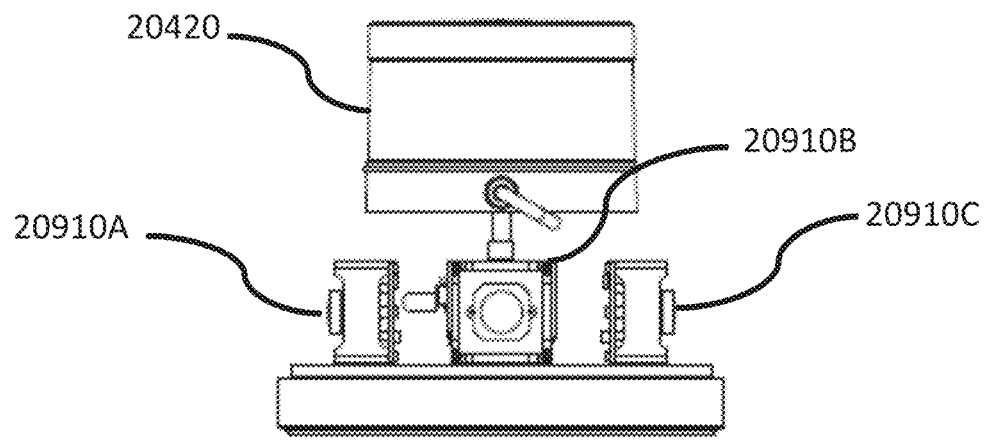
FIG. 2R-2V are views of long range sensors on the autonomous vehicle of the present teachings.

Referring now to FIGS. 2P, 2Q, and 2R, another example of the long-range sensor assembly (LRSA) 20400A that is mounted on top of the cargo container (not shown) is shown. The LRSA may include a LIDAR and a plurality of long-range cameras that are mounted at different positions on the LRSA structure 20950 to provide a panoramic view of the environment of AV 20100A. The LIDAR 20420 is mounted top most on the LRSA structure 20950 to provide an uninterrupted view. The LIDAR can include a VELODYNE LIDAR. A plurality of long-range cameras 20910A-20910D are mounted on the LRSA structure 20950 on the next level below the LIDAR 20420. In an example, four cameras are mounted, one every 90° around the structure, to provide four views the environment around AV 20100. In some examples, the four views will overlap. In some examples, each camera is either aligned with the direction of motion or orthogonal to the direction of movement. In an example, one camera lines up with each of the principle faces of AV 20100A— front, back, left side, and right side. In an example, the long-range cameras are model LI-AR01 44-MIPI-M12 made Leopard Imaging Inc. The long-range cameras may have a MIPI CSI-2 interface to provide high-speed data transfer to a processor. The long-range cameras may have a horizontal field of view between 50° and 70° and a vertical field of view between 30° and 40°.

Figure 2S:
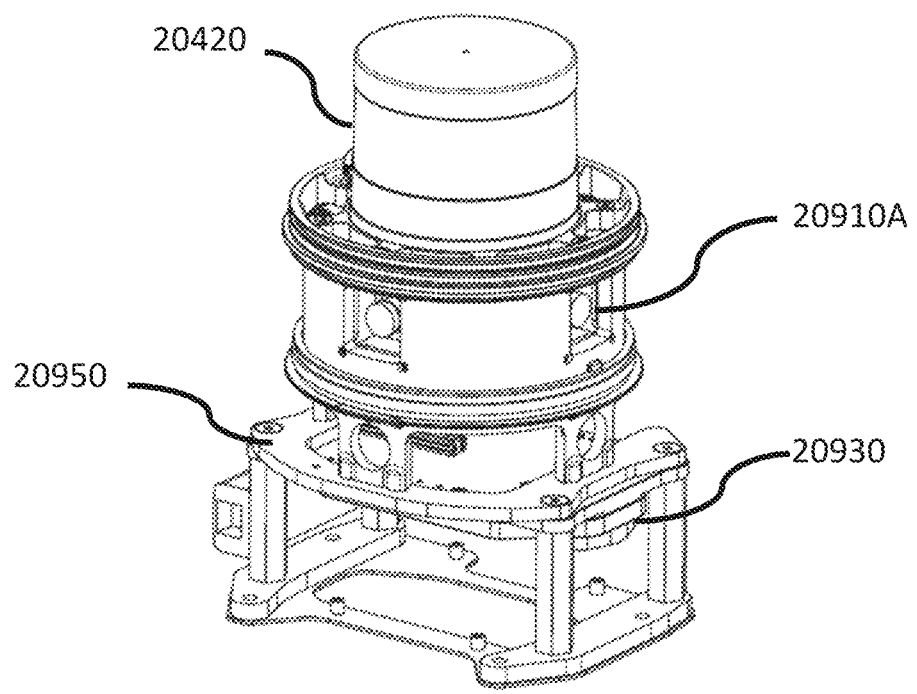
Figure 2T:
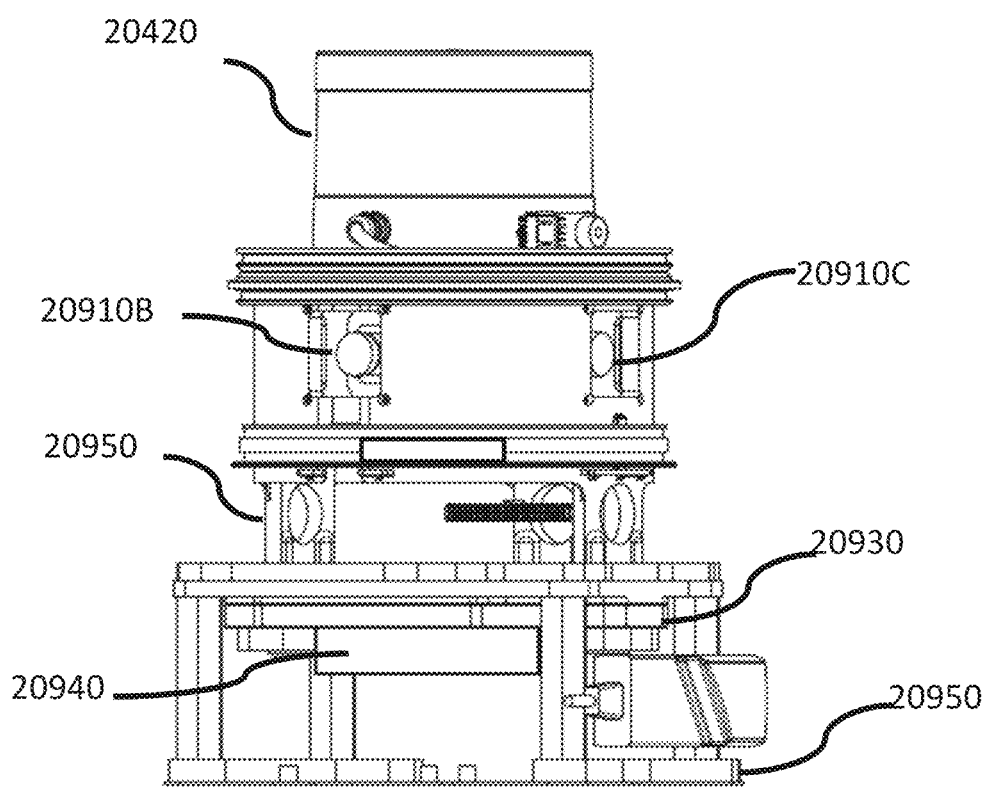
Figure 2U:
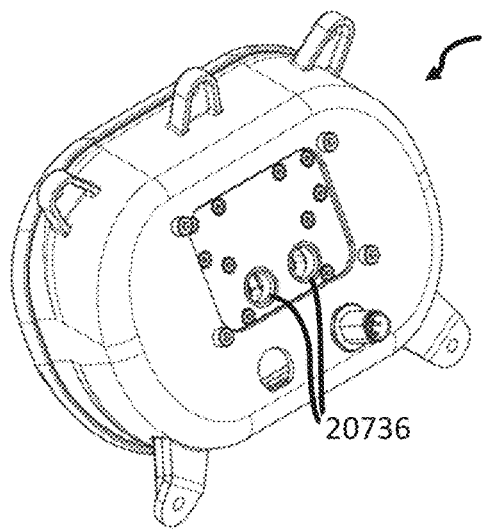
Figure 2V:
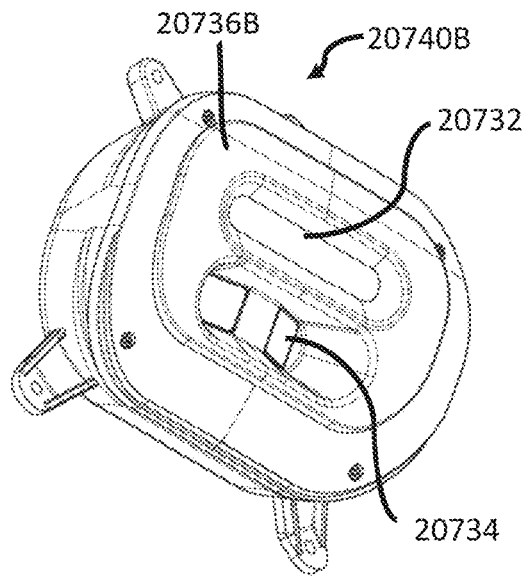

Referring now to FIGS. 2S and 2T, a long-range processor 20940 is located on the LRSA structure 20950 below the long-range cameras 20910A-20910D and the LIDAR 20420. The long-range processor 20940 receives data from the long-range cameras and the LIDAR. The long-range processor is in communication with one or more processors elsewhere in AV 20100A. The long-range processor 20940 provides data derived from the long-range cameras and the LIDAR to one or more processors located elsewhere on AV 20100A, described elsewhere herein. The long-range processor 20940 may be liquid cooled by cooler 20930. The cooler 20930 may be mounted to the structure under the long-range cameras and LIDAR. The cooler 20930 may provide a mounting location for the long-range processor 20940. The cooler 20930 is described in U.S. patent application Ser. No. 16/883,668, filed on May 26, 2020, entitled Apparatus for Electronic Cooling on an Autonomous Device, incorporated herein by reference in full. The cooler is provided with a liquid supply conduit and a return conduit that provide cooling liquid to the cooler 20930.

Referring again to FIGS. 2M and 2N, the short-range camera assemblies 20740A-C are mounted on the front of the container platform 20160 and angled to collect information about the travel surface and the obstacles, steps, curbs and other substantially discontinuous surface features (SDSFs). The camera assemblies 20740A-C include one or more LED lights to illuminate the travel surfaces, objects on the ground and SDSFs.

Referring now to FIGS. 2U-2X, the camera assemblies 20740A-B include lights 20732 to illuminate the ground and objects to provide improved image data from the cameras 20732. Note that camera-assembly 20740A is a mirror of 20740C and descriptions of 20740A apply implicitly to 20740C. The camera 20732 may include a single vision camera, a stereo camera, and/or an infrared projector and CMOS sensor. One example of a camera is the Real-Sense Depth D435 camera by Intel of Santa Clara, CA., that comprises an IR projector, two imager chips with lenses and a RGB camera. The LED lights 20734 may be used at night or in low-light conditions or may be used at all times to improve image data. One theory of operation is that the lights create contrast by illuminating projecting surfaces and creating shadows in depressions. The LED lights may be white LEDs in an example. In an example, the LED lights 20734 are Xlamp XHP50s from Cree Inc. In another example the LED lights may emit in the infrared to provide illumination for the camera 20372 without distracting or bothering nearby pedestrians or drivers.

Continuing to refer to FIGS. 2U-2X, the placement and angle of the lights 20374 and the shape of the covers 20736A, 20736B prevent the camera 20732 from seeing the lights 20374. The angle and placement of the lights 20374 and the covers 20736A, 20736B prevent the lights from interfering with drivers or bothering pedestrians. It is advantageous that camera 20732 not be exposed to the light 20734 to prevent the sensor in the camera 20732 being blinded by the light 20734 and therefore being prevented from detecting the lower light signals from the ground and objects in front of and to the side of the AV 20100A. The camera 20732 and/or the lights 20734 may be cooled with liquid that flows into and out of the camera assemblies through ports 20736.

Figure 2W:
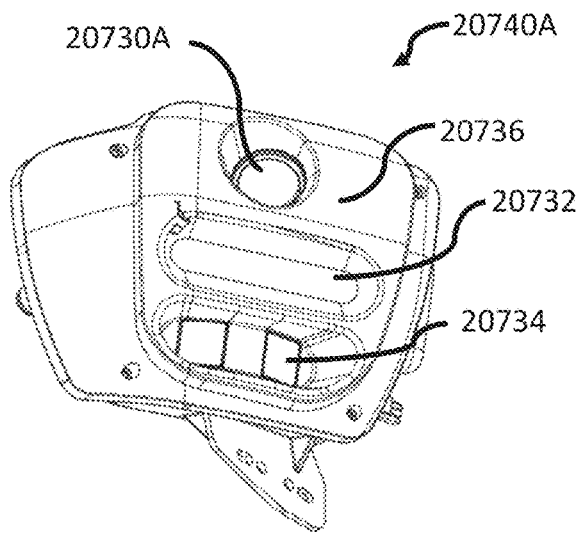
FIG. 2W-2Z are views of an ultrasonic sensor.
Figure 2X:
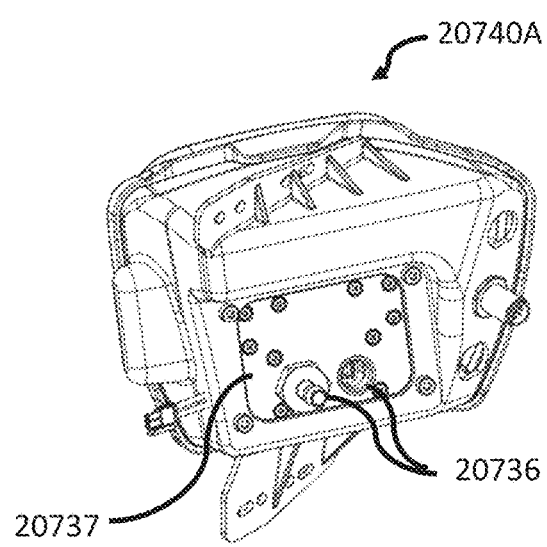

Referring now to FIGS. 2W and 2X, the short-range camera assembly 20740A includes an ultrasonic or sonar short-range sensor 20730A. The second short-range camera assembly 20740C also includes a ultrasonic short-range sensor 20730B (FIG. 2N).

Figure 2Y:
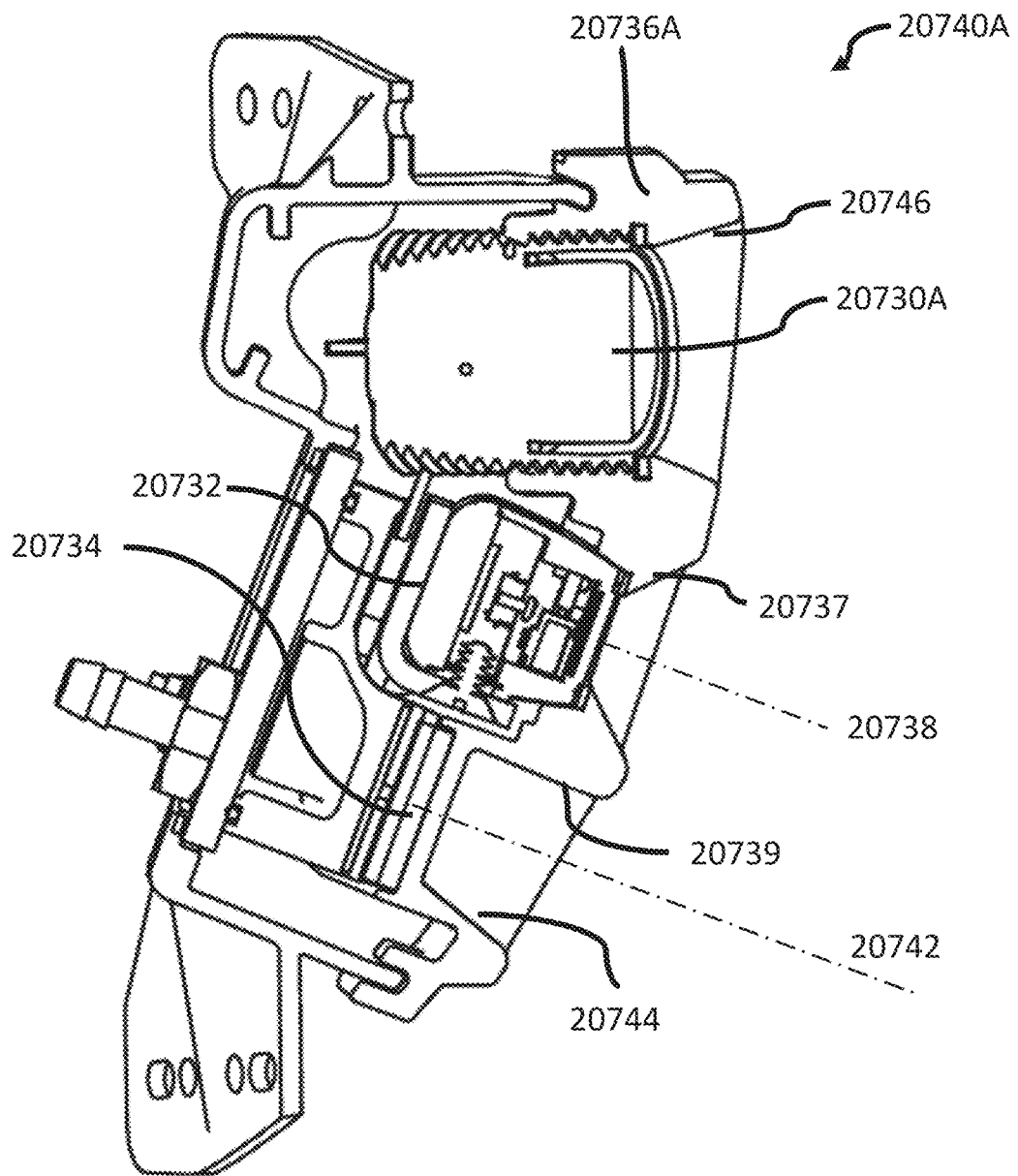

Referring now to FIG. 2Y, the ultrasonic sensor 20730A is mounted above the camera 20732. In an example, the center line of the ultrasonic sensor 20730A is parallel with the base of the cargo container 20110, which often means sensor 20730A is horizontal. Sensor 20730A is angled 45° from facing forward. The cover 20376A provides a horn 20746 to direct the ultrasonic waves emerging from and received by the ultrasonic sensor 20730A.

Continuing to referring FIG. 2Y, a cross-section of the camera 20732, the light 20734 within the camera assembly 20740A illustrates the angles and openings in the cover 20736. The cameras in the short-range camera assemblies are angled downward to better image the ground in front of and to the side of the AV. The center camera assembly 20740B is oriented straight ahead in the horizontal plane. The corner camera assemblies 20740A, 20740C are angled 25° to their respective sides with respect to straight ahead in the horizontal plane. The camera 20732 is angled 20° downward with respect to the top of the cargo platform in the vertical plane. As the AV generally holds the cargo platform horizontal, the camera therefore angled 20° below horizontal. Similarly, the center camera assembly 20740B (FIG. 2M) is angled below horizontal by 28°. In an example, the cameras in the camera assemblies may be angled downward by 25° to 35°. In another example, the cameras in the camera assemblies may be angled downward by 15° to 45°. The LED lights 20734 are similarly angled downward to illuminate the ground that is imaged by the camera 20732 and to minimize distraction to pedestrians. In one example, the LED light centerline 20742 is parallel within 5° of the camera centerline 20738. The cover 20736A both protects the camera 20732 and pedestrians from the bright light of LEDs 20734 in the camera assemblies 20740A-C. The cover that isolates the light emitted by LED also provides a flared opening 20737 to maximize the field of view of the camera 20732. The lights are recessed at least 4 mm from the opening of the cover. The light opening is defined by upper wall 20739 and lower wall 20744. The upper wall 20739 is approximately parallel (±5°) with the center line 2074. The lower wall 20744 is flared approximately 18° from the center line 20742 to maximize illumination of the ground and objects near the ground.

Figure 2Z:
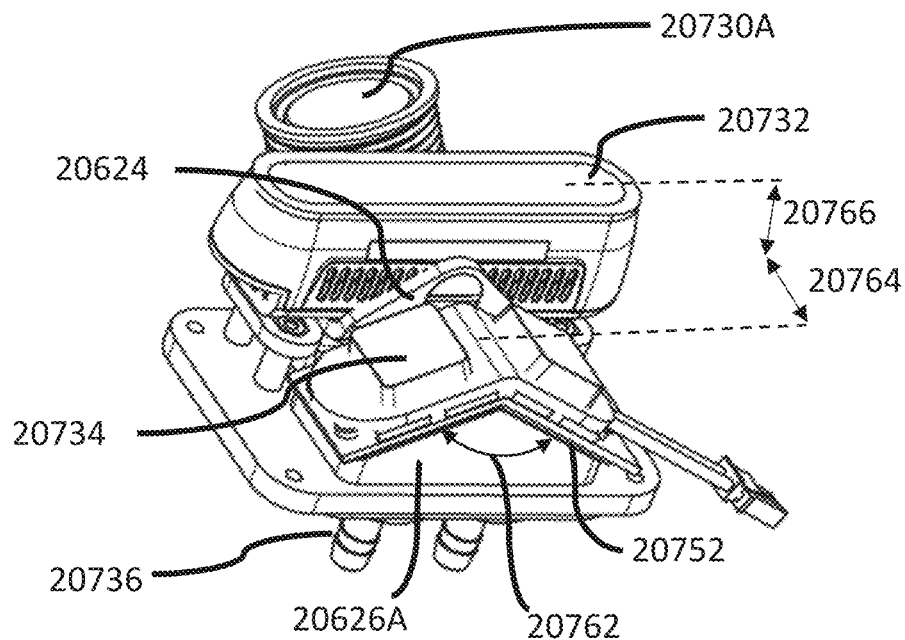
Figure 2A:
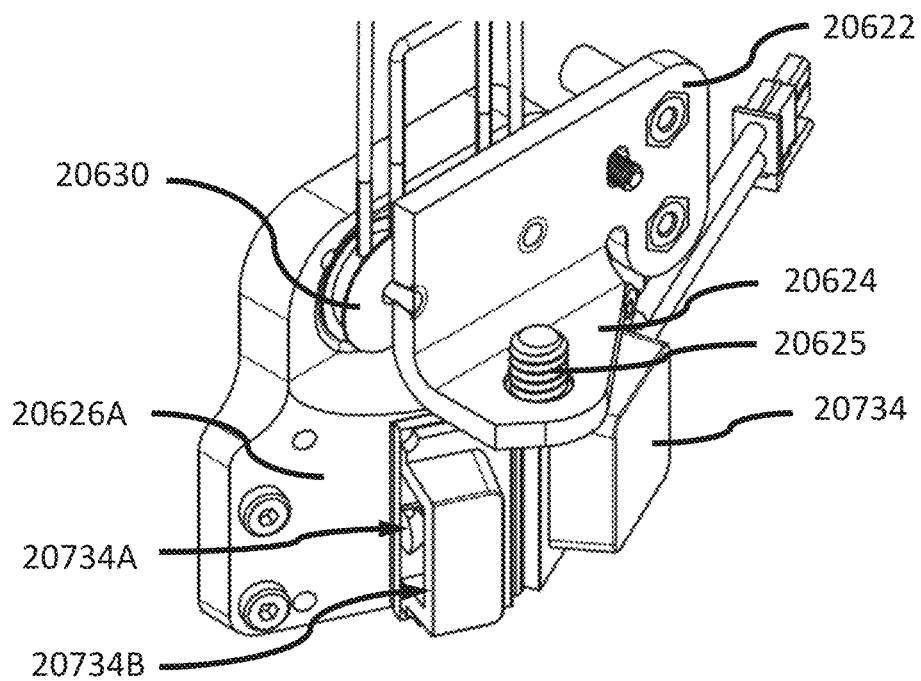
Figure 2B:
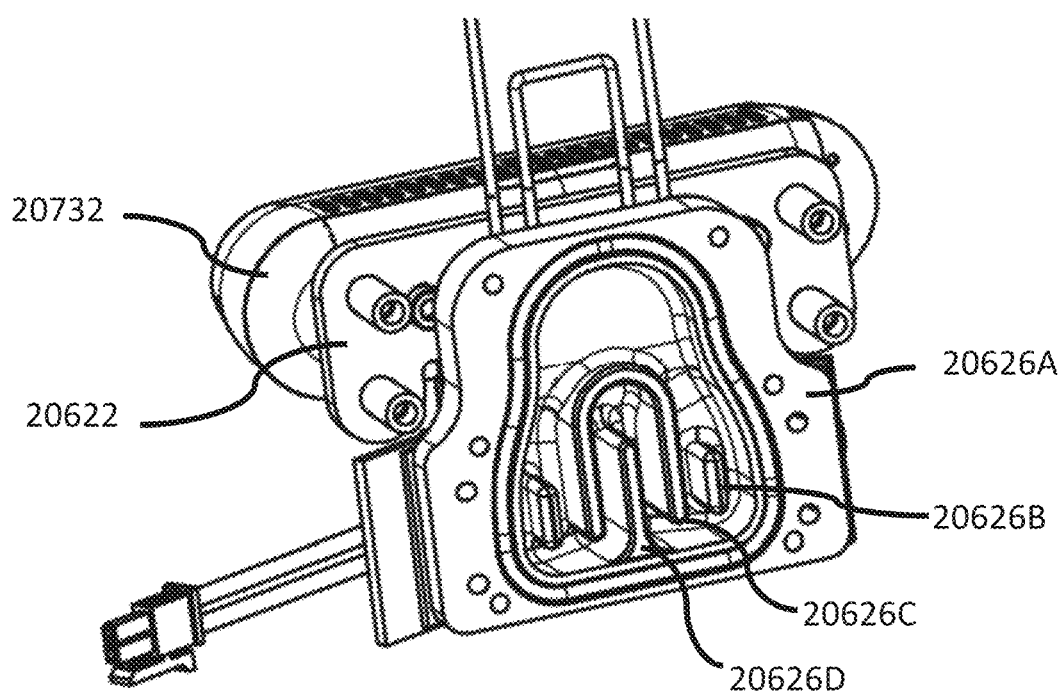

Referring now to FIG. 2Z-2AA, in one configuration, the light 20734 includes two LEDs 20734A, each under a square lens 20734B, to produce a beam of light. The LED/lenses are angled and located with respect to the camera 20372 to illuminate the camera's field of view with minimal spillover of light outside the FOV of the camera 20732. The two LED/lenses are mounted together on a single PCB 20752 with a defined angle 20762 between the two lights. In another configuration, the two LED/lenses are mounted individually on the heat sink 20626A on separate PCBs at an angle with respect to each other. In an example, the lights are Xlamp XHP50s from Cree, Inc., and the lenses are 60° lenses HB-SQ-W from LEDil. The lights are angled approximately 50° with respect to each other so the angle 20762 between the front of the lenses is 130°. The lights are located approximately 18 mm (±5 mm) 20764 behind the front of the camera 20732 and approximately 30 mm 20766 below the center line of the camera 20732.

Referring now to FIGS. 2AA-2BB, the camera 20732 is cooled by a thermo-electric cooler (TEC) 20630, which is cooled along with the light 20734 by liquid coolant that flows through the cold block 20626A. The camera is attached to bracket 20622 via screw 20625 that threads into a sensor block portion of the camera, while the back of the bracket 20622 is bolted to the electronics block of the camera. The bracket 20622 is cooled by two TECs in order to maintain the performance of the IR imaging chips (CMOS chips) in the camera 20732. The TECs reject heat from the bracket 20622 and the electrical power they draw to the cold block 20626A.

Referring now to FIG. 2BB, the coolant is directed through a U-shaped path created by a central fin 20626D. The coolant flows directly behind the LED/lenses/PCBs of the light 20734. Fins 20626B, 20626C improve heat transfer from the light 20734 to the coolant. Coolant flows upward to pass by the hot side of the TECs 20630. The fluid path is created by a plate 20737 (FIG. 2X) attached to the back of the cold block 20626A.

Figure 3A:
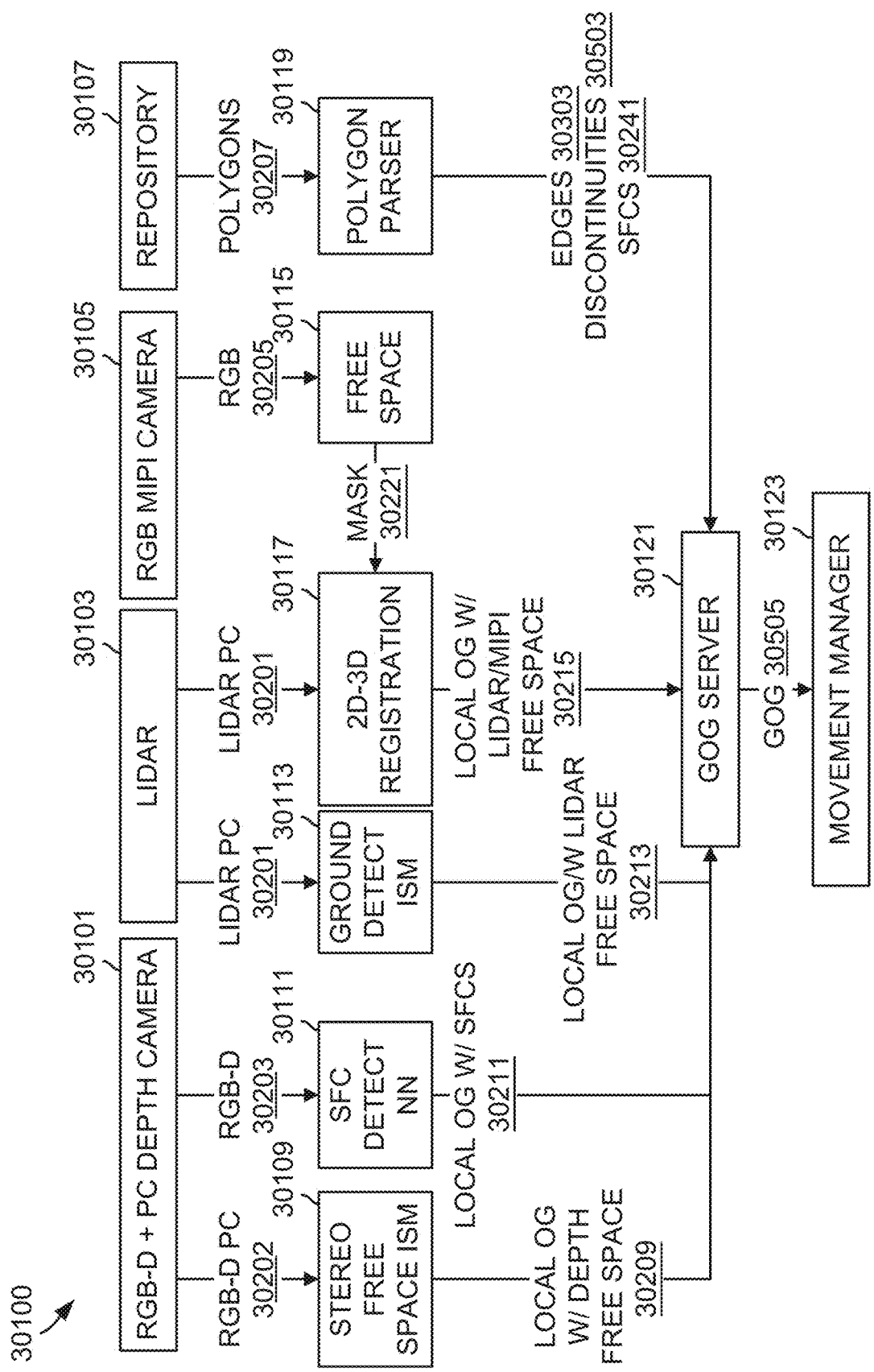
FIG. 3A is a schematic block diagram of the system of one configuration of the present teachings.

Referring now to FIG. 3A, sensor data and map data can be used to update an occupancy grid. The system and method of the present teachings can manage a global occupancy grid for a device that is navigating autonomously with respect to a grid map. The grid map can include routes or paths that the device can follow from a beginning point to a destination. The global occupancy grid can include free space indications that can indicate where it is safe for the device to navigate. The possible paths and the free space indications can be combined on the global occupancy grid to establish an optimum path upon which the device can travel to safely arrive at the destination.

Continuing to refer to FIG. 3A, as the device moves, the global occupancy grid that will be used to determine an unobstructed navigation route can be accessed based on the location of the device, and the global occupancy grid can be updated as the device moves. The updates can be based at least on the current values associated with the global occupancy grid at the location of the device, a static occupancy grid that can include historical information about the neighborhood where the device is navigating, and data being collected by sensors as the device travels. The sensors can be located on the device, as described herein, and they can be located elsewhere.

Continuing to still further refer to FIG. 3A, the global occupancy grid can include cells, and the cells can be associated with occupied probability values. Each cell of the global occupancy grid can be associated with information such as whether obstacles have been identified at the location of the cell, the characteristics and discontinuities of the traveling surface at and surrounding the location as determined from previously collected data and as determined by data collected as the device navigates, and the prior occupancy data associated with the location. Data captured as the device navigates can be stored in a local occupancy grid at whose center is the device. When updating the global occupancy grid, static previously-collected data can be combined with the local occupancy grid data and global occupancy data determined in a previous update to create a new global occupancy grid with the space occupied by the device marked as unoccupied. In some configurations, a Bayesian method can be used to update the global occupancy grid. The method can include, for each cell in the local occupancy grid, calculating the position of the cell on the global occupancy grid, accessing the value at that position from the current global occupancy grid, accessing the value at the position from the static occupancy grid, accessing the value at the position from the local occupancy grid, and computing a new value at the position on the global occupancy grid as a function of the current value from the global occupancy grid, the value from the static occupancy grid, and the value from the local occupancy grid. In some configurations, the relationship used to compute the new value can include the sum of the static value and the local occupancy grid value minus the current value. In some configurations, the new value can be bounded by pre-selected values based on computational limitations, for example.

Continuing to refer to FIG. 3A, system 30100 of the present teachings can manage a global occupancy grid. The global occupancy grid can begin with initial data, and can be updated as the device moves. Creating the initial global occupancy grid can include a first process, and updating the global occupancy grid can include a second process. System 30100 can include, but is not limited to including, global occupancy server 30121 that can receive information from various sources and can update global occupancy grid 30505 based at least on the information. The information can be supplied by, for example, but not limited to, sensors located upon the device and/or elsewhere, static information, and navigation information. In some configurations, sensors can include cameras and radar that can detect surface characteristics and obstacles, for example. The sensors can be advantageously located on the device, for example, to provide enough coverage of the surroundings to enable safe travel by the device. In some configurations, LIDAR 30103 can provide LIDAR point cloud (PC) data 30201 that can enable populating a local occupancy grid with LIDAR free space information 30213. In some configurations, conventional ground detect inverse sensor model (ISM) 30113 can process LIDAR PC data 30201 to produce LIDAR free space information 30213.

Continuing to refer to FIG. 3A, in some configurations, RGB-D cameras 30101 can provide RGB-D PC data 30202 and RGB camera data 30203. RGB-D PC data 30202 can populate a local occupancy grid with depth free space information 30209, and RGB-D camera data 30203 can populate a local occupancy grid with surface data 30211. In some configurations, RGB-D PC data 30202 can be processed by, for example, but not limited to, conventional stereo free space ISM 30109, and RGB-D camera data 30203 can be fed to, for example, but not limited to, conventional surface detect neural network 30111. In some configurations, RGB MIPI cameras 30105 can provide RGB data 30205 to produce, in combination with LIDAR PC data 30201, a local occupancy grid with LIDAR/MIPI free space information 30215. In some configurations, RGB data 30205 can be fed to conventional free space neural network 30115, the output of which can be subjected to pre-selected mask 30221 that can identify which parts of RGB data 30205 are most important for accuracy, before being fed, along with LIDAR PC data 30201, to conventional 2D-3D registration 30117. 2D-3D registration 30117 can project the image from RGB data 30205 onto LIDAR PC data 30201. In some configurations, 2D-3D registration 30117 is not needed. Any combination of sensors and methods for processing the sensor data can be used to gather data to update the global occupancy grid. Any number of free space estimation procedures can be used and combined to enable determination and verification of occupied probabilities in the global occupancy grid.

Continuing to refer to FIG. 3A, in some configurations, historical data can be provided by, for example, repository 30107 of previously collected and processed data having information associated with the navigation area. In some configurations, repository 30107 can include, for example, but not limited to, route information such as, for example, polygons 30207. In some configurations, these data can be fed to conventional polygon parser 30119 which can provide edges 30303, discontinuities 30503, and surfaces 30241, to global occupancy grid server 30121. Global occupancy grid server 30121 can fuse the local occupancy grid data collected by the sensors with the processed repository data to determine global occupancy grid 30505. Grid map 30601 (FIG. 3D) can be created from global occupancy data.

Figure 3B:
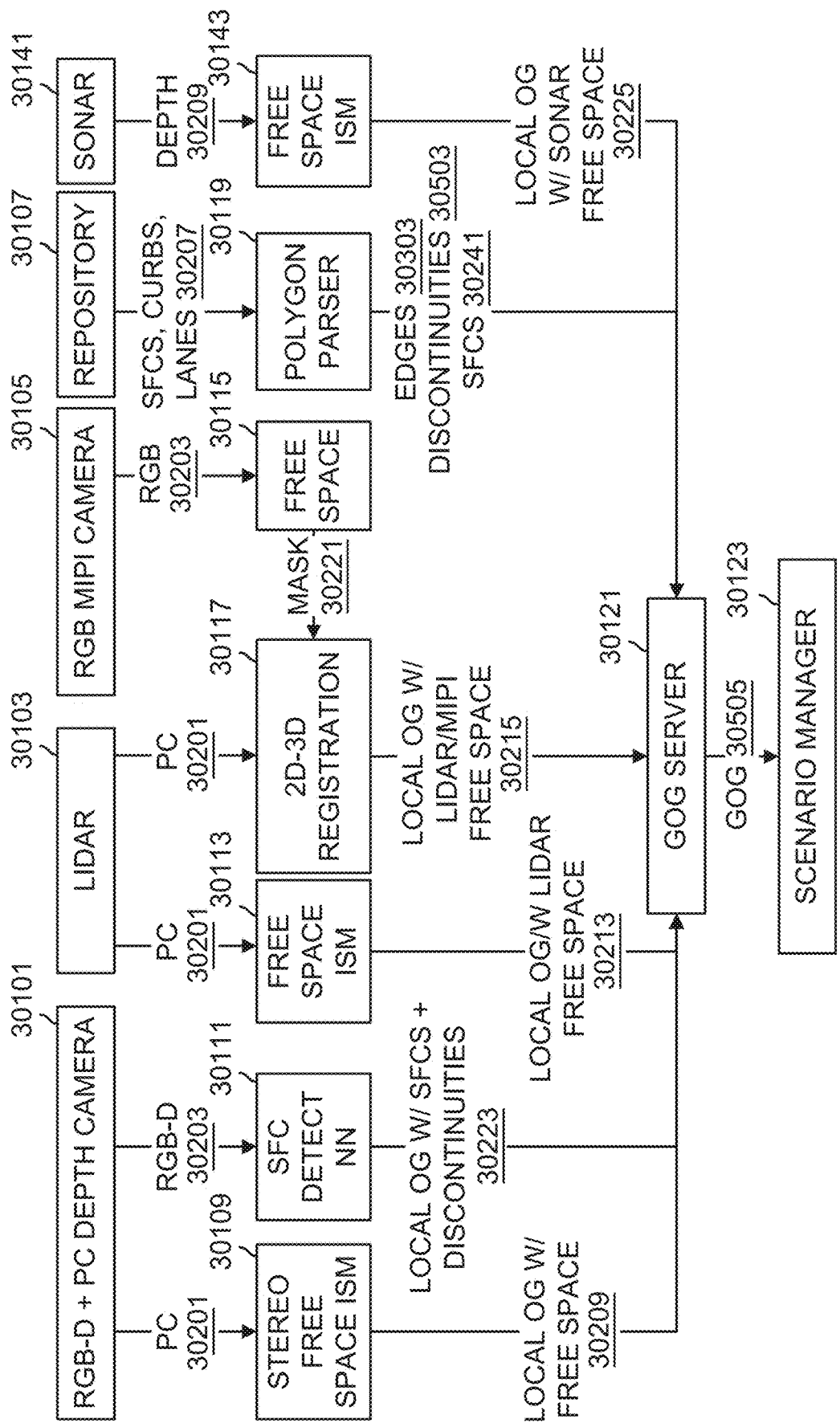
FIG. 3B is a schematic block diagram of the system of another configuration of the present teachings.
Figure 3C:
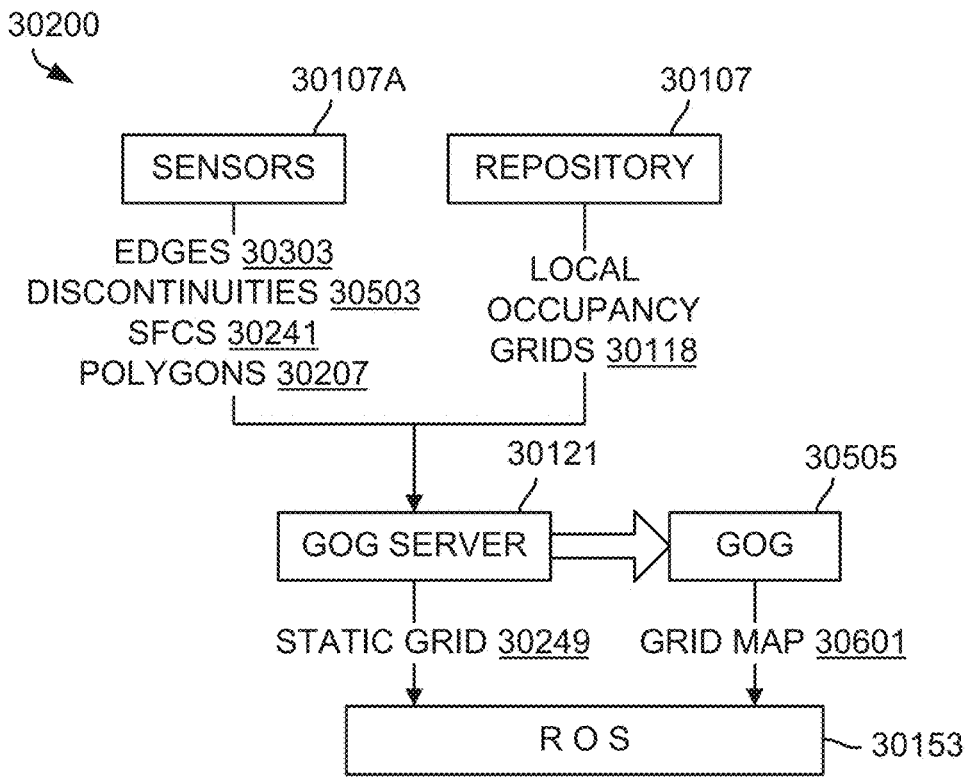
FIG. 3C is a schematic block diagram of the system of the present teachings that can initially create the global occupancy grid.
Figure 3D:
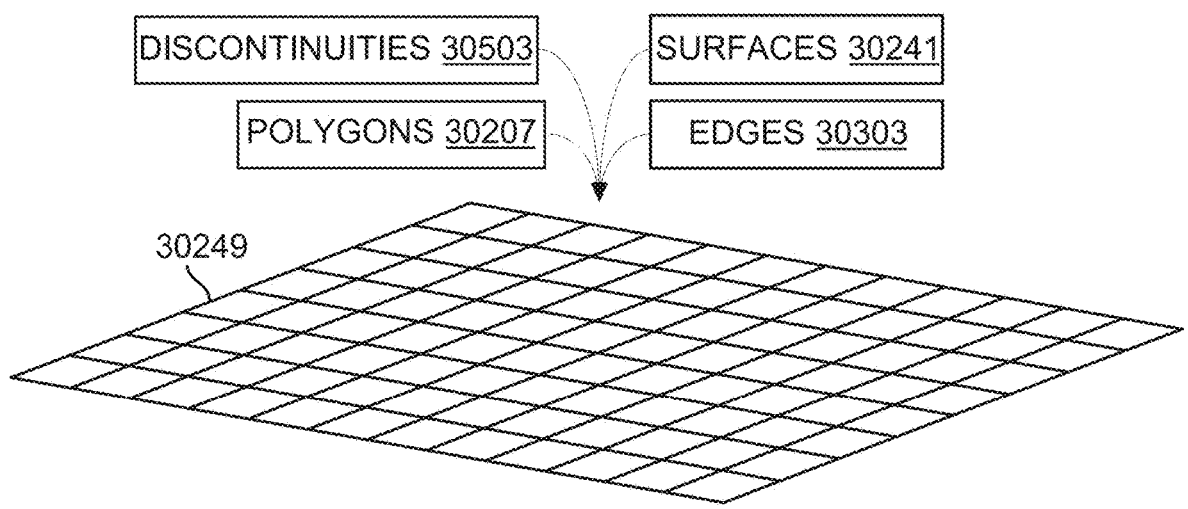
FIG. 3D is a pictorial representation of the static grid of the present teachings.
Figure 3E:
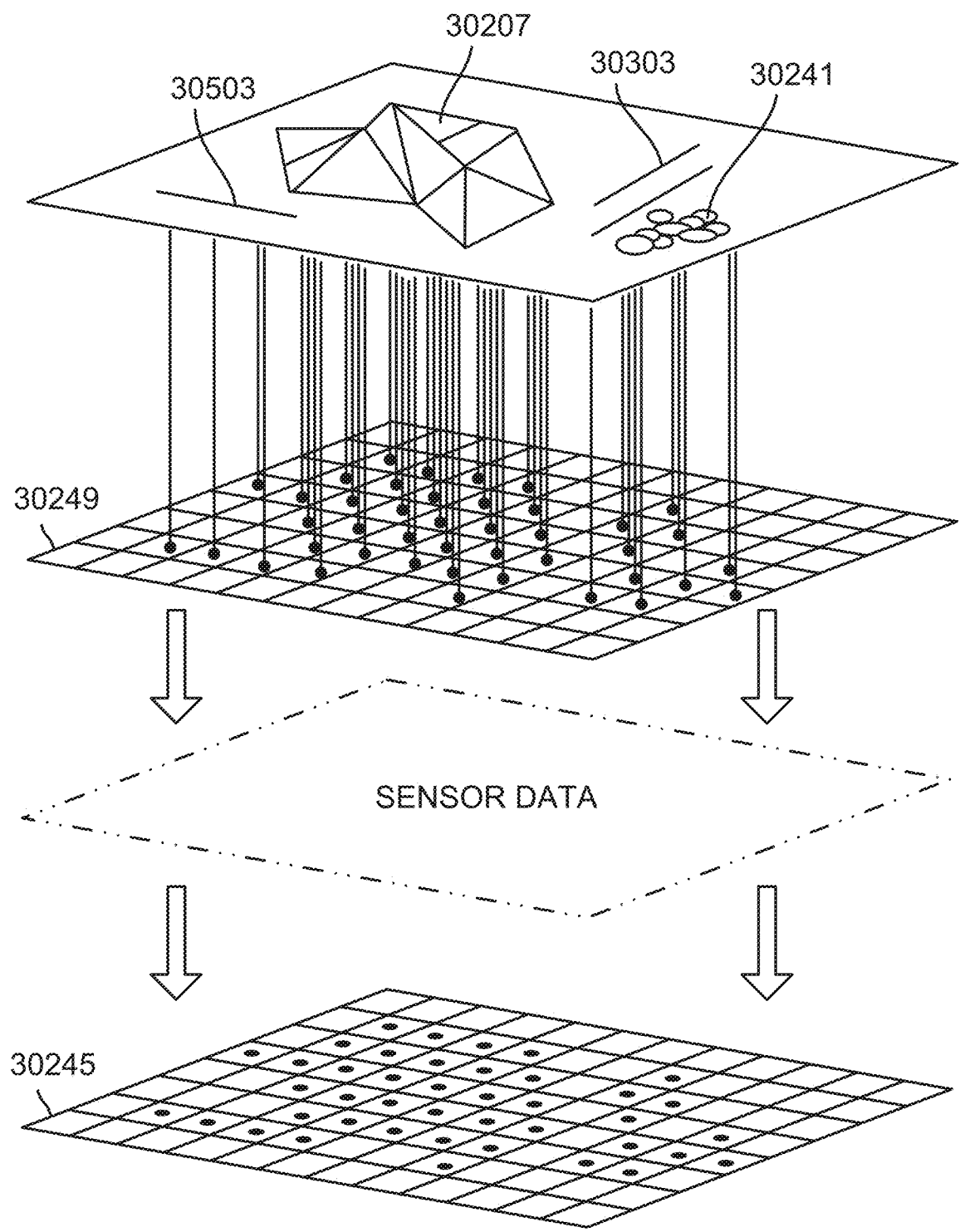
FIGS. 3E and 3F are pictorial representations of the creation of the occupancy grid of the present teachings.
Figure 3F:
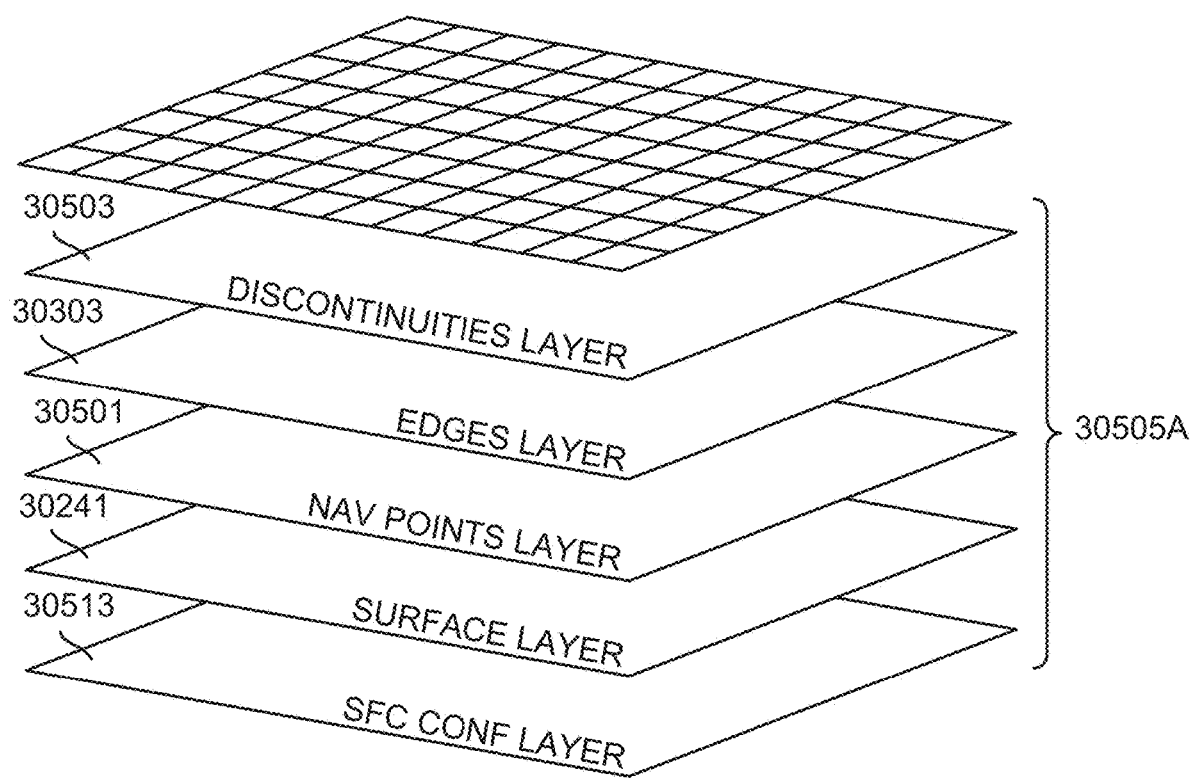

Referring now to FIG. 3B, in some configurations, sensors can include sonar 30141 that can provide local occupancy grid with sonar free space 30225 to global occupancy grid server 30121. Depth data 30209 can be processed by conventional free space ISM 30143. Local occupancy grid with sonar free space 30225 can be fused with local occupancy grid with surfaces and discontinuities 30223, local occupancy grid with LIDAR free space 30213, local occupancy grid with LIDAR/MIPI free space 30215, local occupancy grid with stereo free space 30209, and edges 30303 (FIG. 3F), discontinuities 30503 (FIG. 3F), navigation points 30501 (FIG. 3F), surface confidences 30513 (FIG. 3F), and surfaces 30241 (FIG. 3F) to form global occupancy grid 30505.

Referring now to FIGS. 3C-3F, to initialize the global occupancy grid, global occupancy grid initialization 30200 can include creating, by global occupancy grid server 30121, global occupancy grid 30505 and static grid 30249. Global occupancy grid 30505 can be created by fusing data from local occupancy grids 30118 with edges 30303, discontinuities 30503, and surfaces 30241 located in the region of interest. Static grid 30249 (FIG. 3D) can be created to include data such as, for example, but not limited to, surface data 30241, discontinuity data 30503, edges 30303, and polygons 30207. An initial global occupancy grid 30505 can be computed by adding the occupancy probability data from static grid 30249 (FIG. 3E) to occupancy data derived from collected data from sensors 30107A, and subtracting occupancy data from prior 30505A (FIG. 3F) of global occupancy grid 30505. Local occupancy grids 30118 can include, but are not limited to including, local occupancy grid data resulting from stereo free space estimation 30209 (FIG. 3B) through an ISM, local occupancy grid data including surface/discontinuity detection results 30223 (FIG. 3B), local occupancy grid data resulting from LIDAR free space estimation 30213 (FIG. 3B) through an ISM, and local occupancy grid data resulting from LIDAR/MIPI free space estimation 30215 (FIG. 3B) following in some configurations, 2D-3D registration 30117 (FIG. 3B). In some configurations, local occupancy grids 30118 can include local occupancy grid data resulting from sonar free space estimation 30225 through an ISM. In some configurations, the various local occupancy grids with free space estimation can be fused according to pre-selected known processes into local occupancy grids 30118. From global occupancy grid 30505 can be created grid map 30601 (FIG. 3E) that can include occupancy and surface data in the vicinity of the device. In some configurations, grid map 30601 (FIG. 3E) and static grid 30249 (FIG. 3D) can be published using, for example, but not limited to, robot operating system (ROS) subscribe/publish features.

Figure 3G:
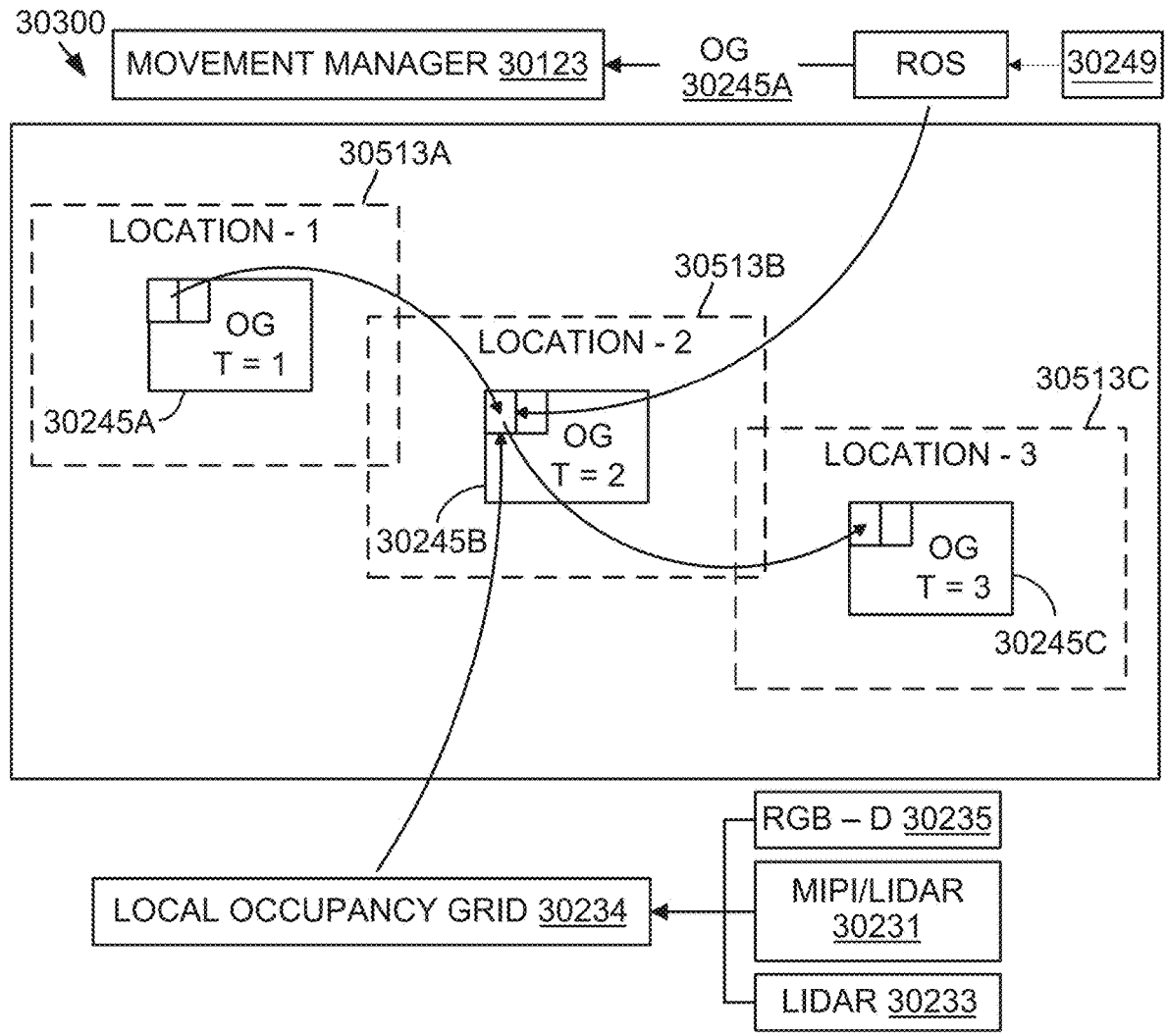
FIG. 3G is a pictorial representation of the prior occupancy grid of the present teachings.
Figure 3H:
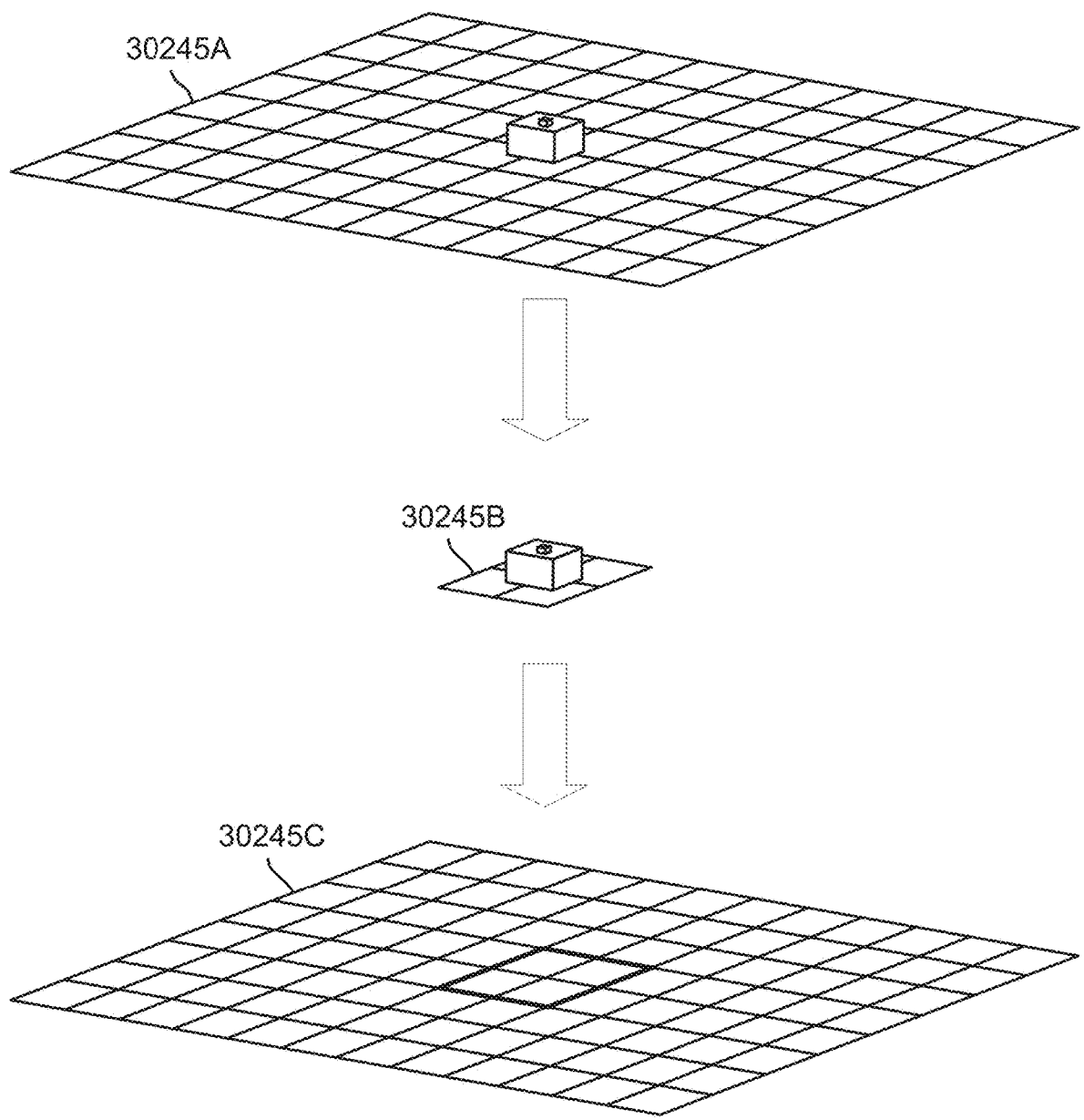
FIG. 3H is a pictorial representation of the updating the global occupancy grid of the present teachings.

Referring now to FIGS. 3G, and 3H, to update the occupancy grid as the device moves, occupancy grid update 30300 can include updating the local occupancy grid with respect to the data measured when the device is moving, and combining those data with static grid 30249. Static grid 30249 is accessed when the device moves out of the working occupancy grid range. The device can be positioned in occupancy grid 30245A at first location 30513A at a first time. As the device moves to second location 30513B, the device is positioned in occupancy grid 30245B which includes a set of values derived from its new location and possibly from values in occupancy grid 30245A. Data from static grid 30249 and surfaces data from the initial global occupancy grid 30505 (FIG. 3C) that locationally coincide with cells in occupancy grid 30245B at a second time can be used, along with measured surface data and occupied probabilities, to update each grid cell according to a pre-selected relationship. In some configurations, the relationship can include summing the static data with the measured data. The resulting occupancy grid 30245C at a third time and third location 30513C can be made available to movement manager 30123 to inform navigation of the device.

Figure 3I:
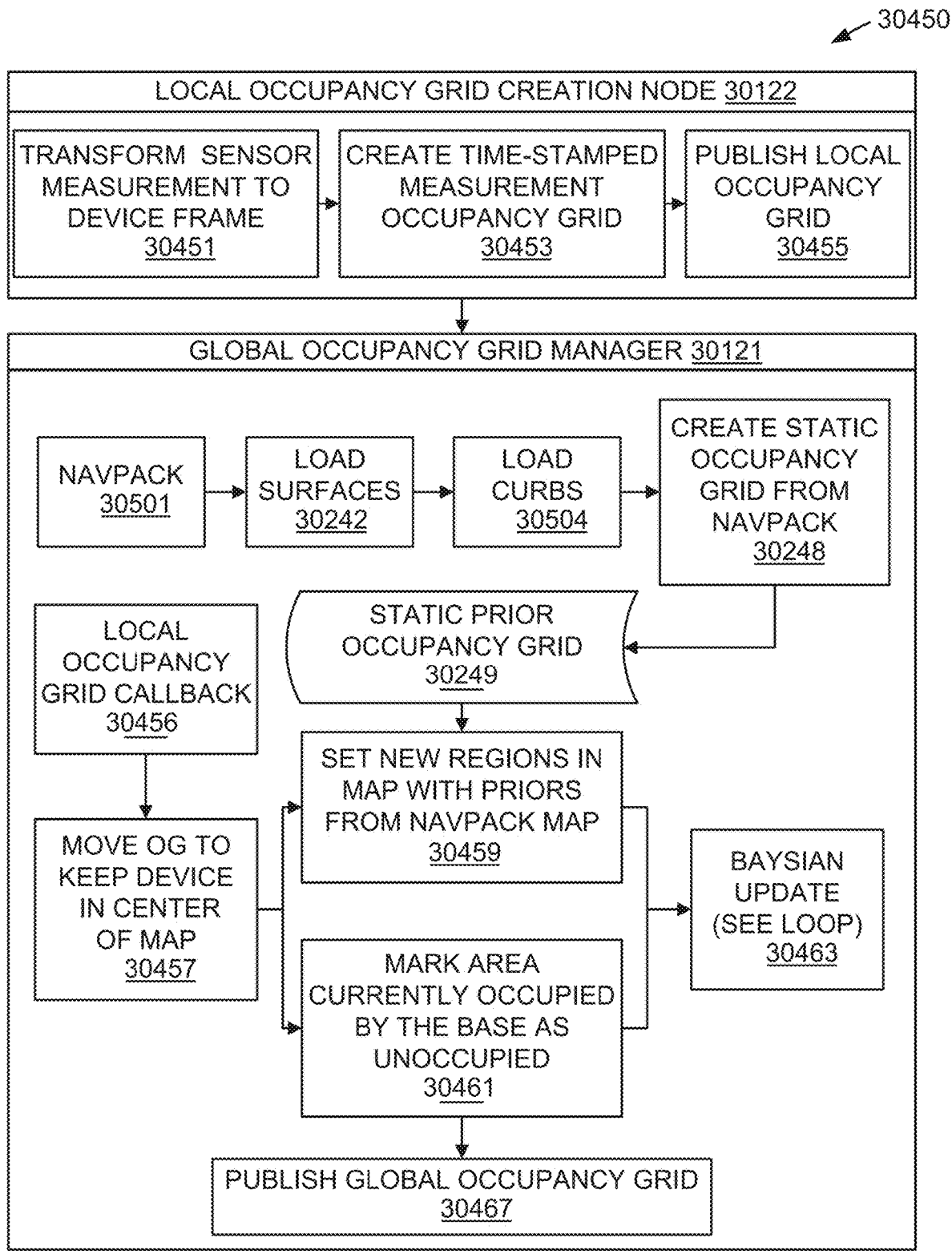
FIG. 3I is a flow diagram of the method of the present teachings for publishing the global occupancy grid.

Referring now to FIG. 3I, method 30450 for creating and managing occupancy grids can include, but is not limited to including, transforming 30451, by local occupancy grid creation node 30122, sensor measurements to the frame of reference associated with the device, creating 30453 a time-stamped measurement occupancy grid, and publishing 30455 the time-stamped measurement occupancy grid as a local occupancy grid 30234 (FIG. 3G). The system associated with method 30450 can include multiple local grid creation nodes 30122, for example, one for each sensor, so that multiple local occupancy grids 30234 (FIG. 3G) can result. Sensors can include, but are not limited to including, RGB-D cameras 30325 (FIG. 3G), LIDAR/MIPI 30231 (FIG. 3G), and LIDAR 30233 (FIG. 3G). The system associated with method 30450 can include global occupancy grid server 30121 that can receive the local occupancy grid(s) and process them according to method 30450. In particular, method 30450 can include loading 30242 surfaces, accessing 30504 surface discontinuities such as, for example, but not limited to, curbs, and creating 30248 static occupancy grid 30249 from any characteristics that are available in repository 30107, which can include, for example, but not limited to, surfaces and surface discontinuities. Method 30450 can include receiving 30456 the published local occupancy grid and moving 30457 the global occupancy grid to maintain the device in the center of the map. Method 30450 can include setting 30459 new regions on the map with prior information from static prior occupancy grid 30249, and marking 30461 the area currently occupied by the device as unoccupied. Method 30450 can, for each cell in each local occupancy grid, execute loop 30463. Loop 30463 can include, but is not limited to including, calculating the position of the cell on the global occupancy grid, accessing the previous value at the position on the global occupancy grid, and calculating a new value at the cell position based on a relationship between the previous value and the value at the cell in the local occupancy grid. The relationship can include, but is not limited to including, summing the values. Loop 30463 can include comparing the new value against a pre-selected acceptable probability range, and setting the global occupancy grid with the new value. The comparison can include setting the probability to a minimum or maximum acceptable probability if the probability is lower or higher than the minimum or maximum acceptable probability. Method 30450 can include publishing 30467 the global occupancy grid.

Figure 3J:
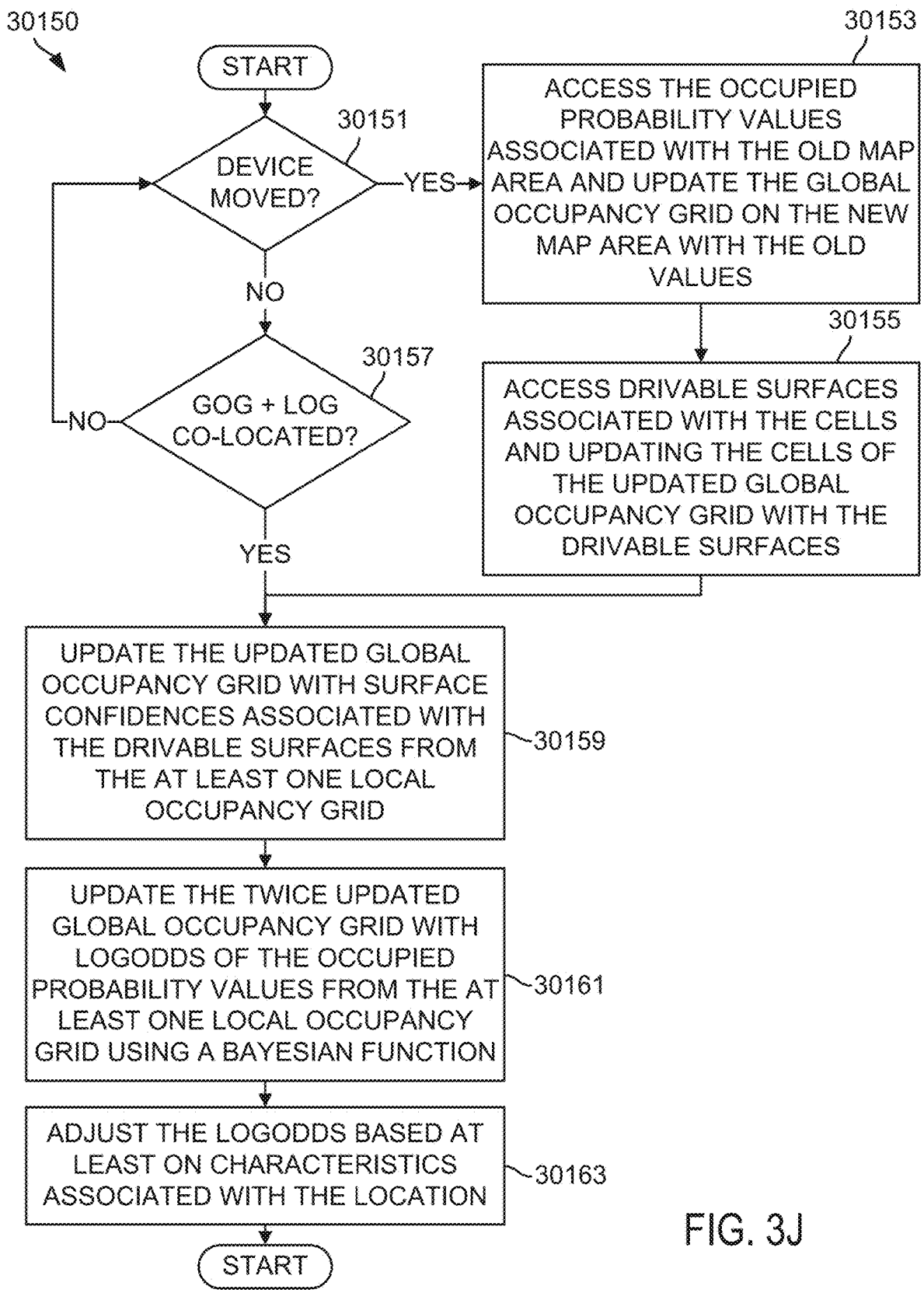
FIG. 3J is a flow diagram of the method of the present teachings for updating the global occupancy grid.

Referring now to FIG. 3J, an alternate method 30150 for creating a global occupancy grid can include, but is not limited to including, if 30151 the device has moved, accessing 30153 the occupied probability values associated with an old map area (where the device was before it moved) and updating the global occupancy grid on the new map area (where the device was after it moved) with the values from the old map area, accessing 30155 drivable surfaces associated with the cells of the global occupancy grid in the new map area, and updating the cells in the updated global occupancy grid with the drivable surfaces, and proceeding at step 30159. If 30151, the device has not moved, and if the global occupancy grid is co-located with the local occupancy grid, method 30150 can include updating 30159 the possibly updated global occupancy grid with surface confidences associated with the drivable surfaces from at least one local occupancy grid, updating 30161 the updated global occupancy grid with logodds of the occupied probability values from at least one local occupancy grid using, for example, but not limited to, a Bayesian function, and adjusting 30163 the logodds based at least on characteristics associated with the location. If 30157 the global occupancy grid is not co-located with the local occupancy grid, method 30150 can include returning to step 30151. The characteristics can include, but are not limited to including, setting the location of the device as unoccupied.

Figure 3K:
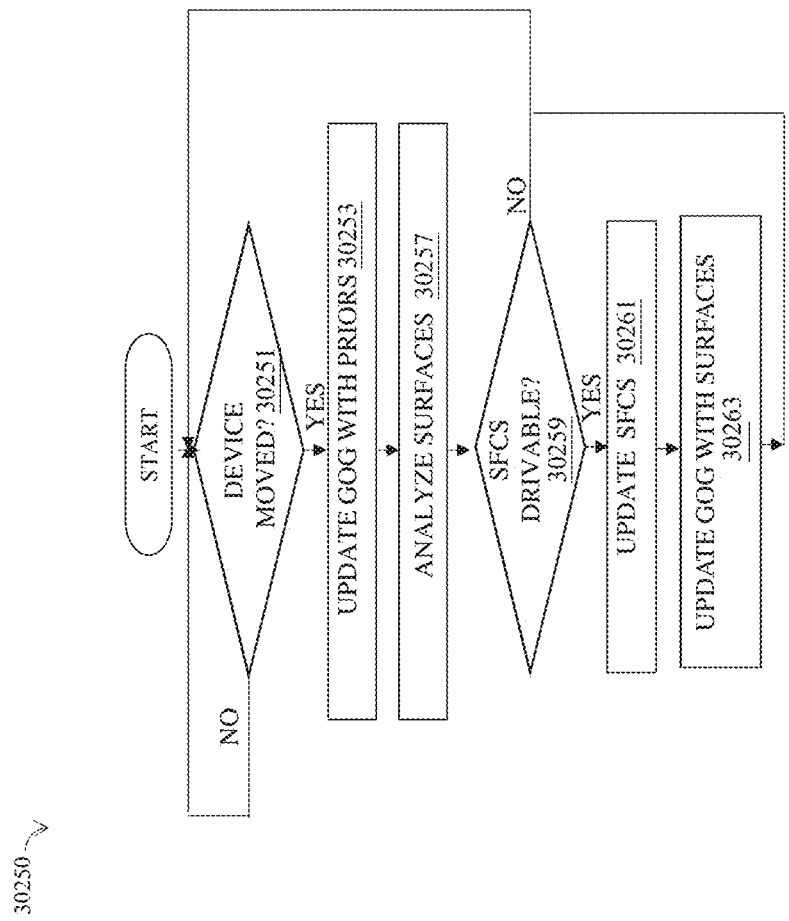
FIGS. 3K-3M are flow diagrams of another method of the present teachings for updating the global occupancy grid.

Referring now to FIG. 3K, in another configuration, method 30250 for creating a global occupancy grid can include, but is not limited to including, if 30251 the device has moved, updating 30253 the global occupancy grid with information from a static grid associated with the new location of the device. Method 30250 can include analyzing 30257 the surfaces at the new location. If 30259, the surfaces are drivable, method 30250 can include updating 30261 the surfaces on the global occupancy grid and updating 30263 the global occupancy grid with values from a repository of static values that are associated with the new position on the map.

Figure 3L:
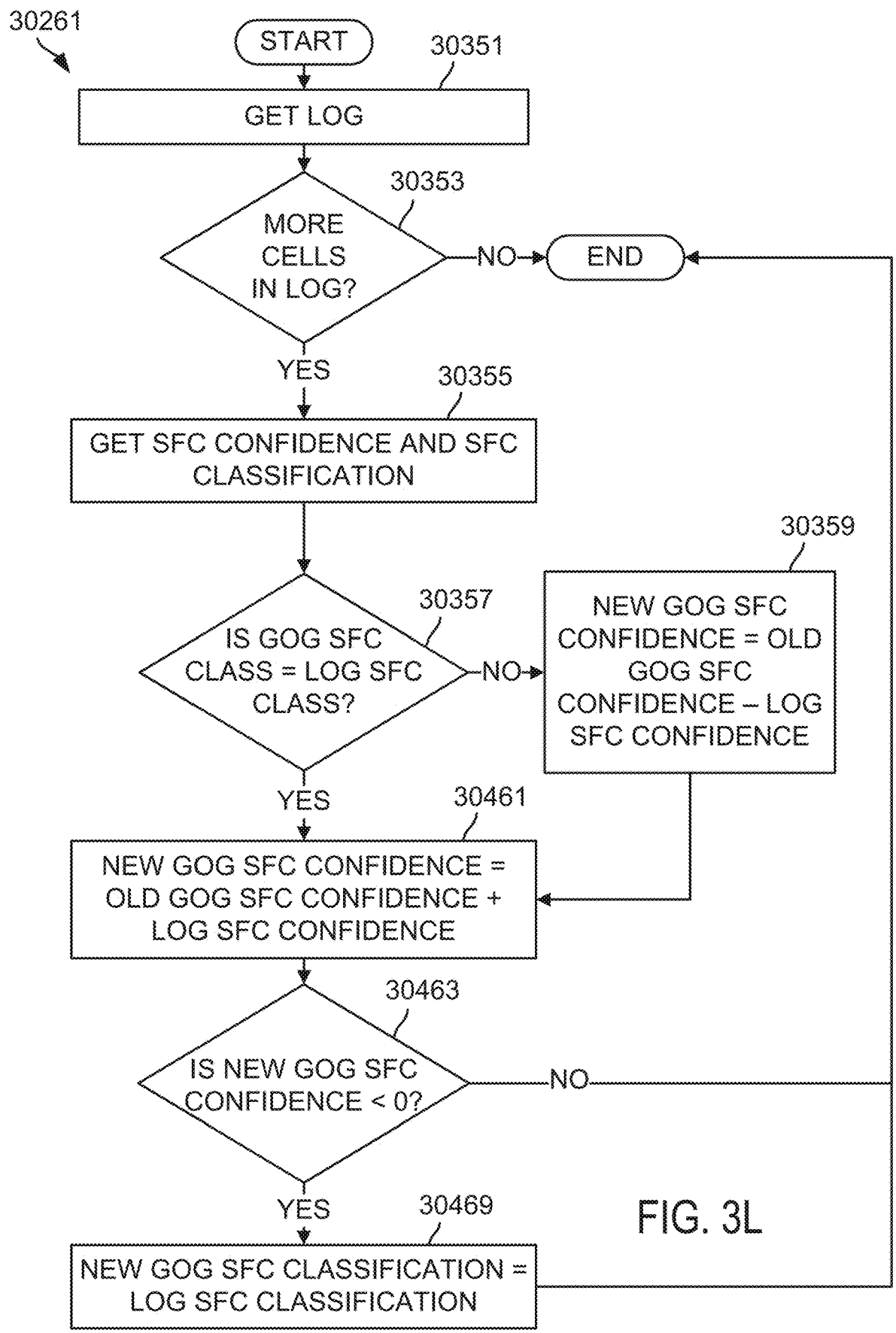

Referring now to FIG. 3L, updating 30261 the surfaces can include, but is not limited to including, accessing 30351 a local occupancy grid (LOG) for a particular sensor. If 30353 there are more cells in the local occupancy grid to process, method 30261 can include accessing 30355 the surface classification confidence value and the surface classification from the local occupancy grid. If 30357 the surface classification at the cell in the local occupancy grid is the same as the surface classification in the global occupancy grid at the location of the cell, method 30261 can include setting 30461 the new global occupancy grid (GOG) surface confidence to the sum of the old global occupancy grid surface confidence and the local occupancy grid surface confidence. If 30357 the surface classification at the cell in the local occupancy grid is not the same as the surface classification in the global occupancy grid at the location of the cell, method 30261 can include setting 30359 the new global occupancy grid surface confidence to the difference between the old global occupancy grid surface confidence and the local occupancy grid surface confidence. If 30463 the new global occupancy grid surface confidence is less than zero, method 30261 can include setting 30469 the new global occupancy grid surface classification to the value of the local occupancy grid surface classification.

Figure 3M:
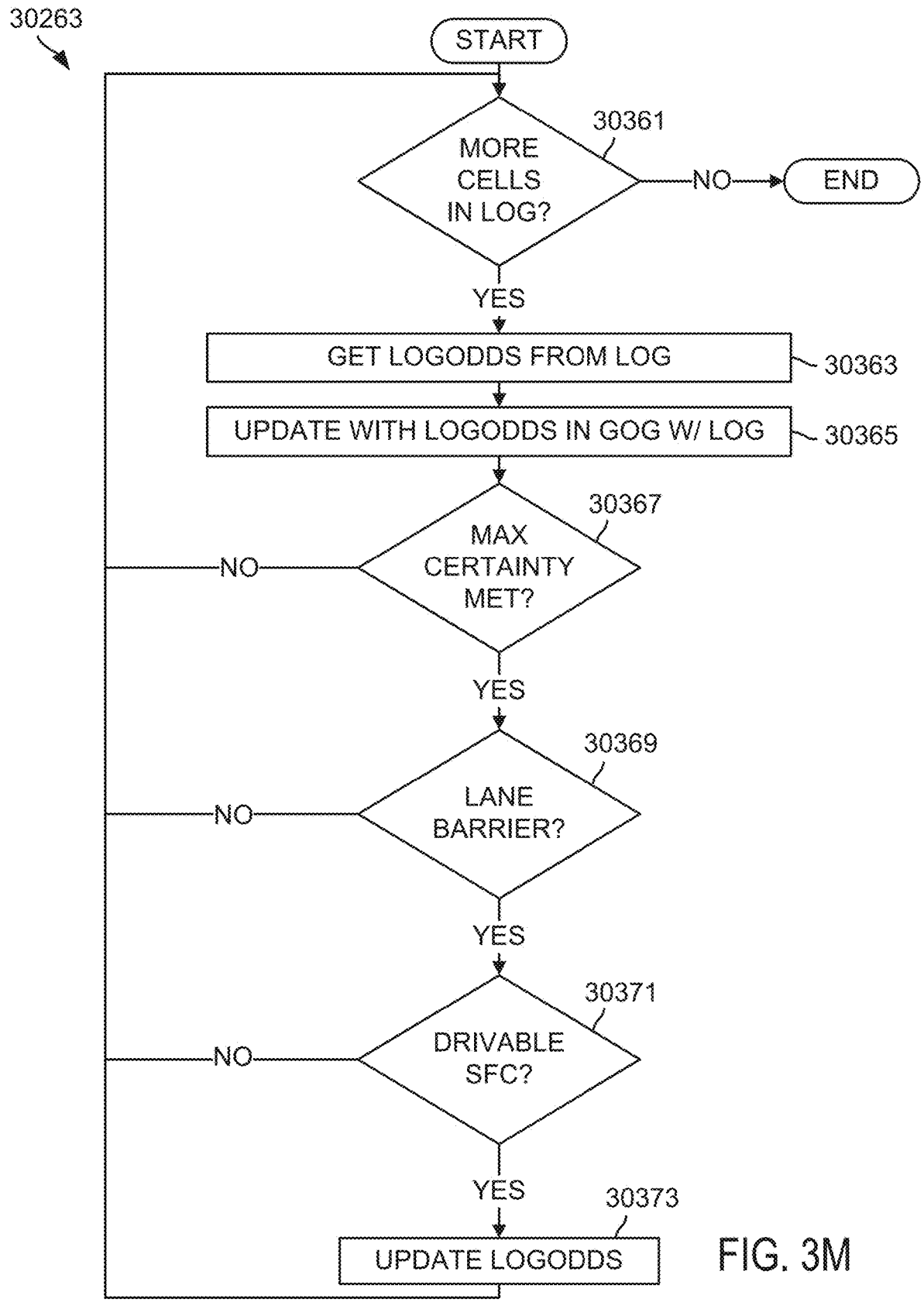

Referring now to FIG. 3M, updating 30263 the global occupancy grid with values from a repository of static values can include, but is not limited to including, if 30361 there are more cells in the local occupancy grid to process, method 30263 can include accessing 30363 the logodds from the local occupancy grid and updating 30365 the logodds in the global occupancy grid with the value from the local occupancy grid at the location. If 30367 maximum certainty that the cell is empty is met, and if 30369 the device is traveling within pre-determined lane barriers, and if 30371 the surface is drivable, method 30263 can include updating 30373 the probability that the cell is occupied and returning to continue processing more cells. If 30367 maximum certainty that the cell is empty is not reached, or if 30369 the device is not traveling in the pre-determined lane, or if 30371 the surface is not drivable in the mode in which the device is currently traveling, method 30263 can include returning to consider more cells without updating the logodds. If the device is in standard mode, i.e. a mode in which the device can navigate relatively uniform surfaces, and the surface classification indicates that the surface is not relatively uniform, method 30263 can adjust the device's path by increasing the probability that the cell is occupied by updating 30373 the logodds. If the device is in standard mode, and the surface classification indicates that the surface is relatively uniform, method 30263 can adjust the device's path by decreasing the probability that the cell is occupied by updating 30373 the logodds. If the device is traveling in 4-wheel mode, i.e. a mode in which the device can navigate non-uniform terrain, adjustments to the probability that the cell is occupied may not be necessary.

Figure 4A:
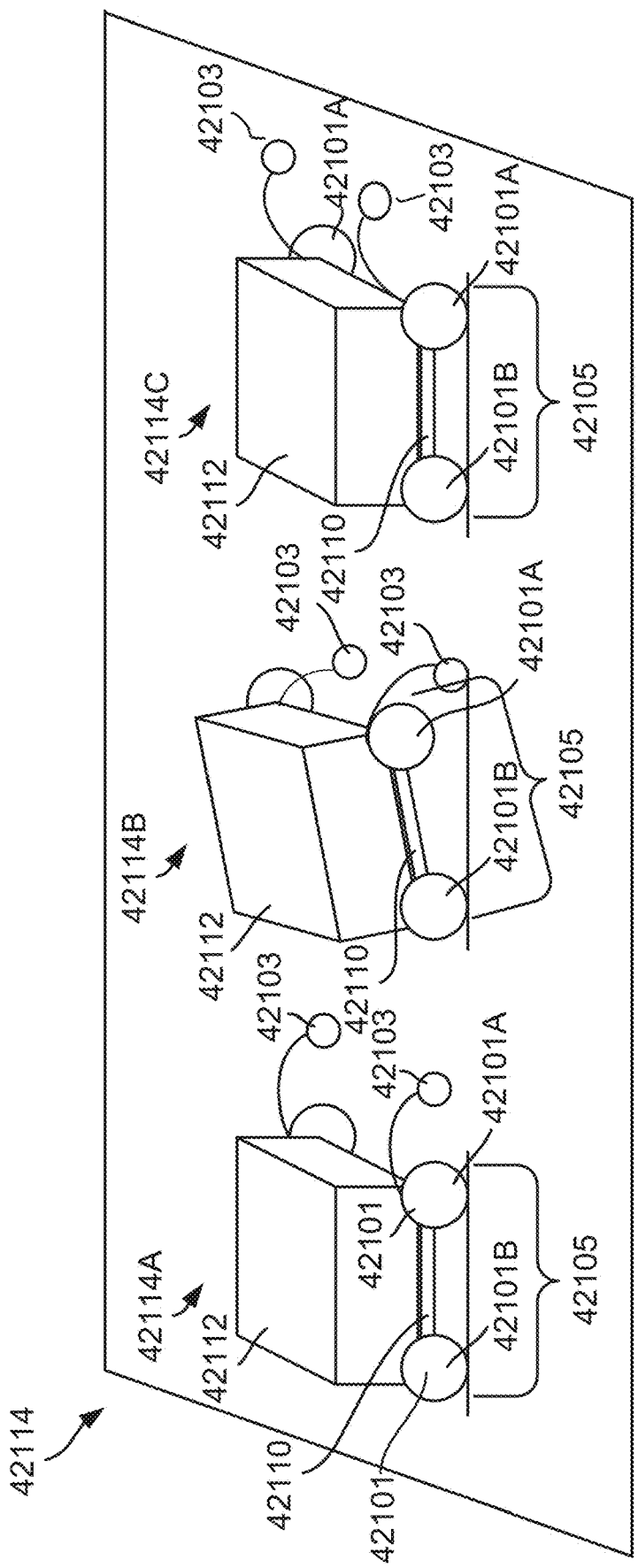
FIG. 4A is a perspective pictorial diagram a device of the present teachings situated in various modes.

Referring now to FIG. 4A, the AV can travel in a specific mode that can be associated with a device configuration, for example, the configuration depicted in device 42114A and the configuration depicted in device 42114B. The system of the present teachings for real-time control of the configuration of the device, based on at least one environmental factor and the situation of the device, can include, but is not limited to including, sensors, a movement means, a chassis operably coupled with the sensors and the movement means, the movement means being driven by motors and a power supply, a device processor receiving data from the sensors, and a powerbase processor controlling the movement means. In some configurations, the device processor can receive environmental data, determine the environmental factors, determine configuration changes according to the environmental factors and the situation of the device, and provide the configuration changes to the powerbase processor. The powerbase processor can issue commands to the movement means to move the device from place to place, physically reconfiguring the device when required by the road surface type.

Continuing to refer to FIG. 4A, the sensors collecting the environmental data can include, but are not limited to including, for example, cameras, LIDAR, radar, thermometers, pressure sensors, and weather condition sensors, several of which are described herein. From this assortment of data, the device processor can determine environmental factors upon which device configuration changes can be based. In some configurations, environmental factors can include surface factors such as, for example, but not limited to, surface type, surface features, and surface conditions. The device processor can determine in real-time, based on environmental factors and the current situation of the device, how to change the configuration to accommodate traversing the detected surface type.

Continuing to refer to FIG. 4A, in some configurations, the configuration change of device 42114A/B/C (referred to collectively as device 42114) can include a change in the configuration of the movement means, for example. Other configuration changes are contemplated, such as user information displays and sensor controls, that can depend on current mode and surface type. In some configurations, the movement means can include at least four drive wheels 442101, two on each side of chassis 42112, and at least two caster wheels 42103 operably coupled with chassis 42112, as described herein. In some configurations, drive wheels 442101 can be operably coupled in pairs 42105, where each pair 42105 can include first drive wheel 42101A and second drive wheel 42101B of the four drive wheels 442101, and pairs 42105 are each located on opposing sides of chassis 42112. The operable coupling can include wheel cluster assembly 42110. In some configurations, powerbase processor 41016 (FIG. 4B) can control the rotation of cluster assembly 42110. Left and right wheel motors 41017 (FIG. 4B) can drive wheels 442101 on the either side of chassis 42112. Turning can be accomplished by driving left and right wheel motors 41017 (FIG. 4B) at different rates. Cluster motors 41019 (FIG. 4B) can rotate the wheelbase in the fore/aft direction. Rotation of the wheelbase can allow cargo to rotate, if at all, independently from drive wheels 442101, while front drive wheels 442101A become higher or lower than rear drive wheels 442101B, for example, when encountering discontinuous surface features. Cluster assembly 42110 can independently operate each pair 42105 of two wheels, thereby providing forward, reverse and rotary motion of device 42114, upon command. Cluster assembly 42110 can provide the structural support for pairs 42105. Cluster assembly 42110 can provide the mechanical power to rotate wheel drive assemblies together, allowing for functions dependent on cluster assembly rotation, for example, but not limited to, discontinuous surface feature climbing, various surface types, and uneven terrain. Further details about the operation of clustered wheels can be found in U.S. patent application #16,035,205 entitled Mobility Device, filed on Jul. 13, 2018, which is incorporated herein by reference in its entirety.

Figure 4B:
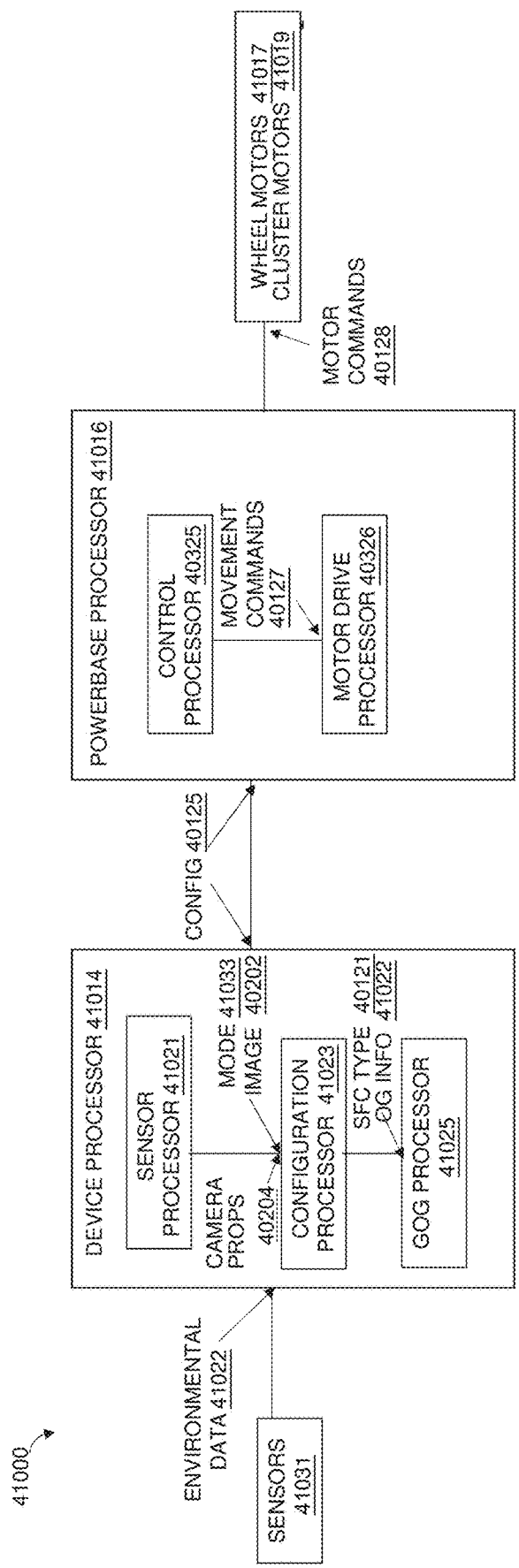
FIG. 4B is a schematic block diagram of the system of the present teachings.

Continuing to refer to FIG. 4A, the configuration of device 42114 can be associated with, but is not limited to being associated with, mode 41033 (FIG. 4B) of device 42114. Device 42114 can operate in several of modes 41033 (FIG. 4B). In standard mode 10100-1 (FIG. 5E), device 42114B can operate on two of drive wheels 442101B and two of caster wheels 42103. Standard mode 10100-1 (FIG. 5E) can provide turning performance and mobility on relatively firm, level surfaces for example, but not limited to, indoor environments, sidewalks, and pavement. In enhanced mode 10100-2 (FIG. 5E), or 4-Wheel mode, device 42114A/C can command four of drive wheels 442101A/B, can be actively stabilized through onboard sensors, and can elevate and/or reorient chassis 42112, casters 42103, and cargo. 4-Wheel mode 10100-2 (FIG. 5E) can provide mobility in a variety of environments, enabling device 42114A/C to travel up steep inclines and over soft, uneven terrain. In 4-Wheel mode 10100-2 (FIG. 5E), all four of drive wheels 442101A/B can be deployed and caster wheels 42103 can be retracted. Rotation of cluster 42110 can allow operation on uneven terrain, and drive wheels 442101A/B can drive up and over discontinuous surface features. This functionality can provide device 42114A/C with mobility in a wide variety of outdoor environments. Device 42114B can operate on outdoor surfaces that are firm and stable but wet. Frost heaves and other natural phenomena can degrade outdoor surfaces, creating cracks and loose material. In 4-Wheel mode 10100-2 (FIG. 5E), device 42114A/C can operate on these degraded surfaces. Modes 41033 (FIG. 4B) are described in detail in U.S. Pat. No. 6,571,892, entitled Control System and Method, issued on Jun. 3, 2003 ('892), incorporated herein by reference in its entirety.

Referring now to FIG. 4B, system 41000 can drive device 42114 (FIG. 4A) by processing inputs from sensors 41031, generating commands to wheel motors 41017 to drive wheels 442101 (FIG. 4A), and generating commands to cluster motors 41019 to drive clusters 42110 (FIG. 4A). System 41000 can include, but is not limited to including, device processor 41014 and powerbase processor 41016. Device processor 41014 can receive and process environmental data 41022 from sensors 41031, and provide configuration information 40125 to powerbase processor 41016. In some configurations, device processor 41014 can include sensor processor 41021 that can receive and process environmental data 41022 from sensors 41031. Sensors 41031 can include, but are not limited to including, cameras, as described herein. From these data, information about, for example, the driving surface that is being traversed by device 42114 (FIG. 4A) can be accumulated and processed. In some configurations, the driving surface information can be processed in real-time. Device processor 41014 can include configuration processor 41023 that can determine surface type 40121 from environmental data 41022, for example, that is being traversed by device 42114 (FIG. 4A). Configuration processor 41023 can include, for example, drive surface processor 41029 (FIG. 4C) that can create, for example, a drive surface classification layer, a drive surface confidence layer, and an occupancy layer from environmental data 41022. These data can be used by powerbase processor 41016 to create movement commands 40127 and motor commands 40128, and can be used by global occupancy grid processor 41025 to update an occupancy grid that can be used for path planning, as described herein. Configuration 40125 can be based, at least in part, on surface type 40121. Surface type 40121 and mode 41033 can be used to determine, at least in part, occupancy grid information 41022, which can include a probability that a cell in the occupancy grid is occupied. The occupancy grid can, at least in part, enable determination of a path that device 42114 (FIG. 4A) can take.

Continuing to refer to FIG. 4B, powerbase processor 41016 can receive configuration information 40125 from device processor 41014, and process configuration information 40125 along with other information, for example path information. Powerbase processor 41016 can include control processor 40325 that can create movement commands 40127 based at least on configuration information 40125 and provide movement commands 40127 to motor drive processor 40326. Motor drive processor 40326 can generate motor commands 40128 that can direct and move device 42114 (FIG. 4A). Specifically motor drive processor 40326 can generate motor commands 40128 that can drive wheel motors 41017, and can generate motor commands 40128 that can drive cluster motors 41019.

Figure 4C:
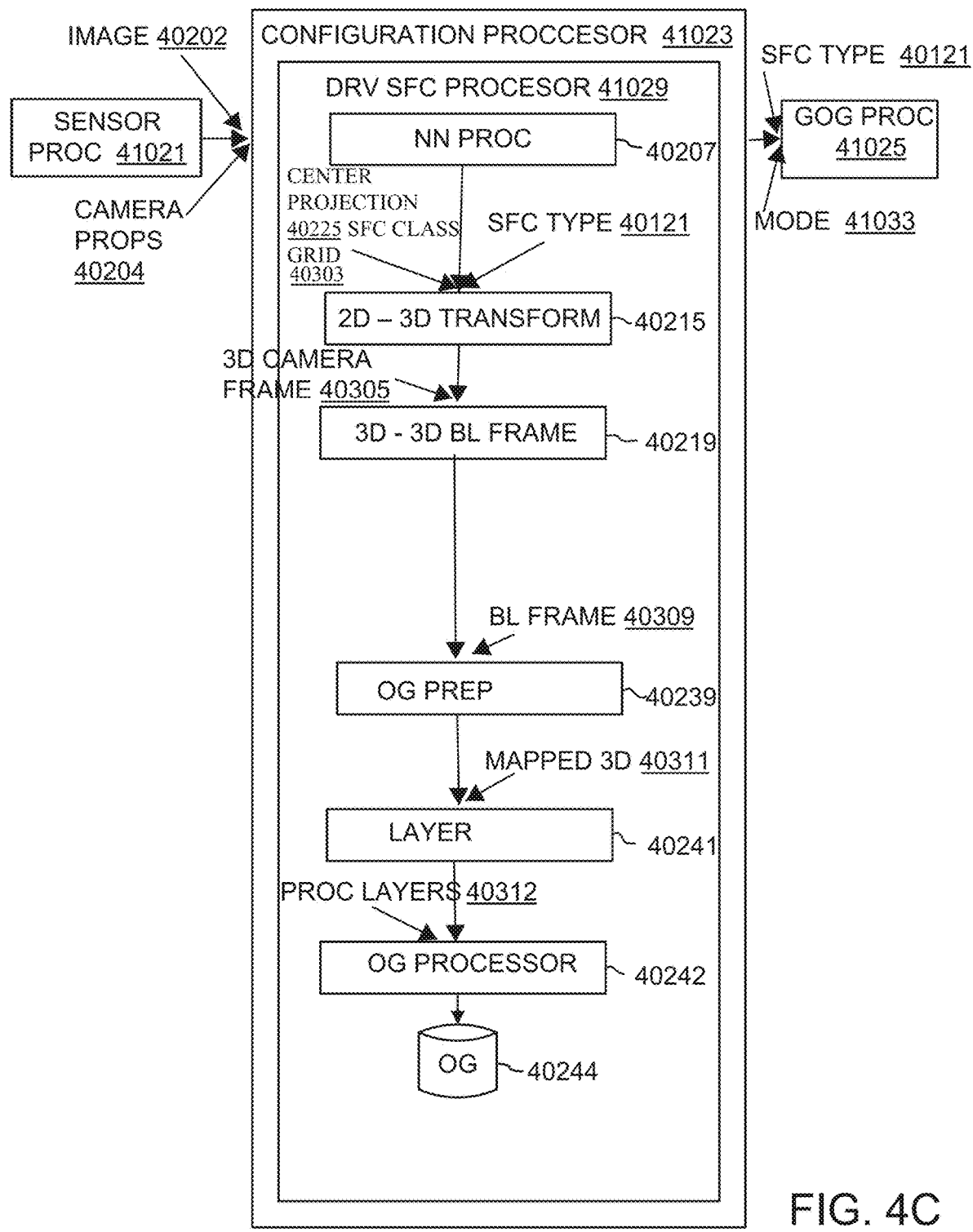
FIG. 4C is a schematic block diagram of the drive surface processor components of the present teachings.

Referring now to FIG. 4C, real-time surface detection of the present teachings can include, but is not limited to including, configuration processor 41023 that can include drive surface processor 41029. Drive surface processor 41029 can determine the characteristics of the driving surface upon which device 42114 (FIG. 4A) is navigating. The characteristics can be used to determine a future configuration of device 42114 (FIG. 4A). Drive surface processor 41029 can include, but is not limited to including, neural network processor 40207, data transforms 40215, 40219, and 40239, layer processor 40241, and occupancy grid processor 40242. Together these components can produce information that can direct the change of the configuration of device 42114 (FIG. 4A) and can enable modification of occupancy grid 40244 (FIG. 4C) that can inform path planning for the travel of device 42114 (FIG. 4A).

Figure 4D:
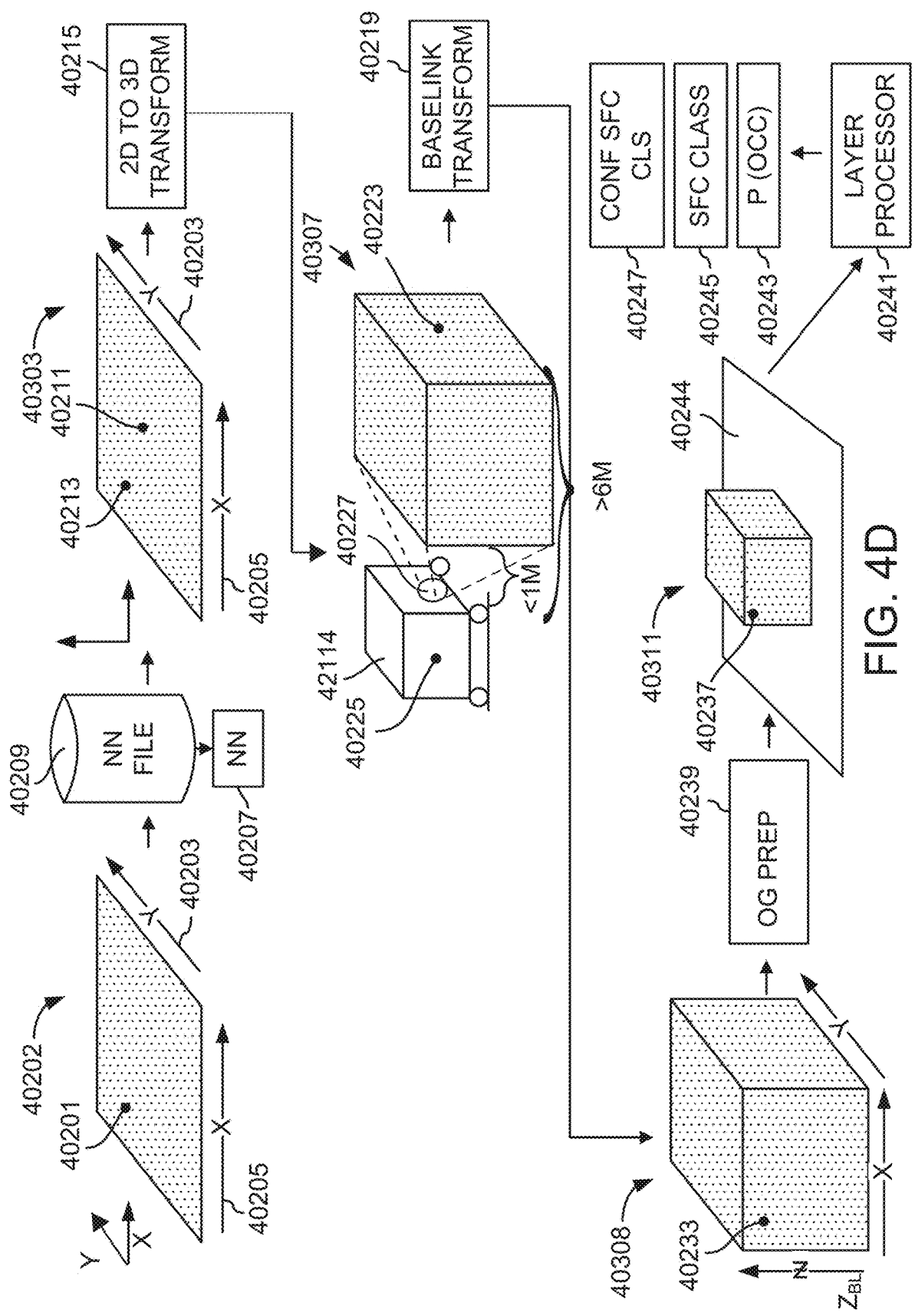
FIG. 4D is a schematic block/pictorial flow diagram of the process of the present teachings.

Referring now to FIGS. 4C and 4D, neural network processor 40207 can subject environmental data 41022 (FIG. 4B) to a trained neural network that can indicate, for each point of data collected by sensors 41031 (FIG. 4B), the type of surface the point is likely to represent. Environmental data 41022 (FIG. 4B) can be, but is not limited to being, received as camera images 40202, where the cameras can be associated with camera properties 40204. Camera images 40202 can include 2D grids of points 40201 having X-resolution 40205 (FIG. 4D) and Y-resolution 40204 (FIG. 4D). In some configurations, camera images 40202 can include RGB-D images, X-resolution 40205 (FIG. 4D) can include 40,640 pixels, and Y-resolution 40204 (FIG. 4D) can include 40,480 pixels. In some configurations, camera images 40202 can be converted to images formatted according to the requirements of the chosen neural network. In some configurations, the data can be normalized, scaled, and converted from 2D to 1D, which can improve processing efficiency of the neural network. The neural network can be trained in many ways including, but not limited to, training with RGB-D camera images. In some configurations, the trained neural network, represented in neural network file 40209 (FIG. 4D), can be made available to neural network processor 40207 through a direct connection to the processor executing the trained neural network or, for example, through a communications channel. In some configurations, neural network processor 40207 can use trained neural network file 40209 (FIG. 4D) to identify surface types 40121 (FIG. 4C) within environmental data 41022 (FIG. 4B). In some configurations, surface types 40121 (FIG. 4C) can include, but are not limited to including, not drivable, hard drivable, soft drivable, and curb. In some configurations, surface types 40121 (FIG. 4C) can include, but are not limited to including, not drivable/background, asphalt, concrete, brick, packed dirt, wood planks, gravel/small stones, grass, mulch, sand, curb, solid metal, metal grates, tactile paving, snow/ice, and train tracks. The result of the neural network processing can include surface classification grid 40303 of points 40213 having X-resolution 40205 and Y-resolution 40203, and center 40211. Each point 40213 in surface classification grid 40303 can be associated with a likelihood being a specific one of surface types 40121 (FIG. 4C).

Continuing to refer to FIGS. 4C and 4D, drive surface processor 41029 (FIG. 4C) can include 2D to 3D transform 40215 that can deproject from 2D surface classification grid 40303 (FIG. 4D) in a 2D camera frame to 3D image cube 40307 (FIG. 4D) in 3D real world coordinates as seen by the camera. Deprojection can recover the 3D properties of 2D data, and can transform a 2D image from a RGB-D camera to 3D camera frame 40305 (FIG. 4C). Points 40233 (FIG. 4D) in cube 40307 (FIG. 4D) can each be associated with the likelihood of being a specific one of surface types 40121 (FIG. 4C), and a depth coordinate as well as X/Y coordinates. The dimensions of point cube 40307 (FIG. 4D) can be delimited according to, for example, but not limited to, camera properties 40204 (FIG. 4C), such as, for example, focal length x, focal length y, and projection center 40225. For example, camera properties 40204 can include a maximum range over which the camera can reliably project. Further, there could be features of device 42114 (FIG. 4A) that could interfere with image 40202. For example, casters 42103 (FIG. 4A) could interfere with the view of camera(s) 40227 (FIG. 4D). These factors can limit the number of points in point cube 40307 (FIG. 4D). In some configurations, camera(s) 40227 (FIG. 4D) cannot reliably project beyond about six meters, which can represent the high limit of the range of camera 40227 (FIG. 4D), and can limit the number of points in point cubes 40307 (FIG. 4D). In some configurations, features of device 42114 (FIG. 4A) can act as the minimum limit of the range of camera 40227 (FIG. 4D).

For example, the presence of casters 42103 (FIG. 4A) can imply a minimum limit that can be set to, in some configurations, approximately one meter. In some configurations, points in point cubes 40307 (FIG. 4D) can be limited to points that are one meter or more from camera 40227 (FIG. 4D) and six meters or less from camera 40227 (FIG. 4D).

Continuing to refer to FIGS. 4C and 4D, drive surface processor 41029 (FIG. 4C) can include baselink transform 40219 that can transform the 3D cube of points to coordinates associated with device 42114 (FIG. 4A), i.e., baselink frame 40309 (FIG. 4C). Baselink transform 40219 can transform 3D data points 40223 (FIG. 4D) in cube 40307 (FIG. 4D) into points 40233 (FIG. 4D) in cube 40308 (FIG. 4D) in which the Z dimension is set to the base of device 42114 (FIG. 4A). Drive surface processor 41029 (FIG. 4C) can include OG prep 40239 that can project points 40233 (FIG. 4D) in cube 40308 (FIG. 4D) onto occupancy grid 40244 (FIG. 4D) as points 40237 (FIG. 4D) in cube 40311 (FIG. 4D). Layer processor 40241 can flatten points 40237 (FIG. 4D) into various layers 40312 (FIG. 4C), depending on the data represented by points 40237 (FIG. 4D). In some configurations, layer processor 40241 can apply a scalar value to layers 40312 (FIG. 4C). In some configurations, layers 40312 (FIG. 4C) can include probability of occupancy layer 40243, surface classification layer 40245 (FIG. 4D) as determined by neural network processor 40207, and surface type confidence layer 40247 (FIG. 4D). In some configurations, surface type confidence layer 40247 (FIG. 4D) can be determined by converting class scores from neural network processor 40207 into scores that can be determined by normalizing the class scores into a probability distribution over the output classes as log(class score)/Σ log(each class). In some configurations, one or more layers can be replaced or augmented by a layer that provides the probability of a non-drivable surface.

Continuing to refer to FIGS. 4C and 4D, in some configurations, the probability value in occupancy layer 40243 can be represented as a logodds (log odds→ln(p/(1−p)) value. In some configurations, the probability value in occupancy layer 40243 can be based at least on a combination of mode 41033 (FIG. 4B) and surface type 40121 (FIG. 4B). In some configurations, pre-selected probability values in occupancy layer 40243 can be chosen to cover situations such as, for example, but not limited to, (1) when surface type 40121 (FIG. 4A) is hard and drivable, and when device 42114 (FIG. 4A) is in a pre-selected set of modes 41033 (FIG. 4B), or (2) when surface type 40121 (FIG. 4A) is soft and drivable, and when device 42114 (FIG. 4A) is in a specific pre-selected mode, such as, for example, standard mode, or (3) when surface type 40121 (FIG. 4A) is soft and drivable, and when device 42114 (FIG. 4A) is in a specific pre-selected mode such as, for example, 4-Wheel mode, or (4) when surface type 40121 (FIG. 4A) is discontinuous, and when device 42114 (FIG. 4A) is in a specific pre-selected mode such as, for example, standard mode, or (5) when surface type 40121 (FIG. 4A) is discontinuous, and when device 42114 (FIG. 4A) is in a specific pre-selected mode, such as 4-wheel mode, or (6) when surface type 40121 (FIG. 4A) is non-drivable, and when device 42114 (FIG. 4A) is in a pre-selected set of modes 41033 (FIG. 4B). In some configurations, probability values can include, but are not limited to including, those set out in

TABLE I

| Surface type | Drive Mode | Occupancy Probability as determined by surface type |
|---|---|---|
| Hard drivable | All | .1 |
| Soft drivable | Standard | .55 |
| Soft drivable | 4W | .3 |
| Discontinuous surface | Standard | .98 |
| Discontinuous surface | 4W | 0.3 |
| Non-drivable | All | .8 |

Referring again to FIG. 4C, occupancy grid processor 40242 can provide, in real-time, parameters that can affect probability values of occupancy grid 40244 such as, for example, but not limited to, surface type 40121 and occupancy grid information 41022, to global occupancy grid processor 41025. Configuration information 40125 (FIG. 4B) such as, for example, but not limited to, mode 41033 and surface type 40121, can be provided to powerbase processor 41016 (FIG. 4B). Powerbase processor 41016 (FIG. 4B) can determine motor commands 40128 (FIG. 4B), which can set the configuration of device 42114 (FIG. 4A), based at least on configuration information 40125 (FIG. 4B).

Figure 4E:
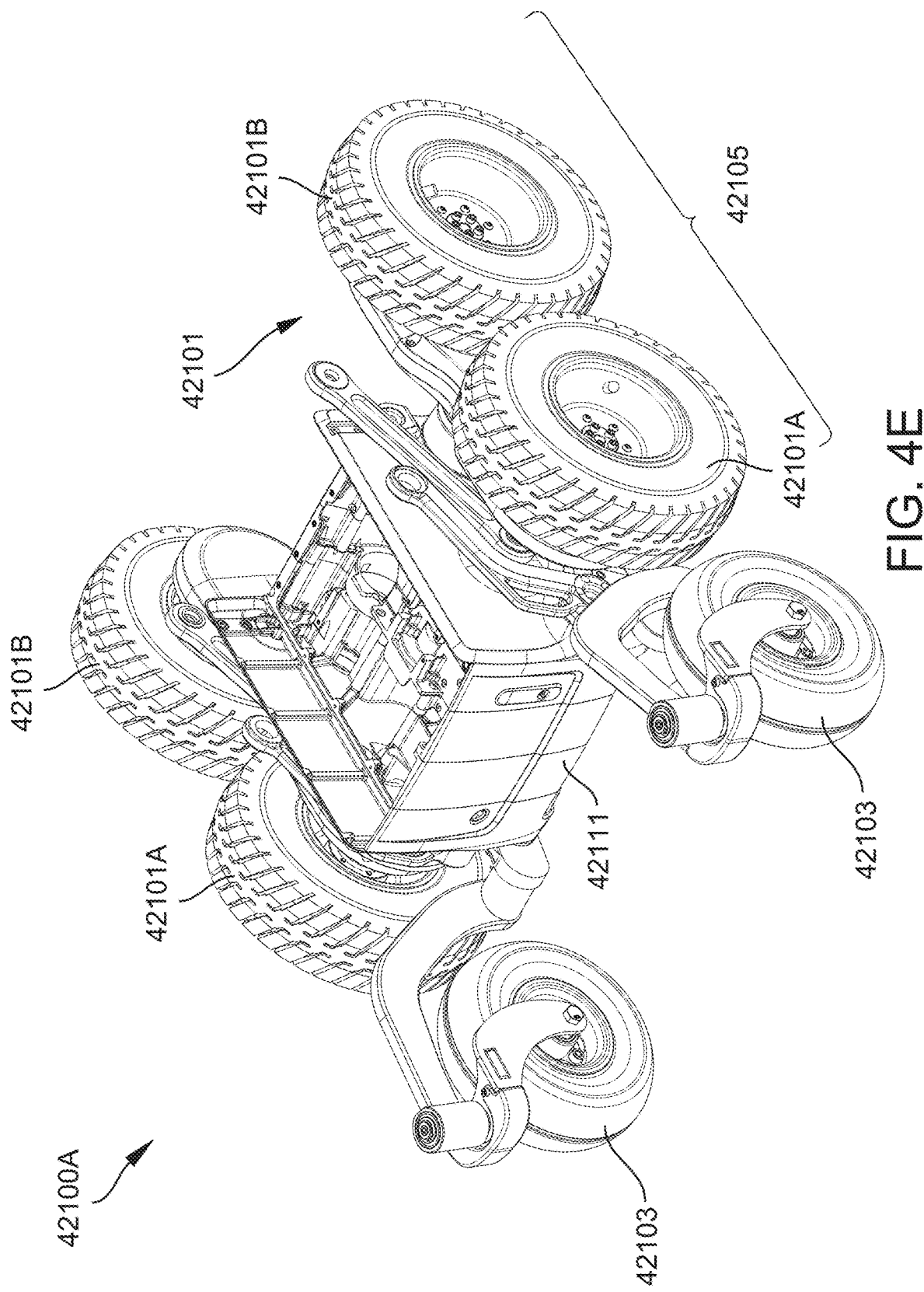
FIGS. 4E and 4F are perspective and side view diagrams, respectively, of a configuration of the device of the present teachings in standard mode.
Figure 4F:
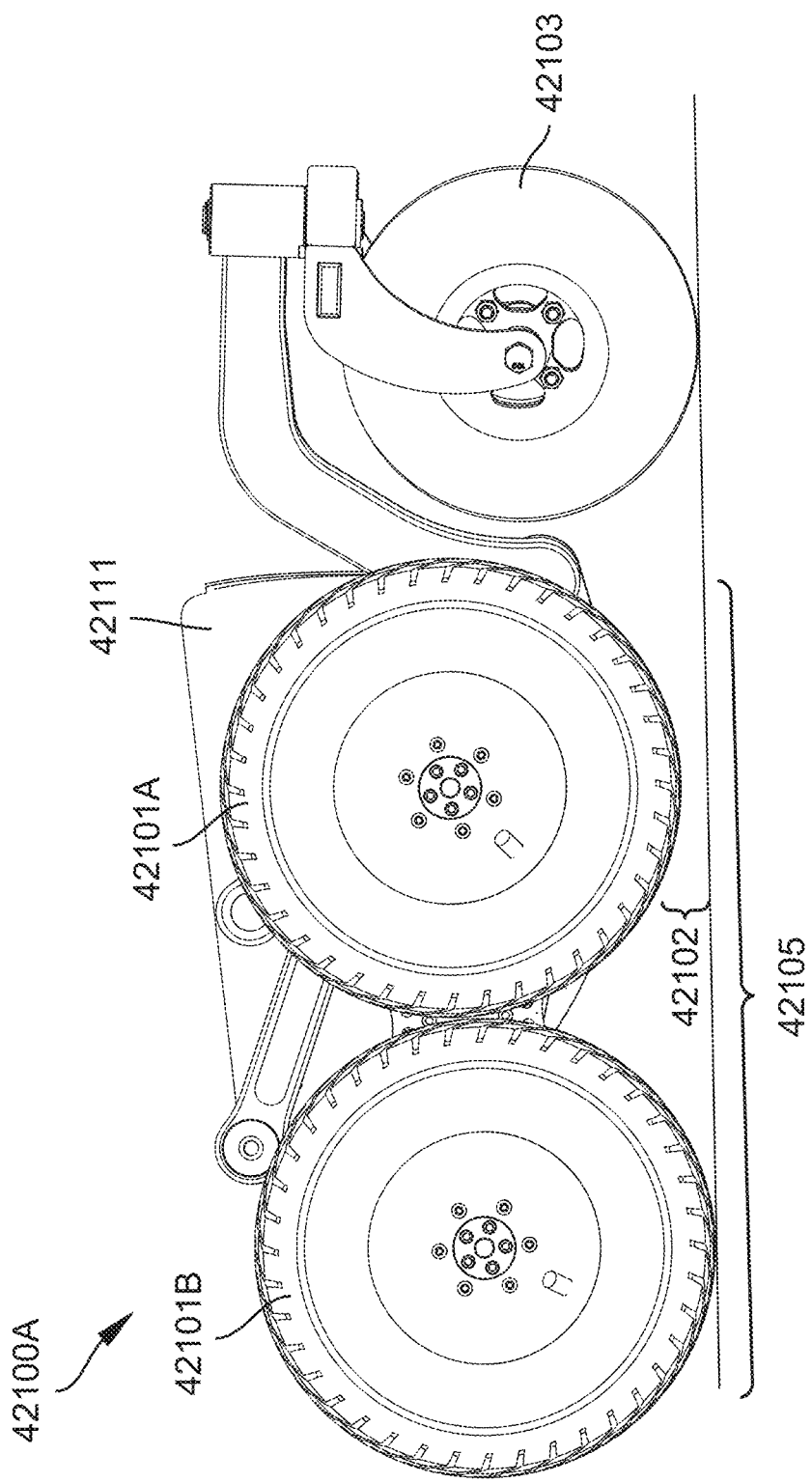
Figure 4G:
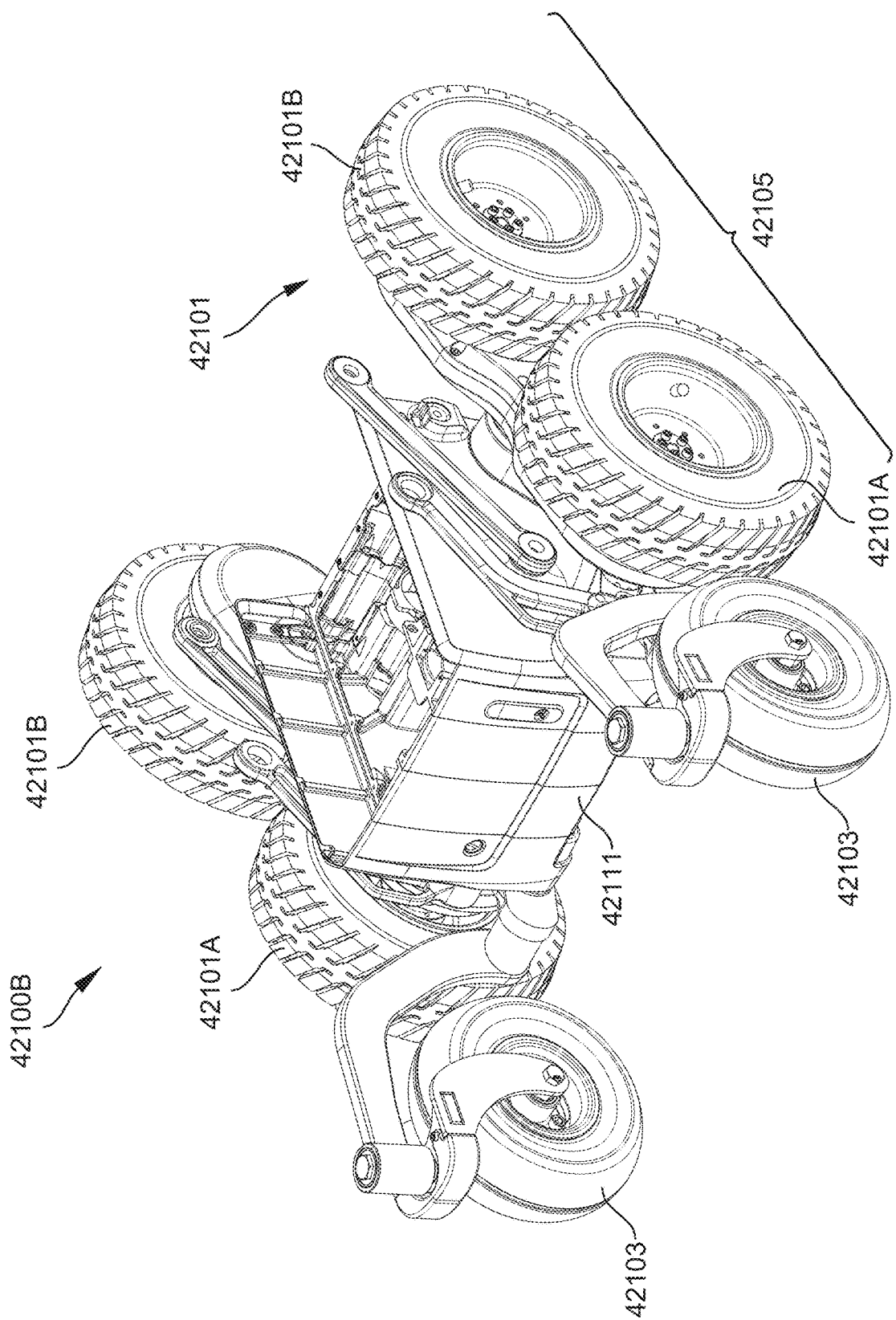
FIGS. 4G and H are perspective and side view diagrams, respectively, of a configuration of the device of the present teachings in 4-Wheel mode.

Referring now to FIGS. 4E and 4F, device 42100A can be configured according to the present teachings to operate in standard mode. In standard mode, casters 42103 and second drive wheel 42101B can rest on the ground as device 42100A navigates its path. First drive wheel 42101A can be raised by a pre-selected amount 42102 (FIG. 4F) and can clear the driving surface. Device 42100A can navigate successfully on relatively firm, level surfaces. When driving in standard mode, occupancy grid 40244 (FIG. 4C) can reflect the surface type limitation (see Table I), and therefore can enable a compatible choice of mode, or can enable a configuration change based on the surface type and the current mode.

Figure 4H:
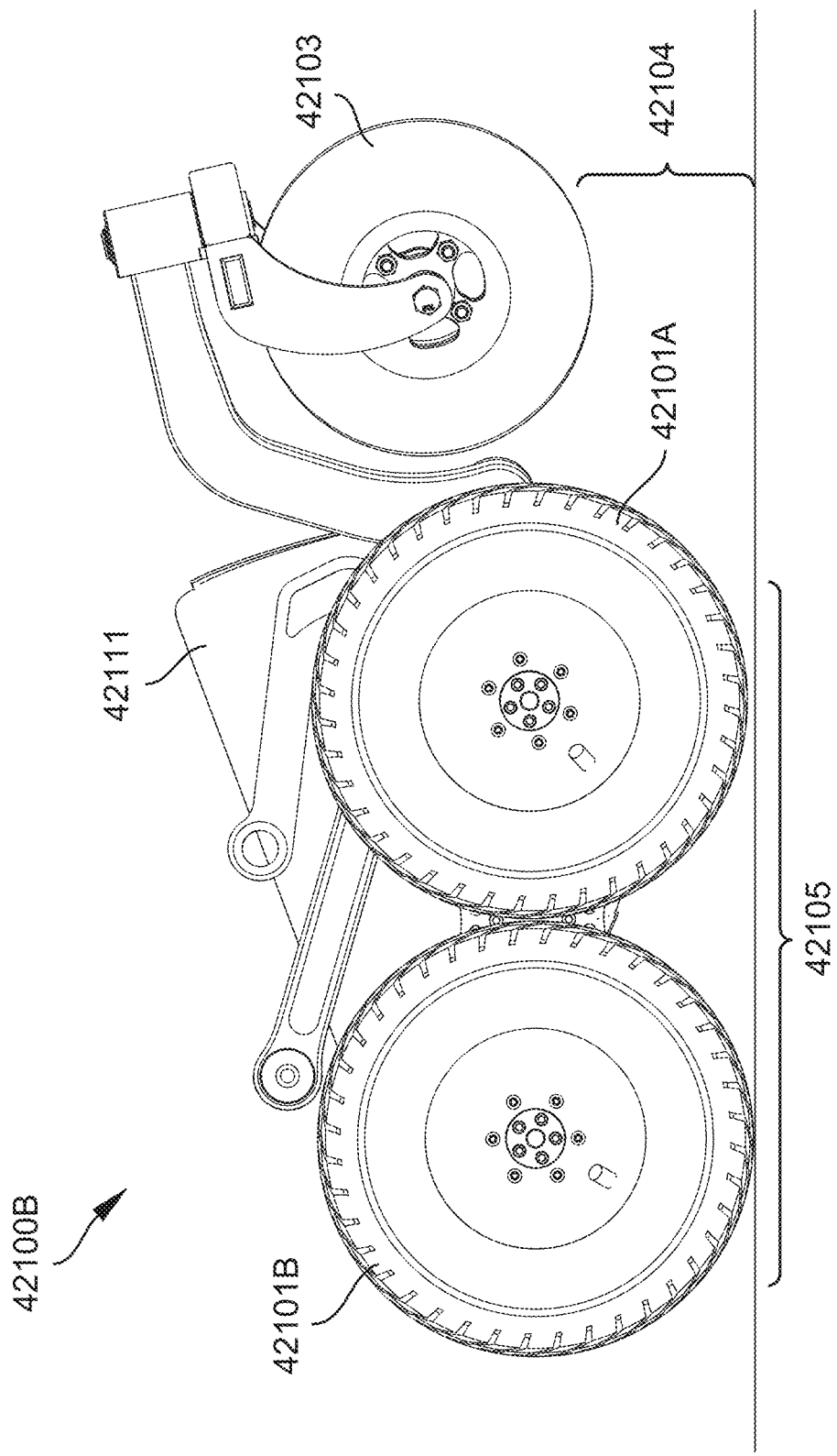
Figure 4I:
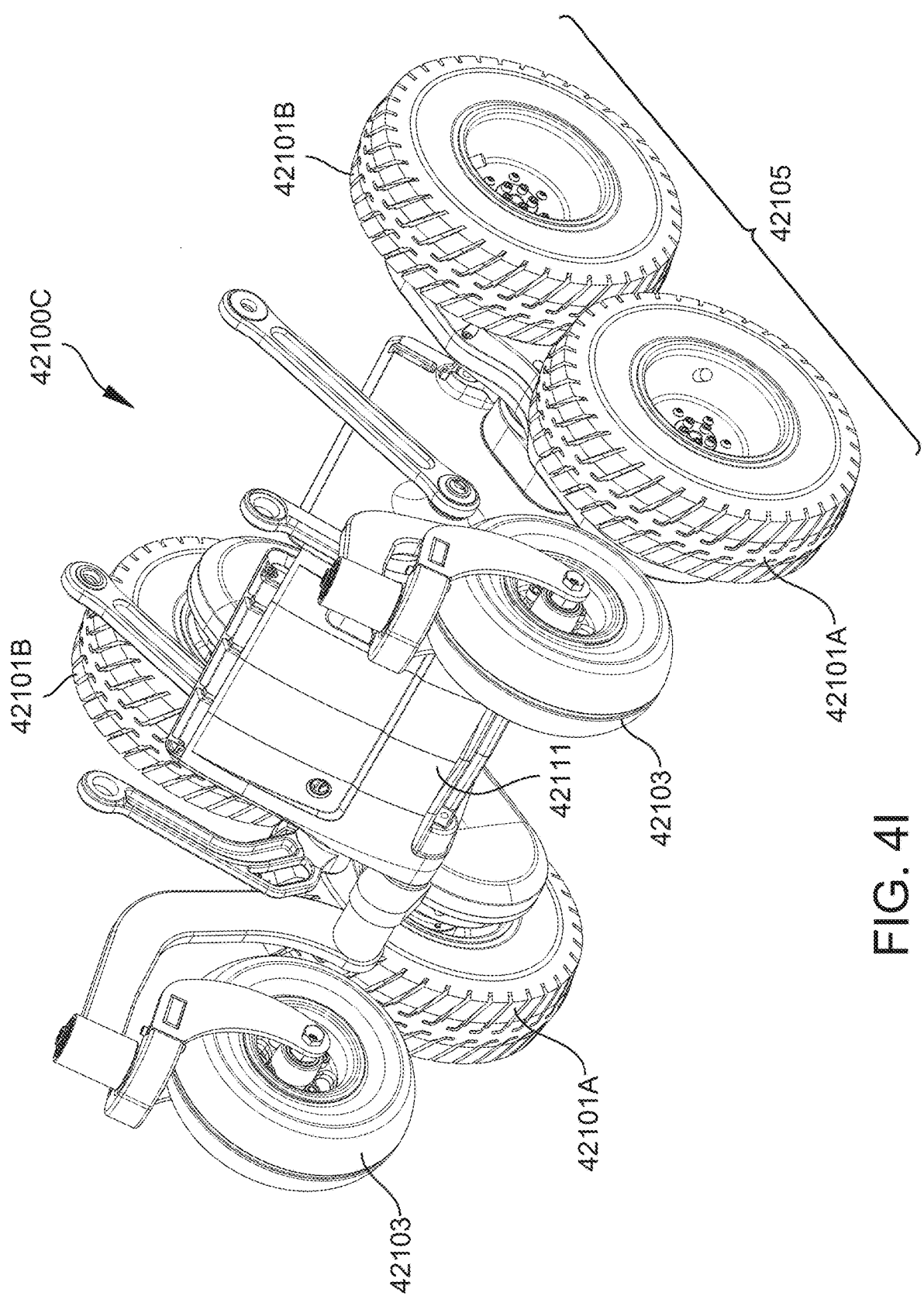

Referring now to FIGS. 4G-4J, device 42100B/C can be configured according to the present teachings to operate in 4-Wheel mode. In one configuration in 4-Wheel mode, first drive wheel 42101A and second drive wheel 42101B can rest on the ground as device 42100A navigates its path. Casters 42103 can be retracted and can clear the driving surface by a pre-selected amount 42104 (FIG. 4H). In another configuration in 4-Wheel mode, first drive wheel 42101A and second drive wheel 42101B can substantially rest on the ground as device 42100A navigates its path. Casters 42103 can be retracted and chassis 42111 can be rotated (thus moving casters 42103 farther from the ground) to accommodate, for example, a discontinuous surface. In this configuration, casters 42103 can clear the driving surface by a pre-selected amount 42108 (FIG. 1J). Devices 42100A/C can navigate successfully on a variety of surfaces including soft surfaces and discontinuous surfaces. In another configuration in 4-Wheel mode, second drive wheel 42101B can rest on the ground as device 42100A while first drive wheel 42101A can be raised as device 42100C (FIG. 1J) navigates its path. Casters 42103 can be retracted and chassis 42111 can be rotated (thus moving casters 42103 farther from the ground) to accommodate, for example, a discontinuous surface. When driving in 4-Wheel mode, occupancy grid 40244 (FIG. 4C) can reflect the surface type (see Table I), and therefore can enable a compatible choice of mode or can enable a configuration change based on the surface type and the current mode.

Figure 4K:
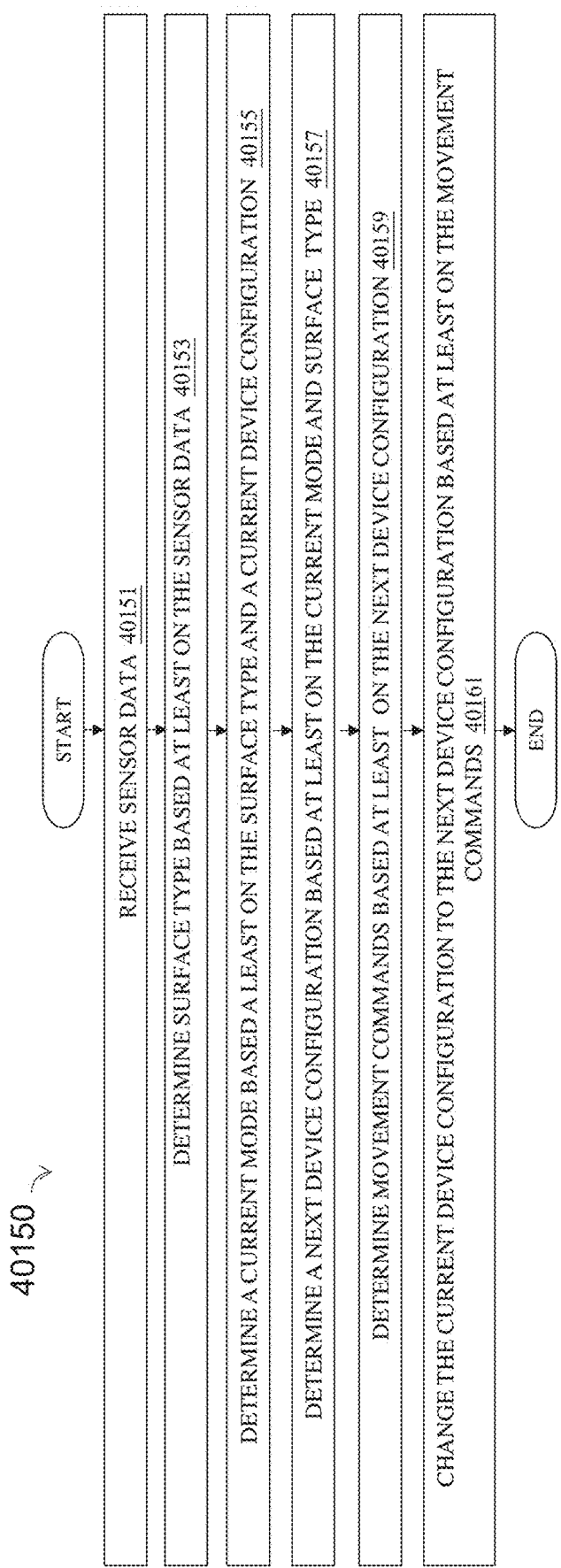
FIG. 4K is a flowchart of the method of the present teachings.

Referring now to FIG. 4K, method 40150 for real-time control of a device configuration of a device such as, for example, but not limited to, an AV, traveling a path based on at least one environmental factor and the device configuration, can include, but is not limited to including, receiving 40151 sensor data, determining 40153 a surface type based at least on the sensor data, and determining 40155 a current mode based at least on the surface type and a current device configuration. Method 40150 can include determining 40157 a next device configuration based at least on the current mode and the surface type, determining 40159 movement commands based at least on the next device configuration, and changing 40161 the current device configuration to the next device configuration based at least on the movement commands.

Figure 5A:
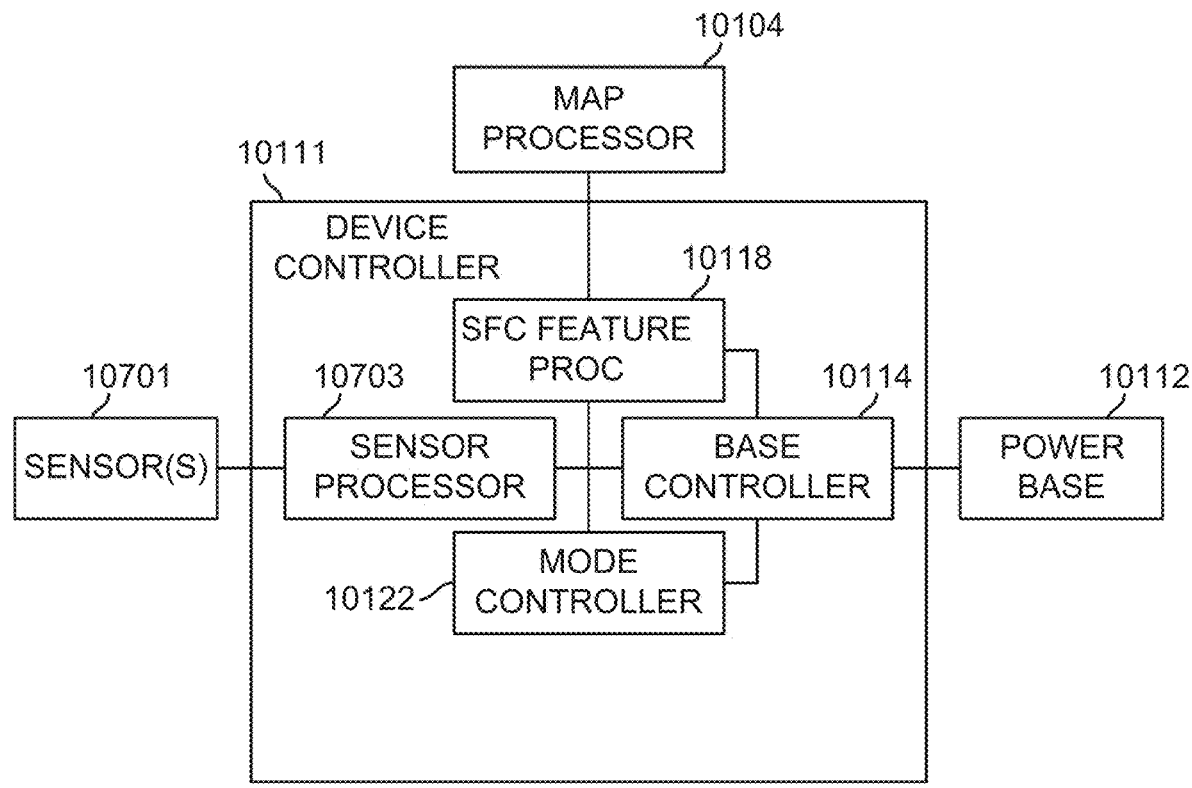
FIG. 5A is a schematic block diagram of the device controller of the present teachings.

Referring now primarily to FIG. 5A, to respond to objects that appear in the path of the AV, annotated point data 10379 (FIG. 5B) can be provided to device controller 10111. Annotated point data 10379 (FIG. 5B), which can be the basis for route information that can be used to instruct AV 10101 (FIG. 1A) to travel a path, can include, but is not limited to including, navigable edges, a mapped trajectory such as, for example, but not limited to mapped trajectory 10413/10415 (FIG. 5D), and labeled features such as, for example, but not limited to, SDSFs 10377 (FIG. 5C). Mapped trajectory 10413/10415 (FIG. 5C) can include a graph of edges of the route space and initial weights assigned to parts of the route space. The graph of edges can include characteristics such as, for example, but not limited to, directionality and capacity, and edges can be categorized according to these characteristics. Mapped trajectory 10413/10415 (FIG. 5C) can include cost modifiers associated with the surfaces of the route space, and drive modes associated with the edges. Drive modes can include, but are not limited to including, path following and SDSF climbing. Other modes can include operational modes such as, for example, but not limited to, autonomous, mapping, and waiting for intervention. Ultimately, the path can be selected based at least on lower cost modifiers. Topology that is relatively distant from mapped trajectory 10413/10415 (FIG. 5C) can have higher cost modifiers, and can be of less interest when forming a path. Initial weights can be adjusted while AV 10101 (FIG. 1A) is operational, possibly causing a modification in the path. Adjusted weights can be used to adjust edge/weight graph 10381 (FIG. 5B), and can be based at least on the current drive mode, the current surface, and the edge category.

Continuing to refer to FIG. 5A, device controller 10111 can include a feature processor that can perform specific tasks related to incorporating the eccentricities of any features into the path. In some configurations, the feature processor can include, but is not limited to including, SDSF processor 10118. In some configurations, device controller 10111 can include, but is not limited to including, SDSF processor 10118, sensor processor 10703, mode controller 10122, and base controller 10114, each described herein. SDSF processor 10118, sensor processor 10703, and mode controller 10122 can provide input to base controller 10114.

Figure 5B:
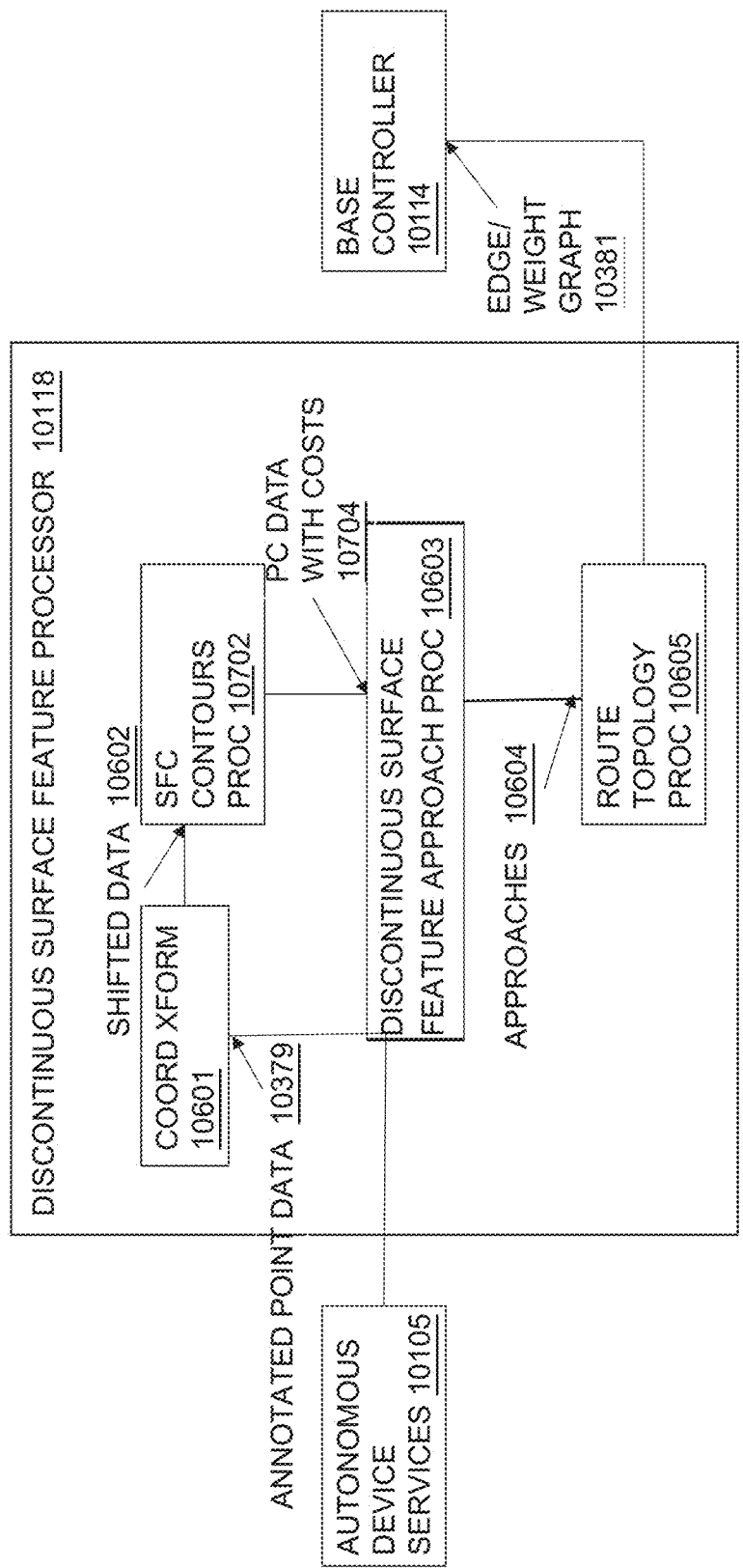
FIG. 5B is a schematic block diagram of the SDSF processor of the present teachings.
Figure 5C:
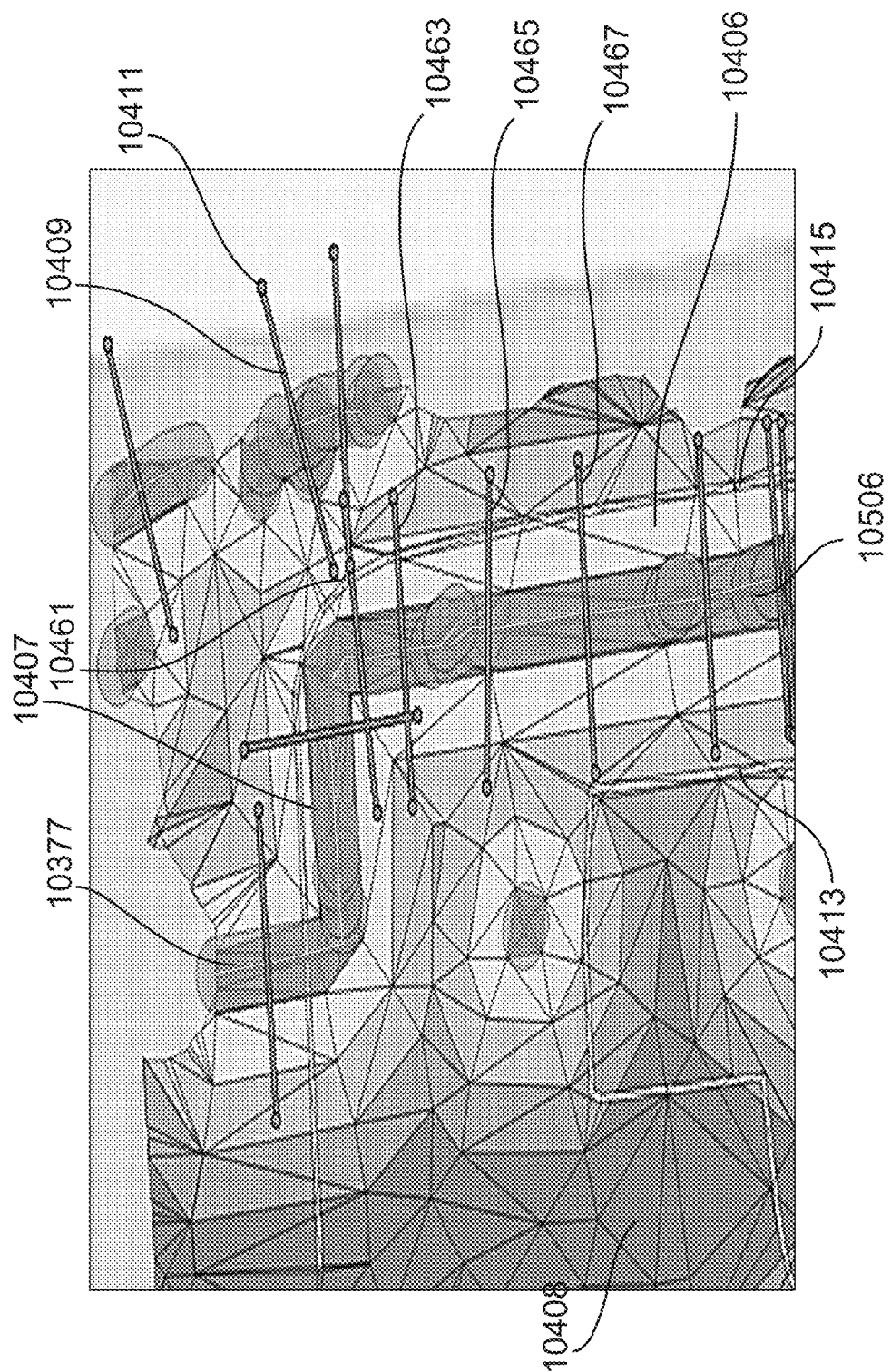
FIG. 5C is an image of the SDSF approaches identified by the system of the present teachings.
Figure 5D:
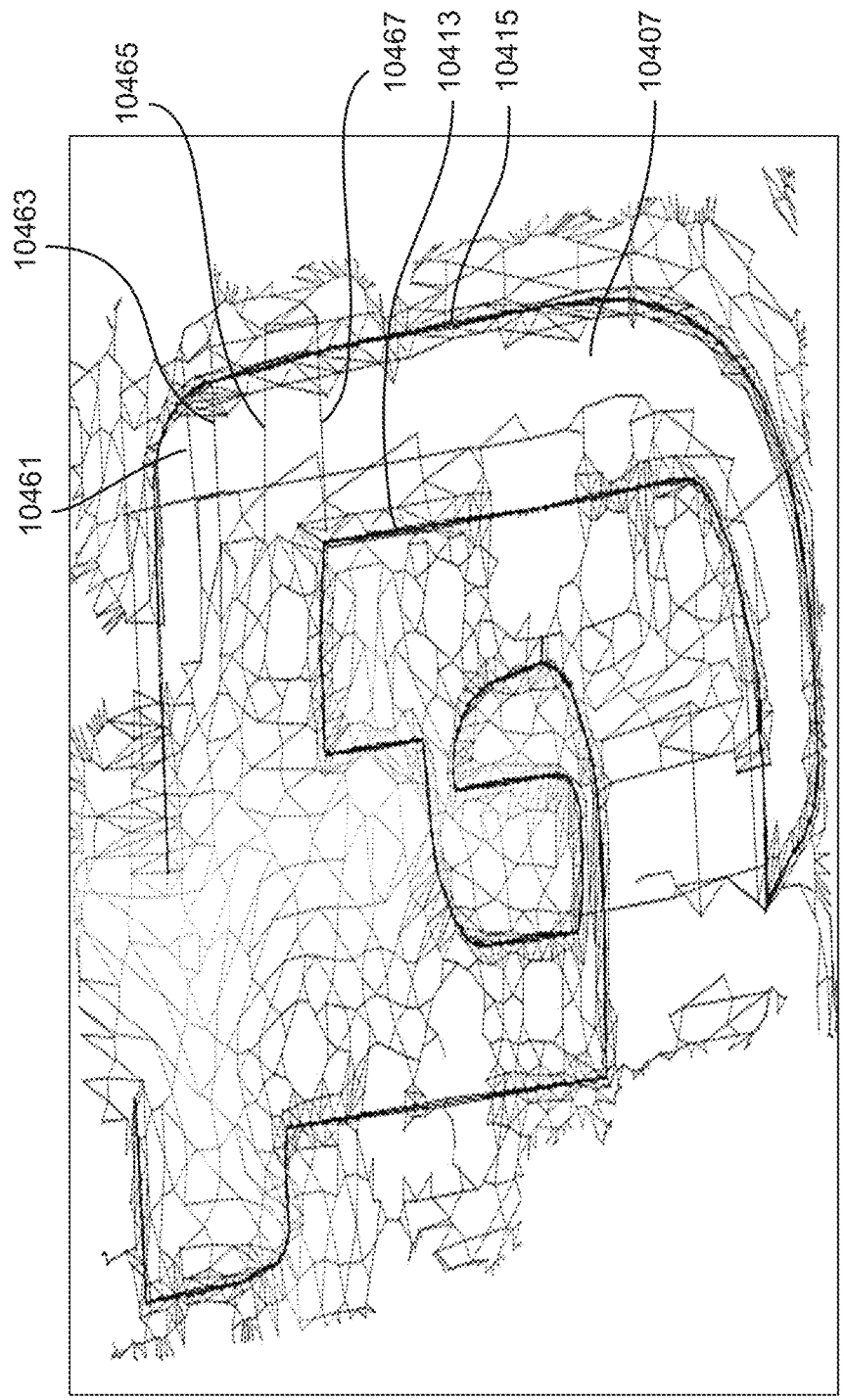
FIG. 5D is an image of the route topology created by the system of the present teachings.

Continuing to refer to FIG. 5A, base controller 10114 can determine, based at least on the inputs provided by mode controller 10122, SDSF processor 10118, and sensor processor 10703, information that power base 10112 can use to drive AV 10101 (FIG. 1A) on a path determined by base controller 10114 based at least on edge/weight graph 10381 (FIG. 5B). In some configurations, base controller 10114 can insure that AV 10101 (FIG. 1A) can follow a pre-determined path from a starting point to a destination, and modify the pre-determined path based at least on external and/or internal conditions. In some configurations, external conditions can include, but are not limited to including, stoplights, SDSFs, and obstacles in or near the path being driven by AV 10101 (FIG. 1A). In some configurations, internal conditions can include, but are not limited to including, mode transitions reflecting the response that AV 10101 (FIG. 1A) makes to external conditions. Device controller 10111 can determine commands to send to power base 10112 based at least on the external and internal conditions. Commands can include, but are not limited to including, speed and direction commands that can direct AV 10101 (FIG. 1A) to travel the commanded speed in the commanded direction. Other commands can include, for example, groups of commands that enable feature response such as, for example, SDSF climbing. Base controller 10114 can determine a desired speed between waypoints of the path by conventional methods, including, but not limited to, Interior Point Optimizer (IPOPT) large-scale nonlinear optimization (https://projects-.coin-or.org/Ipopt), for example. Base controller 10114 can determine a desired path based at least on conventional technology such as, for example, but not limited to, technology based on Dykstra's algorithm, the A* search algorithm, or the Breadth-first search algorithm. Base controller 10114 can form a box around mapped trajectory 10413/ 10415 (FIG. 5C) to set an area in which obstacle detection can be performed. The height of the payload carrier, when adjustable, can be adjusted based at least in part on the directed speed.

Continuing to refer to FIG. 5A, base controller 10114 can convert speed and direction determinations to motor commands. For example, when a SDSF such as, for example, but not limited to, a curb or slope is encountered, base controller 10114, in SDSF climbing mode, can direct power base 10112 to raise payload carrier 10173 (FIG. 1A), align AV 10101 (FIG. 1A) at approximately a 90° angle with the SDSF, and reduce the speed to a relatively low level. When AV 10101 (FIG. 1A) climbs the substantially discontinuous surface, base controller 10114 can direct power base 10112 to transition to a climbing phase in which the speed is increased because increased torque is required to move AV 10101 (FIG. 1A) up an incline. When AV 10101 (FIG. 1A) encounters a relatively level surface, base controller 10114 can reduce the speed in order to remain atop any flat part of the SDSF. When, in the case of a decline ramp associated with the flat part, AV 10101 (FIG. 1A) begins to descend the substantially discontinuous surface, and when both wheels are on the decline ramp, base controller 10114 can allow speed to increase. When a SDSF such as, for example, but not limited to, a slope is encountered, the slope can be identified and processed as a structure. Features of the structure can include a pre-selected size of a ramp, for example. The ramp can include an approximate 30° degree incline, and can optionally, but not limited to, be on both sides of a plateau. Device controller 10111 (FIG. 5A) can distinguish between an obstacle and a slope by comparing the angle of the perceived feature to an expected slope ramp angle, where the angle can be received from sensor processor 10703 (FIG. 5A).

Referring now primarily to FIG. 5B, SDSF processor 10118 can locate, from the blocks of drivable surfaces formed by a mesh of polygons represented in annotated point data 10379, navigable edges that can be used to create a path for traversal by AV 10101 (FIG. 1A). Within SDSF buffer 10407 (FIG. 5C), which can form an area of pre-selected size around SDSF line 10377 (FIG. 5C), navigable edges can be erased (see FIG. 5D) in preparation for the special treatment given SDSF traversal. Closed line segments such as segment 10409 (FIG. 5C) can be drawn to bisect SDSF buffer 10407 (FIG. 5C) between pairs of the previously determined SDSF points 10789 (FIG. 1N). In some configurations, for a closed line segment to be considered as a candidate for SDSF traversal, segment ends 10411 (FIG. 5C) can fall in an unobstructed part of the drivable surface, there can be enough room for AV 10101 (FIG. 1A) to travel between adjacent SDSF points 10789 (FIG. 1N) along line segments, and the area between SDSF points 10789 (FIG. 1N) can be a drivable surface. Segment ends 10411 (FIG. 5C) can be connected to the underlying topology, forming vertices and drivable edges. For example, line segments 10461, 10463, 10465, and 10467 (FIG. 5C) that met the traversal criteria are shown as part of the topology in FIG. 5D. In contrast, line segment 10409 (FIG. 5C) did not meet the criteria at least because segment end 10411 (FIG. 5C) does not fall on a drivable surface. Overlapping SDSF buffers 10506 (FIG. 5C) can indicate SDSF discontinuity, which could weigh against SDSF traversal of the SDSFs within the overlapped SDSF buffers 10506 (FIG. 5C). SDSF line 10377 (FIG. 5C) can be smoothed, and the locations of SDSF points 10789 (FIG. 1N) can be adjusted so that they fall about a pre-selected distance apart, the pre-selected distance being based at least on the footprint of AV 10101 (FIG. 1A).

Continuing to refer to FIG. 5B, SDSF processor 10118 can transform annotated point data 10379 into edge/weight graph 10381, including topology modifications for SDSF traversal. SDSF processor 10118 can include seventh processor 10601, eighth processor 10702, ninth processor 10603, and tenth processor 10605. Seventh processor 10601 can transform the coordinates of the points in annotated point data 10379 to a global coordinate system, to achieve compatibility with GPS coordinates, producing GPS-compatible dataset 10602. Seventh processor 10601 can use conventional processes such as, for example, but not limited to, affine matrix transform and PostGIS transform, to produce GPS-compatible dataset 10602. The World Geodetic System (WGS) can be used as the standard coordinate system as it takes into account the curvature of the earth. The map can be stored in the Universal Transverse Mercator (UTM) coordinate system, and can be switched to WGS when it is necessary to find where specific addresses are located.

Referring now primarily to FIG. 5C, eighth processor 10702 (FIG. 5B) can smooth SDSFs and determine the boundary of SDSF 10377, create buffers 10407 around the SDSF boundary, and increase the cost modifier of the surface the farther it is from a SDSF boundary. Mapped trajectory 10413/10415 can be a special case lane having the lowest cost modifier. Lower cost modifiers 10406 can be generally located near the SDSF boundary, while higher cost modifiers 10408 can be generally located relatively farther from the SDSF boundary. Eighth processor 10702 can provide point cloud data with costs 10704 (FIG. 5B) to ninth processor 10603 (FIG. 5B).

Continuing to refer primarily to FIG. 5C, ninth processor 10603 (FIG. 5B) can calculate approximately 90° approaches 10604 (FIG. 5B) for AV 10101 (FIG. 1A) to traverse SDSFs 10377 that have met the criteria to label them as traversable. Criteria can include SDSF width and SDSF smoothness. Line segments, such as line segment 10409 can be created such their length is indicative of a minimum ingress distance that AV 10101 (FIG. 1A) might require to approach SDSF 10377, and a minimum egress distance that might be required to exit SDSF 10377. Segment endpoints, such as endpoint 10411, can be integrated with the underlying routing topology. The criteria used to determine if a SDSF approach is possible can eliminate some approach possibilities. SDSF buffers such as SDSF buffer 10407 can be used to calculate valid approaches and route topology edge creation.

Referring again primarily to FIG. 5B, tenth processor 10605 can create edge/weight graph 10381 from the topology, a graph of edges and weights, developed herein that can be used to calculate paths through the map. The topology can include cost modifiers and drive modes, and the edges can include directionality and capacity. The weights can be adjusted at runtime based on information from any number of sources. Tenth processor 10605 can provide at least one sequence of ordered points to base controller 10114, plus a recommended drive mode at particular points, to enable path generation. Each point in each sequence of points represents the location and labeling of a possible path point on the processed drivable surface. In some configurations, the labeling can indicate that the point represents part of a feature that could be encountered along the path, such as, for example, but not limited to, a SDSF. In some configurations, the feature could be further labeled with suggested processing based on the type of feature. For example, in some configurations, if the path point is labeled as a SDSF, further labeling can include a mode. The mode can be interpreted by AV 10101 (FIG. 1A) as suggested driving instructions for AV 10101 (FIG. 1A), such as, for example, switching AV 10101 (FIG. 1A) into SDSF climbing mode 100-31 (FIG. 5E) to enable AV 10101 (FIG. 1A) to traverse SDSF 10377 (FIG. 5C).

Figure 5E:
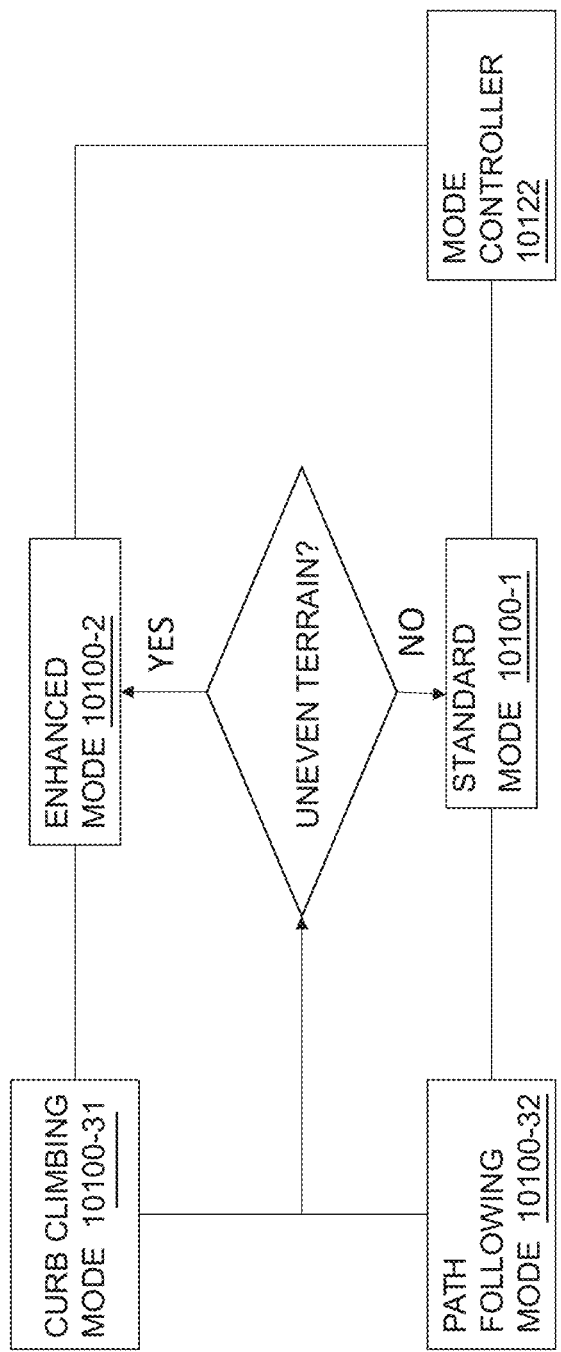
FIG. 5E is a schematic block diagram of the modes of the present teachings.

Referring now to FIG. 5E, in some configurations, mode controller 10122 can provide to base controller 10114 (FIG. 5A) directions to execute a mode transition. Mode controller 10122 can establish the mode in which AV 10101 (FIG. 1A) is traveling. For example, mode controller 10122 can provide to base controller 10114 a change of mode indication, changing between, for example, path following mode 10100-32 and SDSF climbing mode 10100-31 when a SDSF is identified along the travel path. In some configurations, annotated point data 10379 (FIG. 5B) can include mode identifiers at various points along the route, for example, when the mode changes to accommodate the route. For example, if SDSF 10377 (FIG. 5C) has been labeled in annotated point data 10379 (FIG. 5B), device controller 10111 can determine the mode identifier(s) associated with the route point(s) and possibly adjust the instructions to power base 10112 (FIG. 5A) based on the desired mode. In addition to SDSF climbing mode 10100-31 and path following mode 10100-32, in some configurations, AV 10101 (FIG. 1A) can support operating modes that can include, but are not limited to including, standard mode 10100-1 and enhanced (4-Wheel) mode 10100-2, described herein. The height of payload carrier 10173 (FIG. 1A) can be adjusted to provide necessary clearance over obstacles and along slopes.

Figure 5F:
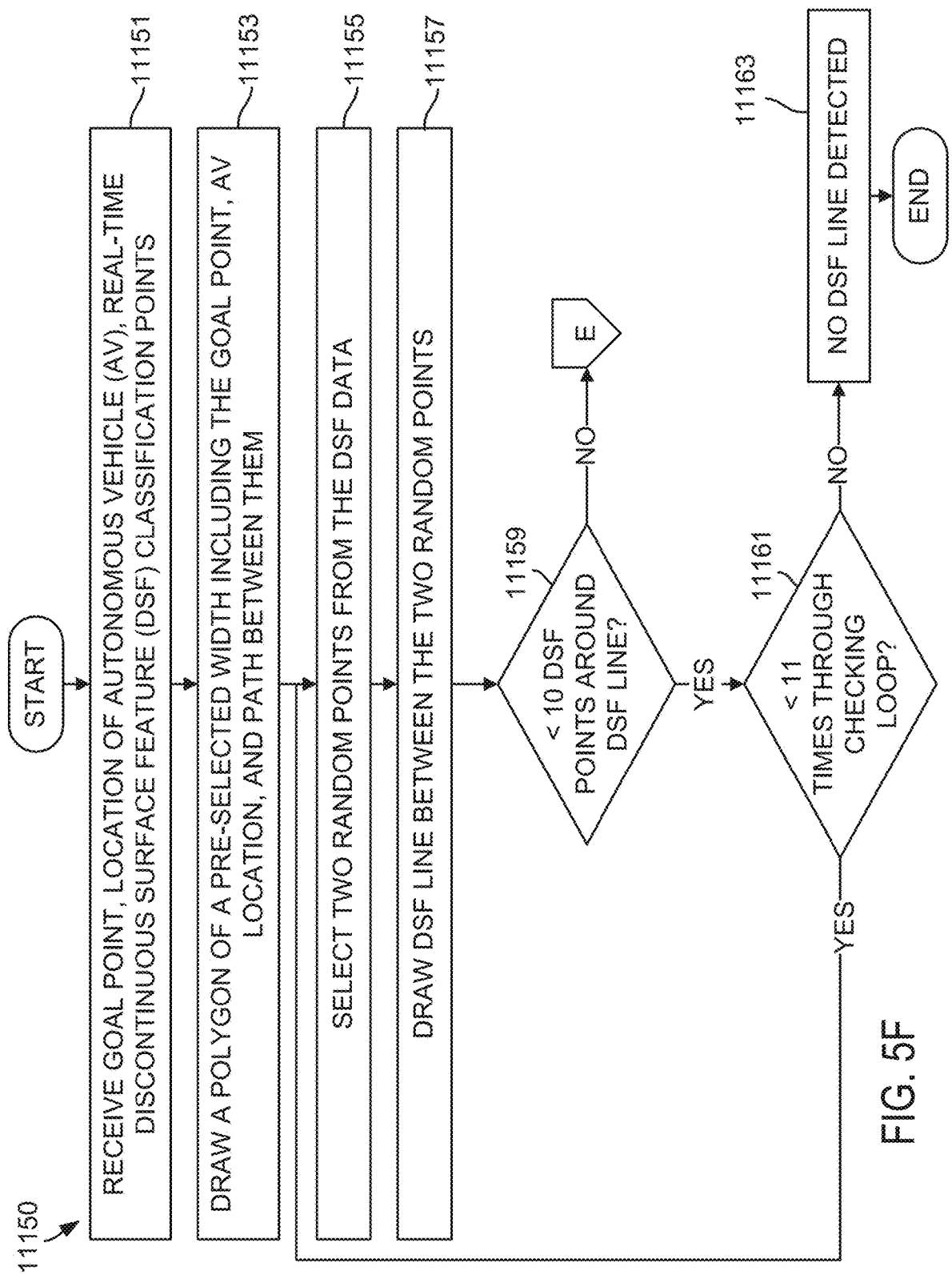

Referring now to FIG. 5F, method 11150 for navigating the AV towards a goal point across at least one SDSF can include, but is not limited to including, receiving 11151 SDSF information related to the SDSF, the location of the goal point, and the location of the AV. The SDSF information can include, but is not limited to including, a set of points each classified as SDSF points, and an associated probability for each point that the point is a SDSF point. Method 11150 can include drawing 11153 a closed polygon encompassing the location of the AV, the location of the goal point, and drawing a path line between the goal point and the location of the AV. The closed polygon can include a pre-selected width. Table I includes possible ranges for the pre-selected variables discussed herein. Method 11150 can include selecting 11155 two of the SDSF points located within the polygon and drawing 11157 a SDSF line between the two points. In some configurations, the selection of the SDSF points can be at random or any other way. If 11159 there are fewer than a first pre-selected number of points within a first pre-selected distance of the SDSF line, and if 11161 there have been less than a second pre-selected number of attempts at choosing SDSF points, drawing a line between them, and having fewer than the first pre-selected number of points around the SDSF line, method 11150 can include returning to step 11155. If 11161 there has been a second pre-selected number of attempts at choosing SDSF points, drawing a line between them, and having fewer than the first pre-selected number of points around the SDSF line, method 11150 can include noting 11163 that no SDSF line was detected.

Figure 5G:
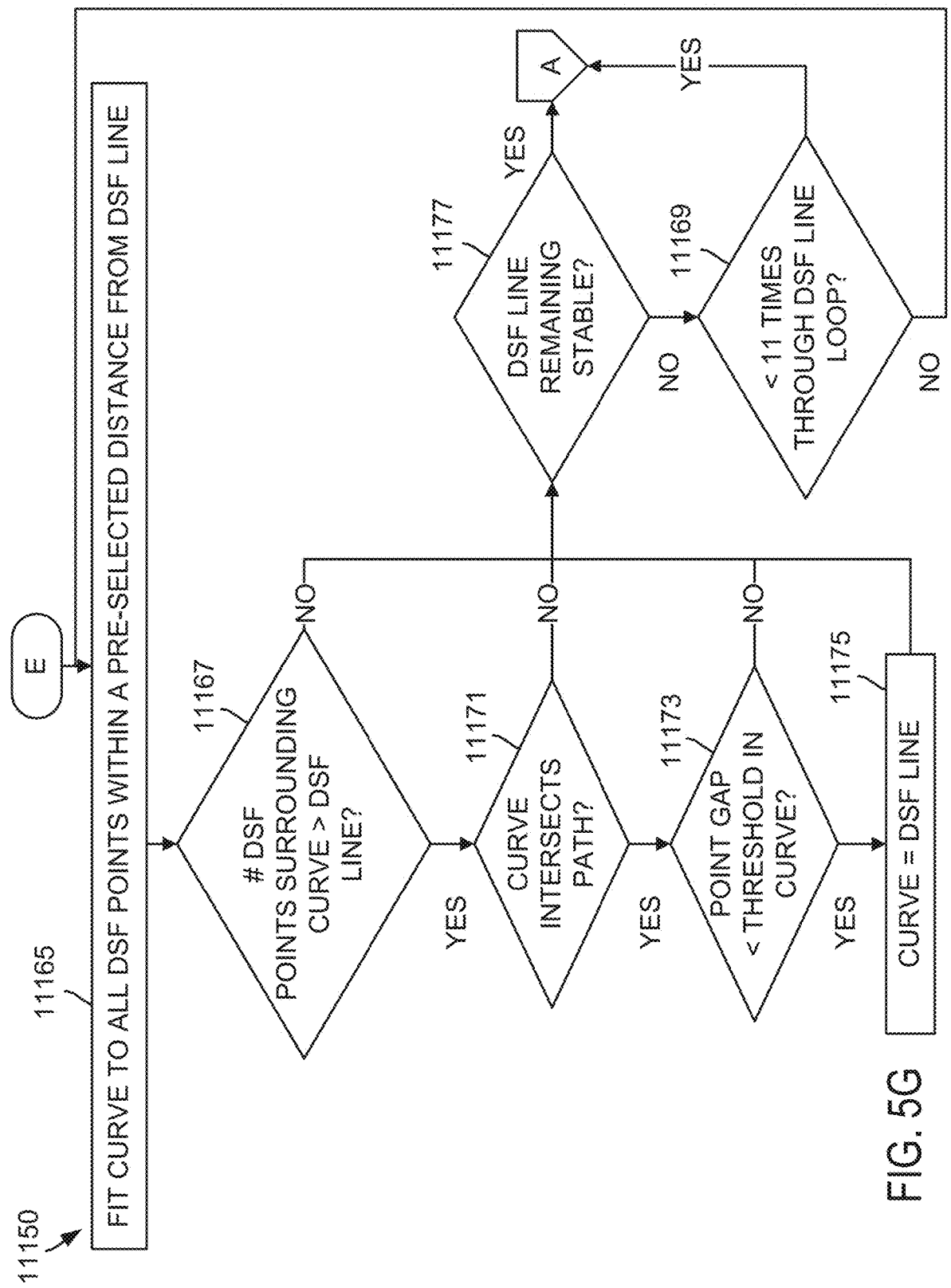
Figure 51:
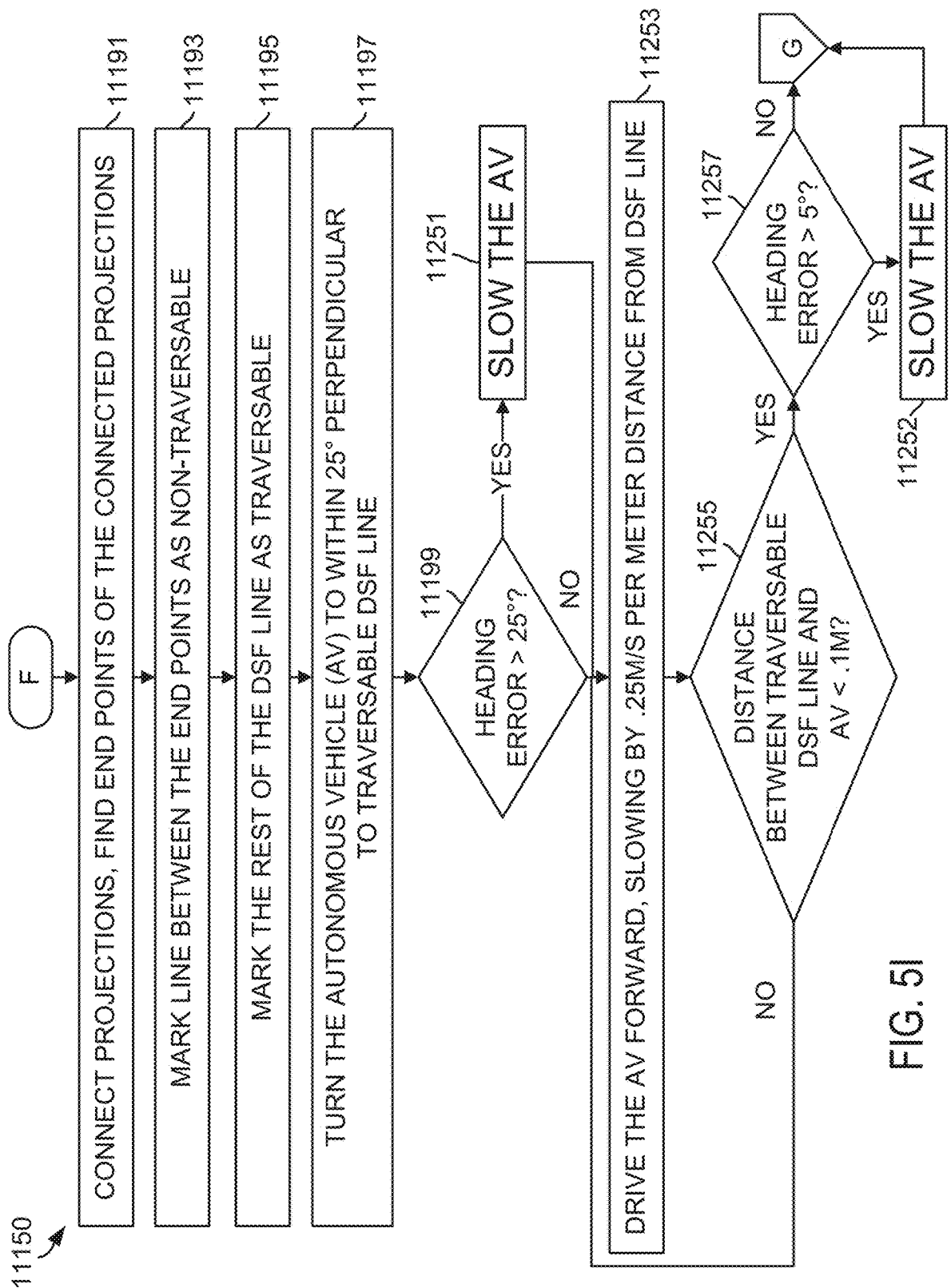

Referring now primarily to FIG. 5G, if 11159 (FIG. 5F) there are the first pre-selected number of points or more, method 11150 can include fitting 11165 a curve to the points that fall within the first pre-selected distance of the SDSF line. If 11167 the number of points that are within the first pre-selected distance of the curve exceeds the number of points within the first pre-selected distance of the SDSF line, and if 11171 the curve intersects the path line, and if 11173 there are no gaps between the points on the curve that exceed a second pre-selected distance, then method 11150 can include identifying 11175 the curve as the SDSF line. If 11167 the number of points that are within the first pre-selected distance of the curve does not exceed the number of points within the first pre-selected distance of the SDSF line, or if 11171 the curve does not intersect the path line, or if 11173 there are gaps between the points on the curve that exceed the second pre-selected distance, and if 11177 the SDSF line is not remaining stable, and if 11169 the curve fit has not been attempted more than the second pre-selected number of attempts, method 11150 can include returning to step 11165. A stable SDSF line is the result of subsequent iterations yielding the same or fewer points.

Referring now primarily to FIG. 5H, if 11169 (FIG. 5G) the curve fit has been attempted the second pre-selected number of attempts, or if 11177 (FIG. 5G) the SDSF line remains stable or degrades, method 11150 can include receiving 11179 occupancy grid information. The occupancy grid can provide the probability that obstacles exist at certain points. The occupancy grid information can augment the SDSF and path information that are found in the polygon that surrounds the AV path and the SDSF(s) when the occupancy grid includes data captured and/or computed over the common geographic area with the polygon. Method 11150 can include selecting 11181 a point from the common geographic area and its associated probability. If 11183 the probability that an obstacle exists at the selected point is higher than a pre-selected percent, and if 11185 the obstacle lies between the AV and the goal point, and if 11186 the obstacle is less than a third pre-selected distance from the SDSF line between SDSF line and the goal point, method 11150 can include projecting 11187 the obstacle to the SDSF line. If 11183 there is less than or equal to the pre-selected percent probability that the location includes an obstacle, or if 11185 the obstacle does not lie between the AV and the goal point, or if 11186 the obstacle lies at a distance equal to or greater than the third pre-selected distance from the SDSF line between the SDSF and the goal point, and if

11189 there are more obstacles to process, method 11150 can include resuming processing at step 11179.

Referring now primarily to FIG. 5I, if 11189 (FIG. 5H) there are no more obstacles to process, method 11150 can include connecting 11191 the projections and finding the end points of the connected projections along the SDSF line. Method 11150 can include marking 11193 the part of the SDSF line between the projection end points as non-traversable. Method 11150 can include marking 11195 the part of the SDSF line that is outside of the non-traversable section as traversable. Method 11150 can include turning 11197 the AV to within a fifth pre-selected amount perpendicular to the traversable section of the SDSF line. If 11199 the heading error with respect to a line perpendicular to the traversable section of the SDSF line is greater than the first pre-selected amount, method 11150 can include slowing 11251 the AV by a ninth pre-selected amount. Method 11150 can include driving 11253 the AV forward towards the SDSF line, slowing by a second pre-selected amount per meter distance between the AV and the traversable SDSF line. If 11255 the distance of the AV from the traversable SDSF line is less than a fourth pre-selected distance, and if 11257 the heading error is greater than or equal to a third pre-selected amount with respect to a line perpendicular to the SDSF line, method 11150 can include slowing 11252 the AV by the ninth pre-selected amount.

Figure 5J:
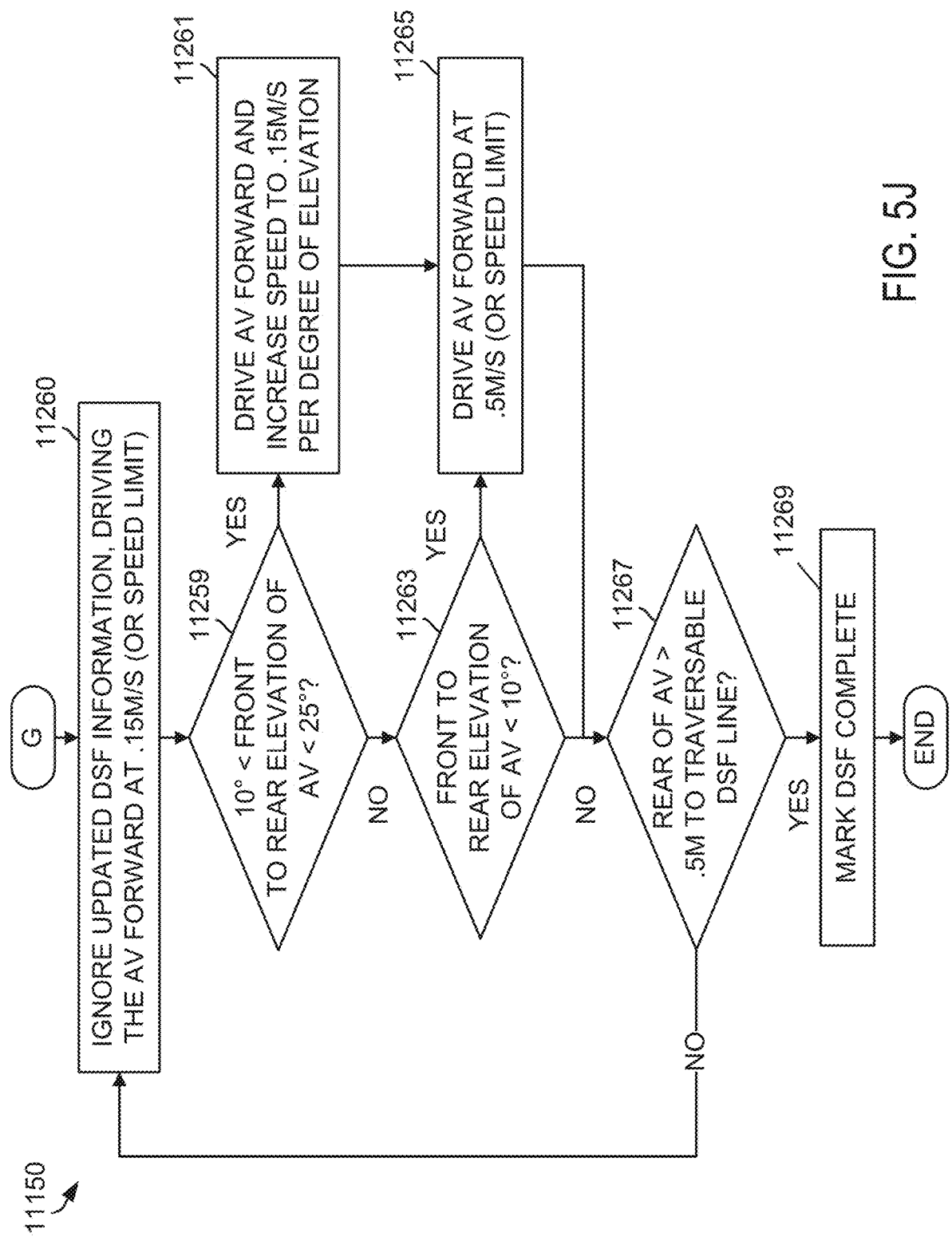

Referring now primarily to FIG. 5J, if 11257 (FIG. 5I) the heading error is less than the third pre-selected amount with respect to a line perpendicular to the SDSF line, method 11150 can include ignoring 11260 updated SDSF information and driving the AV at a pre-selected speed. If 11259 the elevation of a front part of the AV relative to a rear part of the AV is between a sixth pre-selected amount and the fifth pre-selected amount, method 11150 can include driving 11261 the AV forward and increasing the speed of the AV to an eighth pre-selected amount per degree of elevation. If 11263 the front to rear elevation of the AV is less than the sixth pre-selected amount, method 11150 can include driving 11265 the AV forward at a seventh pre-selected speed. If 11267 the rear of the AV is more than a fifth pre-selected distance from the SDSF line, method 11150 can include noting 11269 that the AV has completed traversing the SDSF. If 11267, the rear of the AV is less than or equal to the fifth pre-selected distance from the SDSF line, method 11150 can include returning to step 11260.

Figure 5K:
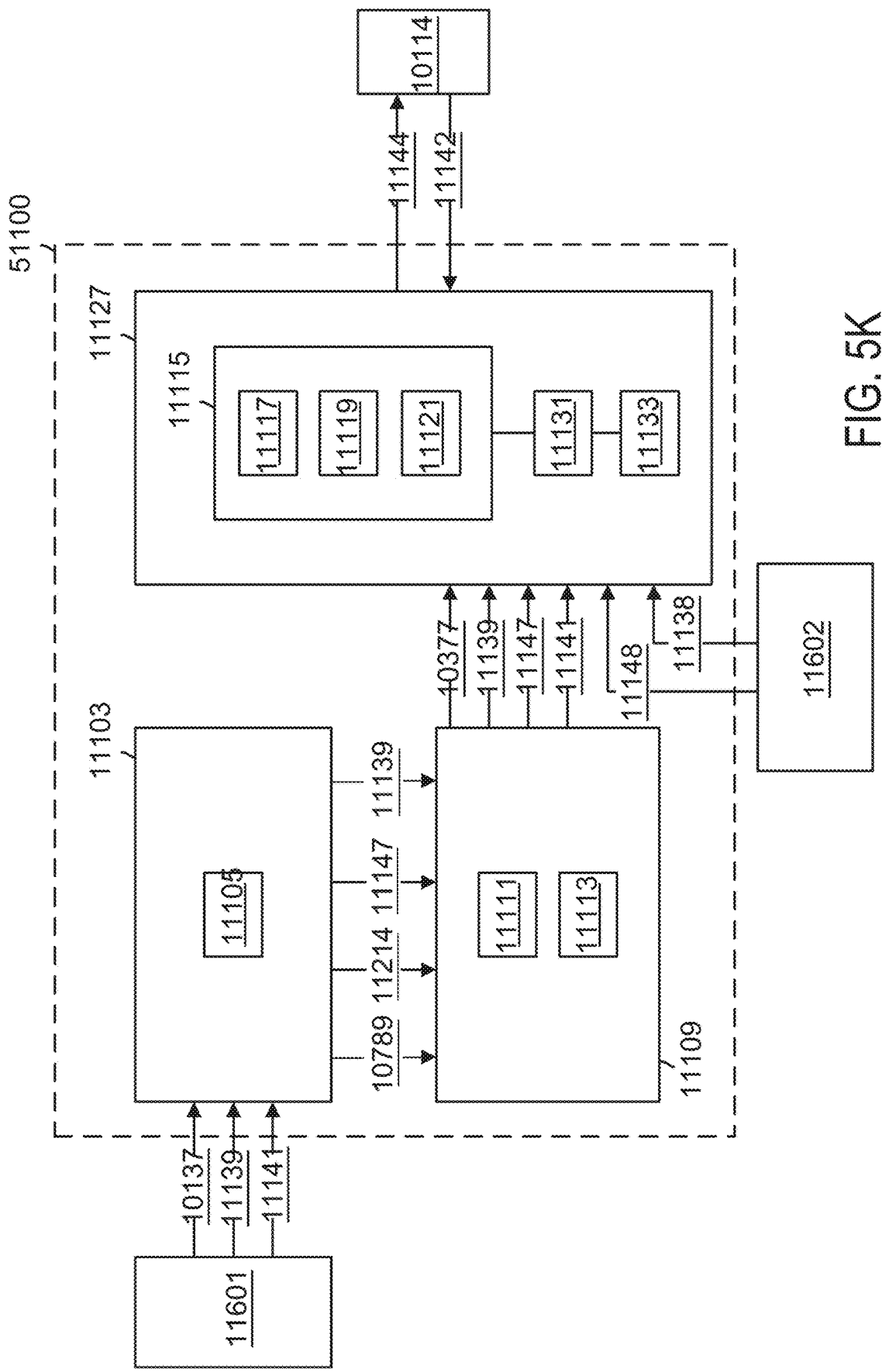
FIG. 5K is schematic block diagram of the system of the present teachings for traversing SDSFs.
Figure 5L:
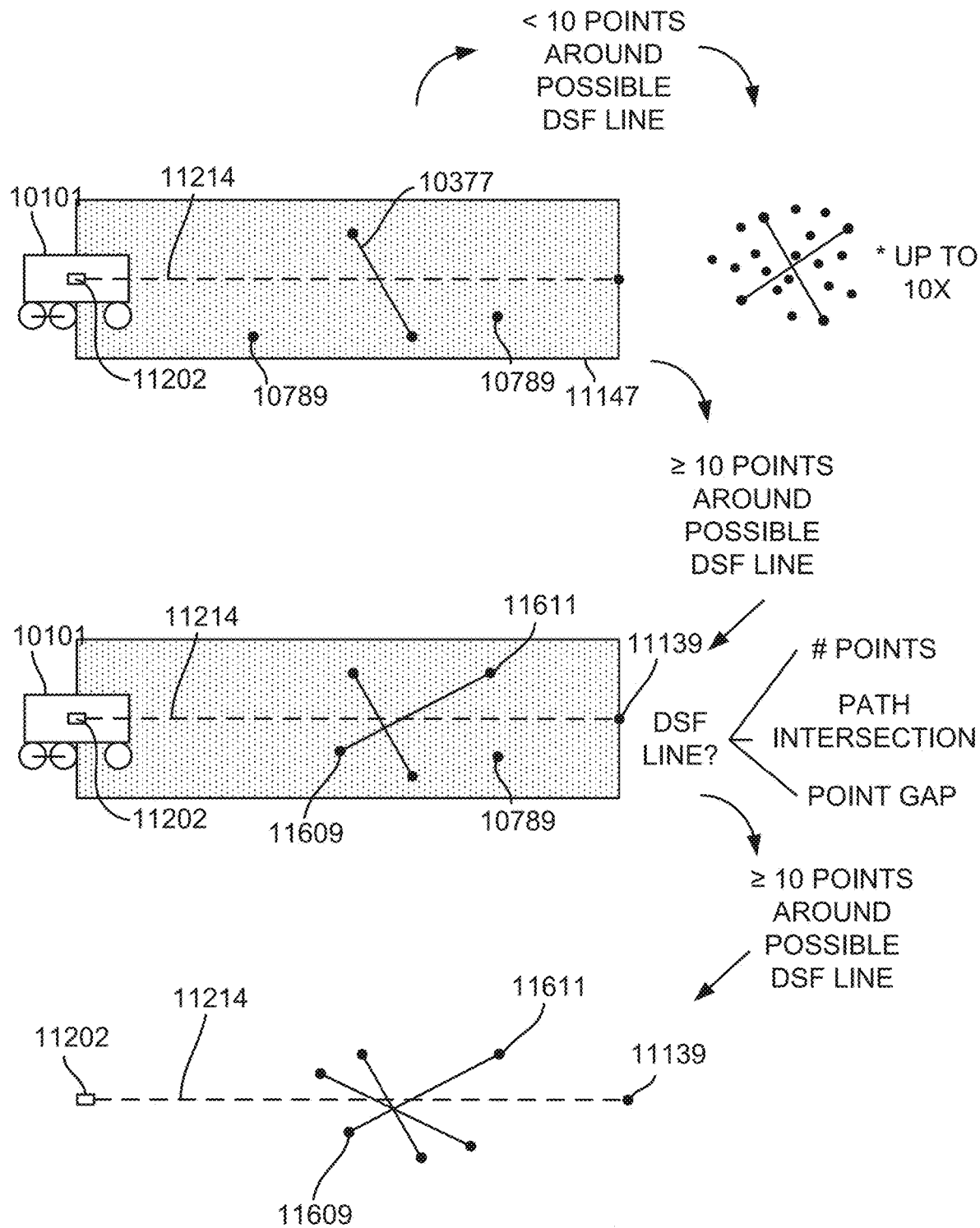
Figure 50:
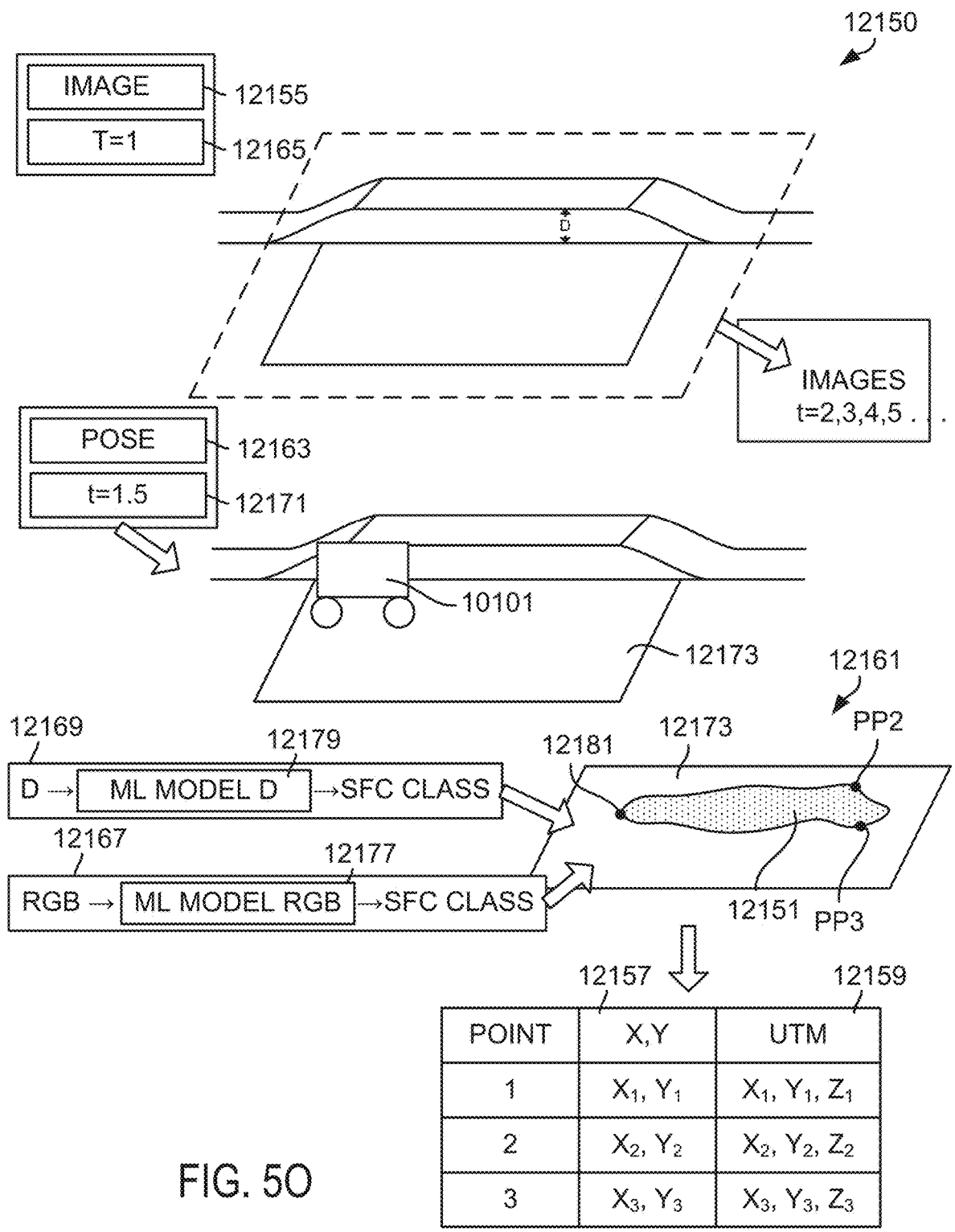

Referring now to FIG. 5K, system 51100 for navigating a AV towards a goal point across at least one SDSF can include, but is not limited to including, path line processor 11103, SDSF detector 11109, and SDSF controller 11127. System 51100 can be operably coupled with surface processor 11601 that can process sensor information that can include, for example, but not limited to, images of the surroundings of AV 10101 (FIG. 5L). Surface processor 11601 can provide real-time surface feature updates, including indications of SDSFs. In some configurations, cameras can provide RGB-D data whose points can be classified according to surface type. In some configurations, system 51100 can process the points that have been classified as SDSFs and their associated probabilities. System 51100 can be operably coupled with system controller 11602, which can manage aspects of the operation of AV 10101 (FIG. 5L). System controller 11602 can maintain occupancy grid 11138 that can include information from available sources concerning navigable areas near AV 10101 (FIG. 5L). Occupancy grid 11138 can include probabilities that obstacles exist. This information can be used, in conjunction with SDSF information, to determine if SDSF 10377 (FIG. 5N) can be traversed by AV 10101 (FIG. 5L), without encountering obstacle 11681 (FIG. 5M). System controller 11602 can determine, based on environmental and other information, speed limit 11148 that AV 10101 (FIG. 5N) should not exceed. Speed limit 11148 can be used as a guide, or can override, speeds set by system 51100. System 51100 can be operably coupled with base controller 10114 which can send drive commands 11144 generated by SDSF controller 11127 to the drive components of the AV 10101 (FIG. 5L). Base controller 10114 can provide information to SDSF controller 11127 about the orientation of AV 10101 (FIG. 5L) during SDSF traverse.

Continuing to refer to FIG. 5K, path line processor 11103 can continuously receive in real time surface classification points 10789 that can include, but are not limited to including, points classified as SDSFs. Path line processor 11103 can receive the location of goal point 11139, and AV location 11141 as indicated by, for example, but not limited to, center 11202 (FIG. 5L) of AV 10101 (FIG. 5L). System 51100 can include polygon processor 11105 drawing polygon 11147 encompassing AV location 11141, the location of goal point 11139, and path 11214 between goal point 11139 and AV location 11141. Polygon 11147 can include the pre-selected width. In some configurations, the pre-selected width can include approximately the width of AV 10101 (FIG. 5L). SDSF points 10789 that fall within polygon 11147 can be identified.

Continuing to refer to FIG. 5K, SDSF detector 11109 can receive surface classification points 10789, path 11214, polygon 11147, and goal point 11139, and can determine the most suitable SDSF line 10377, according to criteria set out herein, available within the incoming data. SDSF detector 11109 can include, but is not limited to including, point processor 11111 and SDSF line processor 11113. Point processor 11111 can include selecting two of SDSF points 10789 located within polygon 11147, and drawing SDSF 10377 line between the two points. If there are fewer than the first pre-selected number of points within the first pre-selected distance of SDSF line 10377, and if there have been less than the second pre-selected number of attempts at choosing SDSF points 10789, drawing a line between the two points, and having fewer than the first pre-selected number of points around the SDSF line, point processor 11111 can include again looping through the selecting-drawing-testing loop as stated herein. If there have been the second pre-selected number of attempts at choosing SDSF points, drawing a line between them, and having fewer than the first pre-selected number of points around the SDSF line, point processor 11111 can include noting that no SDSF line was detected.

Continuing to refer to FIG. 5K, SDSF line processor 11113 can include, if there are the first pre-selected number or more of points 10789, fitting curve 11609-11611 (FIG. 5L) to points 10789 that fall within the first pre-selected distance of SDSF line 10377. If the number of points 10789 that are within the first pre-selected distance of curve 11609-11611 (FIG. 5L) exceeds the number of points 10789 within the first pre-selected distance of SDSF line 10377, and if curve 11609-11611 (FIG. 5L) intersects path line 11214, and if there are no gaps between the points 10789 on curve 11609-11611 (FIG. 5L) that exceed the second pre-selected distance, SDSF line processor 11113 can include identifying curve 11609-11611 (FIG. 5L) (for example) as SDSF line 10377. If the number of points 10789 that are within the pre-selected distance of curve 11609-11611 (FIG. 5L) does not exceed the number of points 10789 within the first pre-selected distance of SDSF line 10377, or if curve 11609-11611 (FIG. 5L) does not intersect path line 11214, or if there are gaps between points 10789 on curve 11609-11611 (FIG. 5L) that exceed the second pre-selected distance, and if SDSF line 10377 is not remaining stable, and if the curve fit has not been attempted more than the second pre-selected number of attempts, SDSF line processor 11113 can execute the curve fit loop again.

Continuing to refer to FIG. 5K, SDSF controller 11127 can receive SDSF line 10377, occupancy grid 11138, AV orientation changes 11142, and speed limit 11148, and can generate SDSF commands 11144 to drive AV 10101 (FIG. 5L) to correctly traverse SDSF 10377 (FIG. 5N). SDSF controller 11127 can include, but is not limited to including, obstacle processor 11115, SDSF approach 11131, and SDSF traverse 11133. Obstacle processor 11115 can receive SDSF line 10377, goal point 11139, and occupancy grid 11138, and can determine if, among the obstacles identified in occupancy grid 11138, any of them could impede AV 10101 (FIG. 5N) as it traverses SDSF 10377 (FIG. 5N). Obstacle processor 11115 can include, but is not limited to including, obstacle selector 11117, obstacle tester 11119, and traverse locator 11121. Obstacle selector 11117 can include, but is not limited to including, receiving occupancy grid 11138 as described herein. Obstacle selector 11117 can include selecting an occupancy grid point and its associated probability from the geographic area that is common to both occupancy grid 11138 and polygon 11147. Obstacle tester 11119 can include, if the probability that an obstacle exists at the selected grid point is higher than the pre-selected percent, and if the obstacle lies between AV 10101 (FIG. 5L) and goal point 11139, and if the obstacle is less than the third pre-selected distance from SDSF line 10377 between SDSF line 10377 and goal point 11139, obstacle tester 11119 can include projecting the obstacle to SDSF line 10377, forming projections 11621 that intersect SDSF line 10377. If there is less than or equal to the pre-selected percent probability that the location includes an obstacle, or if the obstacle does not lie between AV 10101 (FIG. 5L) and goal point 11139, or if the obstacle lies at a distance equal to or greater than the third pre-selected distance from SDSF line 10377 between SDSF line 10377 and goal point 11139, obstacle tester 11119 can include, if there are more obstacles to process, resuming execution at receiving occupancy grid 11138.

Continuing to refer to FIG. 5K, traverse locator 11121 can include connecting projection points and locating end points 11622/11623 (FIG. 5M) of connected projections 11621 (FIG. 5M) along SDSF line 10377. Traverse locater 11121 can include marking part 11624 (FIG. 5M) of SDSF line 10377 between projection end points 11622/11623 (FIG. 5M) as non-traversable. Traverse locater 11121 can include marking parts 11626 (FIG. 5M) of SDSF line 10377 that are outside of non-traversable part 11624 (FIG. 5M) as traversable.

Continuing to refer to FIG. 5K, SDSF approach 11131 can include sending SDSF commands 11144 to turn AV 10101 (FIG. 5N) to within the fifth pre-selected amount perpendicular to traversable part 11626 (FIG. 5N) of SDSF line 10377. If the heading error with respect to perpendicular line 11627 (FIG. 5N), perpendicular to traversable section 11626 (FIG. 5N) of SDSF line 10377, is greater than the first pre-selected amount, SDSF approach 11131 can include sending SDSF commands 11144 to slow AV 10101 (FIG. 5N) by the ninth pre-selected amount. In some configurations, the ninth pre-selected amount can range from very slow to completely stopped. SDSF approach 11131 can include sending SDSF commands 11144 to drive AV 10101 (FIG. 5N) forward towards SDSF line 10377, sending SDSF commands 11144 to slow AV 10101 (FIG. 5N) by the second pre-selected amount per meter traveled. If the distance between AV 10101 (FIG. 5N) and traversable SDSF line 11626 (FIG. 5N) is less than the fourth pre-selected distance, and if the heading error is greater than or equal to the third pre-selected amount with respect to a line perpendicular to SDSF line 10377, SDSF approach 11131 can include sending SDSF commands 11144 to slow AV 10101 (FIG. 5N) by the ninth pre-selected amount.

Continuing to refer to FIG. 5K, if the heading error is less than the third pre-selected amount with respect to a line perpendicular to SDSF line 10377, SDSF traverse 11133 can include ignoring updated SDSF information and sending SDSF commands 11144 to drive AV 10101 (FIG. 5N) at the pre-selected rate. If the AV orientation changes 11142 indicate that the elevation of leading edge 11701 (FIG. 5N) of AV 10101 (FIG. 5N) relative to trailing edge 11703 (FIG. 5N) of AV 10101 (FIG. 5N) is between the sixth pre-selected amount and the fifth pre-selected amount, SDSF traverse 11133 can include sending SDSF commands 11144 to drive AV 10101 (FIG. 5N) forward, and sending SDSF commands 11144 to increase the speed of AV 10101 (FIG. 5N) to the pre-selected rate per degree of elevation. If AV orientation changes 11142 indicate that leading edge 11701 (FIG. 5N) to trailing edge 11703 (FIG. 5N) elevation of AV 10101 (FIG. 5N) is less than the sixth pre-selected amount, SDSF traverse 11133 can include sending SDSF commands 11144 to drive AV 10101 (FIG. 5N) forward at the seventh pre-selected speed. If AV location 11141 indicates that trailing edge 11703 (FIG. 5N) is more than the fifth pre-selected distance from SDSF line 10377, SDSF traverse 11133 can include noting that AV 10101 (FIG. 5N) has completed traversing SDSF 10377. If AV location 11141 indicates that trailing edge 11703 (FIG. 5N) is less than or equal to the fifth pre-selected distance from SDSF line 10377, SDSF traverse 11133 can include executing again the loop beginning with ignoring the updated SDSF information.

Some exemplary ranges for pre-selected values described herein can include, but are not limited to including, those laid out in Table II.

TABLE II

| Variable | Range | Description |
| --- | --- | --- |
| $1^{st}$ pre-selected number | 7-50 | # of points surrounding a SDSF line |
| $2^{nd}$ pre-selected number | 8-20 | Attempts to determine a $1^{st}$ SDSF line |
| $1^{st}$ pre-selected distance | 0.03-0.08 m | Distance from the SDSF line |
| $2^{nd}$ pre-selected distance | 1-7 m | Distance between SDSF points |
| $3^{rd}$ pre-selected distance | 0.5-3 m | Distance of obstacle from SDSF line |
| $4^{th}$ pre-selected distance | 0.05-0.5 m | Distance between AV and SDSF line |
| $5^{th}$ pre-selected distance | 0.3-0.7 m | Distance between rear of AV and SDSF line |
| $1^{st}$ pre-selected amount | 20°-30° | Heading error when AV is relatively far from SDSF line |

TABLE II-continued

| Variable | Range | Description |
| --- | --- | --- |
| $2^{nd}$ pre-selected amount | 0.2-0.3 m/s/meter | Amount of speed decrease when approaching SDSF line |
| $3^{rd}$ pre-selected amount | 3°-8° | Heading error when td is relatively close to SDSF line |
| $5^{th}$ pre-selected amount | 20°-30° | heading error with respect to perpendicular to SDSF line |
| $6^{th}$ pre-selected amount | 5°-15° | Front to rear elevation of td |
| $7^{th}$ pre-selected amount | 0.03-0.07 m/s | Constant speed of AV @ elevation < $6^{th}$ pre-selected amount |
| $8^{th}$ pre-selected amount | 0.1-0.2 m/s/degree | Speed rate change when elevation between about 10°-25° |
| $9^{th}$ pre-selected amount | 0-0.2 m/s | AV speed when heading error encountered |
| Pre-selected speed | 0.01-0.07 m/s | Driving rate near SDSF line |
| Pre-selected width | Width of AV – width of AV + 20 m | Width of polygon |
| Pre-selected % | 30-70% | Obstacle probability threshold |

Referring now to FIG. 5O, to support real-time data gathering, in some configurations, the system of the present teachings can produce locations in three-dimensional space of various surface types upon receiving data such as, for example, but not limited to, RGD-D camera image data. The system can rotate images 12155 and translate them from camera coordinate system 12157 into UTM coordinate system 12159. The system can produce polygon files from the transformed images, and the polygon files can represent the three-dimensional locations that are associated with surface type 12161. Method 12150 for locating features 12151 from camera images 12155 received by AV 10101, AV 10101 having pose 12163, can include, but is not limited to including, receiving, by AV 10101, camera images 12155. Each of camera images 12155 can include an image timestamp 12171, and each of images 12155 can include image color pixels 12167 and image depth pixels 12169. Method 12150 can include receiving pose 12163 of AV 10101, pose 12163 having pose timestamp 12171, and determining selected image 12173 by identifying an image from camera images 12155 having a closest image timestamp 12165 to pose timestamp 12171. Method 12150 can include separating image color pixels 12167 from image depth pixels 12169 in selected image 12173, and determining image surface classifications 12161 for selected image 12173 by providing image color pixels 12167 to first machine learning model 12177 and image depth pixels 12169 to second machine learning model 12179. Method 12150 can include determining perimeter points 12181 of the features in camera image 12173, where the features can include feature pixels 12151 within the perimeter, each of feature pixels 12151 having the same surface classification 12161, each of perimeter points 12181 having set of coordinates 12157. Method 12150 can include converting each of sets of coordinates 12157 to UTM coordinates 12159.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software for accomplishing the methods discussed herein, and computer readable media storing software for accomplishing these methods. The various modules described herein can be accomplished on the same CPU, or can be accomplished on a different computer. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. An autonomous delivery vehicle comprising:
a power base including two powered front wheels, two powered back wheels and an energy storage, the power base configured to move at a commanded velocity and in a commanded direction to perform a transport of at least one object;
a cargo platform including a plurality of short-range sensors, the cargo platform mechanically attached to the power base, the plurality of short-range sensors for configured to collect environmental data;
a cargo container with a volume for receiving the at least one object, the cargo container mounted on top of the cargo platform;
a long-range sensor suite comprising LI DAR and one or more cameras, the long-range sensor suite mounted on top of the cargo container; and
a controller to receive data from the long-range sensor suite and the plurality of short-range sensors, the controller configured to determine the commanded velocity and the commanded direction based at least on the data, the controller configured to provide the commanded velocity and the commanded direction to the power base to complete the transport;
wherein the data from the plurality of short-range sensors comprise at least one characteristic of a surface upon which the power base travels; and
wherein the controller comprises executable code configured for accessing a map, the map formed by a map processor, the map processor comprising:
  a first processor configured to access point cloud data from the long-range sensor suite, the point cloud data representing the surface;
  a filter configured to filter the point cloud data;
  a second processor configured to form processable parts from the filtered point cloud data;
  a third processor configured to merge the processable parts into at least one polygon;
  a fourth processor configured to locate and label at least one substantially discontinuous surface feature (SDSF) in the at least one polygon, if present, the locating and labeling forming labeled point cloud data;
  a fifth processor configured to create graphing polygons having polygon edges from a portion of the labeled point cloud data that is associated with a drivable surface; and
  a sixth processor configured to choose a path from a starting point to an ending point based at least on the graphing polygons, the autonomous delivery vehicle traversing the at least one SDSF along the path;
  wherein the creating graphing polygons comprises:
    smoothing the edges and defining smoothed edges;
    forming a driving margin based on the smoothed edges;
    generating an SDSF trajectory;
    adding the SDSF trajectory to the drivable surface; and
    removing the polygon edges from the drivable surface.

2. An autonomous delivery vehicle comprising:
a power base including two powered front wheels, two powered back wheels and an energy storage, the power base configured to move at a commanded velocity and in a commanded direction to perform a transport of at least one object;
a cargo platform including a plurality of short-range sensors, the cargo platform mechanically attached to the power base, the plurality of short-range sensors configured to collect environmental data;
a cargo container with a volume for receiving the at least one object, the cargo container mounted on top of the cargo platform;
a long-range sensor suite comprising LI DAR and one or more cameras, the long-range sensor suite mounted on top of the cargo container; and
a controller to receive data from the long-range sensor suite and the plurality of short-range sensors, the controller configured to determine the commanded velocity and the commanded direction based at least on the data, the controller configured to provide the commanded velocity and the commanded direction to the power base to complete the transport;
wherein the controller comprises a subsystem for navigating at least one substantially discontinuous surface feature (SDSF) encountered by the autonomous delivery vehicle (AV) when traveling a path over a surface, the surface including the at least one SDSF, the path including a starting point and an ending point, the subsystem comprising:
  a first processor configured to access a route topology, the route topology including at least one graphing polygon including filtered point cloud data, the filtered point cloud data including labeled features, the point cloud data including a drivable margin;
  a second processor configured to transform the point cloud data into a global coordinate system;
  a third processor configured to determine boundaries of the at least one SDSF, the third processor creating SDSF buffers of a pre-selected size around the boundaries;
  a fourth processor configured to determine which of the at least one SDSFs can be traversed based at least on at least one SDSF traversal criterion;
  a fifth processor configured to create an edge/weight graph based at least on the at least one SDSF traversal criterion, the transformed point cloud data, and the route topology; and
  a base controller configured to choose the path from the starting point to the ending point based at least on the edge/weight graph;
  wherein said SDSF traversal criterion comprises: a width of a smoothness of the at least one SDSF; a minimum ingress distance and a minimum egress distance between the at least one SDSF and the AV; and a minimum ingress distance between the at least one SDSF and the AV that can accommodate approximately a 90° approach by the AV to the at least one SDSF.

* * * * *